(12) United States Patent
Deboy

(10) Patent No.: US 9,584,034 B2
(45) Date of Patent: Feb. 28, 2017

(54) POWER CONVERTER CIRCUIT AND METHOD WITH ASYMMETRICAL HALF BRIDGE

(71) Applicant: Infineon Technologies Austria AG, Villach (AT)

(72) Inventor: Gerald Deboy, Klagenfurt (AT)

(73) Assignee: Infineon Technologies Austria AG, Villach (AT)

( * ) Notice: Subject to any disclaimer, the term of this patent is extended or adjusted under 35 U.S.C. 154(b) by 85 days.

(21) Appl. No.: 14/480,036

(22) Filed: Sep. 8, 2014

(65) Prior Publication Data

US 2016/0072398 A1  Mar. 10, 2016

(51) Int. Cl.
| | |
|---|---|
| H02M 7/23 | (2006.01) |
| H02M 3/335 | (2006.01) |
| H02M 7/44 | (2006.01) |
| H02M 7/49 | (2007.01) |
| H02M 1/00 | (2006.01) |
| H02M 7/483 | (2007.01) |

(52) U.S. Cl.
CPC ... *H02M 3/33592* (2013.01); *H02M 3/33584* (2013.01); *H02M 7/23* (2013.01); *H02M 7/44* (2013.01); *H02M 7/49* (2013.01); *H02M 2001/008* (2013.01); *H02M 2001/0074* (2013.01); *H02M 2001/0077* (2013.01); *H02M 2007/4835* (2013.01)

(58) Field of Classification Search
CPC ... H02M 2001/007; H02M 2001/0074; H02M 1/0077; H02M 3/3374; H02M 7/4826
See application file for complete search history.

(56) References Cited

U.S. PATENT DOCUMENTS

| | | |
|---|---|---|
| 7,046,534 B2 | 5/2006 | Schmidt et al. |
| 7,212,419 B2 | 5/2007 | Vinciarelli |
| 7,411,802 B2 | 8/2008 | Victor et al. |

(Continued)

FOREIGN PATENT DOCUMENTS

| | | |
|---|---|---|
| EP | 0557599 A1 | 12/1992 |
| JP | S4891548 A | 11/1973 |

(Continued)

OTHER PUBLICATIONS

Everts, J. et al., "Comparative Evaluation of Soft-Switching, Bidirectional, Isolated AC/DC Converter Topologies", 2012 Twenty-Seventh Annual IEEE Applied Power Electronics Conference and Exposition (APEC), Orlando, FL, Feb. 5-9, 2012, pp. 1067-1074.

(Continued)

*Primary Examiner* — Harry Behm
*Assistant Examiner* — Peter Novak
(74) *Attorney, Agent, or Firm* — Murphy, Bilak & Homiller, PLLC

(57) ABSTRACT

A power converter circuit includes a power converter with a plurality of series connected converter cells. Each of the plurality of converter cells includes at least one first half-bridge circuit including a first silicon MOSFET (Metal Oxide Semiconductor Field-Effect Transistor) and a second silicon MOSFET. At least one of the plurality of converter cells is configured to operate in a continuous current mode.

26 Claims, 57 Drawing Sheets

(56) References Cited

U.S. PATENT DOCUMENTS

| | | | |
|---|---|---|---|
| 8,238,128 B2* | 8/2012 | Falk | H02M 7/44 363/124 |
| 9,397,580 B1 | 7/2016 | Alexander | |
| 2004/0218318 A1* | 11/2004 | Bijlenga | H02M 7/48 361/8 |
| 2006/0226130 A1 | 10/2006 | Kooken et al. | |
| 2010/0007221 A1 | 1/2010 | Ye et al. | |
| 2010/0066319 A1 | 3/2010 | Qiu et al. | |
| 2011/0140535 A1 | 6/2011 | Choi et al. | |
| 2012/0155125 A1 | 6/2012 | Zhang et al. | |
| 2013/0009700 A1* | 1/2013 | Deboy | H02J 3/383 327/581 |
| 2013/0334212 A1 | 12/2013 | Sawada et al. | |
| 2014/0063884 A1* | 3/2014 | Itoh | H02M 7/487 363/132 |
| 2014/0153294 A1 | 6/2014 | Deboy et al. | |
| 2015/0222170 A1 | 8/2015 | Berger et al. | |

FOREIGN PATENT DOCUMENTS

| | | |
|---|---|---|
| JP | H4261360 A | 9/1992 |
| JP | H7154967 A | 6/1995 |
| JP | H865889 A | 3/1996 |
| JP | H8126352 A | 5/1996 |
| JP | H1189242 A | 3/1999 |
| JP | 2004266884 A | 9/2004 |
| JP | 2008005657 A | 1/2008 |
| JP | 2008099464 A | 4/2008 |
| JP | 2008228517 A | 9/2008 |
| JP | 2008301640 A | 12/2008 |
| JP | 2009513101 A | 3/2009 |
| JP | 2009165222 A | 7/2009 |
| JP | 2009201350 A | 9/2009 |
| JP | 2009232587 A | 10/2009 |
| JP | 2012010420 A | 1/2012 |
| JP | 2012147559 A | 8/2012 |
| JP | 2012210013 A | 10/2012 |
| JP | 2013059251 A | 3/2013 |
| JP | 2013255308 A | 12/2013 |
| JP | 2014054121 A | 3/2014 |
| WO | 2011033698 A | 3/2011 |
| WO | 2011033820 A1 | 3/2011 |
| WO | 2013017994 A1 | 2/2013 |
| WO | 2013093963 A1 | 6/2013 |

OTHER PUBLICATIONS

Fiorentino, C. et al., "A Line Cycle Skipping Method to Improve the Light Load Efficiency and THD of PFC Converters", 2013 Twenty-Eighth Annual IEEE Applied Power Electronics Conference and Exposition (APEC), Long Beach, CA, Mar. 17-21, 2013, pp. 368-373.

Giri, R. et al., "Common-Duty-Ratio Control of Input-Series Connected Modular DC-DC Converters with Active Input Voltage and Load-Current Sharing", IEEE Transactions on Industry Applications, vol. 42, No. 4, Jul./Aug. 2006, pp. 1101-1111.

Gong, G. et al., "A Comparative Study of Multicell Amplifiers for AC-Power-Source Applications", IEEE Transactions on Power Electronics, vol. 26, No. 11, Jan. 2011, pp. 149-164.

Huber, L. et al., "Comparison of Audible Noise Caused by Magnetic Components in Switch-Mode Power Supplies Operating in Burst Mode and Frequency-Foldback Mode", 2014 Twenty-Ninth Annual IEEE Applied Power Electronics Conference and Exposition, Fort Worth, TX, Mar. 16-20, 2014, pp. 2895-2901.

Iman-Eini, H. et al., "A Modular AC/DC Rectifier Based on Cascaded H-Bridge Rectifier", 13th Power Electronics and Motion Control Conference, 2008 (EPE-PEMC 2008), Ponzan, Sep. 1-3, 2008, pp. 173-180.

Iman-Eini, H. et al., "A Modular Strategy for Control and Voltage Balancing of Cascaded H-Bridge Rectifiers", IEEE Transactions on Power Electronics, vol. 23, No. 5, Sep. 2008, pp. 2428-2442.

Kang, D.-W. et al., "A Simple Method for Acquiring the Conducting Angle in a Multilevel Cascaded Inverter using Step Pulse Waves", IEE Proceedings Electric Power Applications, vol. 152, Issue 1, Jan. 7, 2005, pp. 103-111.

Krismer, F. et al., "Closed Form Solution for Minimum Conduction Loss Modulation of DAB Converters", IEEE Transactions on Power Electronics, vol. 27, No. 1, Jan. 2012, pp. 174-188.

Lai, J.-S. et al., "Multilevel Converters—A New Breed of Power Converters", IEEE Transactions on Industry Applications, vol. 32, Issue 3, May/Jun. 1996, pp. 509-517.

Malinowski, M. et al., "A Survey on Cascaded Multilevel Inverters", IEEE Transactions On Industrial Electronics, vol. 57, No. 7, Jul. 2010, pp. 2197-2206.

Rodriguez, J. et al., "Multilevel Inverters: A Survey of Topologies, Controls and Applications", IEEE Transactions on Industrial Electronics, vol. 49, No. 4, Aug. 2002, pp. 724-738.

Rufer, A.-C., "An Aid in the Teaching of Multilevel Inverters for High Power Applications", 26th Annual IEEE Power Electronics Specialists Conference, 1995 (PESC '95 Record), vol. 1, Atlanta, GA, Jun. 18-22, 1995, pp. 247-252.

Schminke, W., "Hochleistungsmodulator in PSM-Technik für 500-kW-Kurzwellen- und 600-kW-Mittelwellensender", Brown Boveri Review, vol. 72, No. 5, 1985, pp. 235-240.

Shi, J. et al., "Reseach on Voltage and Power Balance Control for Cascaded Modular Solid-State Transformer", IEEE Transactions on Power Electronics, vol. 26, No. 4, Apr. 2011, pp. 1154-1166.

Tolbert, L. M. et al., "Multilevel Converters for Large Electric Drives", IEEE Transactions on Industry Applications, vol. 35, No. 1, Jan./Feb. 1999, pp. 36-44.

Van Der Merwe, W. et al., "Natural Balancing of the Two-Cell Back-to-Back Multilevel Converter with Specific Application to the Solid-State Transformer Concept", 4th IEEE Conference on Industrial Electronics and Applications, 2009 (ICIEA 2009), Xi'an, May 25-27, 2009, pp. 2955-2960.

Zhao, T. et al., "Voltage and Power Balance Control for a Cascaded H-Bridge Converter-Based Solid-State Transformer", IEEE Transactions on Power Electronics, vol. 28, No. 4, Apr. 2013, pp. 1523-1532.

Zhou, L. et al., "99% Efficiency True-Bridgeless Totem-Pole PFC Based on GaN HEMTs", Available online at: http://www.transphormusa.com/sites/default/files/transphorm/news/Totem-pole%20paper_0.pdf, publication date unknown, pp. 1-9.

Huber, J. et al., "Optimum Number of Cascaded Cells for High-Power Medium-Voltage Multilevel Converters", Proceedings of the IEEE Energy Conversion and Exposition (ECCE USA 2013), Denver, Colorado, USA, Sep. 15-19, 2013, pp. 359-366.

Rothmund, D. et al., "Sic-Based Unidirectional Solid-State Transformer Concepts for Directly Interfacing 400V DC to Medium-Voltage AC Distribution Systems", 2014 IEEE 36th International Telecommunications Energy Conference (INTELEC), Vancouver, British Columbia, Canada, Sep. 28-Oct. 2, 2014, pp. 1-9.

* cited by examiner

IPOS

IPOP

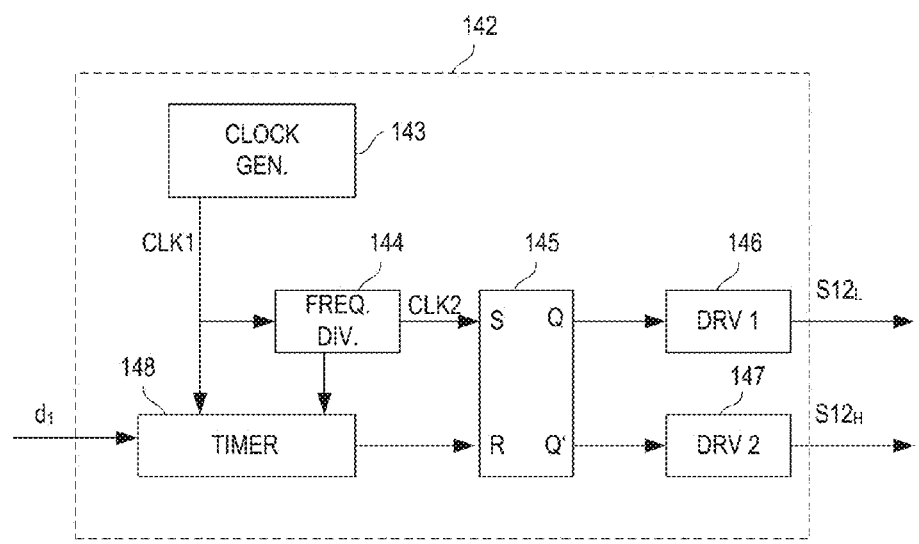
FIG 18
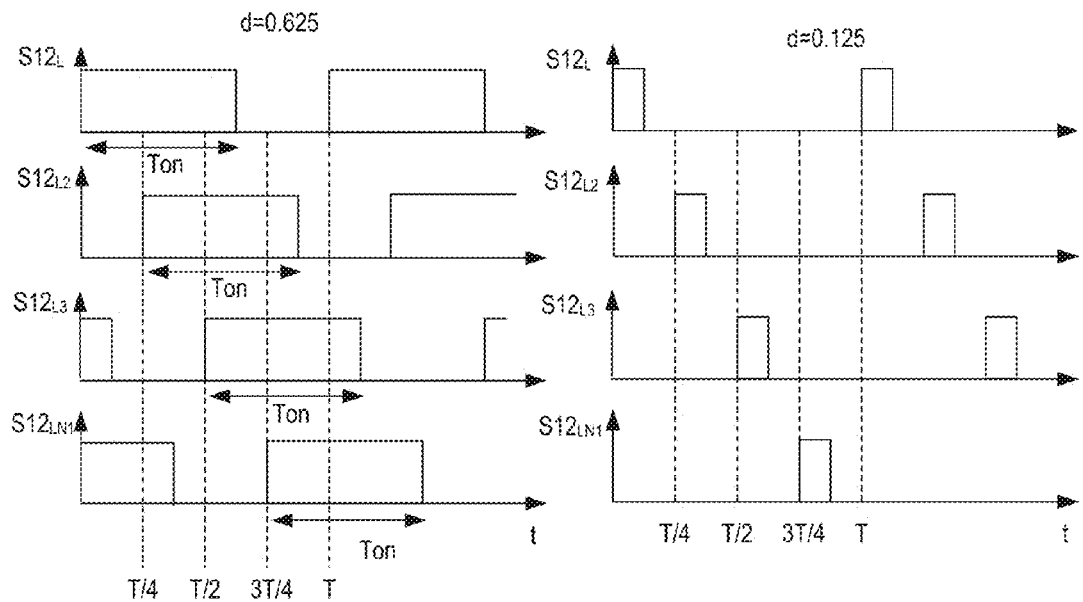
FIG 19A                    FIG 19B

PHASE SHEDDING IN A MULTI-CELL CONVERTER WITH
IP TOPOLOGY

POWER CONVERTER CIRCUIT AND METHOD WITH ASYMMETRICAL HALF BRIDGE

TECHNICAL FIELD

This disclosure in general relates to power conversion methods, and to power converters.

BACKGROUND

Power conversion is an important issue in many different electronic applications. An important aspect in almost every kind of power conversion is to efficiently convert the power, that is, to keep losses that may occur in connection with the power conversion as low as possible.

SUMMARY

According to one embodiment, a power converter circuit includes a power converter which includes a plurality of series connected converter cells, wherein each of the plurality of converter cells includes at least one first half-bridge circuit comprising a first silicon MOSFET (Metal Oxide Semiconductor Field-Effect Transistor) and a second silicon MOSFET, and wherein at least one of the plurality of converter cells is configured to operate in a continuous current mode.

According to one embodiment, a method includes operating at least one converter cell of a power converter which includes a plurality of series connected converter cells in a continuous current mode, wherein each of the converter cells includes at least a first half-bridge comprising a first silicon MOSFET and a second silicon MOSFET.

According to one embodiment, a power converter circuit includes a power converter which includes a plurality of converter cells. Each converter cell includes a half-bridge circuit which includes a first electronic switch and a second electronic switch. The first electronic switch includes a first on-resistance and a first voltage blocking capability, and the second electronic switch includes a second on-resistance and a second voltage blocking capability, wherein in at least one converter cell the first voltage blocking capability and the second voltage blocking capability are substantially equal, and the first on-resistance and the second on-resistance are different.

BRIEF DESCRIPTION OF THE DRAWINGS

Examples are explained below with reference to the drawings. The drawings serve to illustrate certain principles, so that only aspects necessary for understanding these principles are illustrated. The drawings are not to scale. In the drawings the same reference characters denote like features.

FIG. 18 shows one embodiment of a PWM controller in the cell controller shown in FIG. 17.

FIGS. 19A-19B show timing diagrams which illustrates one way of operation of the multi-cell power converter shown in FIG. 12 at different modulation indices.

DETAILED DESCRIPTION

In the following detailed description, reference is made to the accompanying drawings. The drawings form a part of the description and by way of illustration show specific embodiments in which the invention may be practiced. It is to be understood that the features of the various embodiments described herein may be combined with each other, unless specifically noted otherwise.

In the following, several embodiments of power conversion methods and power converter circuits are explained with reference to drawings. These power converter circuits include at least one power converter with several power converter cells. A power converter including several power converter cells will be referred to as multi-cell power converter or multi cell converter in the following. A power conversion method which uses at least one multi-cell converter will be referred to as multi-cell power conversion method.

Figure 1:
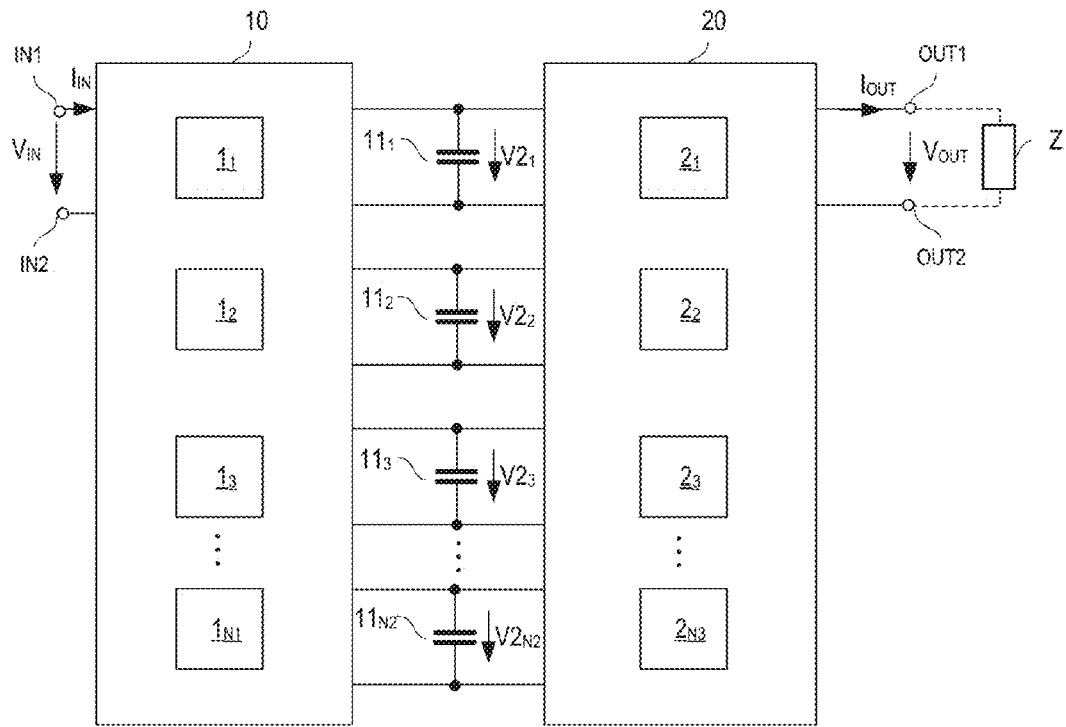
FIG. 1 illustrates a power converter circuit with two power converters.

FIG. 1 shows one embodiment of a power converter circuit which is configured to convert an input power $P_{IN}$ received at an input IN1, IN2 into an output power $P_{OUT}$ provided at an output OUT1, OUT2. The input power $P_{IN}$ is defined as the product of an input current $I_{IN}$ received at the input IN1, IN2, and an input voltage $V_{IN}$ between a first input node IN1 and a second input node IN2 of the input, so that $P_{IN}=V_{IN} \cdot I_{IN}$. The output power $P_{OUT}$ is defined as the product of an output current $I_{OUT}$ provided at the output OUT1, OUT2, and an output voltage $V_{OUT}$ between a first output node OUT1 and a second output node OUT2 of the output, so that $P_{OUT}=V_{OUT} \cdot I_{OUT}$. A load Z (illustrated in dashed lines in FIG. 1) may receive the output power $P_{OUT}$ provided by the second power converter 20.

The power converter circuit includes a first converter 10 configured to receive the input power at the input IN1, IN2, and a second power converter 20 configured to provide the output power at the output OUT1, OUT2. At least one of the first power converter 10 and the second power converter includes a plurality of power converter cells, which will briefly be referred to as converter cells in the following. In the embodiment shown in FIG. 1, the first power converter 10 includes a plurality of converter cells $1_1$-$1_{N1}$, and the second power converter 20 includes a plurality of converter cells $2_1$-$2_{N3}$. These converter cells are only schematically illustrated in FIG. 1. The first power converter 10 and the second power converter 20 are linked by a plurality of capacitors $11_1$-$11_{N2}$. These capacitors $11_1$-$11_{N2}$ will also be referred to as DC link capacitors in the following. Capacitances of the individual DC link capacitors are dependent on several aspects, such as a waveform of the input voltage and/or the output voltage, or a power rating of the power converter circuit, to name only a few. According to one embodiment, the capacitances of the DC link capacitors are selected from a range of between several microfarads (μF), such as 2 uF, and several millifarads (mF), such as 9 mF.

Referring to FIG. 1, the first power converter 10 may include a first number N1 of converter cells $1_1$-$1_{N1}$, a second number N2 of capacitors $11_1$-$11_{N2}$ may link the first power converter 10 and the second power converter 20, and the second power converter 20 may include a third number N3 of converter cells $2_1$-$2_{N2}$. According to one embodiment, the first number N1, the second number N2, and the third number N3 are equal, so that N1=N2=N3=N.

Dependent on how the first power converter 10 and the second power converter 20 are implemented, different types of power conversion methods may be performed by the power converter circuit. Some of those different types of power conversion methods are explained with reference to FIGS. 2A-3C below. Each of these FIGS. 2A-3C schematically illustrates timing diagrams of the input voltage $V_{IN}$ and the output voltage $V_{OUT}$.

Figures 2A, 2B, 2C:
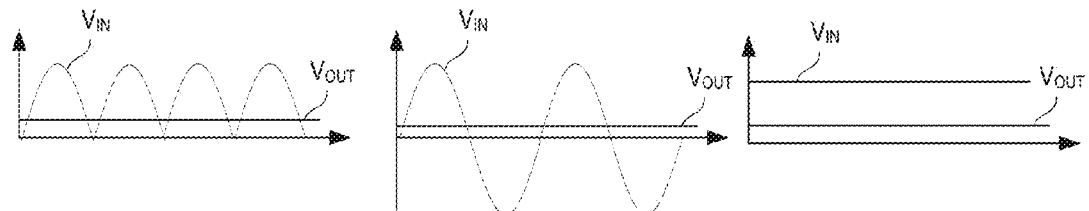
FIGS. 2A-2C show timing diagrams which illustrate some different types of power conversion methods.

Referring to FIG. 2A, the input voltage $V_{IN}$ may be a rectified sine voltage and the output voltage $V_{OUT}$ may be a direct voltage with a voltage level lower than a peak voltage of the input voltage $V_{IN}$. Referring to FIG. 2B, the input voltage $V_{IN}$ may be a sine voltage and the output voltage $V_{OUT}$ may be a direct voltage with a voltage level lower than the amplitude of the input voltage $V_{IN}$. A rectified sine voltage as shown in FIG. 2A may be obtained by rectifying a sine voltage as shown in FIG. 2B. According to one embodiment, the sine voltage is a grid voltage with $110V_{RMS}$ or $220V_{RMS}$ and a frequency of 50 Hz or 60 Hz. The type of power conversion shown in FIG. 2B may be used in a variety of different applications in which a load Z is to be supplied with DC power from a power grid. Examples of those applications include telecommunication switches, computers, or the like. Referring to FIG. 2C each of the input voltage $V_{IN}$ and the output voltage $V_{OUT}$ may be a direct voltage, wherein a voltage level of the input voltage is $V_{IN}$ is higher than a voltage level of the output voltage $V_{OUT}$.

Figures 3A, 3B, 3C:
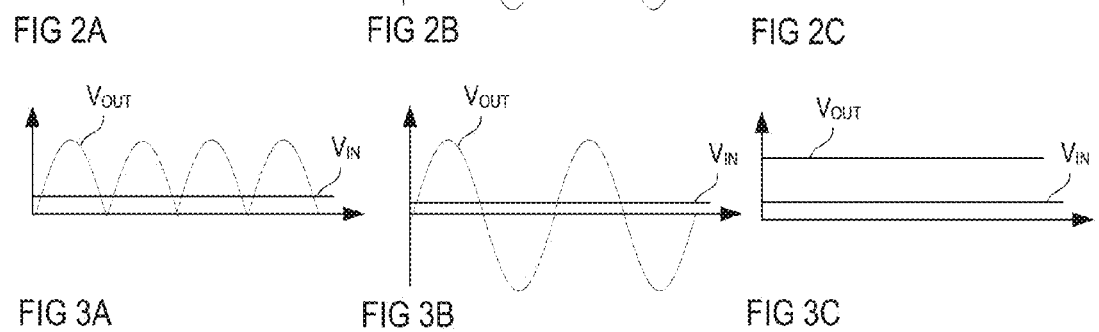
FIGS. 3A-3C show timing diagrams which illustrate some different types of power conversion methods.

Referring to FIG. 3A, the output voltage $V_{OUT}$ may be a rectified sine voltage and the input voltage $V_{IN}$ may be a direct voltage with a voltage level lower than a peak voltage of the output voltage $V_{OUT}$. Referring to FIG. 3B, the output voltage $V_{OUT}$ may be a sine voltage and the input voltage $V_{IN}$ may be a direct voltage with a voltage level lower than the amplitude of the output voltage $V_{OUT}$. According to one embodiment, the sine voltage shown in FIG. 3B is a grid voltage with $110V_{RMS}$ or $220V_{RMS}$ and a frequency of 50 Hz or 60 Hz. The type of power conversion shown in FIG. 3B may be used in applications in which power is to be supplied to a power grid from a DC power source, such as, for example a photovoltaic panel, a battery, or the like. Referring to FIG. 3C each of the input voltage $V_{IN}$ and the output voltage $V_{OUT}$ may be a direct voltage, wherein a voltage level of the input voltage $V_{IN}$ is lower than a voltage level of the output voltage $V_{OUT}$.

In the embodiments shown in FIGS. 2A-2C, the voltage level of the output voltage $V_{OUT}$ is lower than the voltage level or the effective voltage level of the input voltage $V_{IN}$. In the following, a power converter circuit configured to perform one of these types of power conversion will be referred to as a power converter circuit having a step-down characteristic. In the embodiments shown in FIGS. 3A-3C, the voltage level of the input voltage $V_{IN}$ is lower than the voltage level or the effective voltage level of the output voltage. In the following, a power converter circuit configured to perform one of these types of power conversion will be referred to as a power converter circuit having a step-up characteristic.

Four different power converter circuits of the type shown in FIG. 1 are explained with reference to FIGS. 4-7 below. In each of these embodiments, each of the first power converter 10 and the second 20 power converter 20 includes a plurality of converter cells. Further, in each of these embodiments, N1=N2=N3=N so that each of the plurality of converter cells in the first power converter 10 is linked to one of the plurality of converter cells in the second power converter 20 by one DC link capacitor. However, this is only example. Other examples where only one of the first and second power converters 10, 20 includes a plurality of converter cells, or where at least two of N1, N2, and N3 are different are explained further below. The power converter circuits shown in FIGS. 4-7 are different in how the converter cells of the first power converter 10 are connected to the input IN1, IN2, and in how the converter cells of the second power converter 20 are connected to the output OUT1, OUT2.

Figure 4:
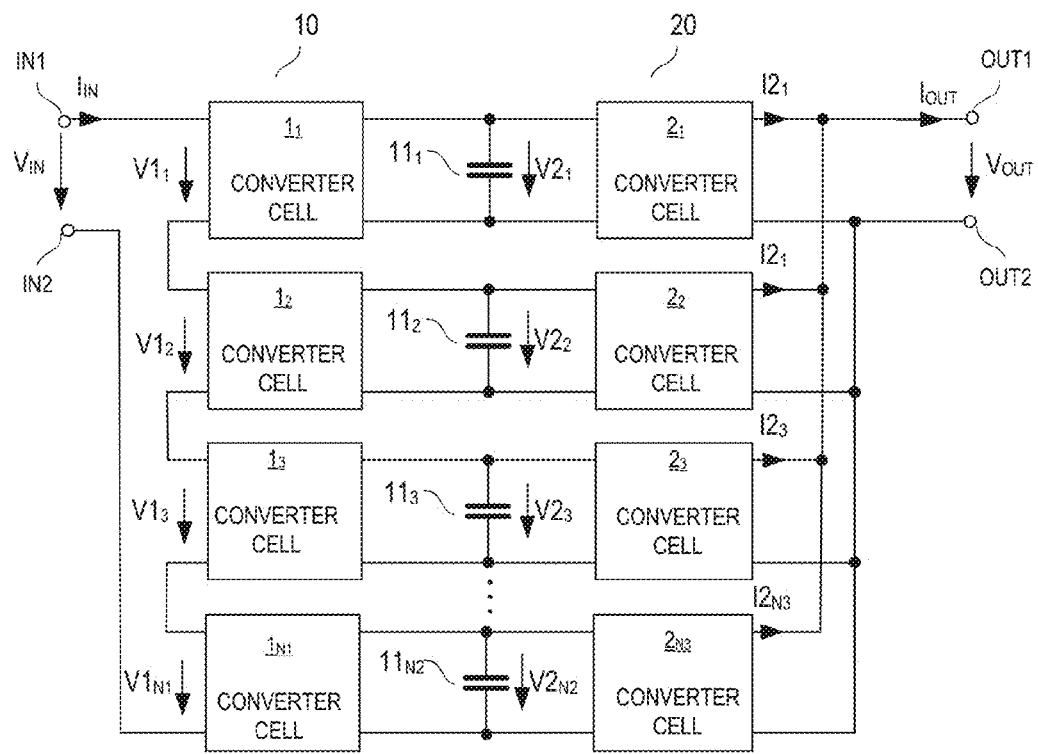
FIG. 4 shows one embodiment of a power converter circuit having an ISOP (Input Serial, Output Parallel) topology.

FIG. 4 shows one embodiment of a power converter circuit with an ISOP (Input Serial, Output Parallel) topology. In this power converter circuit the converter cells $1_1$-$1_{N1}$ of the first power converter 10 are connected in series at the input IN1, IN2, and the converter cells $2_1$-$2_{N3}$ of the second power converter 20 are connected in parallel at the output OUT1, OUT2. This is explained below.

The converter cells $1_1$-$1_{N1}$ of the first power converter 10 will also be referred to as first converter cells in the following. Each of these first converter cells $1_1$-$1_{N1}$ includes a cell input and a cell output. The cell output of each converter cell $1_1$-$1_{N1}$ is connected to one of the plurality of DC link capacitors $11_1$-$11_{N1}$, namely to the DC link capacitor associated with the respective first converter cell $1_1$-$1_{N1}$. The cell inputs of the first converter cells $1_1$-$1_{N1}$ are connected in series at the input IN1, IN2 of the power converter circuit. That is, a first cell input node of one of the plurality of first converter cells (the converter cell $1_1$ in the embodiment shown in FIG. 4) is connected to the first input node IN1. A second cell input node of another one of the plurality of first converter cells (the first converter cell $1_{N1}$ in the embodiment shown in FIG. 1) is connected to the second input node IN2 of the power converter circuit. The other first converter cells (the converter cells $1_2$, $1_3$ shown in FIG. 1) each have the first cell input node connected to the second cell input node of another first converter cell, and have their second cell input node connected to the first cell input node of another first converter cell. In other words, the cell inputs of the individual first converter cells $1_1$-$1_{N1}$ form a cascade between the input nodes IN1, IN2 of the power converter circuit.

The converter cells $2_1$-$2_{N3}$ of the second power converter 20 will also be referred to as second converter cells in the following. Each of these second converter cells $2_1$-$2_{N3}$ includes a cell input and a cell output. The cell input of each converter cell $2_1$-$2_{N3}$ is connected to one of the plurality of DC link capacitors. The cell outputs of the second converter cells $2_1$-$2_{N3}$ are connected in parallel at the output OUT1, OUT2 of the power converter circuit. That is, each of the second converter $2_1$-$2_{N3}$ cells has a first cell output node connected to a first output node OUT1 of the power converter circuit, and each of the second converter cells $2_1$-$2_{N3}$ has a second cell output node connected to a second output node OUT2 of the power converter circuit.

In the power converter circuit with the ISOP topology shown in FIG. 4, each of the series connected first converter cells $1_1$-$1_{N1}$ receives a share or portion of the input voltage $V_{IN}$ as a cell input voltage $V1_1$-$V1_{N1}$. That is, a sum of the cell input voltages $V1_1$-$V1_{N1}$ corresponds to the input voltage $V_{IN}$, $$V_{IN}=\Sigma_{i=1}^{N1}V1_i \qquad (1).$$

A cell input current of each first converter cell $1_1$-$1_{N1}$ equals the input current $I_{IN}$. Further, each of the parallel connected second converter cells $2_1$-$2_{N3}$ provides a cell output current $I2_1$-$I2_{N3}$ which is a share or portion of the output current $I_{OUT}$. That is, a sum of the cell output currents $I2_1$-$I2_{N3}$ corresponds to the output current $I_{OUT}$, $$I_{OUT}=\Sigma_{i=1}^{N3}I2_i \qquad (2).$$

A cell output voltage of each of the second converter cells corresponds to the output voltage $V_{OUT}$ of the power converter circuit.

Figure 5:
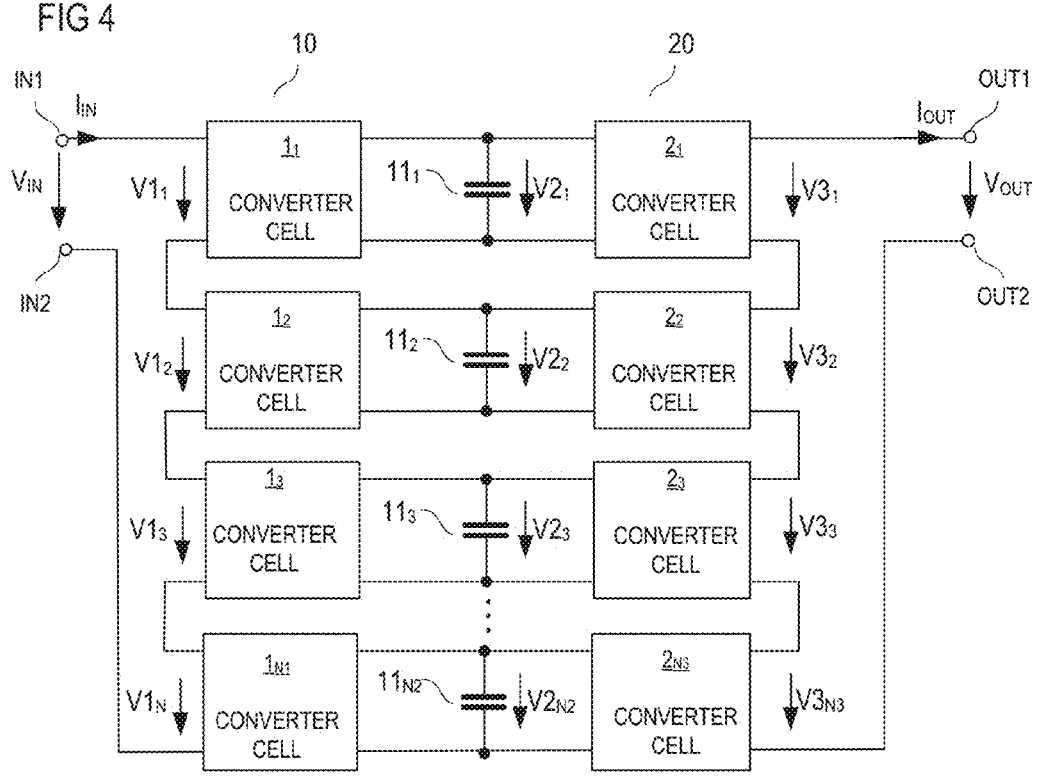
FIG. 5 shows one embodiment of a power converter circuit having an ISOS (Input Serial, Output Serial) topology.

FIG. 5 shows one embodiment of a power converter circuit with an ISOS (Input Serial, Output Serial) topology. Like in the power converter circuit shown in FIG. 4, the first converter cells $1_1$-$1_{N1}$ are connected in series at the input IN1, IN2. The power converter circuit shown in FIG. 5 is different from the power converter circuit shown in FIG. 4 in that the second converter cells $2_1$-$2_{N3}$ are connected in series at the output OUT1, OUT2. This is explained below.

Referring to FIG. 5, a first cell output node of one of the plurality of second converter cells (the converter cell $2_1$ in the embodiment shown in FIG. 5) is connected to the first output node OUT1. A second cell output node of another one of the plurality of second converter cells (the second converter cell $2_{N3}$ in the embodiment shown in FIG. 5) is connected to the second output node OUT2 of the power converter circuit. The other second converter cells (the converter cells $2_2$, $2_3$ shown in FIG. 5) each have the first cell output node connected to the second cell output node of another second converter cell, and have their second cell output node connected to the first cell output node of another second converter cell. In other words, the cell outputs of the individual second converter cells $2_1$-$2_{N3}$ form a cascade between the output nodes OUT1, OUT2 of the power converter circuit. In this embodiment, a cell output voltage $V3_1$-$V3_{N3}$ of each of the plurality of second converter cells $2_1$-$2_{N3}$ is a share of the output voltage $V_{OUT}$ of the power converter circuit. That is, $$V_{OUT}=\Sigma_{i=1}^{N3}V3_i \qquad (3).$$

A cell output current of each of the plurality of second converter cells $2_1$-$2_{N3}$ equals the output current of the power converter circuit.

In the power converter circuit shown in FIG. 5, like in the power converter circuit shown in FIG. 4, the cell output of each of the first converter cells $1_1$-$1_{N1}$ is connected to one of the plurality of DC link capacitors $11_1$-$11_{N2}$, and the cell input of each of the second converter cells $2_1$-$2_{N3}$ is connected to one of the DC link capacitors $11_1$-$11_{N2}$, wherein each of the DC link capacitors $11_1$-$11_{N2}$ has only one first converter cell and only one second converter cell connected thereto.

Figure 6:
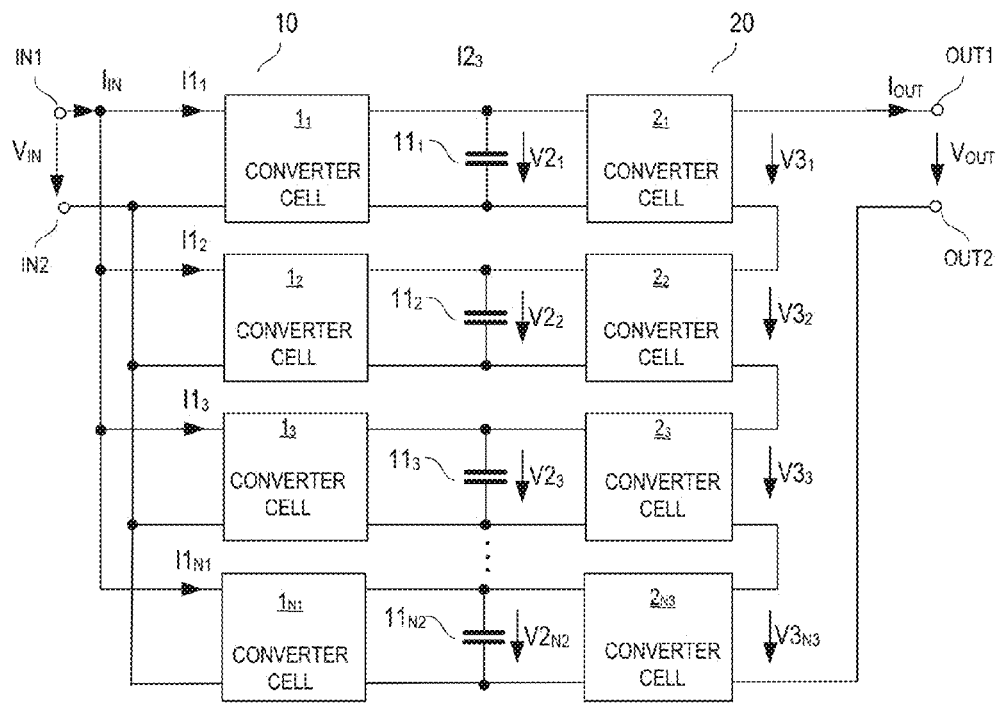
FIG. 6 shows one embodiment of a power converter circuit having an IPOS (Input Parallel, Output Serial) topology.

FIG. 6 shows one embodiment of a power converter circuit with an IPOS (Input Parallel, Output Serial) topology. Like in the power converter circuit shown in FIG. 5, the second converter cells $2_1$-$2_{N3}$ are connected in series at the output OUT1, OUT2. The power converter circuit shown in FIG. 6 is different from the power converter circuit shown in FIG. 5 in that the first converter cells $1_1$-$1_{N1}$ are connected in parallel at the input IN1, IN2. That is, each of the first converter cells $1_1$-$1_{N3}$ has its first cell input node connected to the first input node IN1 of the power converter circuit, and has its second cell input node connected to the second input node IN2 of the power converter circuit. Thus, each of the first converter cells $1_1$-$1_{N3}$ receives the input voltage $V_{IN}$ as a cell input voltage, and a cell input current $I0_1$-$I0_{N1}$ of each of the first converter cells $1_1$-$1_{N1}$ is a share or portion of the input current $I_{OUT}$, so that $$I_{IN} = \Sigma_{i=1}^{N1} I0_i \quad (4).$$

Figure 7:
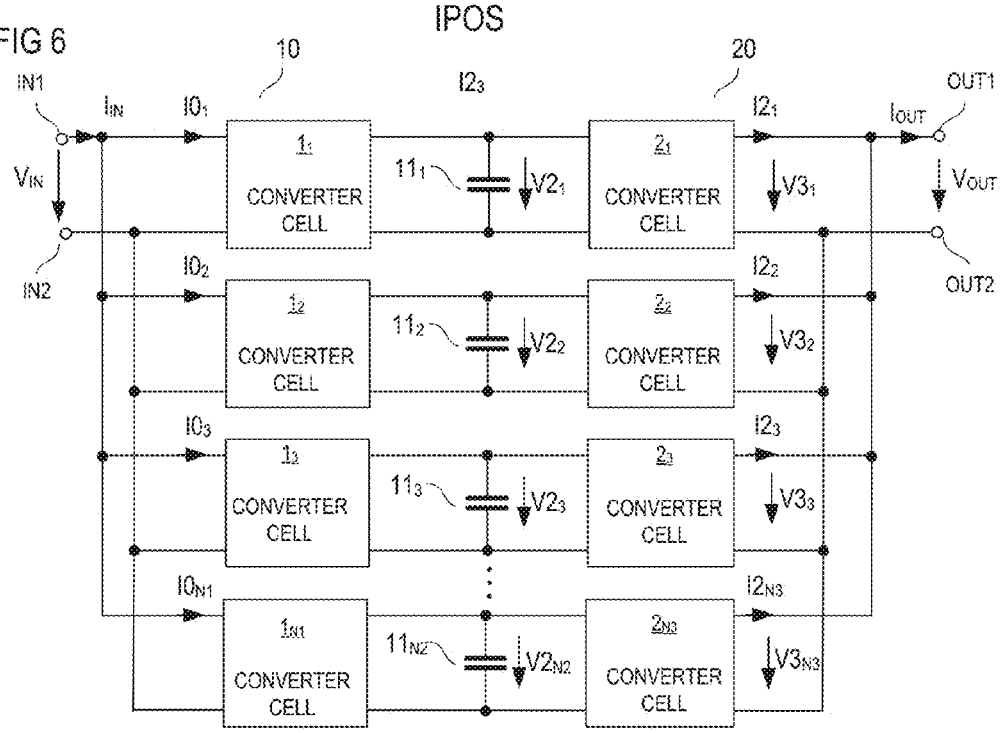
FIG. 7 shows one embodiment of a power converter circuit having an IPOP (Input Parallel, Output Parallel) topology.

FIG. 7 shows one embodiment of a power converter circuit with an IPOP (Input Parallel, Output Parallel) topology. In this power converter circuit, the first converter cells $1_1$-$1_{N1}$ are connected in parallel at the input IN1, IN2, and the second converter cells $2_1$-$2_{N3}$ are connected in parallel at the output. Concerning the parallel connection of the first converter cells $1_1$-$1_{N1}$ reference is made to FIG. 6 and the corresponding description, and concerning the parallel connection of the second converter cells $2_1$-$2_{N3}$ reference is made to FIG. 4 and the corresponding description.

Each of the first converter cells $1_1$-$1_{N1}$ and the second converter cells $2_1$-$2_{N3}$ is implemented with a power converter topology and is configured to receive a cell input power at the cell input and provide a cell output power at the cell output. Each of the first converter cells $1_1$-$1_{N1}$ receives its cell input power from the input IN1, IN2. The cell output power of each of the first converter cells $1_1$-$1_{N1}$ is the power the respective first converter cells provides to the DC link capacitor connected to the cell output and to the second converter cell connected to the cell output, respectively. The cell input power of each of the plurality of second converter cells $2_1$-$2_{N3}$ is the power, the respective second converter cell receives from the DC link capacitor it is connected thereto, and from the first converter it is connected thereto, respectively. Each of the second converter cells provides its cell output power to the output OUT1, OUT1. The DC link capacitors $11_1$-$11_{N2}$ are capable of storing energy so that the power level of the cell output power of one of the first converter cells $1_1$-$1_{N1}$ and the power level of the cell input power of the associated second converter cell can be different. In the following, the word "associated" is used to describe the relationship between one first converter cells, the DC link capacitor connected to this first converter cell, and the second converter cells connected to this first converter cell and this DC link capacitor.

The type of converter topology implemented in the first converter cells $1_1$-$1_{N1}$ and the second converter cells $2_1$-$2_{N3}$ is, for example, dependent on the type of power conversion the power converter circuit performs. In general, the converter cells $1_1$-$1_{N1}$, $2_1$-$2_{N3}$ can be implemented with an isolating power converter topology, or with a non-isolating power converter topology. In the first case, the respective converter cell includes a transformer which galvanically isolates the cell input and the cell output. In the second case, the cell input and the cell output of the converter cell are not galvanically isolated. This is explained with reference to FIGS. 8-10 below. Each of these Figures shows a first converter cell $1_i$, the DC link capacitor $11_i$ of the first converter cell $11_i$, and a second converter cell $2_i$ connected to the first converter cell $1_i$. The first converter cell $1_i$ and the second converter cell $2_i$ represent any pair of a first converter cell $1_1$-$1_{N1}$ and a second converter cell $2_1$-$2_{N3}$ connected to the first converter cell $1_1$-$1_{N1}$ in any of the power converter circuits explained herein before.

Figure 8:
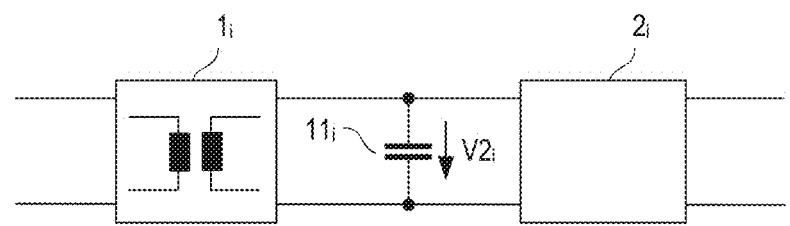
FIG. 8 shows two converter cells of a power converter circuit from which one has an isolating topology and one has a non-isolating topology.

In the embodiment shown in FIG. 8, the first converter cell $1_i$ is implemented with an isolating converter topology. This is schematically illustrated by the transformer symbol in the circuit block representing the first converter cell $1_i$. The second converter cell $2_i$ is implemented with a non-isolating converter topology. In a power converter circuit in which the first converter cells $1_1$-$1_{N1}$ are implemented with an isolating converter topology, and the second converter cells $2_1$-$2_{N3}$ are implemented with a non-isolating converter topology, as shown in FIG. 8, the first converter cells $1_1$-$1_{N1}$ provide for a galvanic isolation between the input IN1, IN2 and the output OUT1, OUT2 of the power converter circuit.

Figure 9:
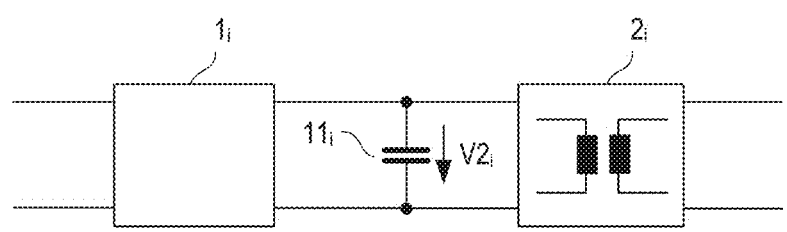
FIG. 9 shows two converter cells of a power converter circuit from which one has an isolating topology and one has a non-isolating topology.

In the embodiment shown in FIG. 9, the first converter cell $1_i$ is implemented with a non-isolating converter topology. This is schematically illustrated by the transformer symbol in the circuit block representing the second converter cell $2_i$. The first converter cell $1_i$ is implemented with a non-isolating converter topology. In a power converter circuit in which the first converter cells $1_1$-$1_{N1}$ are implemented with a non-isolating converter topology, and the second converter cells $2_1$-$2_{N3}$ are implemented with an isolating converter topology, as shown in FIG. 9, the second converter cells $2_1$-$2_{N3}$ provide for a galvanic isolation between the input IN1, IN2 and the output OUT1, OUT2.

Figure 10:
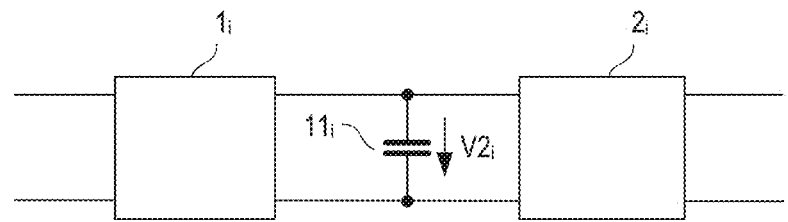
FIG. 10 shows two converter cells of a power converter circuit, both having a non-isolating topology.

In the embodiment shown in FIG. 10, none of the first power converter circuit $1_i$ and the second power converter circuit $2_i$ is implemented with an isolating converter topology. According to another embodiment (not shown), both of the first power converter circuit $1_i$ and the second power converter circuit $2_i$ is implemented with an isolating converter topology.

In the following, different embodiments of the first power converter 10 and ways of operation of these embodiments are explained. In the following, a first multi-cell power converter 10 with series connected converter cells $1_1$-$1_{N1}$ will be referred to as IS (Input Serial) converter, or power converter with an IS topology. Equivalently, a first multi-cell power converter 10 with parallel connected converter cells $1_1$-$1_{N1}$ will be referred to as IP (Input Parallel) converter, or power converter with an IP topology. A second multi-cell power converter with series connected converter cells $2_1$-$2_{N3}$ will be referred to as OS (Output Serial) converter, or power converter with an OS topology. Equivalently, a second multi-cell power converter 20 with parallel connected converter cells $1_1$-$1_{N1}$ will be referred to as OP (Output Parallel) converter, or power converter with an OP topology. In context with one of the first and second power converters 10, 20, "series connected converter cells" are converter cells which either have their cell inputs connected in series (in the first converter 10), or have their cell outputs connected in series (in the second converter 20), and "parallel connected converter cells" are converter cells which either have their cell inputs connected in parallel (in the first converter 10), or have their cell outputs connected in parallel (in the second converter 20).

Figure 11:
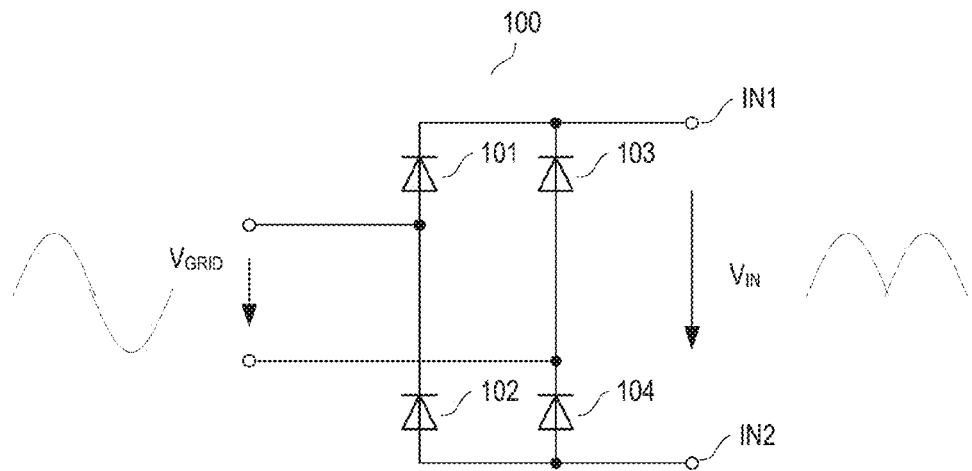
FIG. 11 shows one embodiment of a rectifier circuit.

At first, an embodiment of a first power converter 10 with an IS topology is explained which is configured to receive as an input voltage $V_{IN}$ a rectified sine voltage, as shown in FIG. 2A, and to provide a plurality of DC link voltages $V2_1$-$V2_{N2}$ at the individual DC link capacitors $11_1$-$11_{N2}$ (wherein N1=N2, in this embodiment). Referring to FIG. 11, such input voltage $V_{IN}$ with a rectified sinusoidal waveform may be obtained from a sinusoidal grid voltage $V_{GRID}$ by a bridge rectifier 100 with four rectifier elements 101-104. These rectifier elements may be diodes, as shown in FIG. 11. However other rectifier elements such as switches operated as synchronous rectifier elements may be used as well. These rectifier elements 101-104 are connected in a bridge-configuration and receive the grid voltage $V_{GRID}$ as an input voltage and provide the rectified sine voltage as an output voltage. This output voltage of the rectifier circuit 100 is the input voltage $V_{IN}$ of the power converter circuit, from which only the input IN1, IN2 is shown in FIG. 11.

The grid voltage $V_{GRID}$ may be a 110 $V_{RMS}$ or a 230 $V_{RMS}$ sine voltage. In the first case, a peak voltage of the rectified input voltage $V_{IN}$ is about 160V and in the second case, the peak voltage is about 320V. According to another embodiment, the grid voltage is a medium voltage with a peak voltage of up to several kilovolts (kV).

According to one embodiment, The first power converter 10 with the plurality of first converter cells $1_1$-$1_{N1}$ is configured to generate the DC link voltages $V2_1$-$V2_{N2}$ from the input voltage $V_{IN}$ such that a voltage level of an overall DC link voltage (total DC link voltage) $V2_{TOT}$ is higher than the voltage level of the peak voltage of the input voltage $V_{IN}$. The total DC link voltage $V2_{TOT}$ equals the sum of the individual DC link voltages $V2_1$-$V2_N$, that is, $$V2_{TOT} = \Sigma_{i=1}^{N2} V2_i \quad (5).$$

According to one embodiment, the total DC link voltage $V2_{TOT}$ is between 1.1 times and 1.3 times the peak voltage. For example, in case of an input voltage $V_{IN}$ obtained from a 220$V_{RMS}$ sine voltage, the total DC link voltage $V2_{TOT}$ is about 400V.

Figure 12:
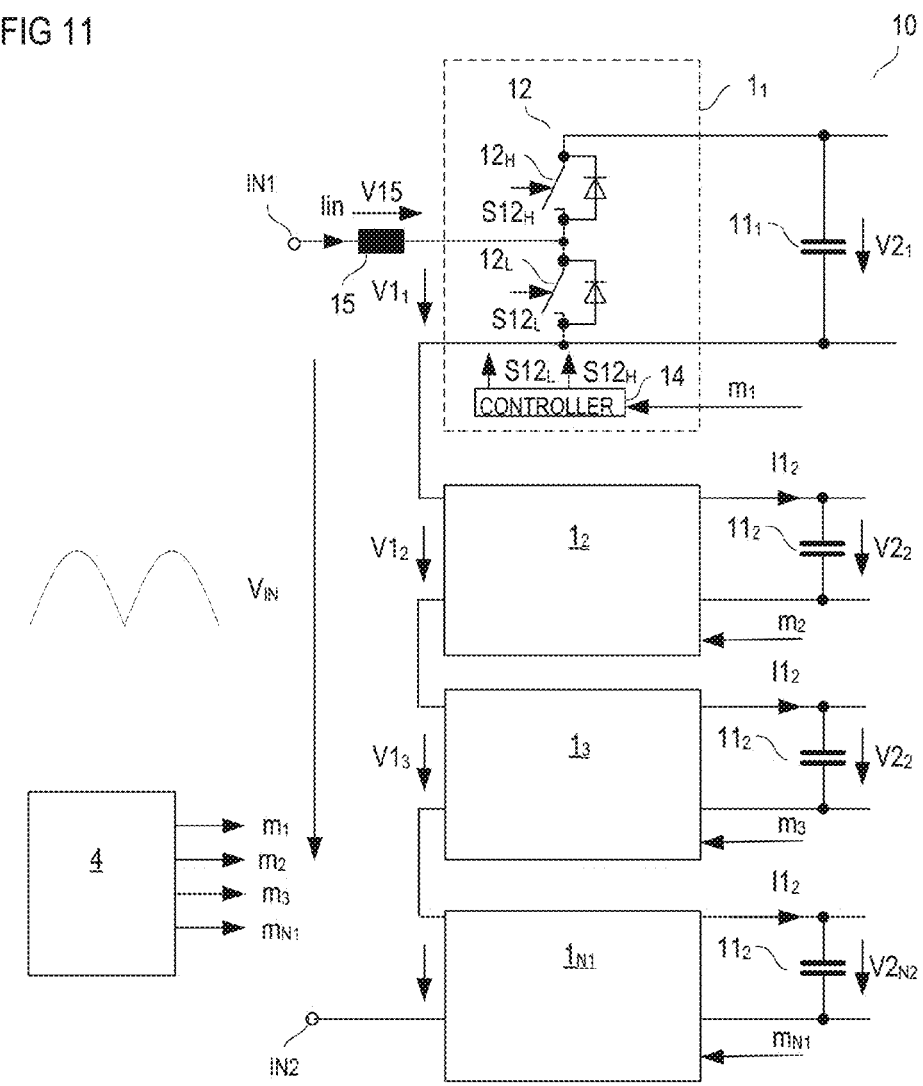
FIG. 12 shows one embodiment of a multi-cell power converter with an IS (Input Serial) topology.

FIG. 12 shows one embodiment of a first power converter 10 having an IS topology and configured to generate the total DC link voltage $V2_{TOT}$ with a higher voltage level than the peak voltage level of the input voltage $V_{IN}$. In this embodiment, the individual first converter stages $1_1$-$1_{N1}$ are each implemented with a boost converter topology, which is one type of a non-isolating converter topology. In FIG. 12, only one of the first converter cells $1_1$-$1_{N1}$ namely the first converter cell $1_1$ is shown in detail. The other first converter cells $1_2$-$1_{N1}$ are implemented with the same topology. Thus, the explanation provided in context with the first converter cell $1_1$ equivalently applies to the other first converter cells $1_2$-$1_{N1}$.

Referring to FIG. 12, the first converter cells 1 includes a half-bridge 12 with a low-side switch $12_L$ and a high-side switch $12_H$. The high-side switch $12_H$ is optional and may be replaced with a rectifier element such as, for example, a diode. Referring to FIG. 12, the high-side switch may be implemented with an electronic switch and a parallel rectifier element. The electronic switch is operated as a synchronous rectifier which switches on each time the parallel rectifier element is conducting. Thus, the high-side switch $12_H$ operates like an active rectifier element. However, losses occurring in the high-side switch $12_H$ when the switch is on are lower than losses that occur in a comparable passive rectifier element, such as a diode. The low side switch $12_L$ may also be implemented with an electronic switch and a parallel rectifier element. However, the rectifier element is optional in this embodiment. The high-side switch $12_H$ and the low-side switch $12_L$ can be implemented as electronic switches. Examples of those switches include, but are not restricted to, MOSFETs (Metal Oxide Semiconductor Field-Effect Transistors), IGBTs (Insulated Gate Bipolar Transistors), JFETs (Junction Field-Effect Transistors), BJTs (Bipolar Junction Transistor), HEMTs (High Electron Mobility Transistor), GaN-HEMTs, or the like. Some types of these electronic switches, such as MOSFETs, include an integrated diode (body diode) which may be used as the rectifier element shown in FIG. 12.

Referring to FIG. 12, the low-side switch $12_L$ is connected between cell input nodes of the first converter cell $1_1$. Thus the low-side switch $12_L$ of the first converter cell $1_1$ and corresponding low-side switches (not shown) in the other first converter cells $1_2$-$1_{N1}$ form a series circuit which is connected between the input nodes of the input IN1, IN2. The high-side switch $12_H$ and the DC link capacitor 111 of the first converter cell $1_1$ form a series circuit, wherein this series circuit is connected in parallel with the low-side switch $12_L$.

The first power converter circuit 10 further includes at least one inductor 15 such as a choke. In the embodiment shown in FIG. 12, the individual first converter cells $1_1$-$1_{N1}$ share the inductor 15. That is, there is one inductor which is connected in series with low-side switch $12_L$ in the first converter cell $1_1$ and the correspondent low-side switches in the other converter cells $1_2$-$1_{N1}$. According to another embodiment (not shown) each converter cell $1_1$-$1_{N1}$ includes one inductor connected between one cell input node and the circuit node common to the high-side switch and the low-side switch in the respective converter cell.

Referring to FIG. 12, the first converter cell $1_1$ further includes a controller $14_1$ which is configured to control operation of the low-side switch $12_L$ and the high-side switch. In case the high-side switch $12_H$ is replaced with a passive rectifier element, the controller 14 only controls operation of the low-side switch $12_L$.

The low-side switch $12_L$ receives a drive signal S$12_L$ from the controller 14, wherein the drive signal 512L switches the low-side switch $12_L$ either on or off. Equivalently, the high-side switch $12_H$ receives a drive signal S$12_H$ from the controller 14, wherein the drive signal S$12_H$ switches the high-side switch $12_H$ either on or off. According to one embodiment, the controller 14 drives the low-side switch $12_L$ and the high-side switch $12_H$ such that they are not switched on at the same time, so as to prevent the DC link capacitor $11_1$ from being discharged via these switches $12_L$, $12_H$.

According to one embodiment, the controller 14 in the first converter cell $1_1$ and corresponding controllers in the other converter cells $1_2$-$1_{N1}$ are controlled by a controller 4 of the first power converter 10. This controller 4 will also be referred to as main controller of the first power converter 10 in the following. Ways of operation of this main controller 4 and possible implementations are explained below.

According to one embodiment, the main controller 4, via the controller 14 in the first converter cell $1_1$ and corresponding controllers in the other converter cells $1_2$-$1_{N1}$ is configured to control (regulate) the total DC link voltage $V2_{TOT}$. According to one embodiment, the main controller 4 is further configured to control a current waveform of the input current $I_{IN}$ such that the waveform of the input current $I_{IN}$ substantially corresponds to the waveform of the input voltage $V_{IN}$. A phase difference between the waveform of the input voltage $V_{IN}$ and the resulting waveform of the input current $I_{IN}$ may be zero or may be different from zero. Controlling the input current $I_{IN}$ to have substantially the same waveform as the input voltage $V_{IN}$ may help to control the power factor of the input power $P_{IN}$ received at the input IN1, IN2. A first power converter 10 configured to control the waveform of the input current $I_{IN}$ to substantially be equal to the waveform of the input voltage $V_{IN}$ will be referred to as a first power converter 10 with a PFC (Power Factor Correction) capability or, briefly, as a first PFC power converter 10.

Figure 13:
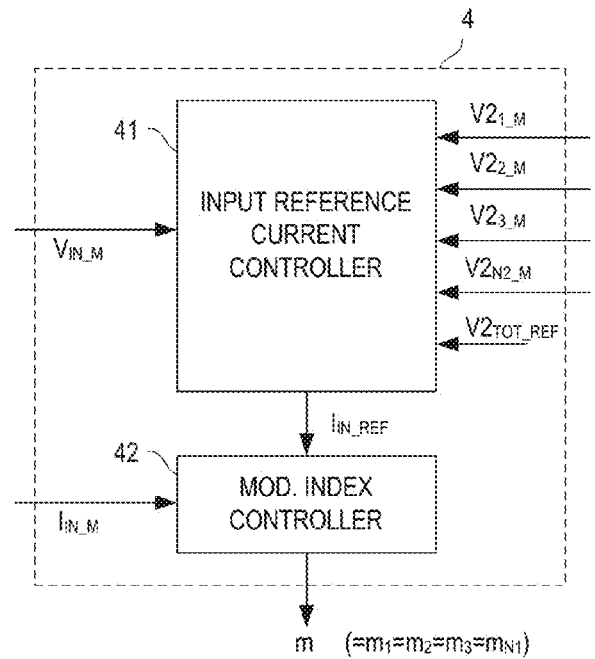
FIG. 13 shows one embodiment of a main controller in the a multi-cell power converter shown in FIG. 12.

One embodiment of a main controller 4 which is configured to control the total DC link voltage $V2_{TOT}$, and the current waveform of the input current $I_{IN}$ is shown in FIG. 13. Referring to FIG. 13, the main controller 4 includes an input reference current controller 41 and a converter cell controller 42, which will also be referred to as modulation index controller. The input reference current controller 41 is configured to generate an input current reference signal $I_{IN\_REF}$. The input current reference signal $I_{IN\_REF}$ represents the desired current level (set point) of the input current $I_{IN}$, which is required in order to control the total DC link voltage $V2_{TOT}$ such that a voltage level of the total DC link voltage $V2_{TOT}$ equals a predefined voltage level. A level of this input current reference signal $I_{IN\_REF}$ may vary over time as the input voltage $V_{IN}$ varies. The input reference current controller 41 receives an input voltage signal $V_{IN\_M}$ which represents the instantaneous voltage level of the input voltage $V_{IN}$. This input voltage signal $V_{IN\_M}$ may be obtained by measuring the input voltage $V_{IN}$, or by other means. The input reference current controller 41 further receives DC link voltage signals $V2_{1\_M}$-$V2_{N2\_M}$. Each of these DC link voltage signals $V2_{1\_M}$-$V2_{N2\_M}$ represents one of the DC link voltages $V2_1$-$V2_{N2}$. These DC link voltage signals $V2_{1\_M}$-$V2_{N2\_M}$ may be obtained by measuring the individual DC link voltages $V2_1$-$V2_{N2}$. The input reference current controller 41 further receives a total DC link voltage reference signal $V2_{TOT\_REF}$. This reference signal $V2_{TOT\_REF}$ represents the desired (predefined) voltage level of the total DC link voltage $V2_{TOT}$. The input reference current controller 41 calculates the input current reference signal $I_{IN\_REF}$ based on these input signals. As the input reference current controller 41 generates the current level of the input current reference signal $I_{IN\_REF}$ such that the total DC link voltage assumes the desired level defined by the DC link voltage reference signal $V2_{TOT\_REF}$, the input reference current controller 41, in the present embodiment as well as in other embodiments explained below, may also be referred to as DC link voltage controller.

The modulation index controller 42 receives the input current reference signal $I_{IN\_REF}$ and an input current signal $I_{IN\_M}$. The input current signal $I_{IN\_M}$ represents the instantaneous current level of the input current $I_{IN}$. This input current signal $I_{IN\_M}$ may be obtained by measuring the input current $I_{IN}$, or by other means. The modulation index controller 42 outputs a control signal m which is received by the controllers $14_1$-$14_N$ in the individual first converter cells $1_1$-$1_N$. Referring to FIG. 12, each of the controllers (more precisely, the controller in each of the converter cells) receives a control signal $m_1$-$m_{N1}$ from the main controller 4. According to one embodiment, the individual first converter cells $1_1$-$1_{N1}$ receive the same control signal m, so that $m=m_1=m_2=m3=m_{N1}$. Details on this control signal m, which will also be referred to as modulation index m in the following, are explained below. Before going into further detail on the modulation index m, embodiments of the input reference current controller 41 and the converter cell controller 42 are explained with reference to FIG. 14. The modulation index controller 42 serves to control the input current $I_{IN}$. Thus, the modulation index controller 42 may also be referred to as (input) current controller.

Figure 14:
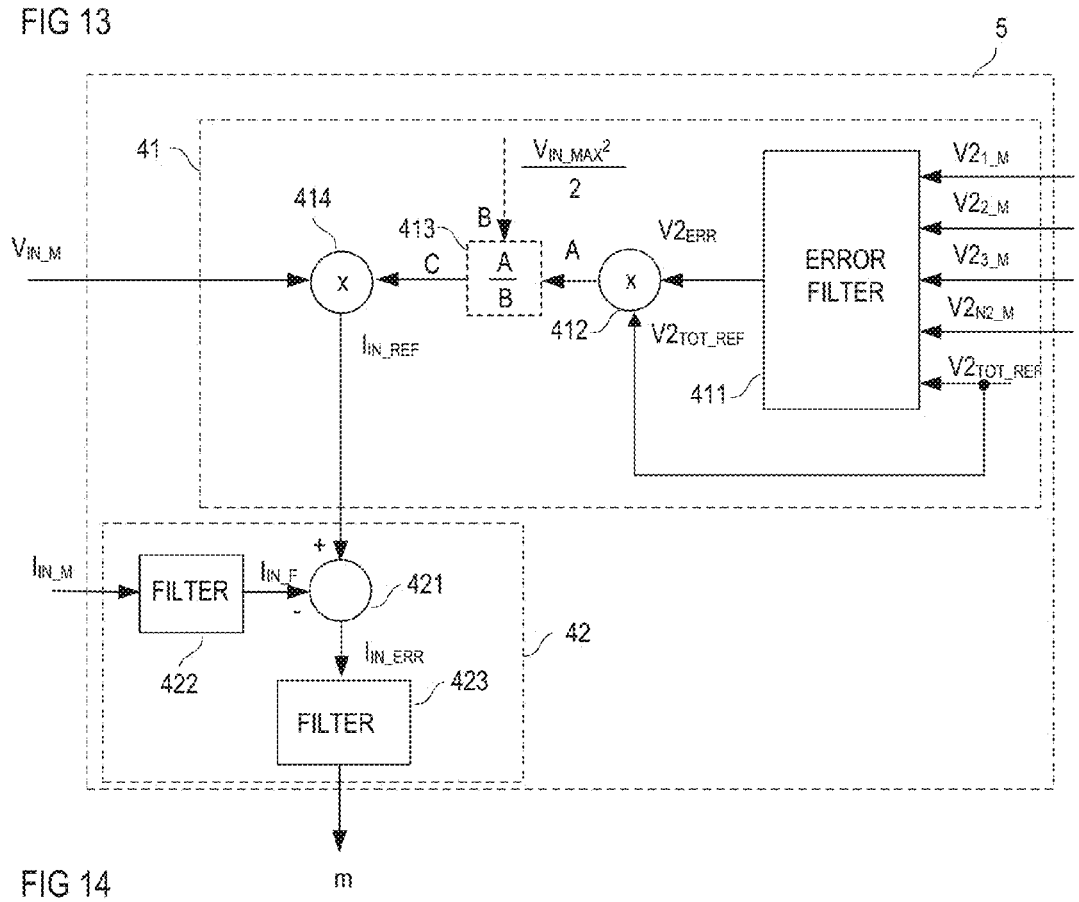
FIG. 14 shows one embodiment of the controller shown in FIG. 13 in greater detail.

In context with FIG. 14, the input reference current controller 41 will briefly be referred to as current controller. Referring to FIG. 14, the current controller 41 may include an error filter 411 which receives the DC link voltage signals $V2_{1\_M}$-$V2_{N2\_M}$ and the total DC link voltage reference signal $V2_{TOT\_REF}$. The error filter 411 generates an error signal $V2_{ERR}$ which is dependent on a difference between the total DC link voltage reference signal $V2_{TOT\_REF}$ and the sum of the individual DC link voltage signals $V2_{1\_M}$-$V2_{N\_M}$. The sum of these DC link voltage signals $V2_{1\_M}$-$V2_{N\_M}$ represents the total DC link voltage $V2_{TOT}$. The error filter may calculate the difference $$V_{2\_TOT} = \Sigma_{i=1}^{N2} V2_{i\_M} \qquad (6)$$

and filter this difference in order to generate the error signal $V2_{ERR}$. The filter may have one of an proportional (P) characteristic, a proportional-integral (PI) characteristic, and a proportional-integral-derivative (PID) characteristic. A multiplier 412 receives the error signal $V2_{ERR}$ and the total DC link voltage signal $V2_{TOT\_REF}$ and provides the product of these signals $V2_{ERR}$, $V2_{TOT\_REF}$ as an output signal A. An optional divider 413 receives the multiplier output signal A and a signal B, wherein the signal B is dependent on the square of the peak voltage level $V_{IN\_MAX}$ of the input voltage $V_{IN}$. In the embodiment shown in FIG. 14, $$B = \frac{V_{IN\_MAX}^2}{2}. \qquad (7)$$

An output signal C of the divider 413 equals the quotient A/B of the divider input signals A, B. A further multiplier 414 receives the divider output signal C and the input voltage signal $V_{IN\_M}$ and is configured to multiply the instantaneous levels of these signals C and $V_{IN\_M}$. The further multiplier 414 provides the input current reference signal $I_{IN\_REF}$ as an output signal.

As explained with reference to FIG. 13, the input current reference signal $I_{IN\_REF}$ defines the desired current level of the input current $I_{IN}$. In case the input voltage $V_{IN}$ is timely varying the input current reference signal $I_{IN\_REF}$ is also timely varying. This is a result of generating the input current reference signal $I_{IN\_REF}$ by multiplying the input voltage signal $V_{IN\_M}$ with the output signal C of the divider 413. The divider 413 may be omitted. In this case, the further multiplier 414 receives the output signal A from the multiplier 412 as an input signal. Assuming that the input current reference signal $I_{IN\_REF}$ is a periodic signal with a frequency defined by the input voltage signal $V_{IN\_M}$, then an amplitude of the input current reference signal $I_{IN\_REF}$ is defined by an amplitude of the input voltage signal $V_{IN\_M}$, and by one of the divider output signal C and the multiplier output signal A. These signals C and A are dependent on the total DC link voltage $V2_{TOT}$. The error filter 411 is configured to generate the error signal $V2_{ERR}$ such that a signal level of the error signal $V2_{ERR}$ increases when the total DC link voltage $V2_{TOT}$ falls below the level defined by the total DC link voltage reference signal $V2_{TOT\_REF}$, so as to increase the level of the multiplier output signal A and the amplitude of the input current reference signal $I_{IN\_REF}$, and so as to regulate the total DC link voltage $V2_{TOT}$ such that a voltage level of the total DC link voltage $V_{TOT}$ substantially corresponds to the voltage level as defined by the total DC link voltage reference signal $V2_{TOT\_REF}$. Equivalently, the error filter 411 decreases a level of the error signal $V2_{ERR}$ when the voltage level of the total DC link voltage $V_{TOT}$ increases to above the voltage level defined by the total DC link voltage reference signal $V2_{TOT\_REF}$, so as to reduce the amplitude of the input voltage reference signal $I_{IN\_REF}$ and to counteract a further increase of the total DC link voltage $V2_{TOT}$.

The optional divider 413 may be used in those applications, in which the amplitude of the input voltage $V_{IN}$ may vary. The divider 413 acts in accordance with the feed-forward principle and helps to reduce the amplitude of the input current $I_{IN}$, by reducing the amplitude of the input current reference signal $I_{IN\_REF}$, when the amplitude of the input voltage $V_{IN}$ increases. In this case, the average input power, which is the input power averaged over one period of the input voltage $V_{IN}$ is substantially independent of the amplitude of the input voltage $V_{IN}$ and is substantially defined by the error signal $V2_{ERR}$ and the total DC link voltage reference signal $V2_{TOT\_REF}$.

Referring to FIG. 14, the modulation index controller 42 includes a first filter 422 which receives the input current signal $I_{IN\_M}$. A subtractor 421 receives the input current reference signal $I_{IN\_REF}$ and the filter output signal 422. This subtractor 421 subtracts the instantaneous signal level of the filter output signal $I_{IN\_F}$ from the instantaneous level of the input current reference signal $I_{IN\_REF}$. An output signal $I_{IN\_ERR}$ of the subtractor 421 represents a current error. That is, the subtractor output a signal $I_{IN\_ERR}$ which represents an instantaneous difference between the desired input current level and the actual input current level. A second filter 423 receives this current error signal $I_{IN\_ERR}$ and provides the modulation index m. According to one embodiment, the first filter 422 has a low-pass characteristic. The second filter 423 may have one of a P, PI, and a PID characteristic.

Figure 15:
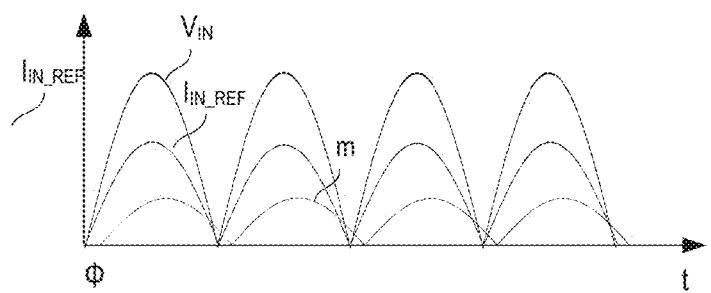
FIG. 15 schematically illustrates one embodiment of an input voltage of the multi-cell power converter shown in FIG. 12, and of a corresponding modulation index.

It can be shown that, in case the input voltage $V_{IN}$ is a periodic voltage such as, for example, a rectified sine voltage with a frequency of 100 Hz or 120 Hz, the modulation index m is also a periodic signal, substantially with the same frequency as the input voltage $V_{IN}$. FIG. 15 schematically illustrates the relationship between the input voltage $V_{IN}$ and the modulation index m. As, referring to FIG. 14, the input current reference signal $I_{IN\_REF}$ is obtained by multiplying the input voltage signal $V_{IN\_M}$ with one of signals C and A which are dependent on the total DC link voltage, the waveform shown in FIG. 15 which represents the input voltage $V_{IN}$ also represents the input current reference signal $I_{IN\_REF}$ (when assuming that the voltage level of the total DC link voltage $V_{TOT}$ does not change during the time period illustrated in FIG. 15). Referring to FIG. 15, there may be a phase-shift $\phi$ between the input voltage $V_{IN}$ and the input current reference signal $I_{IN\_REF}$, respectively, on the one hand, and the modulation index m on the other hand. This phase difference $\phi$ which is at most several degrees, may vary based on the difference between the input voltage reference signal $I_{IN\_REF}$ and the filtered input current signal $I_{IN\_F}$, and on the voltage V15 across the inductor 15 (see, FIG. 11). Further, it can be shown that an amplitude of the varying modulation index m is dependent on the amplitude of the input voltage $V_{IN}$, whereas the amplitude of the modulation index m increases as the amplitude of the input voltage $V_{IN}$ increases. According to one embodiment the main controller 4 is configured to generate the modulation index m as a normalized signal with values of between 0 and 1, wherein the modulation index m has an amplitude of 1 only in those cases in which an amplitude of the input voltage $V_{IN}$ corresponds to the total DC link voltage $V_{TOT}$.

Figure 16:
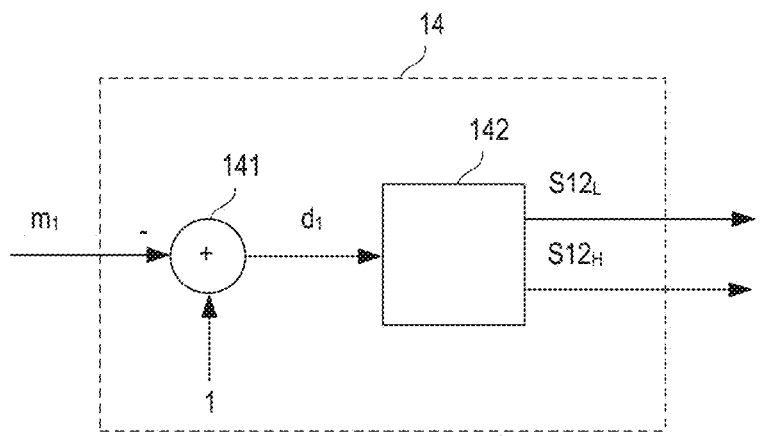
FIG. 16 shows one embodiment of a cell controller of one converter cell in the multi-cell power converter shown in FIG. 12.

FIG. 16 shows one embodiment of the controller 14 in the first converter cell $1_1$ shown in FIG. 12. Each of the controllers (not shown in FIG. 12) in the other converter cells $1_2$-$1_{N1}$ may be implemented in accordance with the controller 14 shown in FIG. 16. Referring to FIG. 16, the controller $14_1$ is configured to calculate a duty cycle $d_1$ based on the modulation index $m_1$ received from the cell controller 42. In the embodiment shown in FIG. 16, calculating the duty cycle d includes calculating the duty cycle d as follows:

$$d_1 = 1 - m_1 \qquad (8).$$

For the purpose of explanation it is assumed that each of the first converter cells $1_1$-$1_{N1}$ receives the same modulation index m from the main controller, so that in the controller of each of the first converter cells $1_1$-$1_{N1}$ the same duty cycle d=1−m is calculated.

Like the modulation index $m_1$, the duty cycle $d_1$ may vary between 0 and 1. Like the modulation index $m_1$, the duty cycle $d_1$ may timely vary and may vary between 0 and 1. A PWM controller 142 receives the duty cycle or, more precisely, a signal representing the duty cycle $d_1$, and generates the drive signal $S12_L$ for the low-side switch $12_L$ and, optionally, the drive signal $S12_H$ for the high-side switch $12_H$ based on the duty cycle $d_1$.

One way of operation of the PWM controller 142 shown in FIG. 16 is explained with reference to FIG. 17 in which timing diagrams of the drive signal $S12_L$ received by the low-side switch $12_L$ and the drive signal $S12_H$ received by the high-side switch $12_H$ are shown. Each of these drive signal $S12_L$, $S12_H$ can assume an on-level which switches on the respective switch, and an off-level which switches off the respective switch. Just for the purpose of explanation, in FIG. 17, an on-level is drawn as a high signal level, and an off-level is drawn as a low signal level.

Figure 17:
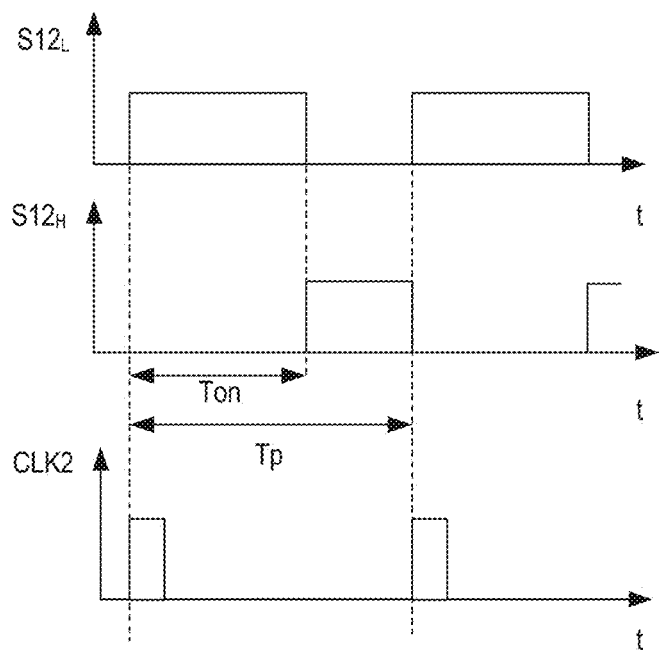
FIG. 17 shows timing diagrams which illustrate one way of operation of the controller shown in FIG. 16.

Referring to FIG. 17, the PWM controller 142 is configured to cyclically switch on the low-side switch $12_L$. In particular, the PWM controller 142 may be configured to periodically switch on the low-side switch $12_L$. In FIG. 17, Tp denotes the duration of one drive cycle of the low-side switch $12_L$. The time period Tp is defined by a switching frequency fp, with Tp=1/fp. The switching frequency fp is, for example, a frequency selected from a frequency range of between 18 kHz and several 100 kHz. In FIG. 17 Ton denotes an on-time of the low-side switch $12_L$, which is a time period within one drive cycle in which the low-side switch $12_L$ is switched on. The duty cycle $d_1$ defines the duration of this on-time relative to the duration Tp of one drive cycle, wherein $$d_1 = Ton/Tp \qquad (9).$$

Thus, the on-time increases relative to the time period Tp of one drive cycle as the duty cycle $d_1$ increases, and vice versa.

Referring to FIG. 17, the PWM controller 142 may switch on and off the high-side switch $12_H$ complementary to switching on and off the low side switch $12_L$. That is, the PWM controller 142 may be configured to switch on the high-side switch $12_H$ when the low-side switch $12_L$ is switched off, and vice versa. There may be a delay time between switching off the low-side switch $12_L$ and switching on the high-side switch $12_H$, and between switching off the high-side switch $12_H$ and again switching on the low-side switch. However, such delay times are not shown in FIG. 17. During such delay times, the rectifier element of the high-side switch $12_H$ conducts. In case the high-side switch $12_H$ is replaced by a rectifier element, the rectifier element "automatically" conducts when the low-side switch $12_L$ is in the off state.

FIG. 18 shows one embodiment of the PWM controller 142 in the controller 14 shown in FIG. 16. Referring to FIG. 18, the PWM controller 142 may include a clock generator 143 which generates a first clock signal CLK1. A frequency of this first clock signal CLK1 may be higher than the switching frequency fp. According to one embodiment, the frequency of the first clock signal CLK1 is at least several MHz. A frequency divider 144, which may be implemented with a counter or the like, receives the first clock signal CLK1 and generates a second clock signal CLK2. The second clock signal CLK2 defines the switching frequency fp. This second clock signal CLK2 is also illustrated in FIG.

17. Referring to FIG. 17, the drive signal $S12_L$ of the low-side switch $12_L$ may assume an on-level each time a signal pulse of the second clock signal CLK2 occurs. A latch, such as an SR flip flop 145 may receive the second clock signal CLK2 at a set input S. A first driver 146 has an input coupled to a non-inverting first output Q of the flip flop 145 and generates the drive signal 512L of the low-side switch $12_L$ based on the output signal at the first input Q of the flip flop 145. An optional second driver 147 generates the drive signal $S12_H$ of the high-side switch $12_H$ based on an output signal at a second inverting output Q' of the flip flop 145. In order to adjust the on-time Ton of the low-side switch $12_L$, a timer 148 receives the second clock signal CLK2, the duty cycle signal d and the first clock signal CLK1. The timer 145 is configured to reset the flip flop 145, in order to cause the drive signal $S12_L$ to assume the off-level at a predefined time period after a signal pulse of the second clock signal CLK2, wherein this time period is defined by the duty cycle d.

It should be noted that FIG. 18 shows only one of a variety of possible implementations of the PWM controller 142. Of course, the implementation of the PWM controller 142 is not restricted to the specific embodiment shown in FIG. 18.

It can be shown that the modulation index generated as explained above approximately corresponds to $$m = V_{IN}/V2_{TOT} \qquad (10).$$

wherein $V_{IN}$ denotes the instantaneous voltage level of the input voltage $V_{IN}$, and $V2_{TOT}$ represents the (desired) total DC link voltage. However, this is only an approximation. Referring to what is stated in context with FIGS. 13 and 14 above, the modulation index m is not only dependent on the input voltage $V_{IN}$, but may further vary based on the difference between current level of the input current $I_{IN}$ and the reference input current $I_{IN\_REF}$.

According to one embodiment, the controller 14 in the first converter cell $1_1$ and corresponding controllers in the other converter cells $1_2$-$1_{N1}$ receive the same modulation index m from the main controller 4, and the individual converter cells $1_1$-$1_{N1}$ are operated in an interleaved fashion. This is explained with reference to FIGS. 19A and 19B. FIGS. 19A and 19B show timing diagrams of the drive signal $S12_L$ of the low-side switch $12_L$ in the first converter cell $1_1$ and timing diagrams of drive signals $S12_{L2}$-$S12_{LN1}$ of corresponding low-side switches in the other converter cells $1_2$-$1_{N1}$. In FIGS. 19A and 19B, these drive signals $S12_L$-$S12_{LN1}$ are shown at two different duty cycles d, namely d=0.625 in FIG. 19A and d=0.125 in FIG. 19B. Operating the individual converter cells $1_1$-$1_{N1}$ in an interleaved fashion means that the drive cycles of the individual converter cells $1_1$-$1_{N1}$ begin with a time offset of Tp/N1. Here, like in the embodiments explained before, N1 denotes the number of first converter cells $1_1$-$1_{N1}$. If, for example, N1=4, the time offset is Tp/4, as shown in FIGS. 19A and 19B. For example, there is a delay time of Tp/4 between the begin of the on-time of the drive signal $S12_L$ in converter cell $1_1$ and the begin of the on time of the drive signal $S12_{L2}$ in the converter cell $1_2$, there is a delay time Tp/4 between begin of the-on time of the drive signal $S12_{L2}$ in the converter cell $1_2$ and the begin of the on time of the drive signal $S12_{L3}$ in the converter cell $1_3$, and there is a delay time Tp/4 between the begin of the on time of the drive signal $S12_{L3}$ in the converter cell $1_3$ and the begin of the on time of the drive signal $S12_{LN1}$ in the converter cell $1_{N1}$. Operating the individual converter cells $1_1$-$1_{N1}$ in an interleaved fashion results in an overall switching frequency of N1·fp. This higher overall switching frequency may help to reduce ripples in the input current $I_{IN}$ that may result from the switched-mode operation of the first power converter 10 or, more precisely, from a switched mode operation of the individual first converter cells $1_1$-$1_{N1}$.

Referring to FIG. 12 and the corresponding description a current level of the input current $I_{IN}$ can be adjusted by modulating a voltage V15 across the inductor 15. The voltage level of this voltage V15 is dependent on the instantaneous value of the input voltage $V_{IN}$, the DC link voltages $V2_1$-$V2_{N2}$ and the operation states of the individual first converter cells $1_1$-$1_{N1}$. For the purpose of explanation it is assumed that the individual DC link voltages $V2_1$-$V2_{N2}$ are substantially equal and the number N2 of DC link capacitors equals the number N1 of first converter cells $1_1$-$1_{N1}$ (N1=N2). In this case, each of these DC link voltages $V2_1$-$V2_{N2}$ equals $V2_{TOT}/N1$. Further, it is assumed that each converter cell $1_1$-$1_{N1}$ can assume an on-state, which is an operation state in which the respective low-side switch $12_L$ is switched on, and an off-state in which the respective low-side switch $12_L$ is switched off. Thus, in the timing diagrams shown in FIGS. 19A and 19B, the on-times of the low-side switch drive signals $12_L$-$12_{LN1}$ represent the on-times of the individual first converter cells.

Assuming that electrical resistances of the individual low-side switches (from which in FIG. 12 only the low-side switch $12_L$ of the first converter cell $1_1$ is shown) in the first converter cells $1_1$-$1_N$ can be neglected, the cell input voltage $V1_1$-$V1_{N1}$ at the cell input of the individual converter $1_1$-$1_{N1}$ cells is zero when the converter cell $1_1$-$1_{N1}$ is in the on-state, and equals the DC link voltage ($V2_{TOT}/N1$) of the respective converter cell when the converter cell is in the off-state. The inductor voltage V15 is given by $$V15 = V_{IN} - V1_{TOT} \qquad (11),$$

wherein $V1_{TOT}$ represents the overall voltage at the cell inputs of the individual first converter cells. That is $$V1\_TOT = \sum_{i=1}^{N1} V1_i \qquad (12).$$

In case each of the first converter cells $1_1$-$1_{N1}$ includes an inductor (not shown), the cell input voltages $V1_1$-$V1_{N1}$ are the voltages across the individual low-side switches. V15 is then the total voltage across the plurality of inductors.

Operating (driving) the individual first converter cells $1_1$-$1_{N1}$ based on the modulation index m as explained with reference to FIGS. 13-19B herein before, causes the inductor voltage V15 substantially to vary between $V_{IN}-(k \cdot V2_{TOT}/N1)$ and $V_{IN}-((k+1) \cdot V2_{TOT}/N1)$, wherein k is dependent on the modulation index m. and equals the number of first converter cells that are in the off-state at one time. k may be obtained by $$k = \text{Round}\left[\frac{V_{IN} \cdot N1}{V2_{TOT}}\right] = \text{Round}\,[m \cdot N1], \qquad (13)$$

where Round[·] is a mathematic function that rounds the result of the operation in the square brackets to the next lower integer, $V_{IN}$ is the instantaneous level of the input voltage $V_{IN}$, and m is the modulation index. If, for example, the instantaneous level of the input voltage $V_{IN}$ is below the level of one DC link voltage ($V2_{TOT}/N1$), then k=0 so that the total cell input voltage $V1_{TOT}$ varies between 0 and $V2_{TOT}/N1$ until the input voltage $V_{IN}$ reaches $V2_{TOT}/N1$. In this way, the total cell input voltage $V1_{TOT}$ "follows" the instantaneous value of the input voltage $V_{IN}$. In other words, the converter cells $1_1$-$1_{N1}$ generate (modulate) the total cell input voltage $V1_{TOT}$ such that the total cell input voltage $V1_{TOT}$ "tracks" the input voltage $V_{IN}$. In this way, the voltage V15 across the inductor 15 can be controlled. This is explained with reference to FIGS. 12 and 19A in the following.

In the embodiment shown in FIG. 19A, the individual converter cells $1_1$-$1_{N1}$ are operated with a duty cycle of d=0.625. In this embodiment, the modulation index m is 0.375 which indicates that the instantaneous value of the input voltage $V_{IN}$ is relatively low as compared to the (desired) overall DC link voltage $V2_{TOT}$. Referring to the equation above, k=1 when m=0.375 and when there are N1=4 converter cells (k=Round[0.375.4]=Round[1.5]=1) so that at m=0.375 the total cell input voltage $V1_{TOT}$ changes between $V2_{TOT}/N1$ and $2 \cdot V2_{TOT}/N1$. That is, either one or two converter cells are in the off-state at one time, and either three or two converter cells are in the off-state at the same time, respectively. If three first converter cells $1_1$-$1_{N1}$ are in the on-state, the total input cell voltage $V1_{TOT}$ is (N1−3)·$V2_{TOT}/N1$. That is, in this specific embodiment with N1=4, the total input cell voltage $V1_{TOT}$ is $V2_{TOT}/N1$. If two of the converter cells $1_1$-$1_N$ are operated in the on-state, the total cell input voltage $V1_{TOT}$ is (N1−2)·$V2_{TOT}/N1$. The inductor voltage V15 in these two cases is $$V15 = V_{IN} - (N1-3) \cdot V2_{TOT}/N1 \quad (14A)$$

$$V15 = V_{IN} - (N1-2) \cdot V2_{TOT}/N1 \quad (14B).$$

A modulation index m=0.375 indicates that the instantaneous value of the input voltage $V_{IN}$ substantially corresponds to the $0.375 \cdot V2_{TOT}$, so that the inductor voltage V15 is positive when three of the first converter cells $1_1$-$1_N$ are in the on-state, and negative when two of the first converter cells $1_1$-$1_N$ are in the on-state. Thus, in the first case, the inductor current $I_{IN}$ increases, while, in the second case, it decreases. In those time periods in which the total cell input voltage $V1_{TOT}$ is lower that the instantaneous value of the input voltage $V_{IN}$, energy is inductively stored in the inductor 15, and in those time periods in which the instantaneous voltage level of the input voltage $V_{IN}$ is below the total cell input voltage $V1_{TOT}$, the energy stored in the inductor 15 is transferred to the DC link capacitors of those first converter cells $1_1$-$1_{N1}$ which are in the off-state. As each of the first converter cells $1_1$-$1_{N1}$ is switched on and off in one drive cycle, the DC link capacitors $11_1$-$11_{N2}$ of the individual first converter cells $1_1$-$1_{N1}$ are equally charged when the individual first converter cells $1_1$-$1_{N1}$ receive the same modulation index m by the main converter 4.

Referring to the embodiment shown in FIG. 19B, a duty cycle d=0.125 corresponds to a modulation index of m=0.875. In this case, the instantaneous voltage level of the input voltage $V_{IN}$ is close to the total DC link voltage $V2_{TOT}$. At m=0.875 and N1=4, k=3 so that three or four converter cells are in the off-state at one time. Consequently, the total cell input voltage $V1_{TOT}$ varies between (N1−1)·$V2_{TOT}/N1$ if three of the first converter cells $1_1$-$1_{N1}$ are in the off-state (only one is in the on-state), and $V2_{TOT}$ if each of the first converter cells $1_1$-$1_{N1}$ is in the off-state (none is in the on-state).

Figure 20:
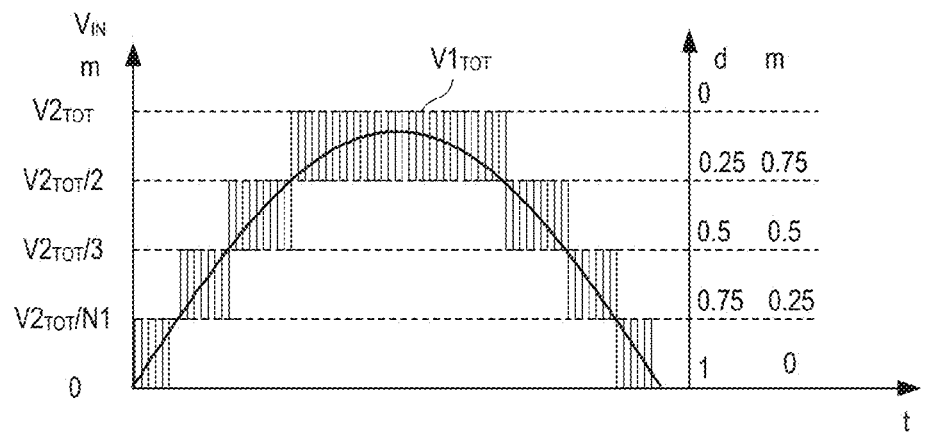
FIG. 20 schematically illustrates one embodiment of an input voltage waveform of the multi-cell power converter shown in FIG. 12, and of a corresponding total cell input voltage.

FIG. 20 schematically illustrates one period of the input voltage $V_{IN}$ and the total cell input voltage $V1_{TOT}$ during this one period of the input voltage $V_{IN}$. The embodiment shown in FIG. 20 is based on a first power converter 10 with N1=4 first converter cells $1_1$-$1_{N1}$ and N2=4 DC link capacitors $11_i$-$11_{N2}$. As can be seen from FIG. 20, dependent on the instantaneous voltage level of the input voltage $V_{IN}$ the total cell input voltage $V1_{TOT}$ switches between two voltage levels. The difference between these two voltage levels substantially is $V2_{TOT}/N1$. In FIG. 20, the dashed lines mark those instantaneous voltage levels of the input voltage $V_{IN}$ at which the two levels change between which the total cell input voltage $V1_{TOT}$ switches. The duty cycles d and the modulation indexes m associated with those instantaneous voltage levels of the input voltage $V_{IN}$ marked by the dashed lines are also shown in FIG. 20. It should be noted that the waveform of the total DC link voltage shown in FIG. 20 can be obtained by operating the individual converter cells $1_1$-$1_{N1}$ with the same (or substantially the same) modulation index m. However, referring to the explanation further below, it is also possible to operate the individual converter cells $1_1$-$1_{N1}$ with different modulation indices and to obtain a waveform as shown in FIG. 20.

Figure 21:
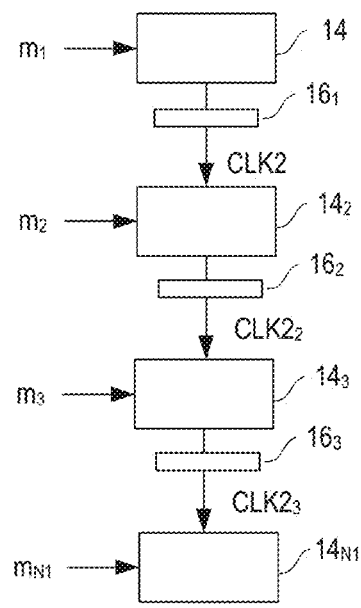
FIG. 21 illustrates how cell controllers in individual converter cells of the multi-cell power converter shown in FIG. 12 may be synchronized.

FIG. 21 shows one example of how the controller 14 in the first converter cell $1_1$ and corresponding controllers in the other converter cells $1_2$-$1_{N1}$ may be synchronized in order for the controllers to operate the individual first converter cells $1_1$-$1_{N1}$ in an interleaved fashion, as explained with reference to FIGS. 19A and 19B. In FIG. 21, reference character 14 denotes the controller in the first converter cells $1_1$, as shown in FIG. 12, and reference characters $14_2$-$14_{N1}$ denote corresponding controllers in the other first converter cells $1_2$-$1_{N1}$. In the embodiments shown in FIGS. 19A and 19B, the drive cycles of the individual first converter cells $1_1$-$1_{N1}$ start in a predefined order. In this case, the individual controllers can be synchronized as shown in FIG. 21. In this embodiment, controller 14 of first converter cell $1_1$ forwards the second clock signal CLK2 (which, in the first converter cell $1_1$, is used to define the beginning of the on-time) to controller $14_2$ of the first converter cell $1_2$ which, referring to FIGS. 19A and 19B, is next in order to start the corresponding drive cycle. The controller $14_2$ forward its second clock signal $CLK2_2$ (which, in the first converter cell $1_2$, is used to define the beginning of the on-time) to controller $14_3$, which forwards its second clock signal $CLK2_3$ (which, in the first converter cell $1_3$, is used to define the beginning of the on-time) to the controller $14_{N1}$. The second clock signals $CLK2$-$CLK2_3$ are transmitted from one controller to the other controller via isolation barriers $16_1$-$16_3$ which may include transformers, optocouplers, or the like, and which galvanically isolate the controllers $14$-$14_{N1}$.

Figure 22:
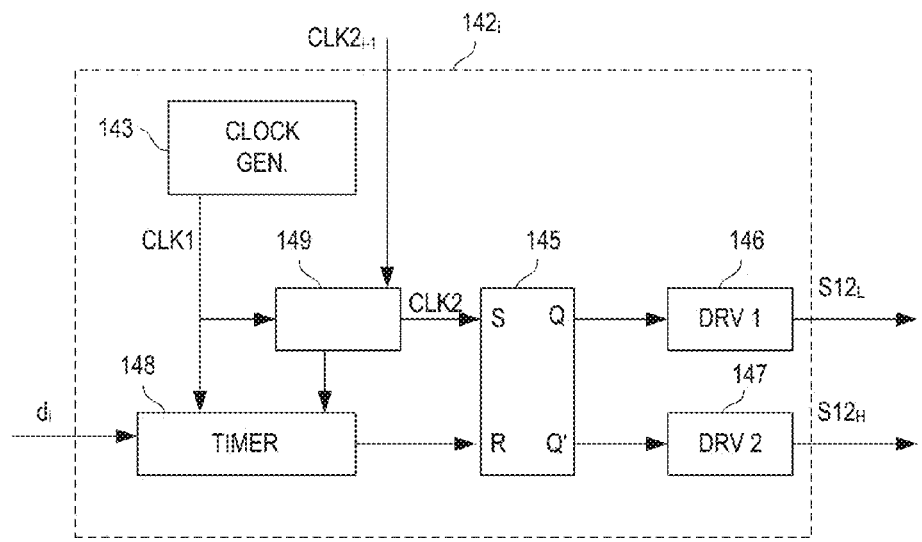
FIG. 22 shows a modification of the PWM controller shown in FIG. 18.

If the individual controllers $14_1$-$14_{N1}$ are synchronized as shown in FIG. 21, the controller 14 of the first converter cell $1_1$ may be implemented as explained with reference to FIGS. 16 and 18. The PWM controllers 142 in the other controllers $14_2$-$14_{N1}$ may be implemented as shown in FIG. 22. The PWM controller 142 shown in FIG. 22 is a modification of the PWM controller 142 shown in FIG. 18. The PWM controller shown in FIG. 22 is different from the one shown in FIG. 18 in that instead of the frequency divider 144 there is a further delay element 149 which receives the second clock signal $CLK2_{i-1}$ from another controller and generates the second clock signal $CLK2_i$ based on the received second clock signal $CLK2_{i-1}$ and the desired time offset (Tp/4 in FIGS. 19A and 19B) between the drive cycles of the individual converter cells $1_1$-$1_{N1}$. In FIG. 22 $CLK2_{i-1}$ denotes the second clock signal received by the respective controller. If, for example, the PWM controller shown in FIG. 22 is the PWM controller of the controller $14_3$ shown in FIG. 21, then $CLK2_{i-1}$ is the clock signal CLK2 received from the controller $14_2$, and $CLK_2$ is the control signal used in the converter cell $1_2$ to control the beginning and the end of the on-time.

The interleaved operation of the first converter cells $1_1$-$1_{N1}$ explained before in which the individual converter cells are operated at the same duty cycle is only one way of operating the series connected first converter cells $1_1$-$1_{N1}$. In this embodiment, each of the converter cells is operated in a PWM fashion (at the switching frequency fp) such that each converter cell is in the on-state for a certain time period and in the off state for a certain time period in each drive cycle. That is, the individual converter cells are operated in the same operation mode. According to another embodiment, in one drive cycle, only one of the first converter cells $1_1$-$1_{N1}$ is operated in a PWM fashion based on the modulation index, while the other first converter cells are either in the on-state or in the off-state throughout the complete duration of one drive cycle. Thus, each of the converter cells is operated in one of three different operation modes, the PWM mode, the on-state (on-mode), and the off-state (off-mode). An on-state of one converter cell throughout one drive cycle corresponds to a duty cycle of 1 (and a modulation index of 0) of the corresponding converter cell, and an off-state of one converter cell throughout one drive cycle corresponds to a duty cycle of 0 (and a modulation index of 1) of the corresponding converter cell. That is, operating one cell in a PWM fashion and operating the other cells either in the on-state or the off-state corresponds to operating the individual cells at different duty cycles and modulation indices, respectively. In general, the modulation indices $m_1$-$m_{N1}$ of the individual converter cells $1_1$-$1_{N1}$ are selected such that $$V_{IN} = \sum_{i=1}^{N1} m_i \cdot V2_i = m \cdot V2_{TOT} \quad (15),$$

where N1=N2, $V_{IN}$ is the instantaneous level of the input voltage $V_{IN}$, $m_i$ is the modulation index of one converter cell, $V2_i$ is the corresponding DC link voltage, m is the overall modulation index of the power converter, and $V2_{TOT}$ the voltage level of the total DC link voltage. If the individual DC link voltages $V2_1$-$V2_{N2}$ are substantially equal and equal to $V2_{TOT}/N1$ then $$V_{IN} = \frac{V2_{TOT}}{N1} \cdot \left( \sum_{i=1}^{N1} m_i \right) = m \cdot V2_{TOT}, \quad (16)$$

and $$\left( \sum_{i=1}^{N1} m_i \right) = N1 \cdot m. \quad (17)$$

Figure 23:
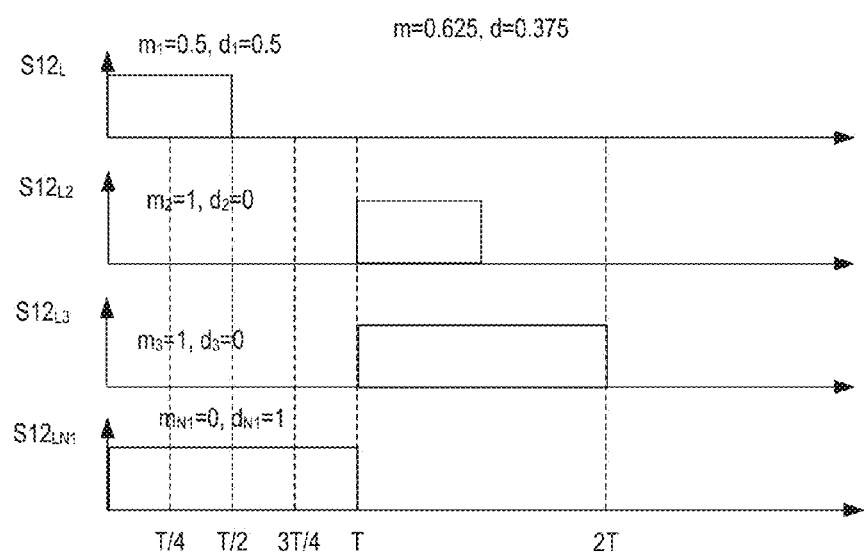
FIG. 23 shows timing diagrams which illustrate another way of operation of the multi-cell power converter shown in FIG. 12.

Operating the individual converter cells at different modulation indices is explained with reference to FIG. 23. FIG. 23 shows timing diagrams of the drive signals $S12_L$-$12_{LN1}$ of the low-side switches in the individual first converter cells, wherein the signal levels of the drive signals $S12_L$-$12_{LN1}$ represent the operation state of the individual first converter cells $1_1$-$1_{N1}$, as explained above.

For the purpose of explanation it is assumed that m=0.625 and N1=4. As 4·0.625=2.5=1+1+0+0.5, an overall modulation index of m=0.625 of the power converter 10 can be obtained by operating two converter cells at a modulation index of 1 (at a duty cycle of 0), one converter cell at a modulation index of 0 (at a duty cycle of 1) and one converter cell at a modulation index of 0.5 (at a duty cycle of 0.5). This is illustrated in FIG. 23. In a first drive cycle shown in FIG. 23, $m_1$=0.5, $m_2$=$m_3$=1, and $m_{N1}$=0, that is, converter cell is operated in a PWM fashion at a duty cycle of $d_1$=0.5 (=1−$m_1$=1−0.5), converter cells $1_2$ and $1_3$ are in the off-state, and converter cell $1_{N1}$ is in the on-state. In a next drive cycle, the modulation indices of 1, 1, 0, and 0.5 may be assigned to the converter cells in another way (as illustrated in FIG. 23). However, it is also possible to operate each of the converter cells with the same modulation index for several drive cycles.

The overall duty cycle of the first power converter 10, such as the duty cycle d=0.375 in FIG. 23 denotes the average duty cycle of each of the first converter cells, that is $$d = \frac{\sum_{i=1}^{N1} d_i}{N1}, \quad (18)$$

wherein $d_i$ denotes the individual duty cycle of each first converter cell. In the embodiments shown in FIGS. 19A and 19B, the individual converter cells have the same duty cycle and the same modulation index which is the overall duty cycle and the overall modulation index, respectively.

Figure 24:
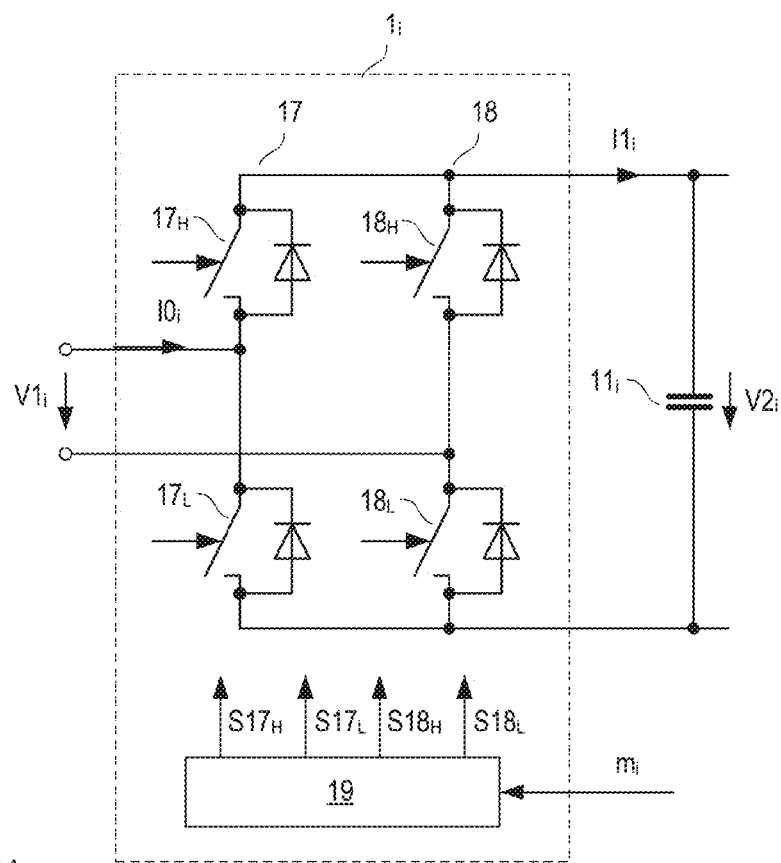
FIG. 24 shows a converter cell of a multi-cell power converter according to one embodiment.

FIG. 24 shows one embodiment of a converter cell $1_i$ which may be used in a multi-cell converter with IS topology of the type shown in FIG. 12 when the multi-cell converter receives a sinusoidal voltage as the input voltage $V_{IN}$. That is, each of the converter cells shown in FIG. 12 may be replaced with a converter cell of the type shown in FIG. 24. In FIG. 24, $V1_i$ denotes the cell input voltage, $V2_i$ denotes the DC link voltage at the associated DC link capacitor $11_i$, $I1_i$ denotes the cell output current (which is the current into the circuit node to which the DC link capacitor $11_i$ is connected thereto).

Referring to FIG. 24, the converter cell $1_i$ includes a bridge circuit with two half-bridges 17, 18. Each half-bridge 17, 18 includes a high-side switch $17_H$, $18_H$ and a low-side switch $17_L$, $18_L$. Load paths of the high-side switch $17_H$, $18_H$ and the low-side switch $17_L$, $18_L$ of each half-bridge 17, 18 are connected in series, whereas these series circuits are each connected in parallel with DC link capacitor $11_i$. Each half-bridge 17, 18 includes a tap, which is a circuit node common to the load paths of the high-side switch $17_H$, $18_H$, and the low-side switch $17_L$, $18_L$ of the respective half-bridge 17, 18. A first cell input node of the first converter cell $1_i$ is connected to the tap of the first half-bridge 17, and a second cell input node of the first converter cell $1_i$ is connected to the tap of the second half-bridge 18. The topology shown in FIG. 24 will be referred to as full-bridge topology in the following.

A first converter 10 with an IS topology and implemented with first converter cells of the type shown in FIG. 24 can directly process a sine voltage provided from a power grid so that a rectifier circuit 100 (see FIG. 11), which may cause losses, is not required. There are several ways to operate the converter cell $1_i$ with the full-bridge topology. Two of these ways of operation are explained with reference to FIGS. 25A and 25B below. In each of these FIGS. 25A and 25B timing diagrams of the input voltage $V_{IN}$ during one period of the input voltage $V_{IN}$, and of drive signals $S17_H$-$S18_L$ of the high-side and low-side switches $17_H$-$18_L$ are schematically illustrated.

Figure 25A:
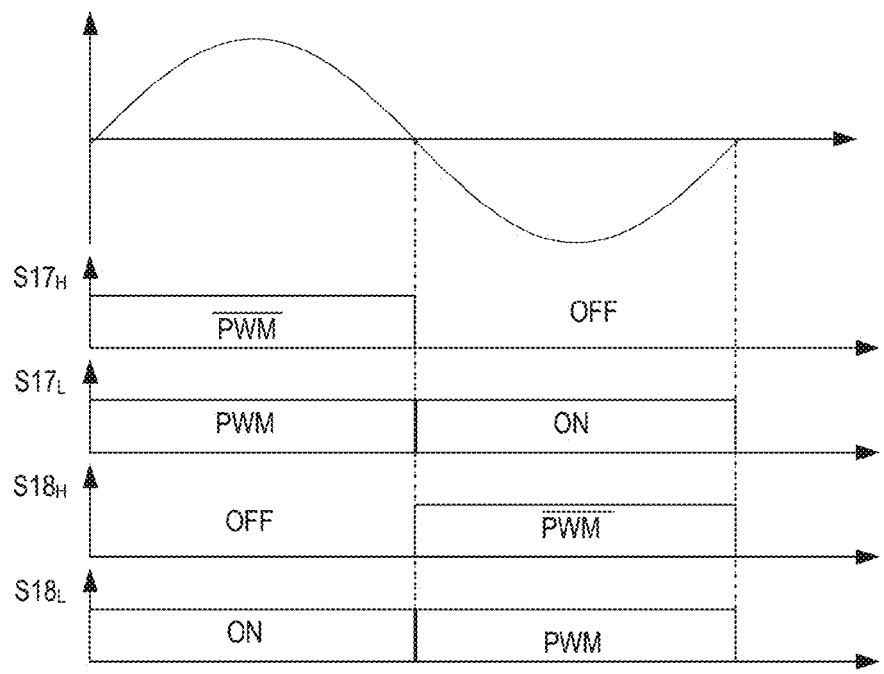
FIGS. 25A-25B show timing diagrams which illustrate one way of operation of the converter cell shown in FIG. 24.

Referring to FIG. 25A, the converter cell $1_i$ operates differently in the positive half-wave and the negative half-wave of the sinusoidal input voltage $V_{IN}$. However, within each halfwave the operation of the converter cell $1_i$ is very similar to the operation of one of the converter cells $1_1$-$1_N$ shown in FIG. 12 which each include one electronic switch and one rectifier element. During each half-wave, the two switches of one of the two half-bridges 17, 18 are operated in a PWM fashion, while the two switches of the other of the two half-bridges are in a predefined operation state during the duration of the halfwave. That is, the two switches of the one half-bridge are switched at the switching frequency fp explained above, while the two switches of the other half-bridge are switched only once in (at the beginning of) one halfwave. During the positive halfwave of the input voltage $V_{IN}$ the high-side switch $18_H$ of the second half-bridge 18 is in the off-state, and the low-side switch $18_L$ is in the on-state. During this positive halfwave, the low-side switch $17_L$ of the first half-bridge 17 operates in a PWM mode, like the switching element 12 in the converters $1_1$ shown in FIG. 12, and the high-side switch $17_H$ of the first half-bridge 17 operates like the high-side switch (rectifier element) 13 shown in FIG. 12. That is, the high-side switch $17_H$ also operates in a PWM fashion, but complementary to the low-side switch $17_L$. During the negative halfwave of the input voltage $V_{IN}$, the high-side switch $17_H$ of the first half-bridge 17 is in the off-state, and the low-side switch $17_L$ of the first half-bridge 17 is in the on-state. The low-side switch $18_L$ of the second half-bridge 18 is operated in the PWM fashion, like the switching element 12 of the first converter $1_1$ shown in FIG. 12. The high-side switch $18_H$ operates like the high-side switch 13 shown in FIG. 12. That is, the high-side switch operates in a PWM fashion complementary to the low side switch. By operating the switches of one half-bridge complementary in the PWM mode the two switches are not switched on at the same time. In this embodiment, the two high-side switches $17_H$, $18_H$ may be replaced by rectifier elements such as, for example, diodes.

In the embodiment shown in FIG. 25A, the first half-bridge 17 operates in a PWM fashion in one halfwave (the positive halfwave in this embodiment), and the second half-bridge 18 operates in a PWM fashion in the other halfwave (the negative halfwave in this embodiment). In another way of operation explained with reference to FIG. 25B only one of the two half-bridges 17, 18 operates in a PWM fashion while the other half-bridge operates at the frequency of the input voltage $V_{IN}$ so that the other half-bridge switches only once in each halfwave. This way of operation will be referred to as totem pole modulation in the following. The totem pole modulation allows to optimize the half-bridge operated in the PWM mode in terms of low switching losses, and to optimize the other half-bridge in terms of low conduction losses. Just for the purpose of explanation it is assumed that the first half-bride 17 operates in the PWM mode, where the switching frequency may be 18 kHz or higher, and that the second half-bridge 18 operates at twice the frequency of the input voltage $V_{IN}$.

Figure 25B:
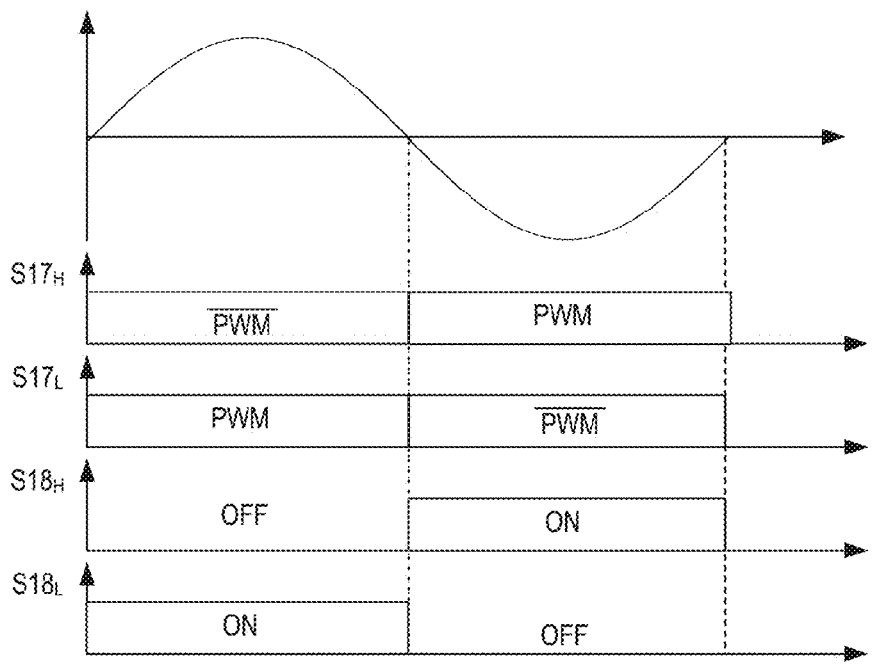

Referring to FIG. 25B, in the positive halfwave the converter cell $1_i$ operates as explained with reference to FIG. 25A above. That is, the low-side switch $17_L$ operates in a PWM fashion based on the modulation index $m_i$ and the duty-cycle $d_i$ (=1−$m_i$), respectively, of the converter cell $1_i$, and the high-side switch $17_H$ switches complementarily. The high-side switch $18_H$ of the second half-bridge 18 is off, and the corresponding low-side switch $18_L$ is on. In the negative halfwave, the drive schemes of the individual switches are "inverted" as compared to the positive halfwave. That is, the high-side switch $17_H$ operates in a PWM fashion based on the modulation index $m_i$ and the duty-cycle $d_i$, respectively, of the converter cell $1_i$, and the low-side switch $17_L$ switches complementarily. The high-side switch $18_H$ of the second half-bridge 18 is on, and the corresponding low-side switch $18_L$ is off.

Referring to FIG. 24, a controller 19 controls the operation of the half-bridges 17, 18. This controller 19 generates the drive signals $S17_H$, $S17_L$, $S18_H$, $S18_L$ for the individual high-side and low-side switches $17_H$-$18_L$. Like the controller 14 explained with reference to FIG. 12 above before, the controller 19 controls the individual switches $17_H$-$18_L$ based on the modulation index $m_i$ received by the main controller 4. The main controller 14 may be implemented as explained with reference to FIGS. 13 and 14. When the input voltage $V_{IN}$ is an alternating voltage, such as sine voltage shown in FIG. 23, the modulation signal m and $m_i$, respectively, generated by the main controller is an alternating signal which may vary between −1 and +1.

Figure 26A:
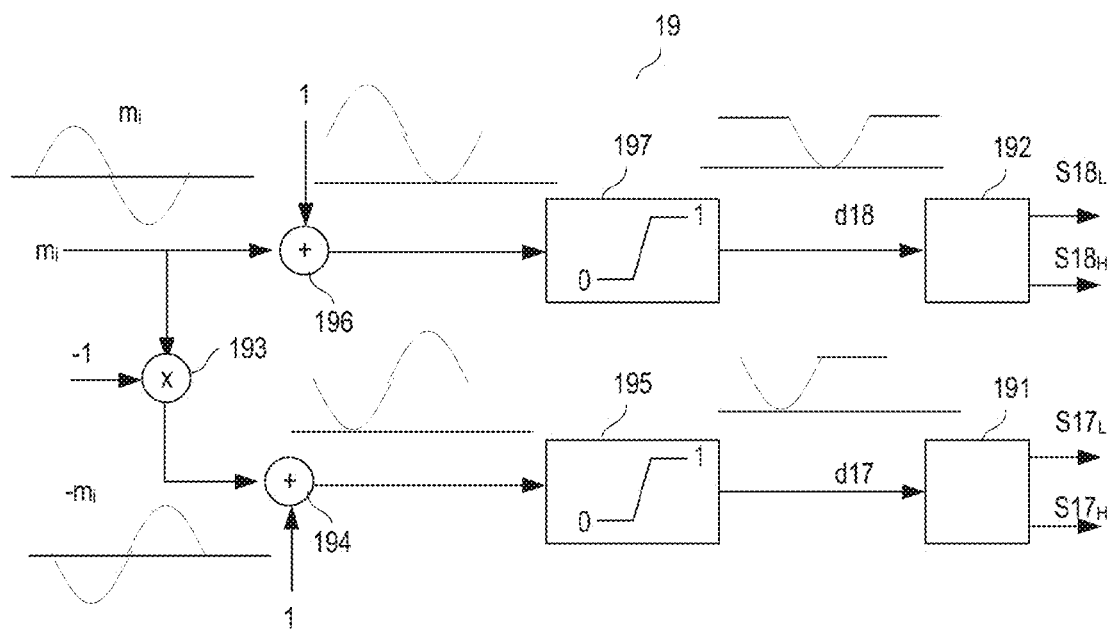
FIGS. 26A-26B show two embodiments of a cell controller in the converter cell shown in FIGS. 25A-25B.
Figure 26B:
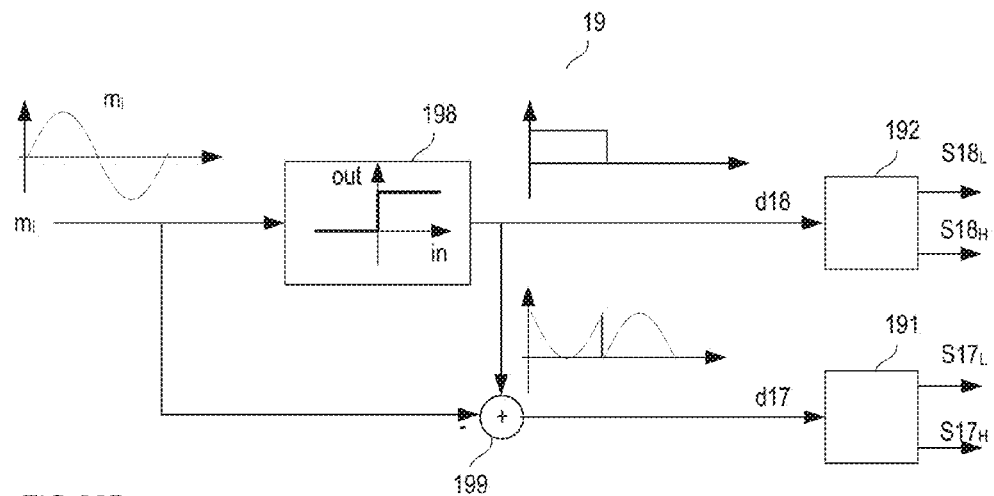

FIGS. 26A and 26B show two embodiments of a controller 19 which is configured to control the half-bridges 17, 18 in the converter cell $1_i$ shown in FIG. 24 based on the modulation index m. FIG. 26A shows one embodiment of a controller configured to control the two half-bridge in accordance with the modulation scheme shown in FIG. 25A, and FIG. 26B shows one embodiment of a controller configured to control the two half-bridges 17, 18 in accordance with the modulation scheme shown in FIG. 25B.

Referring to FIG. 26A, the controller 19 includes a first PWM controller 191 which receives a first duty cycle signal d17 and drives the high-side switch $17_H$ and the low-side switch $17_L$ of the first half-bridge 17 based on this first duty cycle d17. The controller 19 further includes a second PWM controller 192 which receives a second duty cycle signal d18 and is configured to drive the high-side switch $18_H$ and the low-side switch $18_L$ of the second half-bridge 18 based on the second duty cycle d18. The controller 19 is configured to generate the first and second duty cycles d17, d18 as follows:

$$d17 = 1 - m_i, \text{ if } m_i > 0 \quad (19A)$$

$$d17 = 1, \text{ if } m_i \leq 0 \quad (19B)$$

$$d18 = 1 + m_i, \text{ if } m_i < 0 \quad (19C)$$

$$d18 = 1, \text{ if } m_i \geq 0 \quad (19D)$$

Thus, during the positive halfwave of the input voltage $V_{IN}$ and the positive halfwave of the modulation index (which is substantially in phase with the input voltage $V_{IN}$) the low-side switch $18_L$ is on (d18=1), the high-side switch $18_H$ is off, the low-side switch $17_L$ of the first half-bridge 17 is switched on and off with the duty cycle d17 defined by the modulation index $m_i$, and the high-side switch $17_H$ is switched on and off complementary to the low-side switch $17_L$. During the negative halfwave, the low-side switch $17_L$ of the first half-bridge 17 is on (d17=1), the high-side switch $17_H$ is off, the low-side switch $18_L$ of the second half-bridge is switched on and off with the duty cycle d18 as defined by the modulation index $m_i$, and the high-side switch $18_H$ is switched on and off complementary to the low-side switch $18_L$.

The first duty cycle d17 may be generated by multiplying the modulation index $m_i$ with −1 by a first multiplier 193, adding +1 to the result by an adder connected downstream the first multiplier 193, and by limiting the output signal of the adder 194 to a range of between 0 and +1 by a limiter 195. The first duty cycle d17 is available at the output of the limiter 195. The second duty cycle d18 may be generated by adding one to the modulation signal $m_i$ by a second adder 196, and by limiting an output signal of the second adder 196 to a range of between 0 and 1 by a second limiter 197. The second duty cycle d18 is available at the output of the second limiter 197.

The controller 19 shown in FIG. 26B is configured to generate the first and second duty cycles d17, d18 as follows:

$$d17 = 1 - m_i, \text{ if } m_i > 0 \quad (20A)$$

$$d17 = -m_i, \text{ if } m_i \leq 0 \quad (20B)$$

$$d18 = 0, \text{ if } m_i < 0 \quad (20C)$$

$$d18 = 1, \text{ if } m_i \geq 0 \quad (20D)$$

Thus, during the positive halfwave of the input voltage $V_{IN}$ and the positive halfwave of the modulation index (which is substantially in phase with the input voltage $V_{IN}$) the low-side switch 18$_L$ is on (d18=1), the high-side switch 18$_H$ is off, the low-side switch 17$_L$ of the first half-bridge 17 is switched on and off with the duty cycle d17 defined by the modulation index $m_i$ and the high-side switch 17$_H$ is switched on and off complementary to the low-side switch 17$_L$. During the negative halfwave, the low-side switch 18$_L$ is off (d18=0), the high-side switch 18$_H$ is on, the high-side switch 17$_H$ of the first half-bridge 17 is switched on and off with the duty cycle d17 defined by the modulation index $m_i$, and the low-side switch 17$_L$ is switched on and off complementary to the high-side switch 17$_L$.

The second duty cycle d18 may be generated by simply detecting the polarity of the modulation index $m_i$ using a threshold detector 198 which compares the modulation index with 0. The second duty cycle d18, which is available at the output of the threshold detector 198, is 1 if the duty cycle m1 is above 0 and is 0 if the modulation index $m_i$ is below 0. The first duty cycle can be obtained by subtracting the modulation index $m_i$ from the output of the first threshold detector, that is from the second duty cycle using a subtractor. That is, d17=1−d18 in this embodiment. Each of first and second PWM controllers 191, 192 shown in FIGS. 26A and 26B can be implemented like the PWM controller 142 explained with reference to FIGS. 18 and 22 hereinbefore. In case of the PWM controller 191, the duty cycle $d_1$ shown in FIG. 18 corresponds to the first duty cycle d17, the drive signal S12$_L$ shown in FIG. 18 corresponds to the drive signal S17$_L$ of the low-side switch and the drive signal S12$_H$ corresponds to the drive signal S17$_H$ of the high-side switch. Equivalently in case of the second PWM controller 192, the duty cycle $d_1$ shown in FIG. 18, corresponds to the second duty cycle d18, the drive signal S12$_L$ corresponds to the drive signal S18$_L$ of the low-side switch, and the drive signal S12$_H$ corresponds to the drive signal S18$_H$ of the high-side switch.

Referring to the explanation before, a first power converter 10 which receives an alternating input voltage and which includes first converter cells 1$_1$-1$_{N1}$ of the type explained with reference to FIGS. 24 to 26 in the positive halfwave of the input voltage $V_{IN}$ operates like the first power converter 10 shown in FIG. 12, and in the negative halfwave, of the input voltage $V_{IN}$ operates in a similar way, wherein during the negative halfwave the first converter cells connect the DC link capacitors, such as DC link capacitor 11$_i$ shown in FIG. 24, to the cell input in such a way that the cell input voltage, such as voltage V1$_i$ shown in FIG. 24 is negative.

Figure 27:
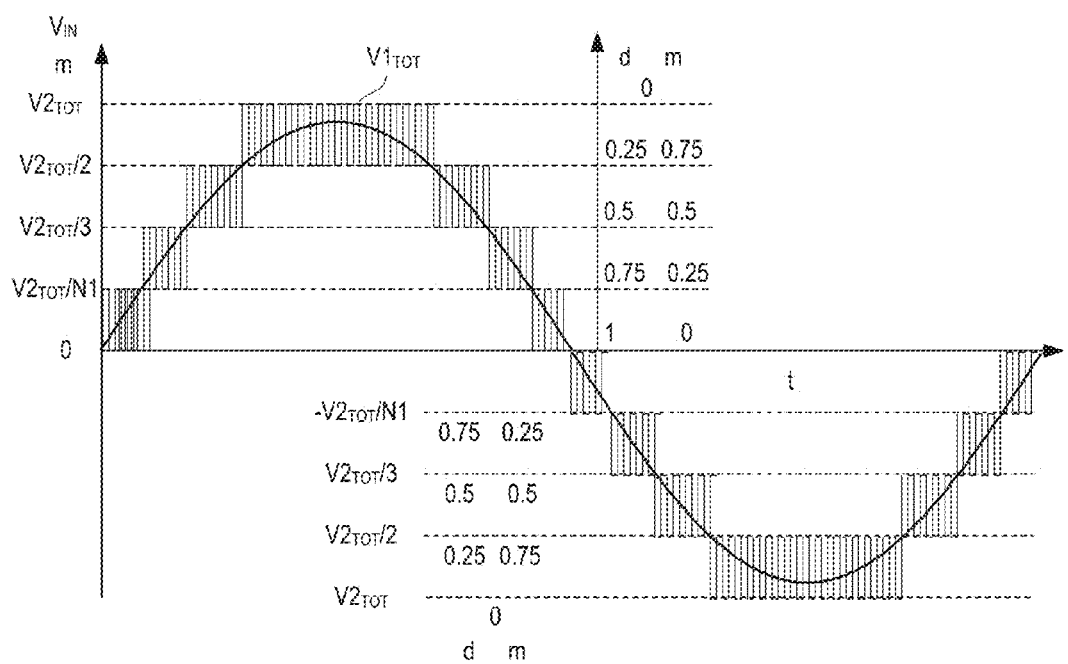
FIG. 27 schematically illustrates one embodiment of an input voltage waveform of a multi-cell power converter shown in FIG. 12 when implemented with a converter cell shown in FIG. 24, and of a corresponding total cell input voltage.

One way of operation of the first power converter 10 during one period of the input voltage $V_{IN}$ is illustrated in FIG. 27. During the positive halfwave, the operation is as explained with reference to FIG. 20. During the negative halfwave of the input voltage $V_{IN}$, the total cell input voltage V1$_{TOT}$ varies between negative voltage levels, wherein a difference between two of these voltage levels is V2$_{TOT}$/N2. During the negative halfwave, the input current reference signal $I_{IN\_REF}$ and, consequently, the input current $I_{IN}$ are negative. However, the DC link voltages V2$_1$-V2$_{N2}$ are positive. The individual converter cells 1$_1$-1$_{N1}$ may operate in the same operation mode, as explained with reference to FIGS. 19A and 19B, or in different modes, as explained with reference to FIG. 23.

A first power converter 10 with an IS topology is not restricted to receive a rectified sine voltage or a sine voltage as the input voltage $V_{IN}$. The power converter 10 could also be operated with a direct voltage as the input voltage $V_{IN}$. In this case, the first power converter generates a plurality of DC link voltages 11$_1$-11$_{N2}$ which may each have a voltage level lower than a voltage level of the input voltage $V_{IN}$. Nevertheless, the level of the overall DC link voltage V2$_{TOT}$ may be higher than the voltage level of the input voltage. The waveform of a direct voltage as the input voltage $V_{IN}$ is schematically illustrated in FIG. 2C. A multi-cell converter implemented with converter cells 1$_1$-1$_{N1}$ shown in FIG. 12 may receive a positive voltage as the input voltage $V_{IN}$, and a multi-cell converter implemented with converter cells shown in FIG. 24 may either receive a positive voltage or a negative voltage as an input voltage.

Figure 28:
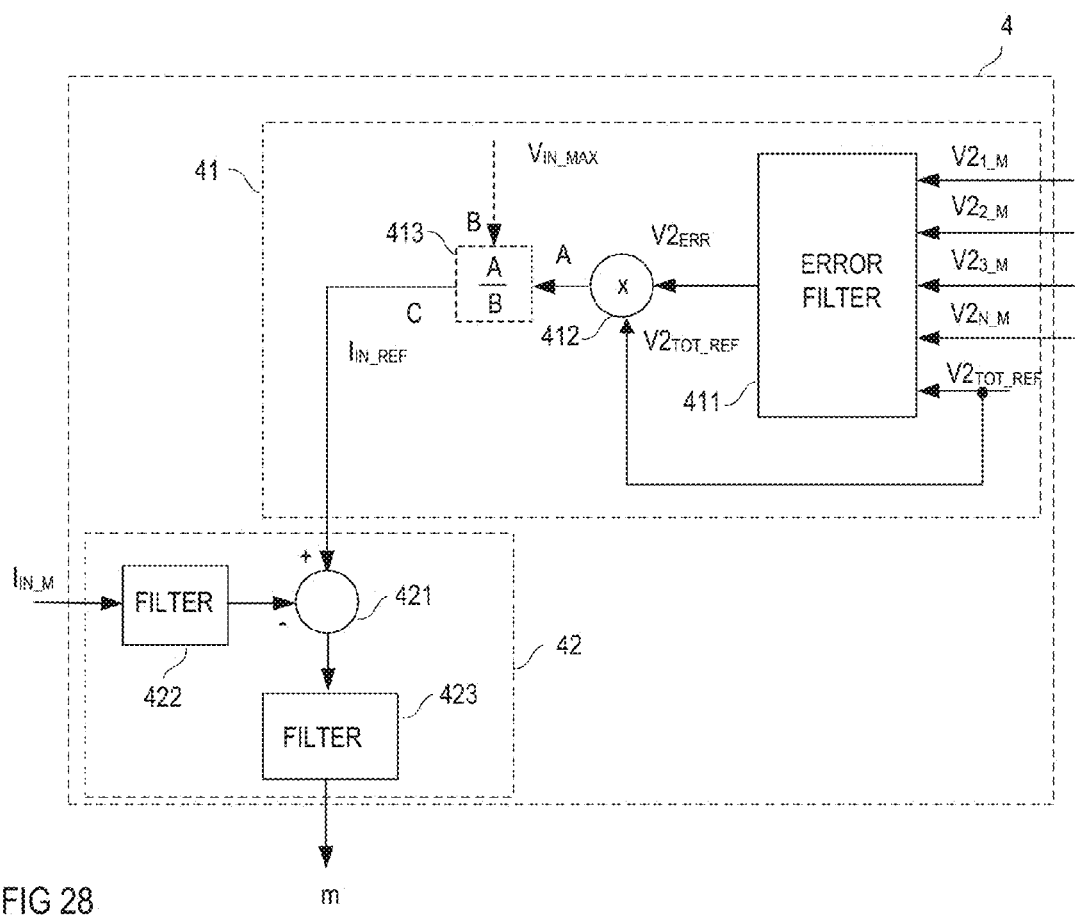
FIG. 28 shows a modification of the main controller shown in FIG. 14.
Figure 29:
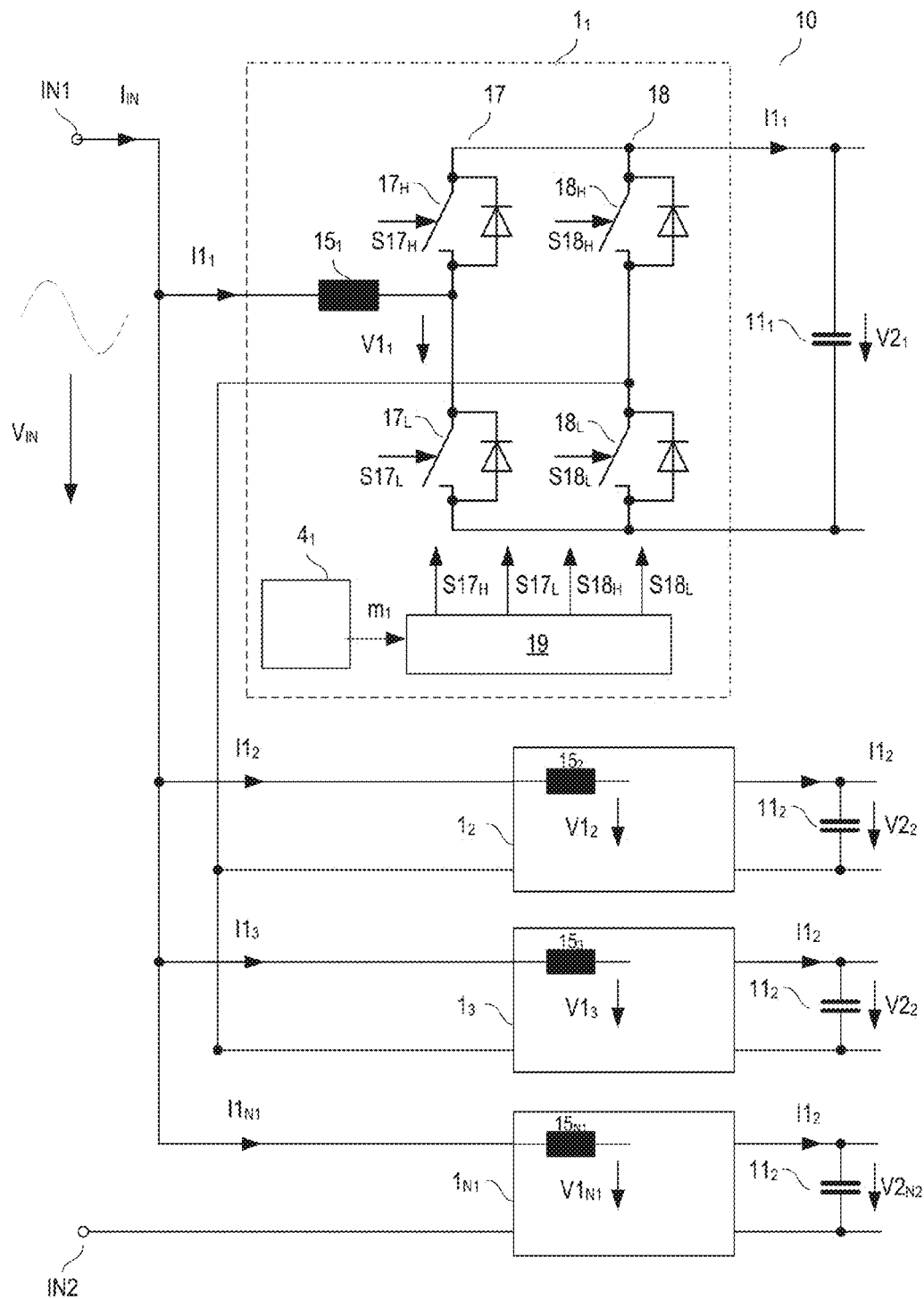
FIG. 29 shows one embodiment of a multi-cell power converter with an IP (Input Parallel) topology.

In case the first power converter 10 is only operated with a direct voltage as the input voltage $V_{IN}$, the main controller 4 may be simplified as shown in FIG. 28. The main controller 4 shown in FIG. 29 is based on the main controller shown in FIG. 14 and is different from this main controller shown in FIG. 14 in that the further multiplier 414 is omitted. The input current reference signal $I_{IN\_REF}$ corresponds to the output signal A of the multiplier 412 or the output signal C of the optional divider 413, respectively. In this embodiment, the input signal B of the optional divider is $V_{IN\_MAX}$, which denotes the voltage level of the input voltage $V_{IN}$.

FIG. 29 shows one embodiment of a multi-cell converter 10 in which the individual converter cells 1$_1$-1$_{N1}$ have their cell inputs connected in parallel at the input IN1, IN2 of the multi-cell converter. That is, each converter cell 1$_1$-1$_{N1}$ has a first cell input node connected to the first input node IN1, and each converter cell 1$_1$-1$_{N1}$ has a second cell input node connected to the second input node IN2 so that each of the converter cells 1$_1$-1$_{N1}$ receives the input voltage $V_{IN}$. The topology of the multi-cell converter shown in FIG. 29 will be referred to as IP (Input Parallel) topology in the following.

In the embodiment shown in FIG. 29, the converter cells 1$_1$-1$_{N1}$ are implemented with full-bridge topology, wherein only converter cell 1$_1$ is shown in detail. However, a boost converter topology as shown in FIG. 12 may be used as well. The multi-cell converter with the IP topology shown in FIG. 29 is different from the multi-cell converter with the IS topology shown in FIG. 12 in that in the converter shown in FIG. 29 each of the plurality of converter cells 1$_1$-1$_{N1}$ includes an inductor. As shown in cell 1$_1$, the inductor 15$_1$ in each cell is connected between one cell input node, such as the first cell input node, and the bridge circuit with the two half-bridges 17, 18. Cell input voltages V1$_1$-V1$_{N1}$ of those converter cells are the voltages between the taps of the half-bridges. This is in correspondence with the converter cell 1$_i$ shown in FIG. 24.

Figure 30:
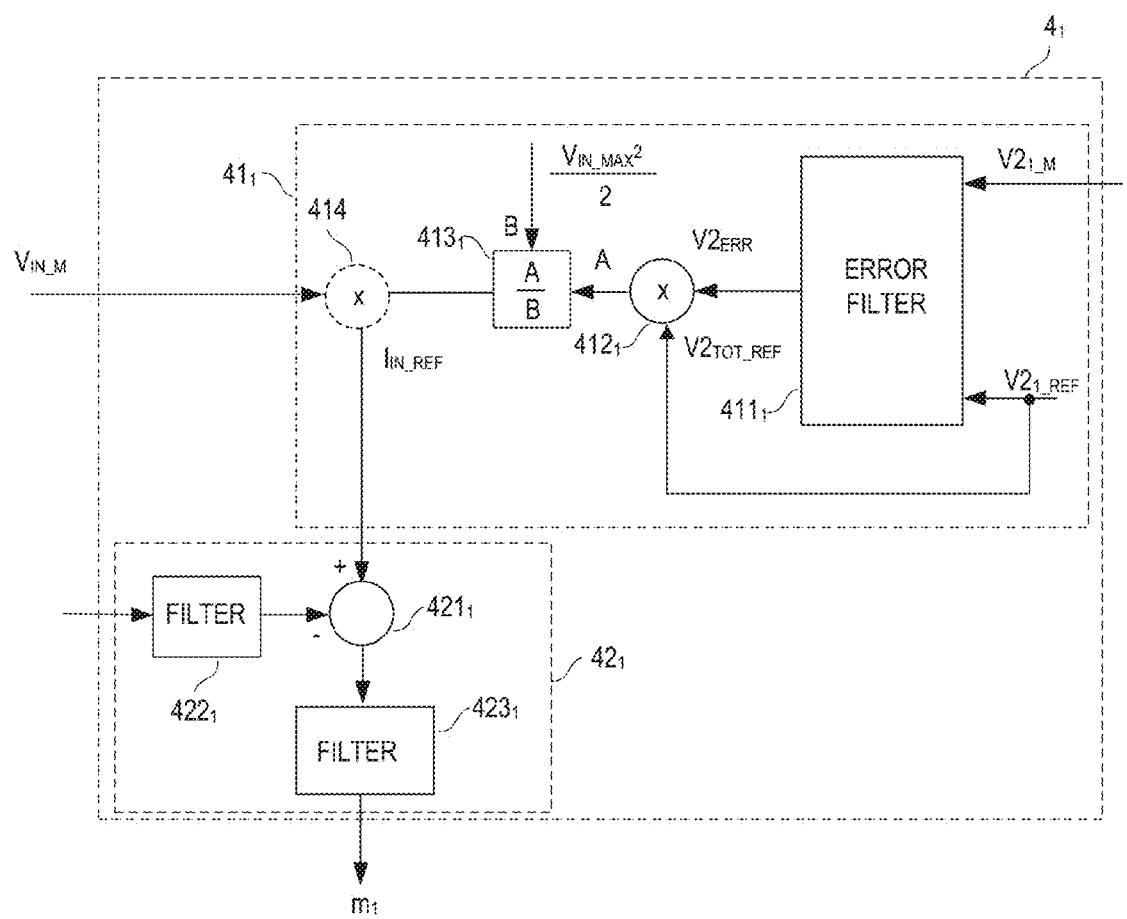
FIG. 30 shows one embodiment of a controller in one of the converter cells shown in FIG. 29.

In the multi-cell power converter 10 with the IP topology shown in FIG. 29, each first converter cell 1$_1$-1$_{N1}$ is configured to control (regulates) its DC link voltage V2$_1$-V2$_{N1}$. For this, each of these converter cells 1$_1$-1$_{N1}$ includes a controller, wherein in FIG. 29 only the controller 4$_1$ of the converter cell $1_1$ is shown. Each of these controllers may be implemented in accordance with the main controller 4 shown in FIGS. 13 and 14, with the difference that the controllers in the individual converter cells $1_1$-$1_{N1}$ do not receive signals representing each of the DC link voltages $V2_1$-$V2_{N2}$, but only a signal representing the DC link voltage of the respective converter cell, and a signal representing the desired level of the converter cell. One embodiment of the controller $4_1$ in the converter cell $1_1$ is shown in FIG. 30. The controllers in the other converter cells may be implemented equivalently.

The controller $4_1$ shown in FIG. 30 is based on the main controller 4 shown in FIG. 14 and is different from the main controller shown in FIG. 14 in that it outputs the modulation index $m_1$ only for one converter cell $1_1$. Further, this modulation index $m_1$ is calculated based on the DC link voltage signal $V2_{1\_M}$ of the respective converter cell, the DC link voltage reference signal $V2_{1\_REF}$ of the respective converter cell, and, optionally, on the instantaneous voltage level of the input voltage $V_{IN}$. In the controller $4_1$ shown in FIG. 30 the components corresponding to the components of the controller 4 shown in FIG. 14 have the same reference character to which a subscript index "1" has been added. With regard to the operation of the controller $4_1$ reference to the description of FIG. 14 is made. The multiplier $414_1$ shown in FIG. 30 may be omitted when the input voltage $V_{IN}$ of the multi-cell converter 10 is a direct voltage. In this case, the input signal B of the divider corresponds to $V_{IN\_MAX}$.

As can be seen in the converter cell $1_1$ shown in FIG. 29, the switch controller (19 in cell $1_1$) of each converter cell $1_1$-$1_{N1}$ receives the modulation index ($m_1$ in cell $1_1$) from the corresponding controller (41 in cell $1_1$) and controls the switches ($17_H$-$18_L$ in cell $1_1$) in the converter cell based on the modulation index $m_1$. The individual main controllers $4_1$ can be implemented in the converter cells $1_1$-$1_N$. In case of a digital implementation of the main controller $4_1$ and the switch controller $19_1$, of one converter cell $1_1$, the main controller $4_1$ and the switch controller 19 may be implemented in one signal processor.

Figure 31:
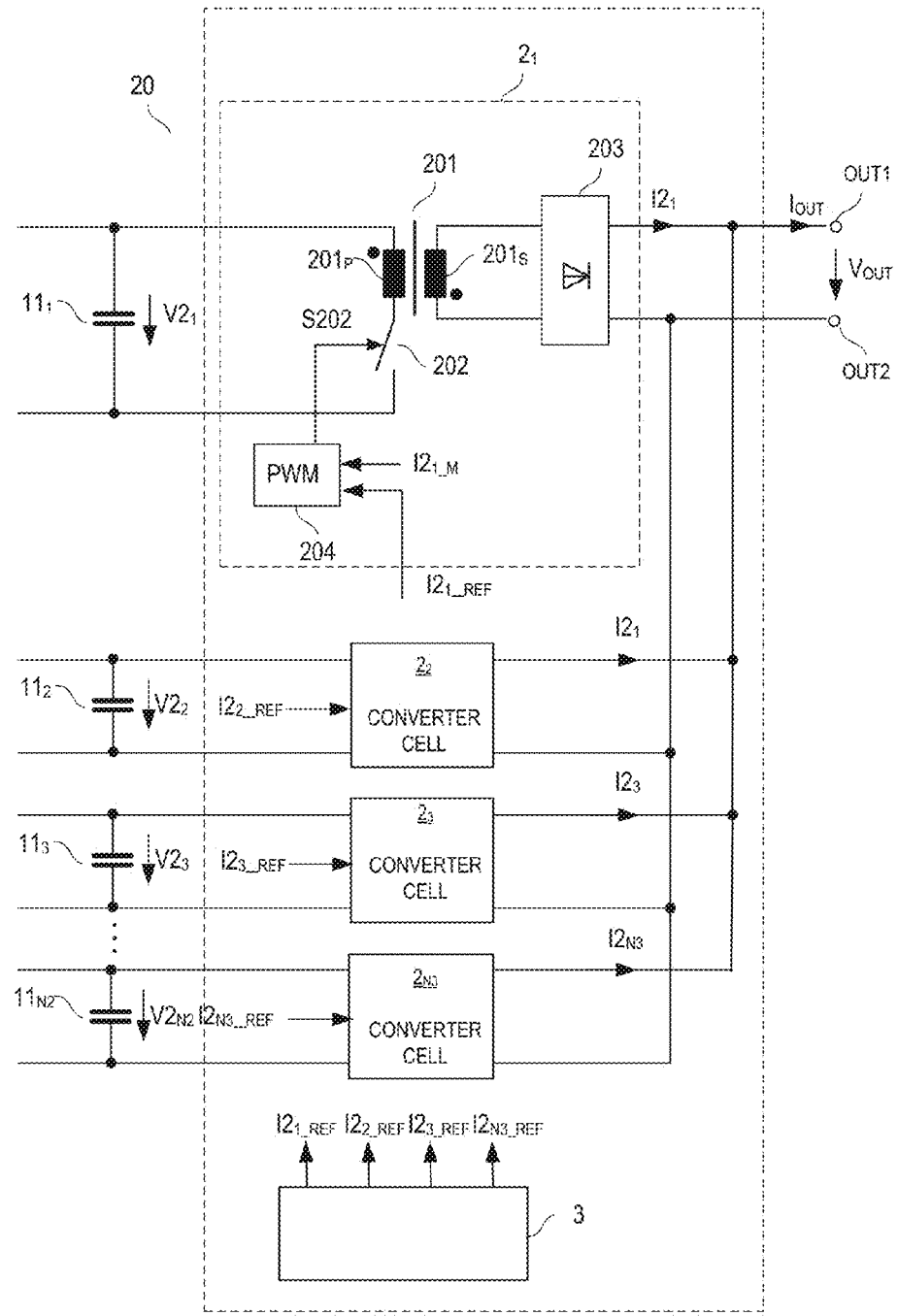
FIG. 31 shows one embodiment of a multi-cell power converter with an OP (Output Parallel) topology.

FIG. 31 shows one embodiment of the second power converter 20 with an OP topology, that is, a topology in which the cell outputs of the individual converter cells $2_1$-$2_{N3}$ are connected in parallel at the output OUT1, OUT2. In FIG. 31 only one converter cell, namely converter cell $2_1$ is shown in detail. The other converter cells $2_2$-$2_{N3}$ can be implemented equivalently.

The converter cell $1_1$ is implemented with a flyback converter topology. That is, the converter cell $2_1$ includes a series circuit with an electronic switch 202 and a primary winding $201_P$ of a transformer 201, wherein this series circuit is connected in parallel with the DC link capacitor $11_1$ so as to receive the DC link voltage $V2_1$. A secondary winding $201_S$ is inductively coupled with the primary winding $201_P$. A rectifier circuit 203 is coupled to the secondary winding $201_S$ and provides the cell output current $I2_1$ to the cell output and the output OUT1, respectively. A PWM (Pulse Width Modulation) controller 204 receives an output current signal $I2_M$ and the output current reference signal $I2_{REF}$. The output current signal $I2_{1\_M}$ represents the instantaneous current level (actual value) of the output current I2. The output current reference signal $I2_{1\_REF}$ represents a desired current level of the output current $I2_1$. This output current reference signal $I2_{1\_REF}$ may vary over time as the power consumption of the load may change. In this topology, the transformer 219 provides for a galvanic isolation between the cell input and the cell output.

The PWM controller 204 is configured to generate a PWM drive signal S202 which drives the electronic switch 202. Based on the output current reference signal $I2_{1\_REF}$ and on the output current signal $I2_{1\_M}$ the PWM controller 201 controls a duty cycle of the PWM drive signal S202 such that a current level of the output current $I2_1$ has a current level which at least approximately equals the current level defined by the reference signal $I2_{1\_REF}$. The switching frequency of the PWM drive signal S202 may be in the same range as the switching frequency in the converter cells $1_1$-$1_{N1}$ explained above, that is, between 18 kHZ and several 100 kHz. The duty cycle is a ratio between the on-time of the electronic switch 202 in one drive cycle and the duration of the drive cycle. The on-time of the electronic switch 202 is the time for which the electronic switch 202 is switched on in one drive cycle. The duration of one drive cycle of the electronic switch 202 is the reciprocal of the switching frequency.

The electronic switch 202, like the other electronic switches explained above and below, may be implemented as a conventional electronic switch such as, for example, a MOSFET (Metal Oxide Semiconductor Field-Effect Transistor), an IGBT (Insulated Gate Bipolar Transistor), a JFET (Junction Field-Effect Transistor), a BJT (Bipolar Junction Transistor), a HEMT (High Electron Mobility Transistor), in particular a GaN HEMT, or the like.

Figure 32A:
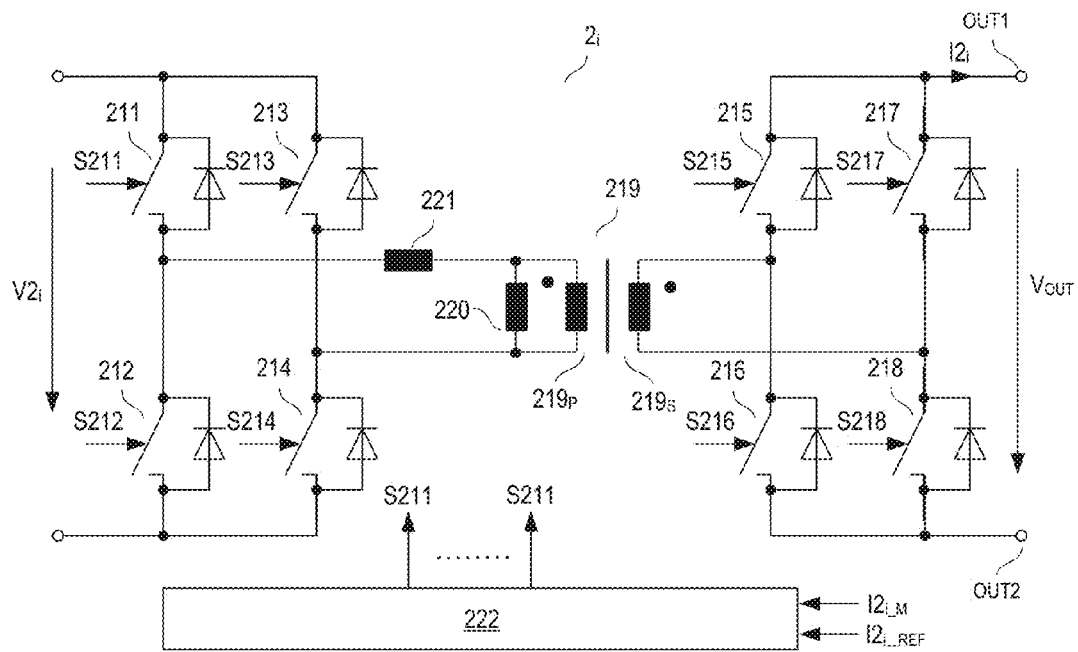
FIGS. 32A-32B shows two embodiments of a converter cell which may be used in the multi-cell power converter shown in FIG. 31.

FIG. 32A shows another type of converter cell which may be used in the multi-cell converter 20 shown in FIG. 31. The converter cell $2_i$ (wherein i denotes any of the order numbers 1 to N3) shown in FIG. 32 is implemented with a dual active bridge (DAB) topology. Such topology is disclosed in FIGS. 2a and 2b of Everts, J.; Krismer, F.; Van den Keybus, J.; Driesen, J.; Kolar, J. W., "Comparative evaluation of soft-switching, bidirectional, isolated AC/DC converter topologies," Applied Power Electronics Conference and Exposition (APEC), 2012 Twenty-Seventh Annual IEEE, pp. 1067-1074, 5-9 Feb. 2012, which is disclosed herein by reference in its entirety. FIG. 32 shows one embodiment of a converter cell $2_i$ implemented with a "full bridge-full bridge DAB topology" as disclosed in Everts et al.

Referring to FIG. 32A, the converter cell $2_i$ includes a first (full) bridge circuit with two half-bridges each including a high-side switch 211, 213 and a low-side switch 212, 214. The half-bridges of the first bridge circuit are connected between the cell input nodes for receiving the respective DC link voltage $V2_i$. A series circuit with an inductive storage element 221 and a primary winding $219_P$ of a transformer 219 is connected between output nodes of the two half bridges 211, 212 and 213, 214, respectively. An output node of one half-bridge is a circuit node common to the high-side switch 211, 213 and the low-side switch 212, 214 of the half-bridge. The transformer 219 provides for a galvanic isolation between the cell input and the cell output, wherein the cell output is connected to the output OUT1, OUT2 of the power converter circuit. The transformer 219 includes a secondary winding $219_S$ which is inductively coupled with the primary winding $219_P$. A further inductive storage 220 element drawn in parallel with the primary winding $219_P$ in FIG. 32A represents the magnetizing inductance of the transformer 219.

A second bridge circuit with two half bridges each including a high-side switch 215, 217 and a low-side switch 216, 218 is coupled between the secondary winding $219_S$ and cell output nodes of the cell output. Each of these half-bridges 215, 216, and 217, 218, respectively, includes an input, which is a circuit node common to the high-side switch 215, 217 and the low-side switch 216, 218 of the respective half-bridge. The input of a first half-bridge 215, 216 of the second bridge circuit is connected to a first node of the secondary winding $219_S$, and the input of a second half-bridge 217, 218 of the second bridge circuit is connected to a second node of the secondary winding $219_S$. The half-bridges of the second bridge circuit are each connected between the cell output nodes.

The switches 211-214, 215-218 of the first and second bridge circuits shown in FIG. 8 may each be implemented to include a rectifier element (freewheeling element), such as a diode, connected in parallel with the switch. These switches can be implemented as known electronic switches, such as MOSFETs (Metal-Oxide Field-Effect Transistors), IGBTs (Insulated Gate Bipolar Transistors), JFETs (Junction Field-Effect Transistors), HEMTs (High-Electron-Mobility Transistors), or the like. When the switches 211-214, 215-218 are each implemented as a MOSFET, an internal body diode of the MOSFETs can be used as rectifier element, so that no additional rectifier element is required.

A control circuit 222 controls operation of the two bridge circuits. For this, each of the switches 211-214, 215-218 receives an individual drive signal from the control circuit 24. These drive signals are referred to as S211-S214 and S215-S218 in FIG. 8. The control circuit receives the output current signal $I2_{i\_M}$ and the output current reference signal $I2_{i\_REF}$ and is configured to drive the switches 211-214, 215-218 such that the current level of the output current $I_{OUT}$ substantially corresponds to the current level defined by the reference signal $I2_{i\_REF}$. There are several ways to drive the switches 211-214, 215-218 to obtain this. According to one embodiment, a duty cycle of the individual switches 211-214, 215-218 is modulated in the region of 50%. For details on controlling the switches, reference is made to F. Krismer, J. W. Kolar "Closed form solution for minimum conduction loss modulation of DAB converters", IEEE Transactions on Power Electronics, Vol. 27, Issue 1, 2012, which is incorporated herein by reference in its entirety.

According to one embodiment, the control circuit 222 is configured to control a timing of switching on and switching off the individual switches 211-214 of the first bridge such that at least some of the switches 211-214 are switched on and/or switched off when the voltage across the respective switch is zero. This is known as zero voltage switching (ZVS).

Figure 32B:
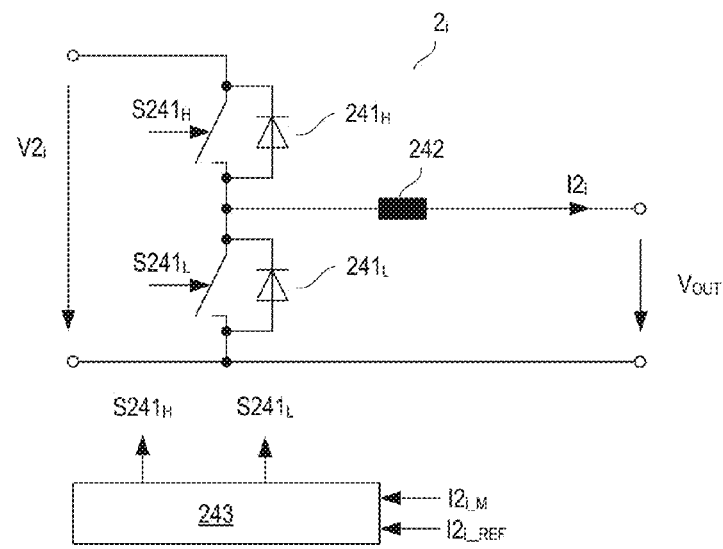

FIG. 32B shows another embodiment of one converter cell $2_i$. In this embodiment, the converter cell $2_i$ is implemented with a buck converter topology. The converter cell $2_i$ includes a half-bridge 241 with a high-side switch $241_H$ and a low-side switch $241_L$. The half-bridge 241 is connected to the cell input such that that the associated DC link voltage $V2_i$ drops across the series circuit with the high-side switch $241_H$ and the low-side switch $241_L$. An inductor is connected between a tap of the half-bridge 214 and one of the cell output nodes. The tap of the half-bridge is a circuit where the high-side switch $214_H$ and the low-side switch $241_L$ are connected. A PWM controller 243 receives the output current signal $I2_{i\_M}$ which represents the output current $I2_i$ of the converter cell $2_i$, and the output current reference signal which represents the desired current level of the cell output current $I2_i$. The cell output current $I2i$ is the current through the inductor 242. The controller 243 is configured to generate PWM drive signals $S214_H$, $S241_L$ for the high-side and the low-side switch $241_H$, $241_L$ switch such that the output current $I2_i$ has a current level which substantially equals a current level represented by the output current reference signal $I2_{i\_REF}$.

In the buck topology shown in FIG. 32B, the current level of the output current $I2_i$ is controlled by controlling the duty cycle of the high-side switch $241_H$. The low side switch acts as a freewheeling element, which switches complementary to the high-side switch $241_H$.

It should be noted that the topologies of the converter cells shown in FIGS. 31 and 32A-32B are only two of many possible examples of how the converter cells $2_1$-$2_{N3}$ may be implemented. The topologies shown in FIGS. 31 and 32A each include a transformer 201 and 219, respectively, which provides for a galvanic isolation between the cell inputs and the cell outputs. Thus, these transformer also provide for a galvanic isolation between the input IN1, IN2 and the output OUT1, OUT2 of a power converter circuit implemented with a multi-cell converter 20 as shown in FIG. 31. However, possible implementations of the converter cells $2_1$-$2_{N3}$ are not restricted to topologies including a transformer, which may be referred to as isolated topologies. Instead, non-isolated topologies, which are topologies without a galvanic isolation between the cell input and the cell output, may be used as well. One example of such non-isolated topology is the buck converter topology shown in FIG. 32B.

Figure 33:
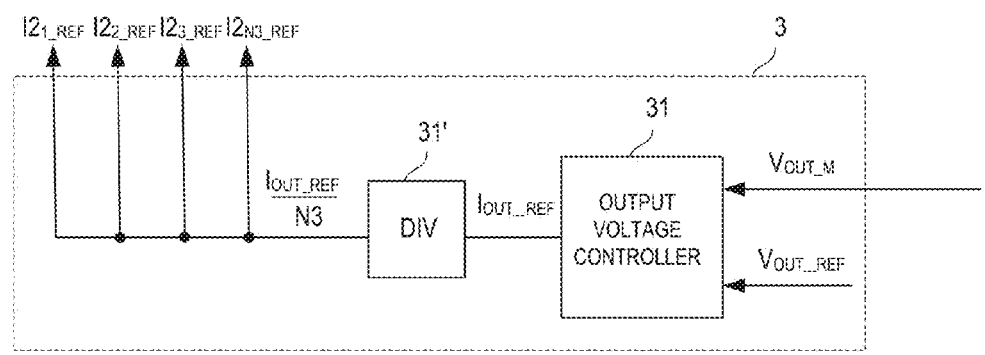
FIG. 33 shows one embodiment of a main controller in the multi-cell power converter shown in FIG. 31.

Referring to FIG. 31, the multi-cell converter 20 includes a main controller 3 which generates the output current reference signals $I2_{1\_REF}$-$I2_{N3\_REF}$ received by the individual converter cells $2_1$-$2_{N3}$. One embodiment of this main controller is shown in FIG. 33. The main controller 33 shown in FIG. 33 includes an output voltage controller 31 which receives an output voltage signal $V_{OUT\_M}$ and an output voltage reference signal $V_{OUT\_REF}$. The output voltage signal $V_{OUT\_M}$ represents an instantaneous voltage level of the output voltage $V_{OUT}$ and the output voltage reference signal $V_{OUT\_REF}$ represents the desired voltage level of the output voltage $V_{OUT}$. Based on these signals $V_{OUT\_REF}$, $V_{OUT\_M}$, in particular based on a difference between these signals $V_{OUT\_REF}$, $V_{OUT\_M}$, the output voltage controller 31 generates an output current signal $I_{OUT\_REF}$. The output current signal $I_{OUT\_REF}$ represents a desired current level of the output current $I_{OUT}$. According to one embodiment, the individual converter cells $2_1$-$2_{N3}$ supply equal shares of the output current $I_{OUT}$. In this case, the level of each of the output current reference signals $I2_{1\_REF}$-$I2_{N3\_REF}$ received by the individual converter cells $2_1$-$2_{N3}$ is $I_{OUT\_REF}$/N3. In the embodiment shown in FIG. 33, a divider 31' calculates the output current reference signals $I2_{1\_REF}$-$I2_{N3\_REF}$ based on the output current reference signal $I_{OUT\_REF}$.

When implemented with a main controller 3 as shown in FIG. 33, the multi-cell converter 20 has a voltage source characteristic. According to one embodiment, the second power converter 20 is configured to provide the output power $P_{OUT}$ such that the output voltage $V_{OUT}$ is substantially constant. As the power consumption of the load Z may vary, the second power converter 20, in this embodiment, is configured to vary the output current $I_{OUT}$ in order to keep the output voltage $V_{OUT}$ substantially constant, but to meet the power requirements by the load Z. According to another embodiment, the second power converter 20 has a current source characteristic. That is, the second power converter is configured to control the output current $I_{OUT}$. In this embodiment, the output voltage controller 31 may be omitted. In this case, the output current reference signal $I_{OUT\_REF}$ may be provided by a central controller (not shown) similar to the central controller which provides the output voltage reference signal $V_{OUT\_REF}$. Basically, the second power converter may be configured to control one of the output voltage $V_{OUT}$ and the output current. This equivalently applies to each of the second power converters 20 explained below, which are configured to supply a direct current.

Figure 34:
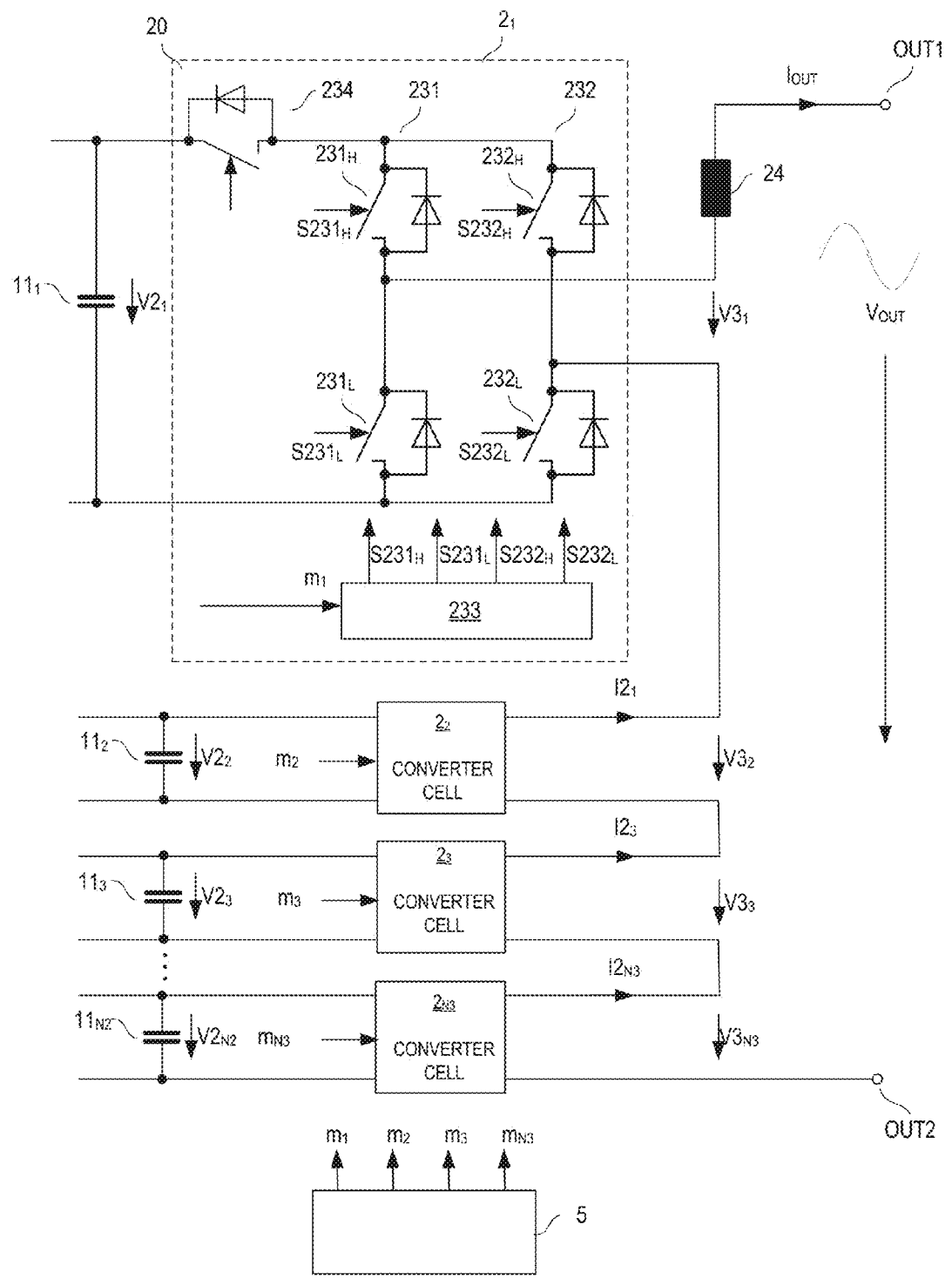
FIG. 34 shows one embodiment of a multi-cell power converter with an OS (Output Serial) topology.

FIG. 34 shows one embodiment of the second power converter 20 with an OS (Output Serial) topology. In FIG. 34, converter cell $2_1$ is shown in detail. The other converter cells $2_2$-$2_{N3}$ may be implemented accordingly. The OS topology shown in FIG. 34 is similar to the IS topology shown in FIG. 12. Like in the IS converter shown in FIG. 12, the OS converter shown in FIG. 33 has one inductor 24 which is connected in series with the cell output of the individual converter cells $2_1$-$2_{N3}$. The series circuit with the cell outputs and the inductor 24 is connected between the output nodes OUT1, OUT2.

In the embodiment shown in FIG. 34, the individual converter cells $2_1$-$2_{N3}$ are implemented with a full-bridge topology, which is explained in detail with reference to one converter cell $1_i$ of the IS topology in FIG. 24 above. Referring to FIG. 34, the converter cell $2_1$ includes a first half-bridge 231 with a high-side switch $231_H$ and a low-side switch $231_L$, and a second half-bridge 232 with a high-side switch $232_H$ and a low-side switch $232_L$. A controller 233 operates these switches $231_H$-$232_L$ by generating drive signals $S231_H$-$S232_L$ for these switches $231_H$-$232_L$ based on an modulation index $m_1$ received from a main controller 5. Unlike the converter cell $1_i$ shown in FIG. 24, a cell output of the converter cell $2_1$ is formed by taps of the two half-bridges. The cell input, where the DC link voltage $V2_1$ is received, is formed by those circuit nodes where the two half-bridges 231, 232 are connected in parallel. The controller may operate the full-bridge in accordance with one of the modulation schemes explained with reference to FIGS. 26A and 26B above.

The power converter 20 with the OS topology shown in FIG. 34 can be operated to supply an output current $I_{OUT}$ to a power grid connected to the output nodes OUT1, OUT2. In this case, the output voltage $V_{OUT}$ at the output OUT1, OUT2 is defined by the power grid. In other words, the power converter 20 receives the output voltage $V_{OUT}$ at the output and provides the output current $I_{OUT}$ at the output. The instantaneous level of the output power is defined by the instantaneous level of the output voltage $V_{OUT}$ and the instantaneous level of the output current. The output voltage may have a sinusoidal waveform, as schematically illustrated in FIG. 34. In this case, the second converter 20 generates the output current $I_{OUT}$ such that a waveform of the output current $I_{OUT}$ is substantially in phase with the output voltage $V_{OUT}$ (or that there is a predefined phase difference). Further, the second converter 20 may generate the amplitude of the output current $I_{OUT}$ such that the total DC link voltage has a predefined voltage level. A second power converter 20 configured to control the waveform of the output current $I_{OUT}$ to substantially be equal to the waveform of the output voltage $V_{OUT}$ will be referred to as a second power converter 20 with a PFC (Power Factor Correction) capability or, briefly, as a second PFC power converter 20.

In the embodiment shown in FIG. 34, the individual converter cells $2_1$-$2_{N3}$ share one inductor 34, which is connected in series with the cell outputs. According to another embodiment (not shown) each of the converter cells $2_1$-$2_{N3}$ includes an inductor connected between one cell output node and the tap of the first half-bridge 231. In each case, the individual converter cells $2_1$-$2_{N3}$ at as buck converters. That is, the cell output voltage of each converter cell $2_1$-$2_{N3}$ is lower than the DC link voltage $V2_1$-$V2_{N2}$ of the associated DC link capacitor $11_1$-$11_{N3}$. The topology of the converter cell shown in FIG. 34 will also be referred to as full-bridge topology (or full bridge buck topology) in the following.

The second converter 20 with the OS topology shown in FIG. 34 can be operated to generate an AC voltage, such as a sine voltage, as the output voltage $V_{OUT}$ from the DC link voltages $V2_1$-$V2_{N2}$. However, it can also be operated to generate a rectified sine voltage or a DC voltage as the output voltage. In this case, the output voltage $V_{OUT}$ is a rectified sine voltage or a DC voltage, the converter cell $2_1$ may be simplified by omitting the high-side switch $232_H$ of the second half-bridge 232 and by replacing the low-side switch $232_L$ with a conductor. The converter cell $2_1$ (and each of the other converter cells $2_2$-$2_{N3}$) then only includes the first half-bridge 231, wherein the first half-bridges of the individual converter cells $2_1$-$2_{N3}$ are connected in series. Such modified topology of the converter cells $2_1$-$2_{N3}$ will be referred to as buck topology in the following.

It should be noted that the converter cells $2_1$-$2_{N3}$ are not restricted to be implemented with a full-bridge buck topology as shown in FIG. 34, or with a buck topology explained above. Other topologies, in particular modifications of the topology shown in FIG. 34 may be used as well. One such modification is shown in FIG. 34. This modification includes an additional switch 234 connected between the DC link capacitor $11_1$ and the full-bridge. Such modified topology is known as H5 topology. The further switch 234 may be switched on and off synchronously with the one of the switches that is operated in the PWM mode in the respective modulation scheme. Another modification includes additional switches (not shown) between the taps of the two half-bridges. Such modified topology is known as HERIC topology.

Figure 35:
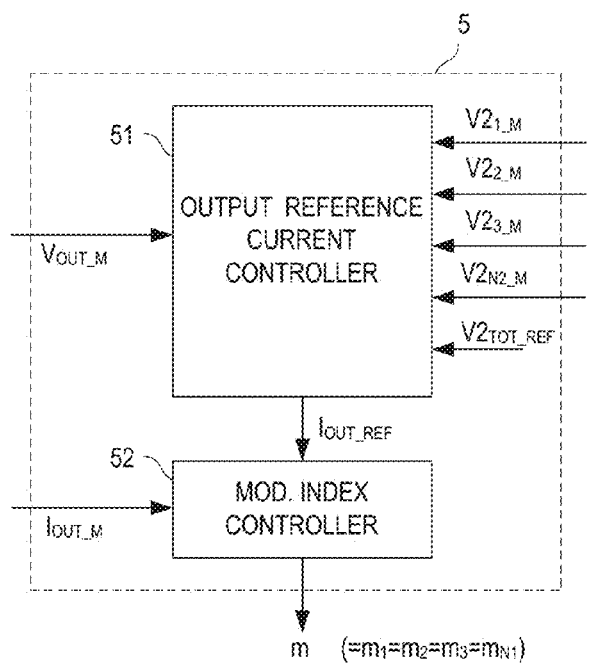
FIG. 35 shows one embodiment of a main controller of the multi-cell power converter shown in FIG. 34.
Figure 36:
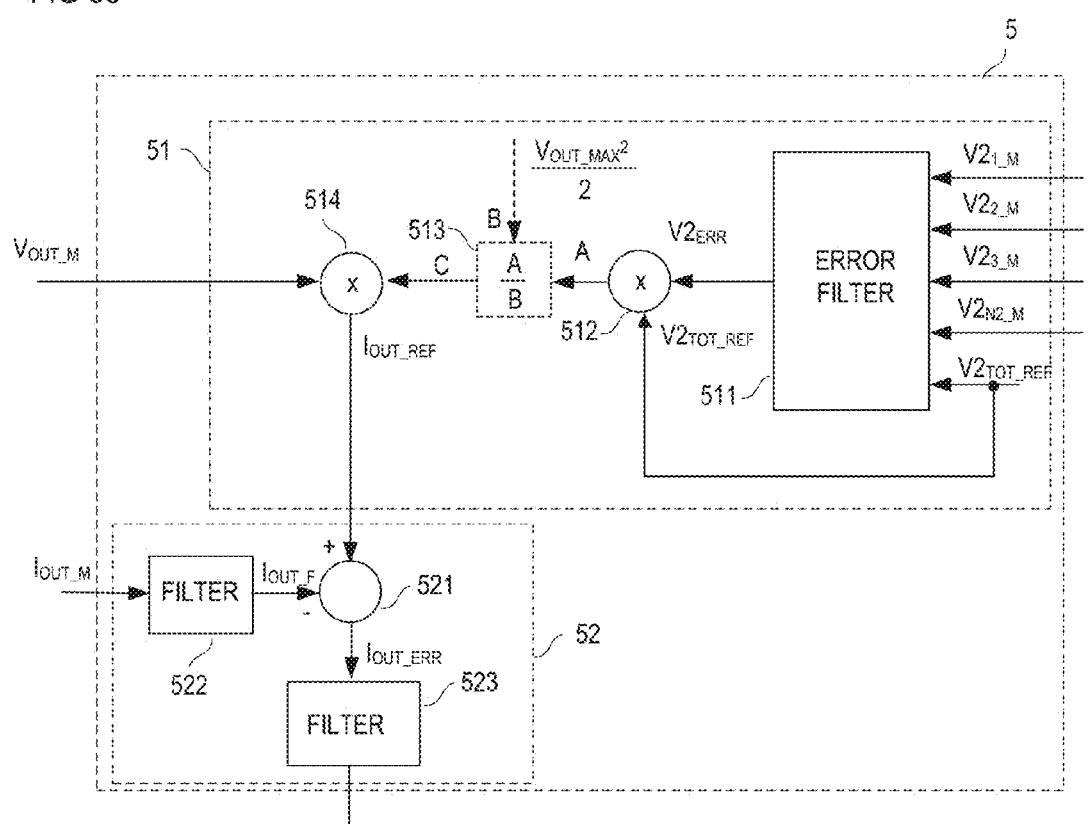
FIG. 36 shows one embodiment of the main controller shown in FIG. 35 in greater detail.

One embodiment of a main controller 5 which is configured to operate the converter cells $2_1$-$2_{N3}$ such that the second converter 20 controls the total DC link voltage $V2_{TOT}$ and generates the output current $I_{OUT}$ such that it is substantially in phase with the output voltage $V_{OUT}$ is shown in FIGS. 35 and 36. FIG. 35 shows a block diagram of one embodiment of the main controller 5, and FIG. 36 shows one embodiment of the main controller shown in FIG. 35 in greater detail. The main controller 5 shown in FIGS. 35 and 36 is very similar to the main controller 4 of the IS converter shown in FIGS. 13 and 14. Instead of the input reference current controller $4_1$ in the main controller 4, the main controller 5 shown in FIG. 35 includes an output reference current controller 51 which receives an output voltage signal $V_{OUT\_M}$ which represents the instantaneous voltage level of the output voltage $V_{OUT}$. The output reference current controller 51 further receives DC link voltage signals $V2_{1\_M}$-$V2_{N2\_M}$ which represent the individual DC link voltages $V2_1$-$V2_{N2}$, and a total DC link voltage reference signal $V2_{TOT\_REF}$. The total DC link voltage reference signal $V2_{TOT\_REF}$ represents a desired signal level of the total DC link voltage $V2_{TOT}$. Based on these signals, the output reference current controller 51 generates an output reference signal $I_{OUT\_REF}$ which is received by a modulation index controller 52. Based on the output current reference signal $I_{OUT\_REF}$, and based on an output current signal $I_{OUT\_M}$, the modulation index controller 52 generates a modulation index m. According to one embodiment, the modulation indices $m_1$-$m_{N3}$ received by the individual converter cells $2_1$-$2_{N3}$ shown in FIG. 34 is equal to the modulation index m generated by the modulation index controller 52. The output current signal $I_{OUT\_M}$ represents an instantaneous current level of the output current.

FIG. 36 shows one embodiment of the output reference current controller 51 and the modulation index controller 52. The design and the operation of the output reference current controller 51 is similar to the design and the operation of the input reference current controller 41 of the main controller 4 shown in FIG. 14, to which reference is made. Referring to FIG. 36, the output reference controller 51 includes an error filter 511 which receives the DC link voltage signals $V2_{1\_M}$-$V2_{N3\_M}$ and the total DC link voltage reference signal $V2_{TOT\_REF}$ and calculates an error signal $V2_{ERR}$ from these signals. The error filter 511 may have the same filter characteristic as explained with reference to the error filter 411 shown in FIG. 14. A multiplier 512 multiplies the error signal $V2_{ERR}$ with the total DC link voltage reference signal $V2_{TOT\_REF}$. An output signal A of the multiplier 512 is received by a divider 513 which divides the output signal A of the multiplier 512 by a value which is dependent on the amplitude of the output voltage $V_{OUT}$ ($V_{OUT\_MAX}^2/2$ in this embodiment). An output signal C of the divider 513 is received by a further multiplier 514 which multiplies the divider output signal C with the output voltage signal $V_{OUT\_M}$. Like in the main controller 4 shown in FIG. 14, the divider 513 in the main controller 5 shown in FIG. 36 is optional. If the divider 513 is omitted, the further multiplier 514 receives the output signal A from the multiplier 512.

The second converter 20 shown in FIG. 34 is not restricted to supply power to an AC grid. The second converter 20 may also supply power to a DC grid (a DC bus) which defines the output voltage $V_{OUT}$. In this case, multiplying the divider output signal C or the multiplier output signal A with the output signal $V_{OUT\_M}$ may not be necessary. In this case, the input signal B of the divider is $V_{OUT\_MAX}$ instead of $V_{OUT\_MAX}^2/2$.

The further multiplier 514 outputs the output current reference signal $I_{OUT\_REF}$. If the further multiplier 514 is omitted, either the output signal C of the divider 513 or the output signal A of the multiplier 512 is the output current reference signal $I_{OUT\_REF}$.

Referring to FIG. 36 the modulation index controller 52 subtracts a filtered output current signal $I_{OUT\_F}$ from the output current reference signal $I_{OUT\_REF}$ to generate an output current error signal $I_{OUT\_ERR}$. The filtered output current signal $I_{OUT\_F}$ is obtained by filtering the output current signal $I_{OUT\_M}$ by a first filter 522. The modulation index m is obtained by filtering the output current error signal $I_{OUT\_ERR}$ by a second filter. The first and second filter 522, 523 may be designed as explained with reference to the filters 422, 423 shown in FIG. 14.

Figure 37:
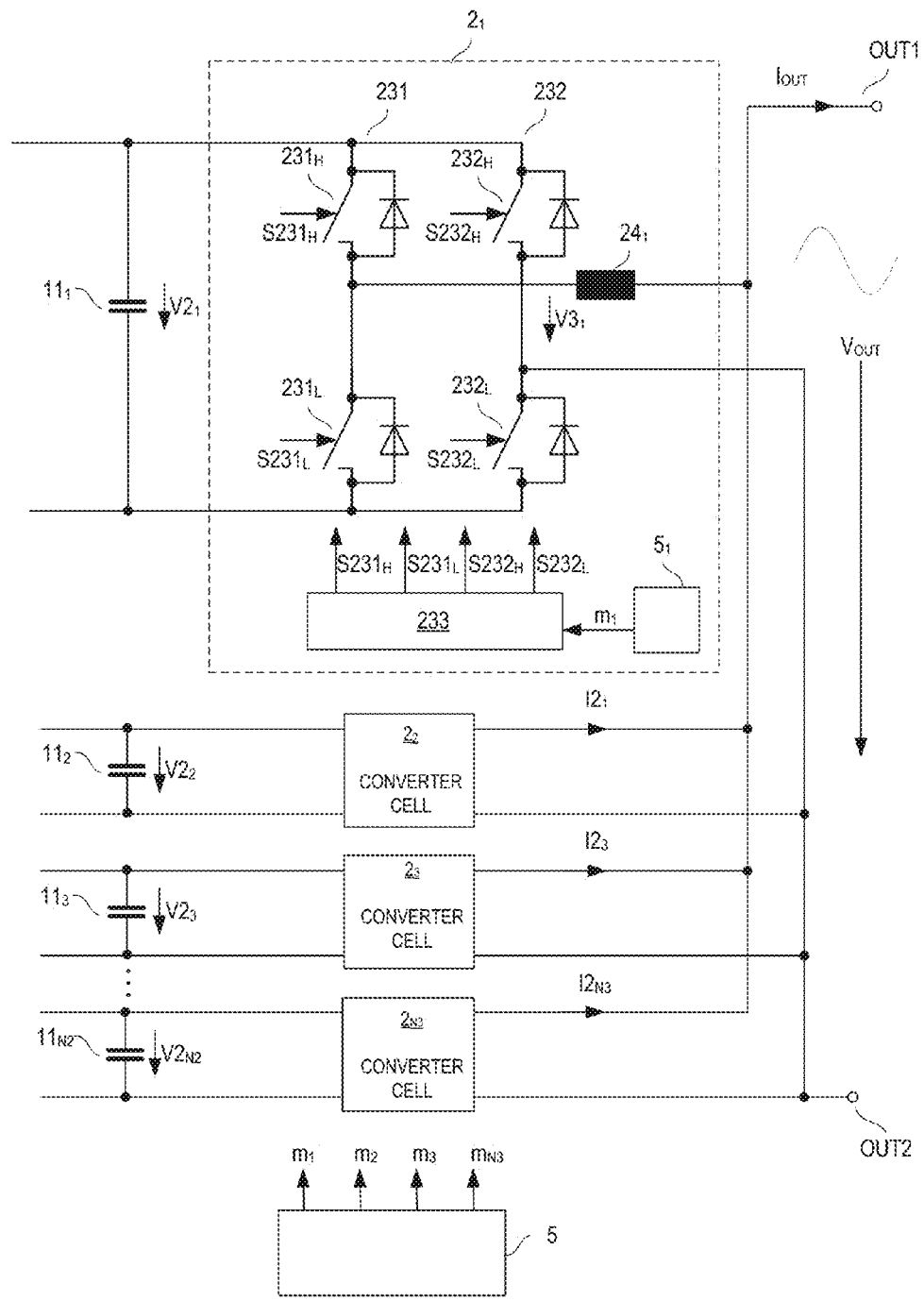
FIG. 37 shows one embodiment of a multi-cell power converter with an OP (Output Parallel) topology.

FIG. 37 shows one embodiment of the second converter 20 with an OP topology. This converter 20 is based on the converter 20 shown in FIG. 34 and is different from the converter shown in FIG. 34 in that the individual converter cells $2_1$-$2_{N3}$ have their cell outputs connected in parallel at the output OUT1. In the embodiment shown in FIG. 37, each converter cell $2_1$-$2_{N3}$ includes an inductor, which is shown in the first converter cell $2_1$ where the inductor is labeled with reference character $24_1$. Further, each converter cell $2_1$-$2_{N3}$ includes a controller which generates the modulation index of the respective converter cell. This is shown in the first converter cell $2_1$ where the controller is labeled with reference character $5_1$. The controller in each converter cell, such as controller $5_1$ in converter cell $2_1$, may correspond to the controller 5 shown in FIGS. 35 and 36, with the difference that the controller (in particular the error filter) of one converter cell only receives the DC link voltage signal of the respective converter cell and a DC link voltage reference signal of the respective converter cell instead of each of the DC link voltage signals $V2_{1\_M}$-$V2_{N3\_M}$ and the total DC link voltage reference signal $V2_{TOT\_REF}$.

Figure 38:
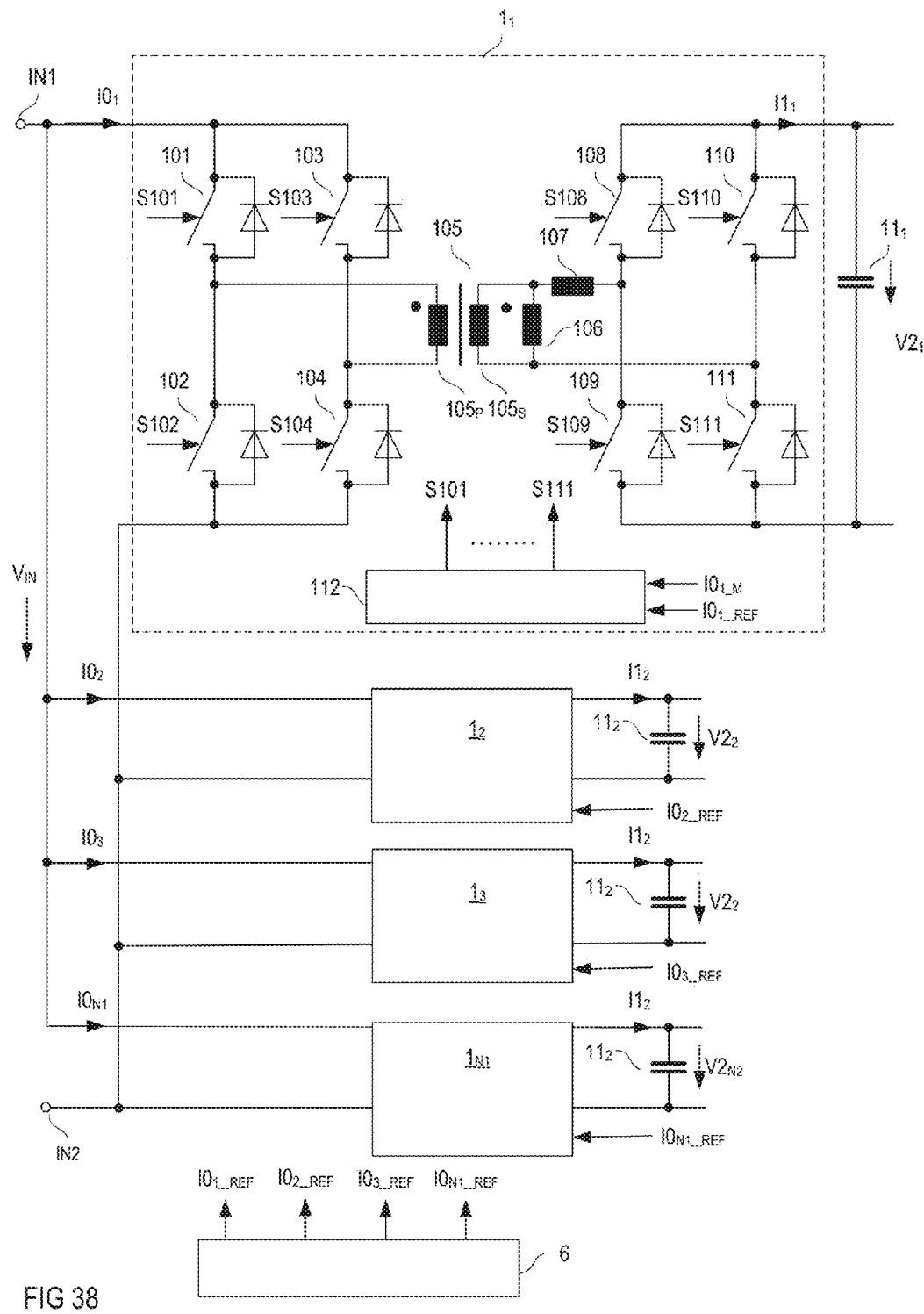
FIG. 38 shows one embodiment of a multi-cell power converter with an IP (Input Parallel) topology.

FIG. 38 shows another embodiment of a first power converter 10 with an IP topology. In this embodiment, the individual converter cells $1_1$-$1_{N1}$ are implemented with a dual-active bridge (DAB) topology, wherein only the topology of the first converter cell $1_1$ is shown in detail in FIG. 38. Referring to the converter cell $1_1$, the cell topology is based on the cell topology shown in FIG. 32. That is, the cell topology includes two full-bridges which each include two half bridges, wherein each half bridge includes a high-side switch 101, 103, 108, 110 and a low-side switch 102, 104, 109, 111. Like in the cell topology shown in FIG. 32, one full bridge is connected to the cell input (the full bridge with switches 101-104 shown in FIG. 38), and one full bridge is connected to the cell output (the full bridge with switches 108-111 shown in FIG. 38). A primary winding $105_P$ of a transformer 105 is connected to taps of the first full bridges 101-104, and a series circuit with a secondary winding $105_S$ and a further inductor 107 is connected to taps of the second full bridge 108-111. A further inductor 106 drawn in parallel with the secondary winding $105_S$ represents the magnetizing inductance of the transformer 105. A controller 112 controls operation of the individual switches of the full bridges by generating drive signals S101-S111 of the switches such that a cell input current $I0_1$ has a current level defined by an input current reference signal $I1_{\_REF}$. For this, the controller 112 receives an input current signal $I0_{1\_M}$ which represents an instantaneous current level of the input current $I0_1$, and the input current reference signal $I0_{1\_REF}$. A main controller 6 generates the input current reference signals $I0_{1\_REF}$-$I0_{N1\_REF}$ of the individual converter cell $1_1$-$1_{N1}$.

The converter cell $1_1$ (like the other converter cells $1_2$-$1_{N1}$) shown in FIG. 38 has one of a step-up and a step-down characteristic. That is, it may generate the DC link voltage $V2_1$ with a higher voltage level or with a lower voltage level than the input voltage $V_{IN}$. The converter 10 shown in FIG. 38 is not restricted to be implemented with converter cells having a DAB topology. Other topologies, such as the flyback topology, or the buck topology explained before may be used as well.

Figure 39:
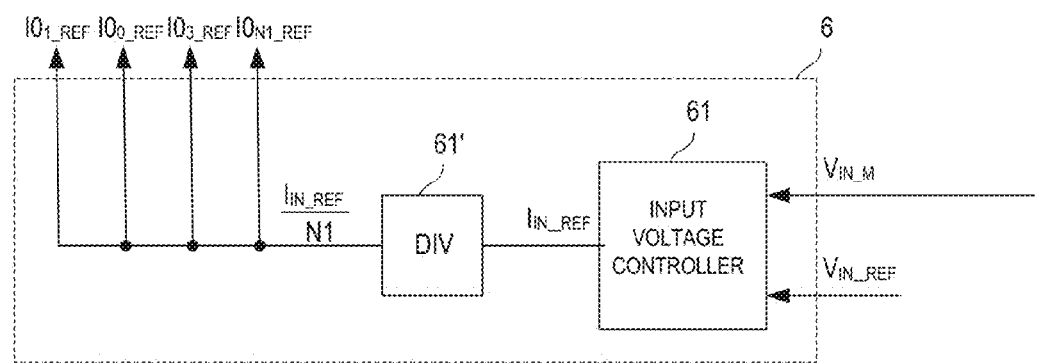
FIG. 39 shows one embodiment of a main controller in the multi-cell power converter shown in FIG. 38.

FIG. 39 shows one embodiment of the main controller 6. In this embodiment, the main controller 6 includes an input voltage controller 61 which receives an input voltage signal $V_{IN\_M}$ and an input voltage reference signal $V_{IN\_REF}$ and is configured to control the voltage level of the input voltage $V_{IN}$. The input voltage controller 61 generates an input current reference signal $I_{IN\_REF}$ based on these signals. In this embodiment, each of the input current reference signals $I0_{1\_REF}$-$I0_{N1\_REF}$ received by the individual converter cells $1_1$-$1_{N1}$ corresponds to the input current reference signal $I_{IN\_REF}$ generated by the input voltage controller 61. The input current signal $I_{IN\_REF}$ represents a desired current level of the input current $I_{IN}$. According to one embodiment, the individual converter cells $1_1$-$1_{N1}$ receive equal shares of the input current $I_{IN}$. In this case, the level of each of the input current reference signals $I1_{1\_REF}$-$I1_{N1\_REF}$ received by the individual converter cells $1_1$-$1_{N1}$ is $I_{IN\_REF}/N1$. In the embodiment shown in FIG. 39, a divider 61' calculates the input current reference signals $I1_{1\_REF}$-$I1_{N1\_REF}$ based on the input current reference signal $I_{IN\_REF}$.

For example, the input voltage $V_{IN}$ is controlled in those applications where the input power is provided by a solar panel with a plurality of photovoltaic (PV) cells. The efficiency of a PV cell that receives solar power is dependent on the input voltage so that it may become necessary to vary the voltage at the PV panel as the solar power received by the solar panel varies. An operation point at which a PV cell, at a given received solar power, has its maximum efficiency (supplies the maximum power) is referred to as maximum power point (MPP). The MPP can be found by varying the voltage at the PV cell and the solar panel, respectively, and by measuring the power received from the solar panel. This is commonly known. According to one embodiment, an MPP tracker (not shown) which is configured to measure the power received at the input IN1, IN2 provides the input voltage reference signal $V_{IN\_REF}$ in order to operate the power source supplying the input voltage $V_{IN}$ in the MPP.

According to another embodiment, a central controller (not shown) generates the input voltage reference signal $V_{IN\_REF}$.

According to another embodiment, the first power converter 10 is configured to control the input current $I_{IN}$. In this embodiment, the input voltage controller 61 may be omitted. In this case, the input current reference signal $I_{IN\_REF}$ may be provided by a central controller (not shown) similar to the central controller which may provide the input voltage reference signal $V_{IN\_REF}$.

Several of a variety of different topologies of the first power converter 10 and the second power converter 20 are disclosed above. In the design of the power converter circuit, the type of the first power converter 10 and the type of the second power converter can be selected dependent on the desired type of power conversion to be performed by the power converter circuit. Some of a variety of combinations and their possible field of application are explained below. In the following, a power converter circuit configured to receive a periodic (alternating) input voltage (such as a sine voltage or a rectified sine voltage) and to supply a direct output voltage will be referred to as AC/DC power converter circuit, a power converter circuit configured to receive a direct input voltage and a periodic output voltage and configured to supply an alternating output current will be referred to as AC/DC power converter circuit, and a power converter circuit configured to receive a direct input voltage and to provide a direct output voltage will be referred to as DC/DC power converter circuit.

The design and ways of operation of a multi-cell power converter, such as, for example, one of the IS, IP, OS, or OP multi-cell power converters explained herein before, offers several degrees of freedom which may be used in terms of increasing the efficiency of the multi-cell converter and of the power converter circuit in which it is employed. These degrees of freedom include the number of converter cells in one multi-cell converter, operation modes of the converter cells, the type of connection between the converter cells, the voltage levels of the DC link voltages, the design of the converter cells, etc. Some of these degrees of freedom and how they may be used to increase the efficiency of a multi-cell converter are explained below.

In a multi-cell converter, such as one of the multi-cell converters explained herein before, each of the plurality of converter cells may have a maximum rated power. The maximum rated power defines the maximum power the converter cell can convert. That is, the maximum input power the converter cell may receive, or the maximum output power the converter cell may provide.

Figure 40:
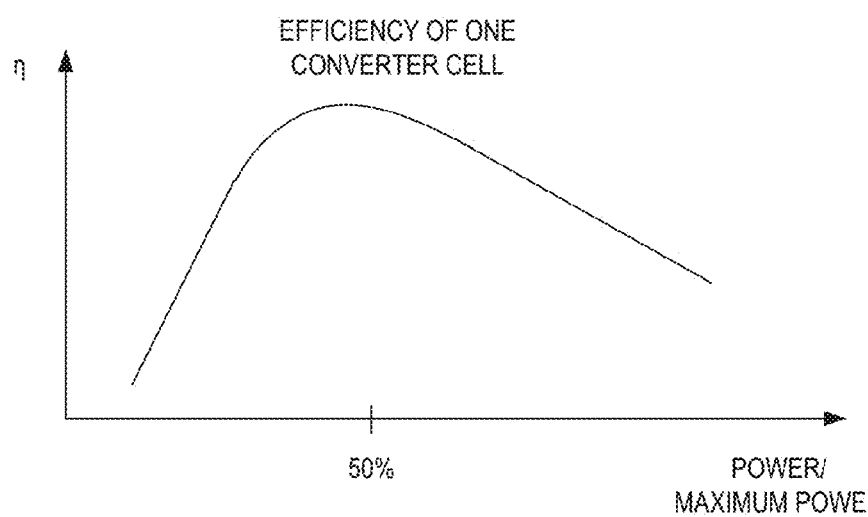
FIG. 40 schematically illustrates the efficiency of a converter cell based on the power level of the converted power.

Referring to FIG. 40, the efficiency of the individual converter cells may vary dependent on a ratio between the instantaneous power and the maximum power. FIG. 40 schematically illustrates the efficiency of one converter cell based on this ratio. Referring to FIG. 40, the converter cell may have its maximum efficiency somewhere around 50% of the maximum power, where the efficiency decreases towards lower output power levels and towards higher power levels.

Referring to the explanation above, the individual converter cells can be implemented as switched mode converter cells. That is, these converter cells are implemented as switched-mode power converters and each include at least one semiconductor switch which is operated at a switching frequency. For example, in an OP converter or an IP converter, the switched mode operation is used to control output currents $I2_1$-$I2_{N3}$ and input currents $I0_1$-$I0_{N3}$ of the individual converter cells $1_1$-$1_{N1}$, $2_1$-$2_{N3}$, respectively. The switching frequency may be 18 kHz or higher. Switching on and off the at least one semiconductor switch in a converter cell causes losses. These losses, which can be referred to as switching losses, include a portion which is substantially independent of the output power of the respective converter cell. Those constant losses, which may result from losses in drivers, microcontrollers, or the like, are one reason that the efficiency of the converter cell significantly decreases as the output power decreases.

According to one embodiment, in order to efficiently operate the multi-cell power converter, that is, to efficiently convert the power received by the multi-cell power converter, the individual converter cells in a multi-cell converter with an xP topology can be activated (operated in an active mode) or deactivated (operated in an inactive mode). A multi-cell converter with an xP topology is a multi-cell converter with either an IP topology or a multi-cell converter with either an OP topology. Deactivating of at least one converter cell in an xP topology may help to increase the efficiency of the other converter cells. This is explained for an OP topology with reference to FIGS. 41A-44, and for an IP topology with reference to FIGS. 45A-49.

The individual converter cells in an xP topology can be referred to as "phases". An operation mode in which at least one of these converter cells is inactive will be referred to as "phase shedding" mode in the following. In the phase shedding mode active converter cells take over the part of the inactive converter cell so that the total converted power only varies dependent on a power reference signal. The "power reference signal" defines the power that is to be converted by the multi-cell converter.

For the purpose of explanation it is assumed that the power consumption of the load Z is such that each of the converter cells $2_1$-$2_N$ of a second power converter 20 with an OP topology supplies an output power which is significantly less than 50% of its maximum output power. If one of the converter cells $2_1$-$2_N$ is deactivated so that its output power becomes zero, the power levels of the other converter cells have to increase in order to keep the power level of the output power $P_{OUT}$ constant. However, the higher power levels of the other (active) converter cells may result in a higher efficiency of these active converter cells.

"Operating one converter cell in the inactive mode" means that, during the inactive mode, the cell input power received by the respective converter cell and the cell output power provided by the respective converter cell is substantially zero. Nevertheless, the DC link capacitor associated with the inactive converter cell may further be charged by the first power converter 10, as explained further below. In the active mode, the individual converter cells operate in a switched-mode at a switching frequency fp as explained above. During the inactive mode, the DC link voltage of the respective converter cell may increase as the first converter 10 may further supply power to the respective DC link capacitor $11_1$-$11_N$. This is independent of the specific topology of the first power converter 10. The DC link voltage of the inactive converter cell may increase until the converter cell is again activated and receives cell input power from the respective DC link capacitor. The DC link capacitors 11$_1$-11$_{N2}$ act as buffers between the first power converter 10 which receives input power from the input IN1, IN2 and the second power converter 20 which provides the output power P$_{OUT}$. The energy storage capability of these DC link capacitors 11$_1$-11$_N$ allows to cyclically operate the converter cells 2$_1$-2$_{N3}$ in the inactive mode so as to increase the efficiency of the second power converter 20 when the output power P$_{OUT}$ is low (at low-load conditions).

Figure 41A:
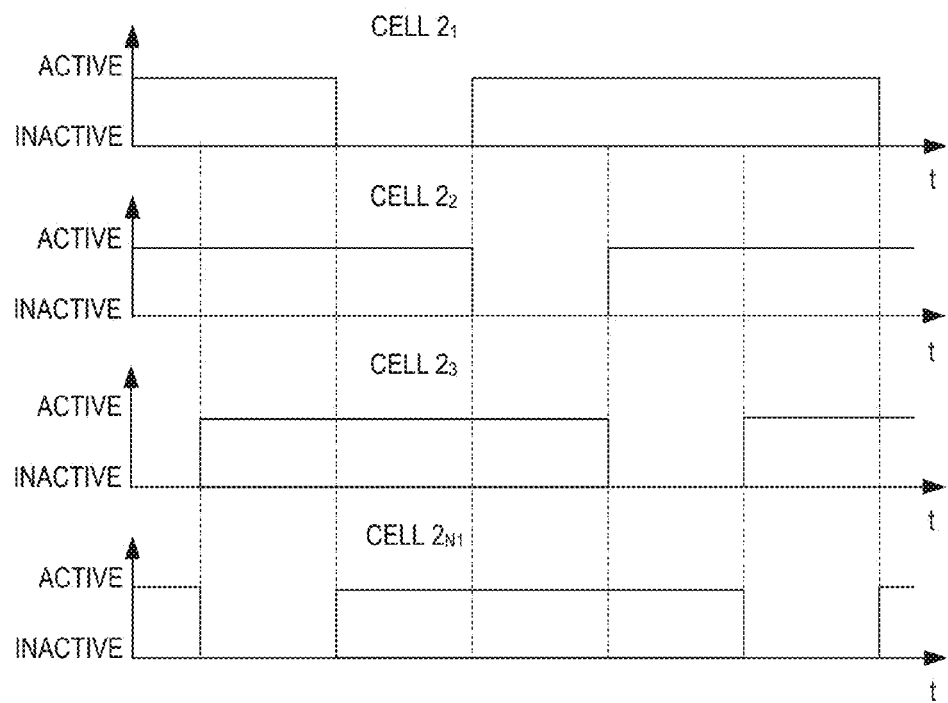
FIGS. 41A-41B show timing diagrams which illustrate activating and deactivating converter cells (phase shedding) in a multi-cell power converter with OP topology.
Figure 41B:
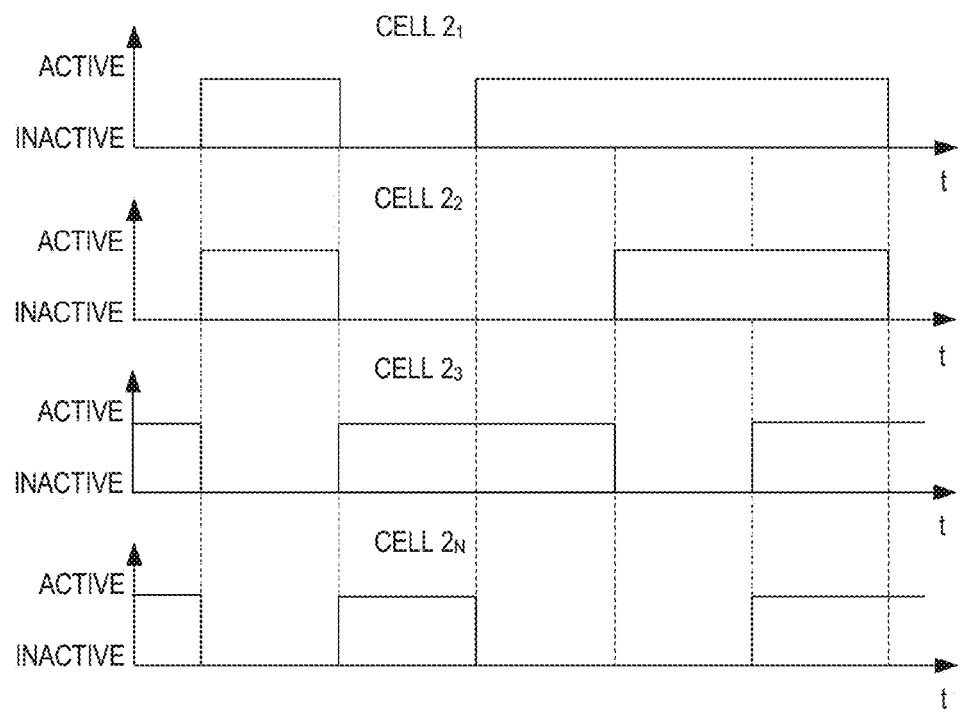

FIG. 41A shows a first operation scenario of the second power converter 20. In this scenario, one converter cell is in the inactive mode at one time. In FIG. 41A only the activation states of the individual converter cells 2$_1$-2$_{N1}$ are shown. That is, the individual timing diagrams only show whether the respective converter cell 2$_1$-2$_{N3}$ is active or inactive. The curves shown in FIG. 41A do not show the power level of the output power, and do not show the current level of the output current of the respective converter cells 2$_1$-2$_{N3}$. According to another scenario, shown in FIG. 41B, two of the converter cells 2$_1$-2$_N$ may be inactive at one time. In general, up to N3−1 converter cells can be inactive at one time, leaving only one converter cell active at one time. Several different criteria may be used to decide which of the converter cells belong to the group of N3−K active converter cells and to the group of K inactive converter cells at one time, and how long the individual converter cells are active/inactive before a next decision is taken. This is explained in further detail below.

Figure 42:
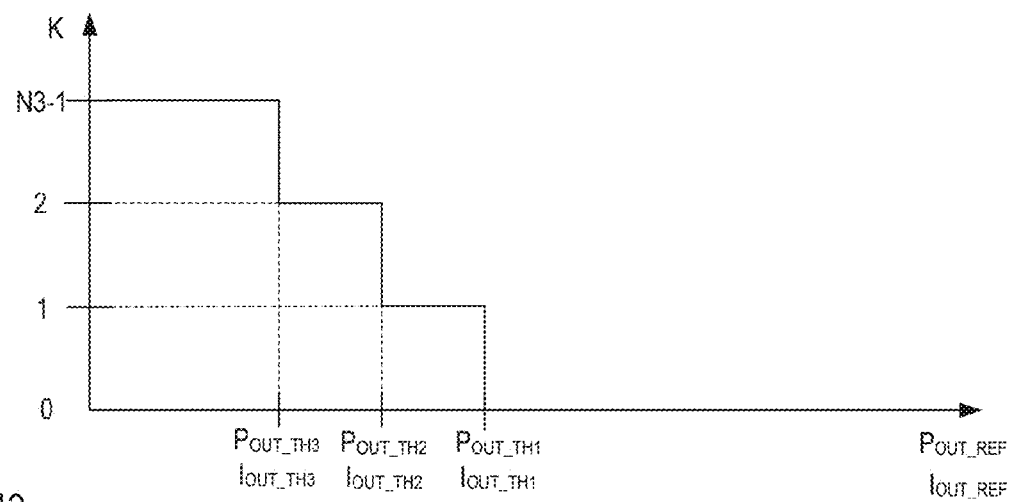
FIG. 42 schematically illustrates how a number of inactive converter cells may be set in a multi-cell power converter with OP topology dependent on an output power.

According to one embodiment, a number K of converter cells that are inactive at one time is set based on one of an output power reference signals P$_{OUT\_REF}$ and an output current reference signal I$_{OUT\_REF}$, respectively. This is illustrated in FIG. 42. The output power reference signal P$_{OUT\_REF}$ defines a desired power level of the output power P$_{OUT}$ to be provided by the second converter 20. In case the output voltage V$_{OUT}$ is substantially constant the output current reference signal I$_{OUT\_REF}$ is a measure for the desired power level of the output power P$_{OUT}$. Instead of the output power reference signal P$_{OUT\_REF}$ the instantaneous level of the output power P$_{OUT}$, and instead of the output current reference signal I$_{OUT\_REF}$ the instantaneous level of the output current I$_{OUT}$ may be used.

FIG. 42 illustrates K based on the output power reference signal P$_{OUT\_REF}$ and the output current reference signal I$_{OUT\_REF}$, respectively. In the embodiment shown in FIG. 42, none (K=0) of the converter cells is inactive when the output power reference signal P$_{OUT\_REF}$ is above a first threshold P$_{OUT\_TH1}$ (if the output current reference signal I$_{OUT\_REF}$ is above a first current threshold I$_{OUT\_TH1}$). One (K=1) converter cell is deactivated (inactive) when the output power reference signal P$_{OUT\_REF}$ is between the first threshold P$_{OUT\_TH1}$ and a second threshold P$_{OUT\_TH2}$ (when the output current reference signal I$_{OUT\_REF}$ is between the first threshold I$_{OUT\_TH1}$ and a second current threshold I$_{OUT\_TH2}$), two (K=2) converter cells are inactive when the output power reference signal P$_{OUT\_REF}$ is between the second power threshold P$_{OUT\_TH2}$ and a third power threshold P$_{OUT\_TH3}$ (when the output current reference signal I$_{OUT\_REF}$ is between the second current threshold I$_{OUT\_TH2}$ and a third current threshold I$_{OUT\_TH3}$), and so on. The difference between neighboring power thresholds and current thresholds, respectively, can be substantially the same or can be different.

Figure 43:
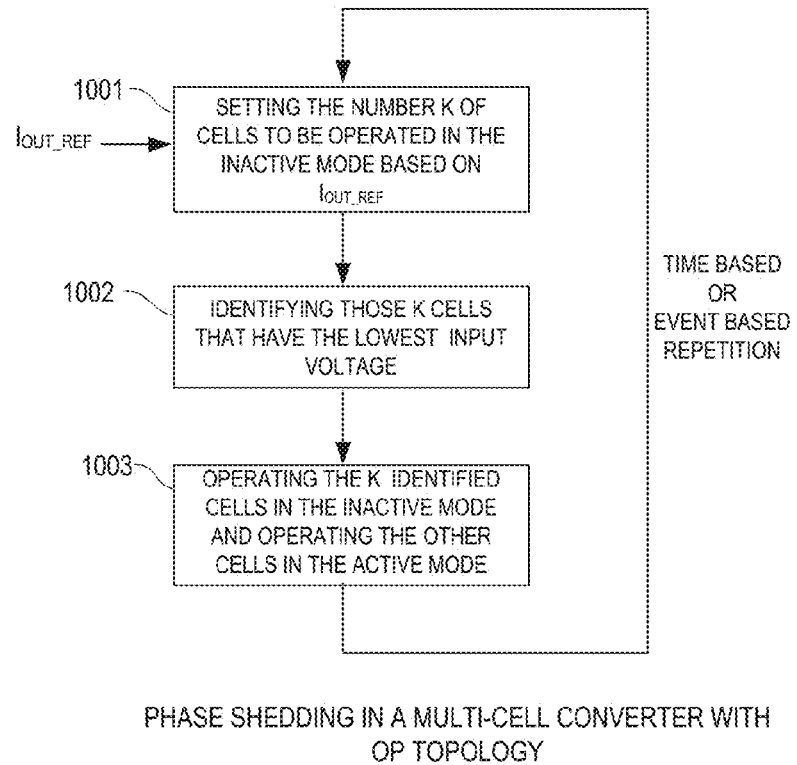
FIG. 43 illustrates one embodiment of operating a multi-cell converter with OP topology.

FIG. 43 illustrates one embodiment of a method for setting the number K of converter cells to be deactivated, and for identifying the cells that are deactivated at one time. Referring to FIG. 43, the method includes setting the number M of cells to be operated in the inactive mode based on the output current reference signal I$_{OUT\_REF}$ (1001). The output current reference signal I$_{OUT\_REF}$ represents the desired output current I$_{OUT}$ of the second power converter 20. According to one embodiment, M is set based on the output current reference signal I$_{OUT\_REF}$ in accordance with a curve as shown in FIG. 40.

Referring to FIG. 43, the method further includes identifying those K converter cells that currently have the lowest input voltage (DC link voltage) (1002). Such identification may include sorting the converter cells 2$_1$-2$_{N3}$ based on the voltage level of their DC link voltages 11$_1$-11$_{N2}$ and selecting those K converter cells that have the lowest DC link voltage levels. These K identified converter cells are operated in the inactive mode and the other converter cells are operated in the active mode (1003). By operating the converter cells that have the lowest DC link voltages in the inactive mode, and, consequently, operating the other N3−K converter cells that have the highest DC link voltages in the active mode it can be prevented that the individual DC link voltages V2$_1$-V2$_{N2}$ (see, for example, FIG. 1) become too different. Referring to FIG. 43, setting the number K of converter cells (1001), identifying those K cells with the lowest DC link voltage (1002) and operating the K identified cells in the inactive mode (1003) are repeated. Repeating these process steps 1001-1003 may be time-based or event based. Repeating these process steps 1001-1003 time-based may include regularly repeating these steps 1001-1003. According to one embodiment, a frequency at which the process steps 1001-1003 are repeated is less than 0.1 times, or even less than 0.01 times the switching frequency. According to one embodiment, the frequency at which the process steps 1001-1003 are repeated is 500 Hz or less.

Repeating these process steps 1001-1003 event-based may include repeating these steps 1001-1003 every time a predefined event occurs. Examples of those events include, but are not restricted to, a decrease of one DC link voltage V2$_1$-V2$_{N2}$ below a predefined first voltage threshold, and the increase of one DC link voltage V2$_1$-V2$_{N2}$ above a predefined second voltage threshold, higher than the first threshold. According to another embodiment, the power drawn by the load at the output is measured and the process steps 1001-1003 are repeated when a significant change of the power consumption of the load Z is detected.

According to one embodiment, the duration in which at least one converter cell is inactive is much longer than the period of one drive cycle of the converter cells in the active mode. According to one embodiment, the duration in which the at least one converter cell is inactive is at least ten times the drive cycle period. Referring to the above the drive cycle period Tp is the reciprocal of the switching frequency fp in the active mode.

Figure 44:
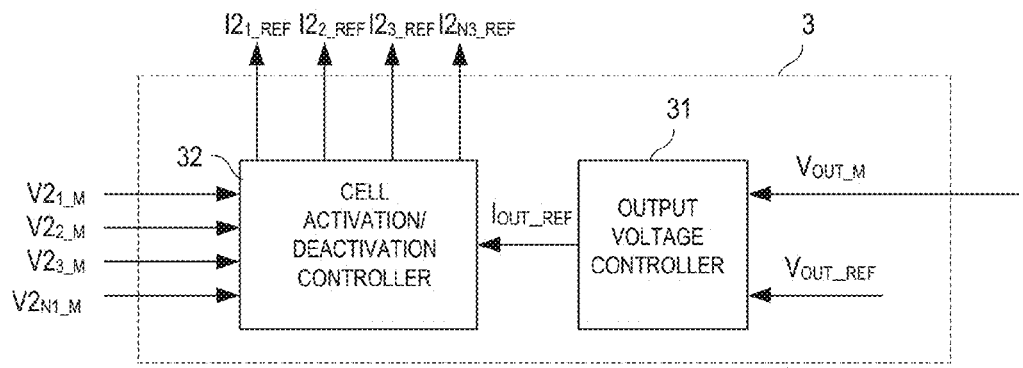
FIG. 44 shows one embodiment of a main controller in a multi-cell power converter having a phase shedding functionality.

Referring to the explanation above, the second power converter 20 includes a main controller 3 which is configured to control operation of the individual converter cells 2$_1$-2$_{N3}$. FIG. 44 shows one embodiment of the controller 3 which is configured to operate at least on converter cell in the inactive mode. The controller 3 shown in FIG. 44 is based on the controller 3 shown in FIG. 33 (to the specification of which reference is made) and is different from the controller shown in FIG. 33 in that it additionally includes a cell activation/deactivation controller 32. The cell activation/deactivation controller 32 receives the output current reference signal $I_{OUT\_REF}$ from the output voltage controller 31 which may be omitted when the output current $I_{OUT}$ is to be controlled). The operation of the cell activation/deactivation controller 32 is based on the method explained with reference to FIG. 43. The activation/deactivation controller 32 activates/deactivates the individual converter cells. That is, the controller 32 based on the output current reference signal $I_{OUT\_REF}$ sets the number K of converter cells that are to be deactivated, and based on the DC link voltages $V2_1$-$V2_{N2}$ of the individual converter cells $2_1$-$2_{N3}$ selects those cells that are to be deactivated. For identifying those converter cells $2_1$-$2_N$ that have the lowest DC link voltage, the controller 32 receives DC link voltage signals $V2_{1\_M}$-$V2_{N3\_M}$ which represent the individual DC link voltages $V2_1$-$V2_{N3}$. These voltage signals $V2_{1\_M}$-$V2_{N3\_M}$ may be obtained from the individual DC link voltages $V2_1$-$V2_{N3}$ using conventional voltage measurement circuits (not shown in the drawings).

Referring to FIG. 44, the cell activation/deactivation controller generates 32 current reference signals $I2_{1\_REF}$-$I2_{N3\_REF}$. These reference signals $I2_{1\_REF}$-$I2_{N3\_REF}$ represent desired current levels of the output currents $I2_1$-$I2_{N3}$ of the individual converter cells $2_1$-$2_N$. The cell activation/deactivation controller 32 generates the individual reference signals $I2_{1\_REF}$-$I2_{N3\_REF}$ such that their sum corresponds to the output current reference signal. That is, $$\Sigma_{i=1}^{N3} I2_{i\_REF} = I_{OUT\_REF} \quad (21).$$

In this way, the converted power is only dependent on the output power reference signal $P_{OUT\_REF}$ and the output current reference signal $I_{OUT\_REF}$, respectively. Thus, operating the multi-cell converter 20 in the phase shedding mode does not result in substantial variations of the converted power. The converted power is one of the input power the second converter 20 receives from the DC link capacitors and the first power converter 10, respectively, and the output power supplied to the load. The current reference signal of the at least one converter cell that is to be deactivated are set to zero by the cell activation/deactivation controller 32 in order to set the output power of the deactivated converter cell to zero.

According to one embodiment, the cell activation/deactivation controller 32 is configured to generate the current reference signals of the active converter cells such that these reference signals are substantially equal, so that the active converter cells substantially provide the same output current. However, this is only an example. According to a further embodiment, the cell activation/deactivation controller 32 is configured to generate the individual reference signals $I2_{1\_REF}$-$I2_{N3\_REF}$ of the active converter cells such that these reference signals are different. According to one embodiment, the cell activation/deactivation controller 32 generates the current reference signal of an active converter cell such that the current reference signal of one converter cell is dependent on the DC link voltage of the respective converter cell. The current reference signal may be generated such that the current reference signal increases as the DC link voltage of the associated DC link capacitor increases. In this embodiment, those active converter cells that have a higher DC link voltage supply a higher output current than other active converter cells having a lower DC link voltage.

According to another embodiment, the cell activation/deactivation controller 32 generates the reference signals $I2_{1\_REF}$-$I2_{N3\_REF}$ of the active converter cells in accordance with efficiency curves such that these converter cells operate in a high efficiency range. A high efficiency range is, for example a range in which the efficiency is at least 60% or at least 75% of a maximum efficiency. Referring to the explanation below, the individual converter cells may have their maximum efficiency or a high efficiency range at different currents. In this case, operating the active cells at different currents, additionally to phase shedding, may help to increase the overall efficiency of the power converter 20.

It should be noted that the block diagrams of each of the controllers shown in the drawings, such as controller 3 shown in FIG. 44 and other drawings, and controllers 4, 5 and 6 shown in other drawings, merely serve to illustrate the functionality of the respective controller rather than its implementation. The individual function blocks may be implemented using a conventional technology that is suitable to implement a controller. Specifically, the function blocks of the controller 3 may be implemented as analog circuits, digital circuits, or may be implemented using hardware and software, such as a micro controller on which a specific software is running in order to implement the functionality of the controller 3.

Operating of converter cells of a multi-cell power converter in an active mode or an inactive mode, as explained with reference to FIGS. 41A-44 above is not restricted to converter cells in a second power converter 20. Such activating or deactivating of converter cells in order to efficiently operate a power converter circuit may also be applied to the converter cells $1_1$-$1_{N1}$ in a first power converter 10 with an IP topology (in which cell inputs of the individual converter cells are connected in parallel). This is explained with reference to FIGS. 45A-49 below.

Figure 45A:
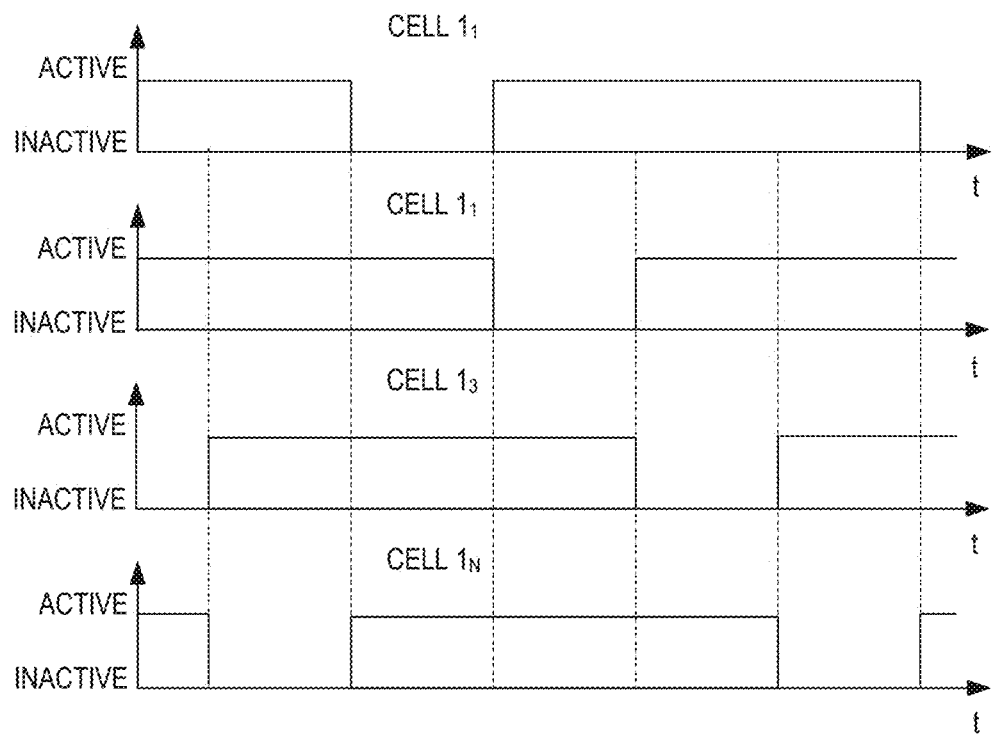
FIGS. 45A-45B show timing diagrams which illustrate activating and deactivating converter cells (phase shedding) in a multi-cell power converter with IP topology.
Figure 45B:
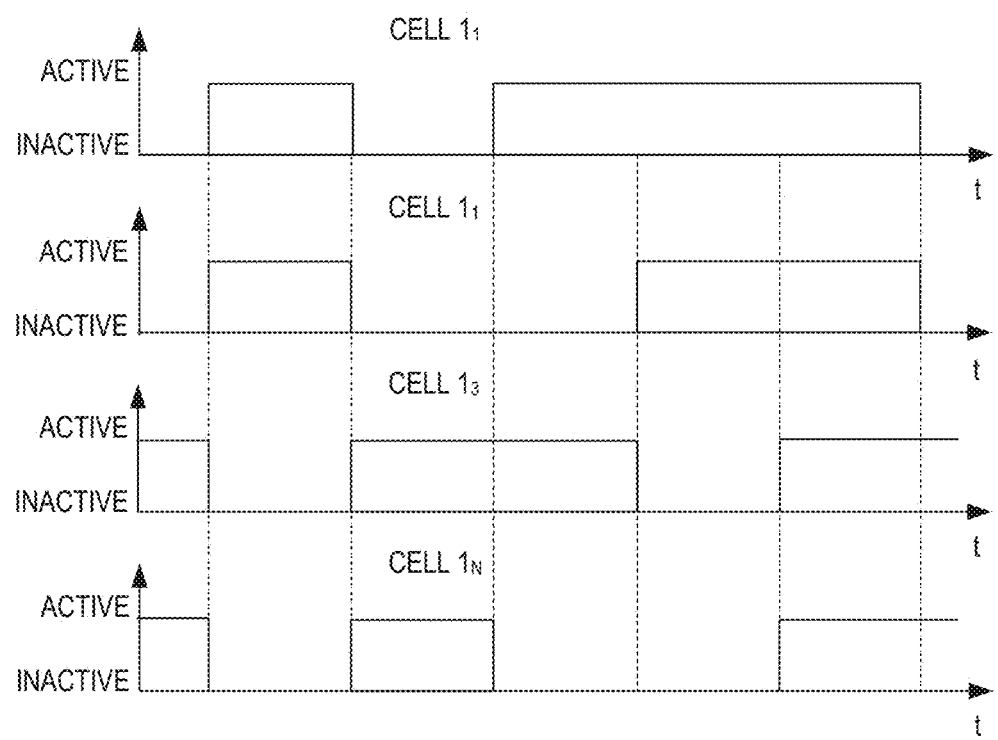

FIGS. 45A and 45B show timing diagrams that illustrate how converter cells $1_1$-$1_{N1}$ of the first power converter 10 may operate in an active mode or an inactive mode. In the embodiment shown in FIG. 45A, only one of the converter cells $1_1$-$1_{N1}$ is deactivated at one time, in the embodiment shown in FIG. 35B, two of the converter cells $1_1$-$1_{N1}$ are deactivated at one time. In general, up to N1−1 of the converter cells $1_1$-$1_{N1}$ may deactivated at one time. Activating and deactivating the converter cells $1_1$-$1_{N1}$ of the first power converter circuit 10 is similar to activating and deactivating converter cells of the second power converter 20, with the difference that in the first power converter 10 the at least one converter cell is activated or deactivated based on an input power reference signal $P_{IN\_REF}$. The input power reference signal $P_{OUT\_REF}$ defines a desired power level of the input power $P_{IN}$ to be received by the first converter 10. In case the input voltage $V_{IN}$ is substantially constant the input current reference signal $I_{IN\_REF}$ is a measure for the desired power level of the input power $P_{IN}$. Instead of the input power reference signal $P_{IN\_REF}$ the instantaneous level of the input power $P_{IN}$, and instead of the output current reference signal $I_{OUT\_REF}$ the instantaneous level of the input current $I_{IN}$ may be used.

Figure 46:
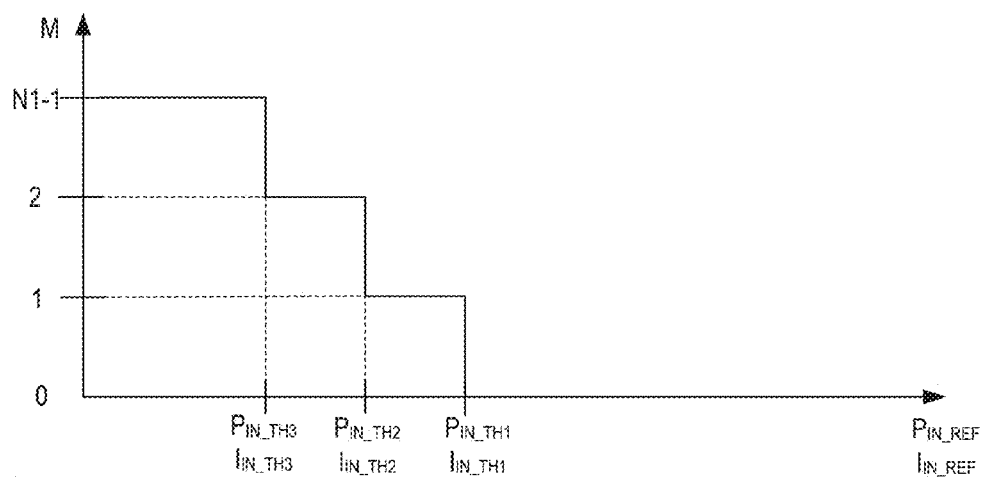
FIG. 46 schematically illustrates how a number of inactive converter cells may be set in a multi-cell power converter with IP topology dependent on an output power.

Referring to FIG. 46, the number K of converter cells which are deactivated at one time may increase as the input power reference signal $P_{IN\_REF}$, or the input current reference signal $I_{IN\_REF}$ decreases. The input current reference signal $I_{IN\_REF}$ represents a desired current level of the input current $I_{IN}$. Referring to FIG. 46, one converter cell (K=1) may be deactivated if the input power reference signal $P_{IN\_REF}$ falls below a first threshold $P_{IN\_TH}$ or the input current reference signal $I_{IN\_REF}$ falls below a first current threshold $I_{IN\_TH1}$, two converter cells (K=2) may be deactivated if the input power reference signal $P_{IN\_REF}$ or the input current reference signal $I_{IN\_REF}$ falls below a second threshold $P_{IN\_TH2}$, $I_{IN\_TH2}$, respectively, and three (K=3) converter cells are deactivated if the input power reference signal $P_{IN\_REF}$ and the input current reference signal $I_{IN\_REF}$ falls below a third threshold $P_{IN\_TH3}$, $I_{IN\_TH3}$, respectively.

In the embodiments explained before, there are four converter cells $1_1$-$1_{N1}$ (N1=4). However, this is only an example. The number N1 of converter cells that are connected in parallel are not restricted to N1=4. In general, two or more converter cells are connected in parallel.

Figure 47:
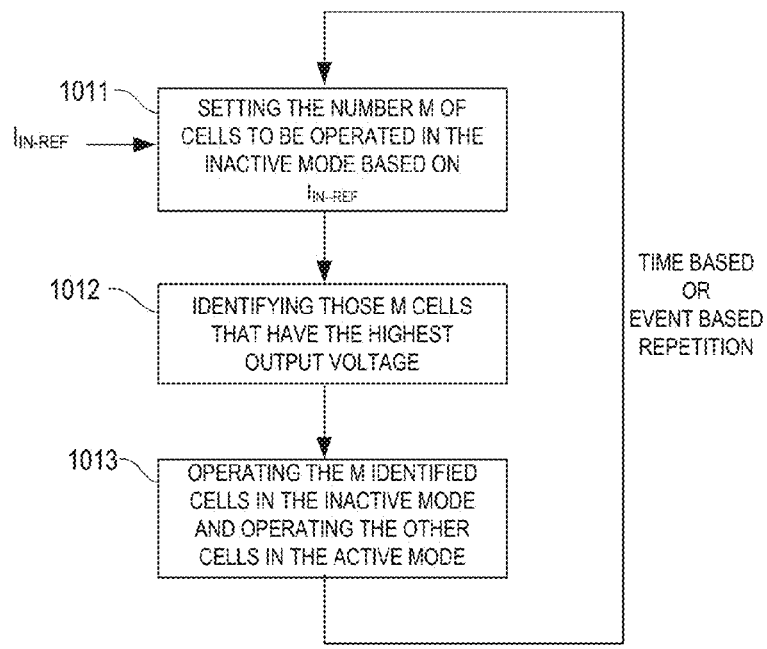
FIG. 47 illustrates one embodiment of operating a multi-cell converter with OP topology.

FIG. 47 illustrates one embodiment of a method for deactivating at least one of the converter cells $1_1$-$1_{N1}$. The method includes setting the number K of converter cells that are to be operated in the inactive mode (1011). The method shown in FIG. 47 uses the input reference signal $I_{IN\_REF}$ to detect the desired input power and to set K. However, any other signal representing the instantaneous or the desired input power may be used as well. Setting the number K may be performed in accordance with the curve shown in FIG. 46. The method further includes identifying those K cells that have the highest output voltages (DC link voltage) (1012), and operating those K identified cells in the inactive mode, and operating the other cells in the active mode (1013). The process steps 1011-1013 which include setting the number K, identifying those K cells that have the highest output voltage, and operating the K identified cells in the inactive mode can be repeated periodically (time based), or event based. According to one embodiment, an event based repetition of these process steps 1011-1013 may include repeating the process steps 1004-1006 when the voltage level of one DC link voltage $V2_1$-$V2_N$ of one of the plurality of converter cells $1_1$-$1_N$ rises above a predefined first threshold level, or the voltage level of one of the plurality of DC link voltages $V2_1$-$V2_N$ falls below a predefined second threshold level, lower than the first threshold.

Figure 48:
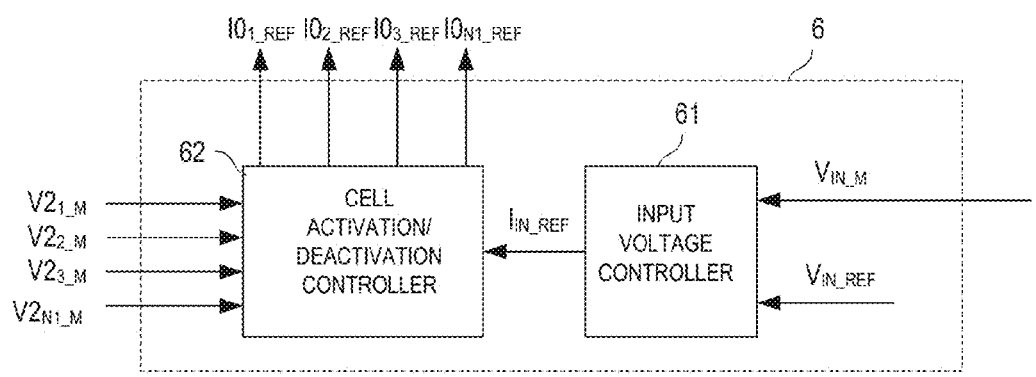
FIG. 48 shows one embodiment of a main controller in a multi-cell power converter having a phase shedding functionality.

FIG. 48 shows a block diagram of one embodiment of a main controller 6 which is configured to activate or deactivate the individual converter cells $1_1$-$1_{N1}$. This main controller 6 is based on the main controller 6 shown in FIG. 39 (to the specification of which reference is made) and is different from this main controller 6 in that it additionally includes a cell activation/deactivation controller 62. The cell activation/deactivation controller 62 receives the input current reference signal $I_{IN\_REF}$ from the input voltage controller 61 (which may be omitted when the input current is to be controlled) and generates input current reference signal $I0_{1\_REF}$, $I0_{2\_REF}$, $I0_{3\_REF}$, $I0_{N1\_REF}$ for the individual converter cells $1_1$-$1_{N1}$. These input current reference signals $I0_{1\_REF}$-$I0_{N1\_REF}$ are received by the individual converter cells $1_1$-$1_N$, which are configured to control their input current $I0_1$-$I0_{N1}$ based on these reference signals $I0_{1\_REF}$-$I0_{N1\_REF}$, as explained above.

The cell activation/deactivation controller 62 is configured to set the reference current of the at least one converter cell which is to be deactivated to zero. According to one embodiment, the levels of the input current reference signals of those converter cells that are to be activated (operate in the active mode) are equal. According to another embodiment the cell activation/deactivation controller 52 is configured to generate the input current reference signals of the activated converter cells with different current levels. For example, the cell activation/deactivation controller 62 generates the signal levels of the active converter cells based on the DC link voltages such that the reference signal decreases as the DC link voltage increase, in order to charge the DC link capacitors of those converter cells $1_1$-$1_{N1}$ slower that have a relatively high DC link voltage $V2_1$-$V2_{N2}$.

According to another embodiment, the activation/deactivation controller 32 is configured to generate the current reference signals of the active converter cells based on efficiency curves of the active converter cells such that these converter cells operate in a high efficiency range. A high efficiency range is, for example a range in which the efficiency is at least 60% or at least 75% of a maximum efficiency.

However, in each case the sum of the reference signals corresponds to input current reference signal $I_{IN\_REF}$. That is, $$\Sigma_{i=1}^{N1} I0_{i\_REF} = I_{IN\_REF} \qquad (22).$$

Thus, the input power is only dependent on the input power reference signal $P_{IN\_REF}$ or the input current reference signal, respectively. Thus, operating the multi-cell converter 10 in the phase shedding mode does not result in substantial variations of the converted power. The converted power is of the input power the second converter 10 receives at the input, and the output power supplied to the DC link capacitors and the second converter, respectively.

Activating/deactivating converter cells $1_1$-$1_N$ of the first power converter 10 based on an input current reference signal $I_{IN\_REF}$ may, in particular, be employed in a power converter circuit which receives a DC voltage as the input voltage $V_{IN}$.

However, activating deactivating converter cells in a power converter with an IP or OP topology is not restricted to power converters which receive or generate a DC voltage. Such activating or deactivating of converter cells may also be employed in a multi-cell converter of the type shown in FIG. 29 which includes a plurality of converter cells $1_1$-$1_{N1}$ that have the cell inputs connected in parallel, which has a PFC capability, and which receives a periodic input voltage $V_{IN}$. As will be explained in further detail with reference to FIGS. 50 and 53 below, the input power $P_{IN}$ in such power converter periodically varies with a frequency which is twice the frequency of the input voltage $V_{IN}$. The input power is zero when the instantaneous level of the input voltage $V_{IN}$ is zero and increases as the level of the input voltage increases until the input voltage $V_{IN}$ reaches the maximum. After the input voltage has reached the maximum (or the minimum in the negative halfwave), the input power decreases until the input voltage again reaches zero. According to one embodiment, the converter cells $2_1$-$2_{N1}$ are activated and deactivated based on at least one of the level of the input voltage $V_{IN}$ and the input current $I_{IN}$ such that the number of activated converter cells, within one halfwave, increases as the input voltage $V_{IN}$ and/or the input current increases and decreases as the input voltage $V_{IN}$ and/or the input current decreases. The order in which the converter cells are activated and deactivated in one halfwave may change so that the DC link capacitors $11_1$-$11_{N2}$ are equally charged. A controller (not shown in FIG. 29) may activate and deactivate the individual converter cells $1_1$-$1_{N1}$ based on at least one of the input voltage $V_{IN}$ and the input current $I_{IN}$.

Figure 49:
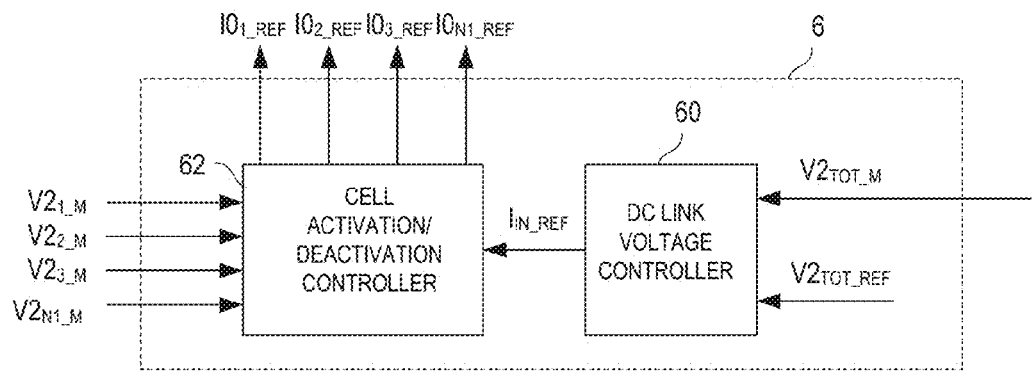
FIG. 49 shows one embodiment of a main controller in a multi-cell power converter having a phase shedding functionality.

Equivalently, in a multi-cell converter of the type shown in FIG. 37 which includes a plurality of converter cells $2_1$-$2_{N3}$ that have the cell outputs connected in parallel, which has a PFC capability, and which receives a periodic output voltage $V_{OUT}$ the converter cells $2_1$-$2_{N3}$ may be activated and deactivated based on at least one of the level of the output voltage $V_{OUT}$ and the output current $I_{OUT}$ such that the number of activated converter cells, within one halfwave, increases as the output voltage $V_{OUT}$ and/or the output current $I_{OUT}$ increases and decreases as the output voltage $V_{OUT}$ and/or the output current $I_{OUT}$ decreases. FIG. 49 shows a main controller 6 according to another embodiment. In this embodiment, the main controller 6 instead of the input voltage controller 61 includes a DC link voltage controller 60 which is configured to generate the input current reference signal $I_{IN\_REF}$ based on a difference between the total DC link voltage $V2_{TOT}$ and desired DC link voltage.

Another way to increase the efficiency of a multi-cell power converter under low load conditions is to intermittently operate the multi-cell power converter such that an average converted power alternates. According to one embodiment, the multi-cell power converter is one of an IS, OS, IP, or OP power converter with a PFC functionality, such as one of the IS, OS, IP, or OP power converters with PFC functionality explained hereinbefore. Operating such power converter in an intermittent operation mode is explained with reference to FIGS. 50-53. According to another embodiment, the multi-cell converter is one of an IS, OS, IP, or OP power converter configured to receive or provide a direct voltage. Operating such power converter in an intermittent operation mode is explained with reference to FIGS. 54-59.

In general, in an IS, OS, IP or OP converter with PFC capability the converted power periodically varies as the input voltage and the input current periodically vary. For example, if the input voltage $V_{IN}$ in an IS or IP converter (or the output voltage $V_{OUT}$ in an OS or OP converter), is a sine voltage and the input current $I_{IN}$ (the output current $I_{OUT}$) has a sine waveform, the converted power has a sine square waveform and a frequency which is twice the frequency of the sine voltage. The converted power is the input power received at the input IN1, IN2 in an IS or IP converter, and the output power $P_{OUT}$ provided at the output OUT1, OUT2 in an OS or OP converter. In a normal mode (a non-intermittent mode) the average power level and the peak power level of the converted power is only dependent on the power to be converted. This power to be converted may be defined by the input current reference signal $I_{IN\_REF}$ and the output current reference signal $I_{OUT\_REF}$, respectively.

Figure 50:
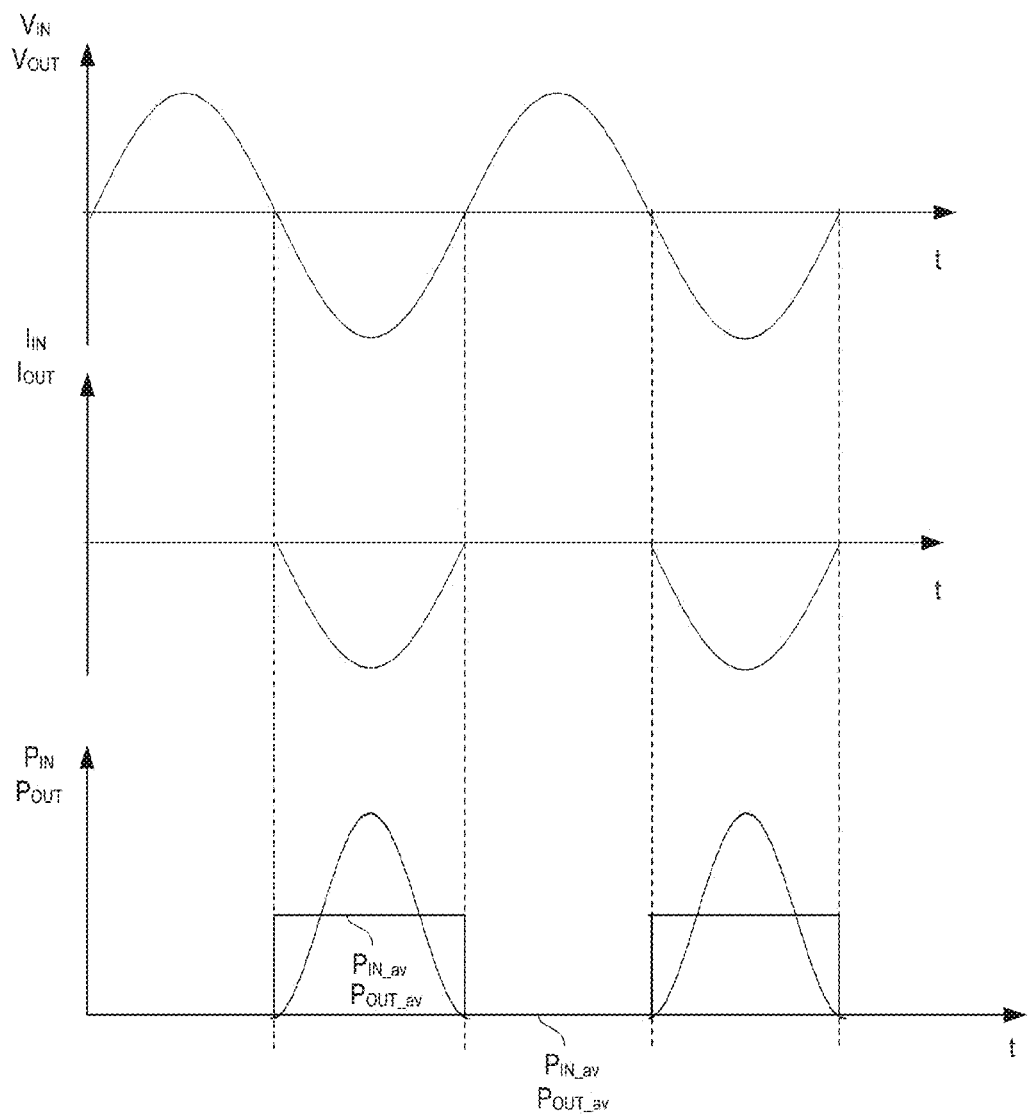
FIG. 50 shows timing diagrams which illustrate one way of operation of an IS or OS multi-cell converter in an intermittent operation mode.

In the intermittent mode, the average power level and the peak power level alternate. This is explained with reference to FIG. 50 which schematically illustrates the waveform of an input voltage $V_{IN}$ of an IS power converter, or the waveform of an output voltage $V_{OUT}$ of an OS power converter. The voltage shown in FIG. 50 is sine voltage. However, the way of operation explained below applies to a rectified sine voltage equivalently. FIG. 50 further illustrates the input current $I_{IN}$, and the output current $I_{OUT}$, respectively, and the input power $P_{IN}$ and the output power $P_{OUT}$, respectively.

In the embodiment shown in FIG. 50, the power converter converts power only during negative halfwaves of the input voltage $V_{IN}$, or the output voltage $V_{OUT}$, respectively. During these negative halfwaves, the waveform of the current $I_{IN}$, $I_{OUT}$ follows the waveform of the voltage $V_{IN}$, $V_{OUT}$. That is, the current $I_{IN}/I_{OUT}$ is substantially in phase $V_{IN}/V_{OUT}$, and a current level is substantially proportional to a voltage level of the voltage $V_{IN}/V_{OUT}$. The power $P_{IN}$, $P_{OUT}$ has a sine square waveform during the negative half-cycles. FIG. 50 further illustrates the average power level $P_{IN\_AVG}$, $P_{OUT\_AVG}$ during the negative halfwaves.

In the embodiment shown in FIG. 50, the multi-cell converter is operated such that the current $I_{IN}$, $I_{OUT}$ and, therefore, the average power level $P_{IN\_AVG}$, $P_{OUT\_AVG}$ is zero in the positive halfwaves. However, this is only an example. In general, operating the multi-cell converter in the intermittent operation mode means operating the multi-cell converter such that the average power level alternates between different levels wherein one of these levels is less than 80%, less than 50%, or even less than 30% of the other one of these levels. The "average power level" is the average power level in one half-period, that is, in a time period between two timely successive (sequential) zero crossings of the voltage $V_{IN}/V_{OUT}$. This applies to a sine voltage and a rectified sine voltage. In a sine voltage, zero crossings are those times at which the voltage level is zero, that is at which the voltage changes from a positive to a negative level, and vice versa. In a rectified sine voltage, zero crossings are those times in which the voltage becomes zero or close to zero before the voltage level again increases.

In the embodiment shown in FIG. 50, the average power level $P_{IN\_AVG}$, $P_{OUT\_AVG}$ changes every halfwave so that the frequency of changes of the average power level is twice the frequency of the voltage $V_{IN}$, $V_{OUT}$. However, this is only an example. Instead of reducing the average power only in every second halfwave (every positive halfwave) there may two or more halfwaves in which the average power is reduced to the lower level before again having one halfwave in which the average power has the higher level. It is also possible, to have the higher level for two or more subsequent halfwaves and then to change to the lower level for one, two or more subsequent halfwave. In any case, in the intermittent mode, the average power level alternates between different levels. The average power levels between which the average power alternates may vary. That is, for example, the lower level may change between a first time when the average power assumes the lower level, and a second time after the first time.

Figure 51:
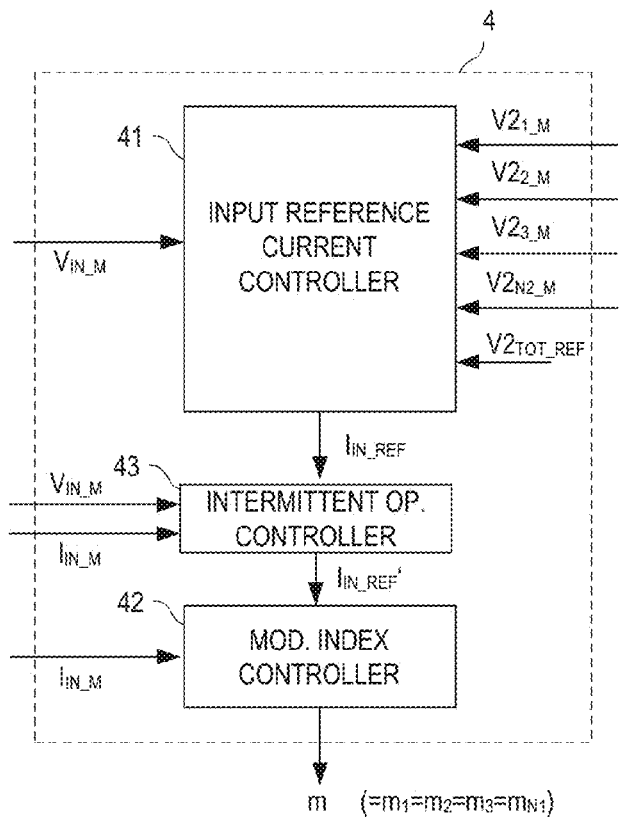
FIG. 51 shows one embodiment of a main controller in an IS multi-cell converter having an intermittent operation functionality.

FIG. 51 shows one embodiment of a main controller 4 of an IS power converter which has an intermittent operation functionality. The main controller 4 shown in FIG. 51 is based on the main controller 4 shown in FIG. 13 (to the description of which reference is made), and is different from the main controller 4 shown in FIG. 13 in that it additionally includes an intermittent operation controller between the input reference current controller 4₁ and the modulation index controller 42. The intermittent operation controller 43 receives the input current reference signal $I_{IN\_REF}$ from the input reference current controller 41 and is configured to provide a modified input current reference signal $I_{IN\_REF'}$ to the modulation index controller 42. According to one embodiment, the intermittent operation controller 43 is configured to generate the modified input current reference signal $I_{IN\_REF'}$ such that the modified input current reference signal $I_{IN\_REF'}$ corresponds to the input current reference signal $I_{IN\_REF}$ during certain halfwaves of the voltage $V_{IN}/V_{OUT}$, and that the modified input current reference signal $I_{IN\_REF'}$ has a lower amplitude, such as zero during certain halfwaves of the voltage $V_{IN}/V_{OUT}$. In the embodiment shown in FIG. 50, the intermittent operation controller 43 forwards the input current reference signal $I_{IN\_REF}$ to the modulation index controller 42 during the negative halfwaves of the voltage $V_{IN}/V_{OUT}$, and sets the modified input current reference signal $I_{IN\_REF'}$ to zero during the positive halfwaves of the voltage $V_{IN}/V_{OUT}$. During those time periods in which the modified input current reference signal $I_{IN\_REF'}$ is zero, the modulation index controller 42 generates the modulation index m such that the input current $I_{IN}$ of the power converter is zero. During this time period, the individual converter cells may still be operated in a clocked fashion so that there may be time periods when the multi-cell power converter receives an input current. However, there are also time periods in which the input current is negative (the multi-cell power converter provides a current to the power source) so that the average input current is zero during those time periods in which the modified input current reference signal $I_{IN\_REF'}$ is zero.

During those time periods in which the modified input current reference signal $I_{IN\_REF'}$ is zero, the multi-cell power converter may still generate the cell input voltages $V1_1$-$V1_{N1}$ as explained hereinbefore. In particular in those time periods in which the average input current should be zero, the main converter may operate only one converter cell in a clocked fashion in one drive cycle. This is explained with reference to the timing diagram shown in FIG. 27. Referring to FIG. 27, the total cell input voltage $V1_{TOT}$ switches between two voltage levels which are associated with a range of the modulation index m. In the embodiment shown in FIG. 27 the total cell input voltage $V1_{TOT}$ switches between zero and $V2_{TOT}/N1$ when the modulation index is between 0 and 0.25, switches between $V2_{TOT}/N1$ and $V2_{TOT}/N3$ when the modulation index is between 0.25 and 0.5, and so on.

According to one embodiment, the multi-cell power converter is operated such that only one converter cell is operated in a switched mode in order to switch the total cell input voltage $V1_{TOT}$ between two distinct voltage levels (such as, for example between $V2_{TOT}/N1$ and $V2_{TOT}/N3$) in the embodiment shown in FIG. 27 and to statically operate the other converter cells. "To statically operate the other converter cells" means that one converter cells switches to the off-state when the modulation index reaches a certain level and stays in this off-state until the modulation index again falls below this certain level. For example, one converter cell may be switched off, when the modulation index reaches 0.25 in the embodiment shown in FIG. 27, in order to provide one share of $V2_{TOT}/N1$ to the total cell input voltage $V1_{TOT}$, and stays in the off-state until the modulation index falls below 0.25. This operation mode in which only one converter cell is operated in a switched and in which the other converter cells are operated "statically" will be referred to as block mode in the following. The number of converter cells which are statically operated in the off-state increases as the voltage level of the input voltage increases. That is, based on the voltage level of the input voltage $V_{IN}$ the converter cells are operated in one of the PWM mode, the on-mode and the off-mode, wherein according to one embodiment, only one converter cell is operated in the PWM mode at on time.

In the embodiment shown in FIG. 50, the average power received/provided by the multi-cell power converter is zero during the negative halfwaves and is other than zero in the positive halfwaves. In this embodiment, the average power provided during the negative halfwaves is twice (two times) the average power that would be received/provide if the multi-cell converter would be operated continuously (not intermittently). However, as explained with reference to FIG. 40, the efficiency of the converter cells of the multi-cell power converter may decrease as the power converted by the individual converter cells decreases. Intermittently operating the multi-cell converter, that is, operating the multi-cell power converter at a higher power during certain time periods (such as the negative halfwaves in the embodiment shown in FIG. 50), may increase the efficiency of the multi-cell power converter.

According to one embodiment, the intermittent operation controller 43 calculates the average input power received during one halfwave and, based on this calculation, decides whether the multi-cell power converter is to be operated in the intermittent operation mode, or in the normal mode. In the normal mode, the intermittent operation controller 43 passes the input current reference signal $I_{IN\_REF}$ to the modulation index controller 42. In the intermittent operation, the ratio between those time periods in which the input power is zero, and those time periods in which the input power is other than zero (this ratio is 1:1 in the embodiment shown in FIG. 50) is calculated based on the calculated power. Referring to FIG. 51 the intermittent operation controller may receive the input voltage signal $V_{IN\_M}$ and the input current signal $I_{IN\_M}$ in order to calculate the average input power during one halfwave of the voltage $V_{IN}/V_{OUT}$.

Figure 52:
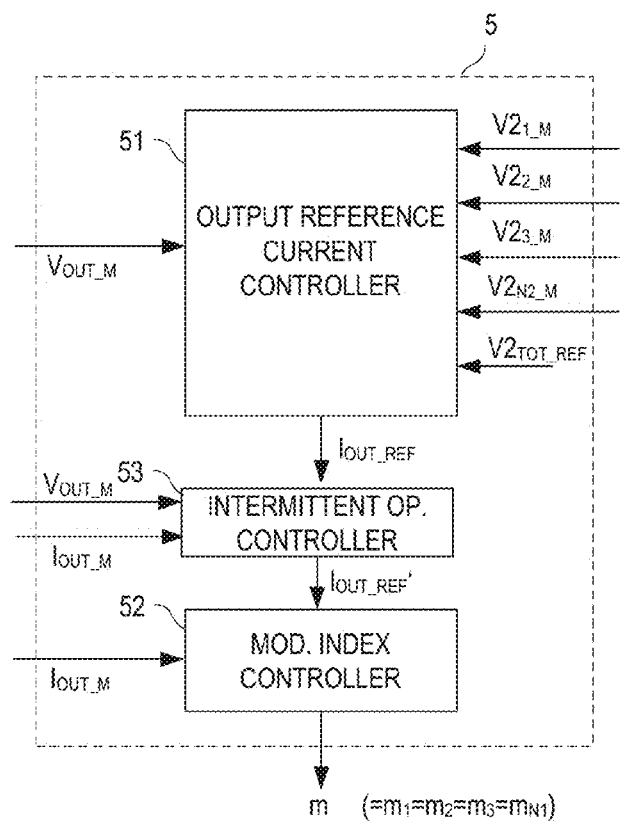
FIG. 52 shows one embodiment of a main controller in an IS multi-cell converter having an intermittent operation functionality.

FIG. 52 shows one embodiment of a main controller 5 in an OS multi-cell power converter having an intermittent operation functionality. This main controller 5 is based on the main controller 5 shown in FIG. 35 (to the specification of which reference is made) and is different from the main controller 5 shown in FIG. 35 in that it includes an intermittent operation controller 53 between the output reference current controller 51 and the modulation index controller 52. This intermittent operation controller 53 receives the output current reference signal $I_{OUT\_REF}$ from the output reference current controller and provides a modified output current reference signal $I_{OUT\_REF'}$ to the modulation index controller 52. The operation of the main controller 5 shown in FIG. 52 may correspond to the operation of the main controller 4 shown in FIG. 51, with the difference that the main controller 5 shown in FIG. 52 processes the output voltage signal $V_{OUT/M}$ of the output current signal $I_{OUT/M}$ instead of the input voltage signal $V_{IN/M}$ and the input current signal $I_{IN/M}$. However, what has been explained with reference to the input voltage $V_{IN}$ and the input current $I_{IN}$ in an IS power converter applies to the output voltage $V_{OUT}$ and the output current $I_{OUT}$ in an OS power converter equivalently.

Figure 53:
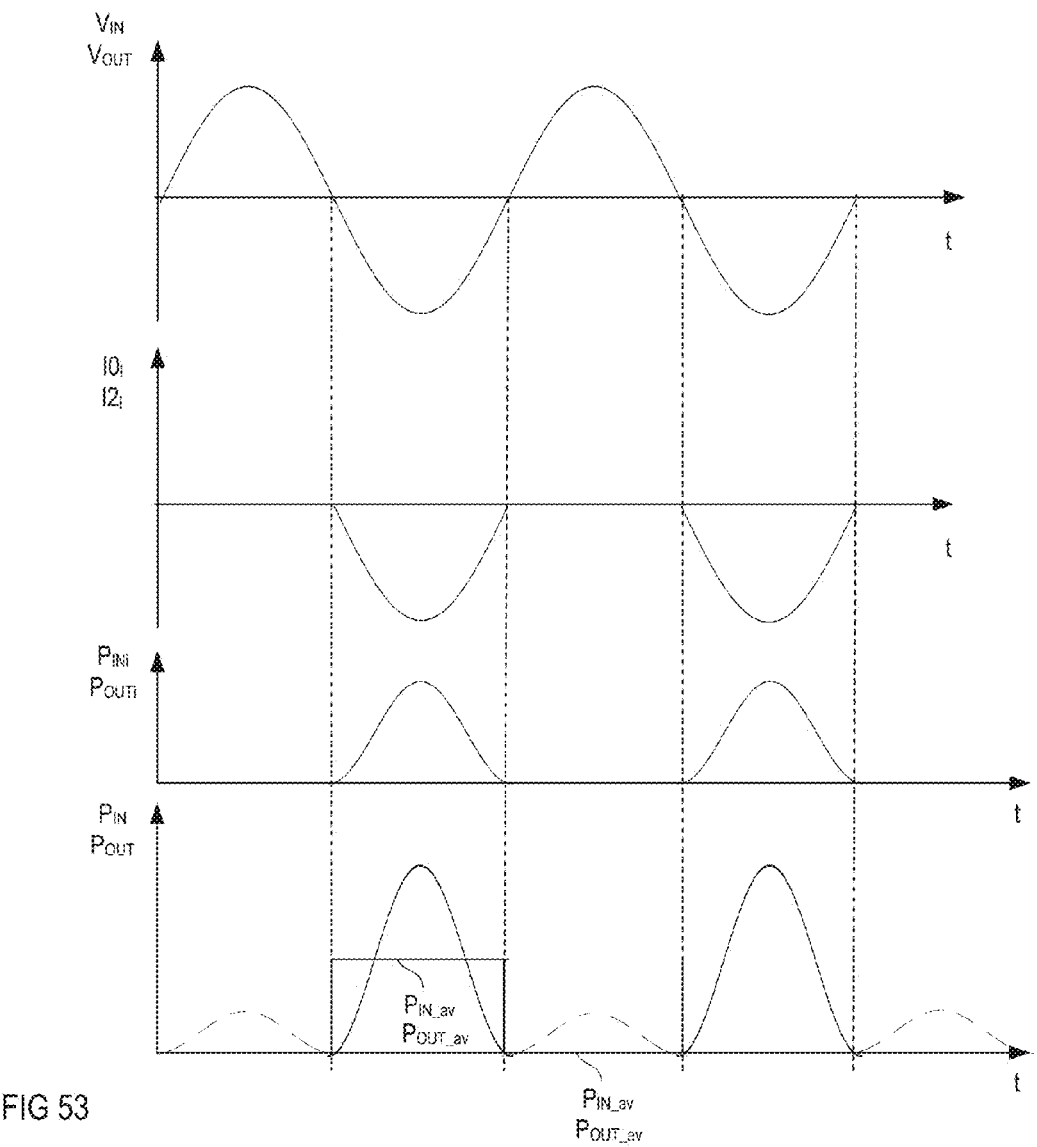
FIG. 53 shows timing diagrams which illustrate one way of operation of an IP or OP multi-cell converter in an intermittent operation mode.

Operating a multi-cell power converter in an intermittent operation mode is not restricted to a multi-cell power converter with an IS topology or an OS topology. The intermittent operation mode explained with reference to FIGS. 50 to 52 hereinbefore, may equivalently be used in an IP power converter of the type shown in FIG. 29, and an OP power converter of the type shown in FIG. 37. FIG. 53 shows timing diagrams of the input voltage $V_{IN}$ and the output voltage $V_{OUT}$, respectively, of the cell input current $I0_i$ and the cell output current $I2_i$, respectively, of one converter cell, and the input power $P_{IN}$ and the output power $P_{OUT}$, respectively, of the multi-cell converter with one of those IP and OP topologies. Each of these parallel connected converter cells may be operated in an intermittent operation mode as explained before. In the intermittent mode, the average power converted by one converter cell alternates between a higher level and a lower level, wherein the lower level may be less than 80%, less than 50%, or even less than 30% of the first level. Cell converters of these converter cells may correspond to the main converters 4 and 5 shown in FIGS. 51 and 52, respectively, with the difference that one controller instead of a total DC link voltage reference signal $V2_{TOT\_REF}$ and each of the DC link voltage signals $V1_{1\_M}$-$V1_{N2\_M}$ only processes a DC link voltage reference signal and the DC link voltage signal of the respective converter cell.

According to one embodiment, in the intermittent operation mode of a power converter with parallel connected converter cells, the number of converter cells which operate at the lower level is the same in each half-wave. If the first average power level of the individual converter cells is the same, and if the lower average power level of the individual converter cells is the same, the total average power level (which is the sum of the average power levels of the individual converter cells) is substantially the same in each halfwave. In this case, operating the individual converter cells in the intermittent mode does not result in a varying average power level of the multi-cell converter.

According to one embodiment, each converter cell in a power converter with parallel connected converter cells is operated in an intermittent mode, and the converter cells are synchronized such that they change their average power level at the same time. In this case, the average power level of the multi-cell converter varies. This is shown in FIG. 53 where the average converted power level $P_{IN\_AVG}$, $P_{OUT\_AVG}$ is drawn to vary. According to one embodiment, at least one converter cell is operated in the intermittent mode and at least one converter cell is operated in the normal mode. In this case, the converted power $P_{IN}$, $P_{OUT}$ may have a waveform as shown in dashed lines in FIG. 53.

If, in one of the power converter circuits explained with reference to FIGS. 1 and 4-7 before, the first power converter 10 has an IS or IP topology and is operated in an intermittent operation mode as explained with reference to FIGS. 50-53 before, the DC link capacitors $11_1$-$11_{N2}$ act as buffers which provide for a continuous power flow to the second power converter 20 and the load. In case the second power converter 20 is implemented with one of an OS topology and an OP topology, the first power converter 10 may continuously draw power from the power source and charge the DC link capacitors $11_1$-$11_{N2}$.

Figure 54:
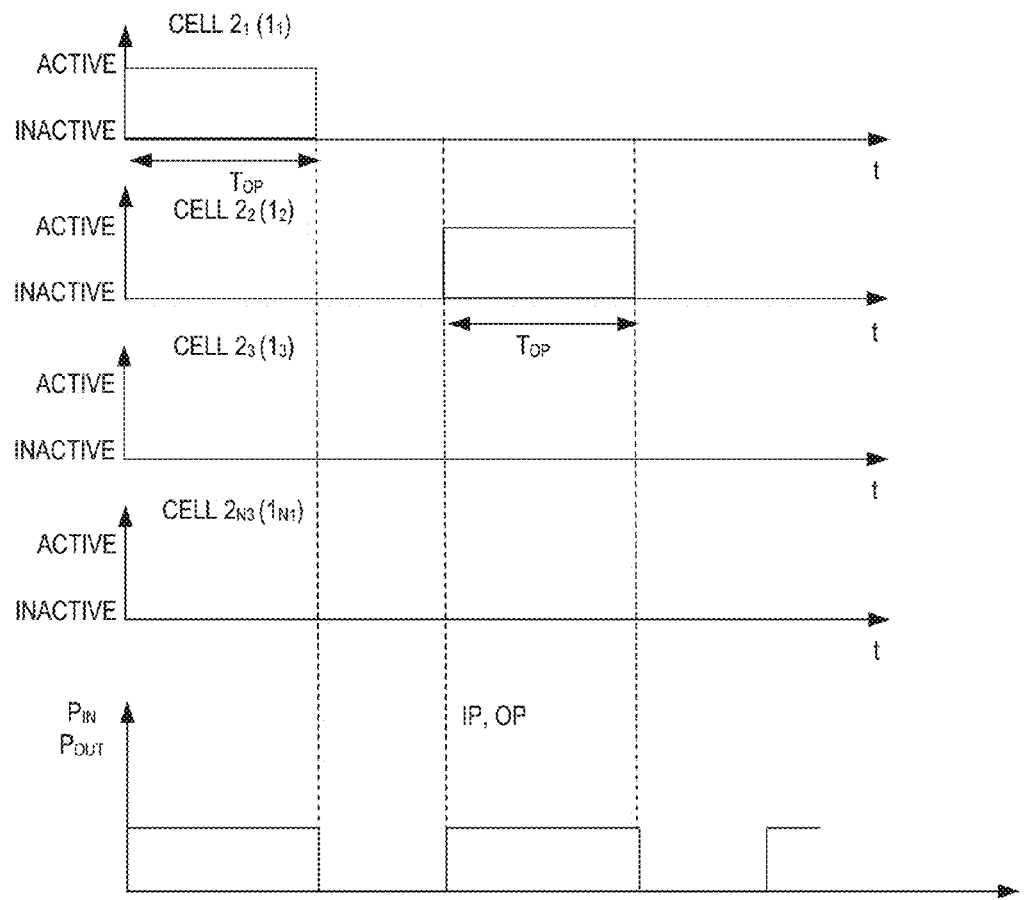
FIG. 54 shows timing diagrams which illustrate one way of operation of an IP or OP multi-cell converter in an intermittent operation mode.

FIG. 54 shows one embodiment of operating a multi-cell power converter with an IP topology or an OP topology, such as one of the topologies explained with reference to FIGS. 29 and 38 hereinbefore, in an intermittent mode. FIG. 54 shows timing diagrams of the activation states of the individual converter cells. These converter cells are converter cells $2_1$-$2_{N3}$ in an OP power converter, and converter cells $1_1$-$1_{N1}$ in an IP power converter. According to the embodiment shown in FIG. 54, operating the power converter in the intermittent mode may include activating only one converter cell at one time. In the time period illustrated in FIG. 54, a first converter cell $2_1$ and $1_1$, respectively, and a second converter cell $2_1$ and $2_2$, respectively, is activated. $T_{OP}$ denotes an activation time, which is a time duration in which the respective converter cell is activated. These activation times are drawn to be equal in the embodiment shown in FIG. 54. However, this is only an example. These activation times may vary dependent on different parameters. This is explained in further detail below. In the embodiment shown in FIG. 54, there is a time period between the activation times of the converter cells $2_1$, $2_2$. Thus, the converted power $P_{OUT}$ ($P_{IN}$) alternates. That is, there are times when the power level of the converted power changes from a higher level to a lower level, and times when the power level of the converted power changes from the lower level to the higher level. The higher level and the lower level may vary. However, each time there is a change of the power level from the higher level to the lower level the lower level is less than 80%, less than 50%, or even less than 30% of the higher level.

In the embodiment shown in FIG. 54, the lower level is zero. That is, there are times in which none of the converter cells is active. However, this is only an example. It is also possible to have one or more converter cells active while at least one other is operated intermittently. In this case, the lower level is different from zero.

Figure 55:
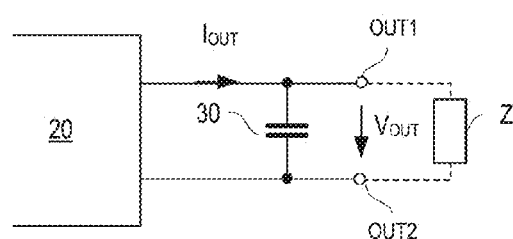
FIG. 55 shows one section of a power converter circuit which includes an output capacitor.

If, in one of the power converter circuits explained hereinbefore, the second power converter 20 is implemented as an OP converter with an intermittent operation functionality, an output capacitor 30 may provide for a continuous power flow to the load Z. This is schematically illustrated in FIG. 55. FIG. 55 shows one section of the power converter circuit. Referring to FIG. 55, an output capacitor may be connected between the output node OUT1, OUT2. This output capacitor 30 is intermittently supplied with power by the second power converter 20 having an OP topology. However, by virtue of the charge storing capability of the output capacitor 30 the load Z may continuously draw power from the power converter circuit at the output OUT1, OUT2.

Figure 56:
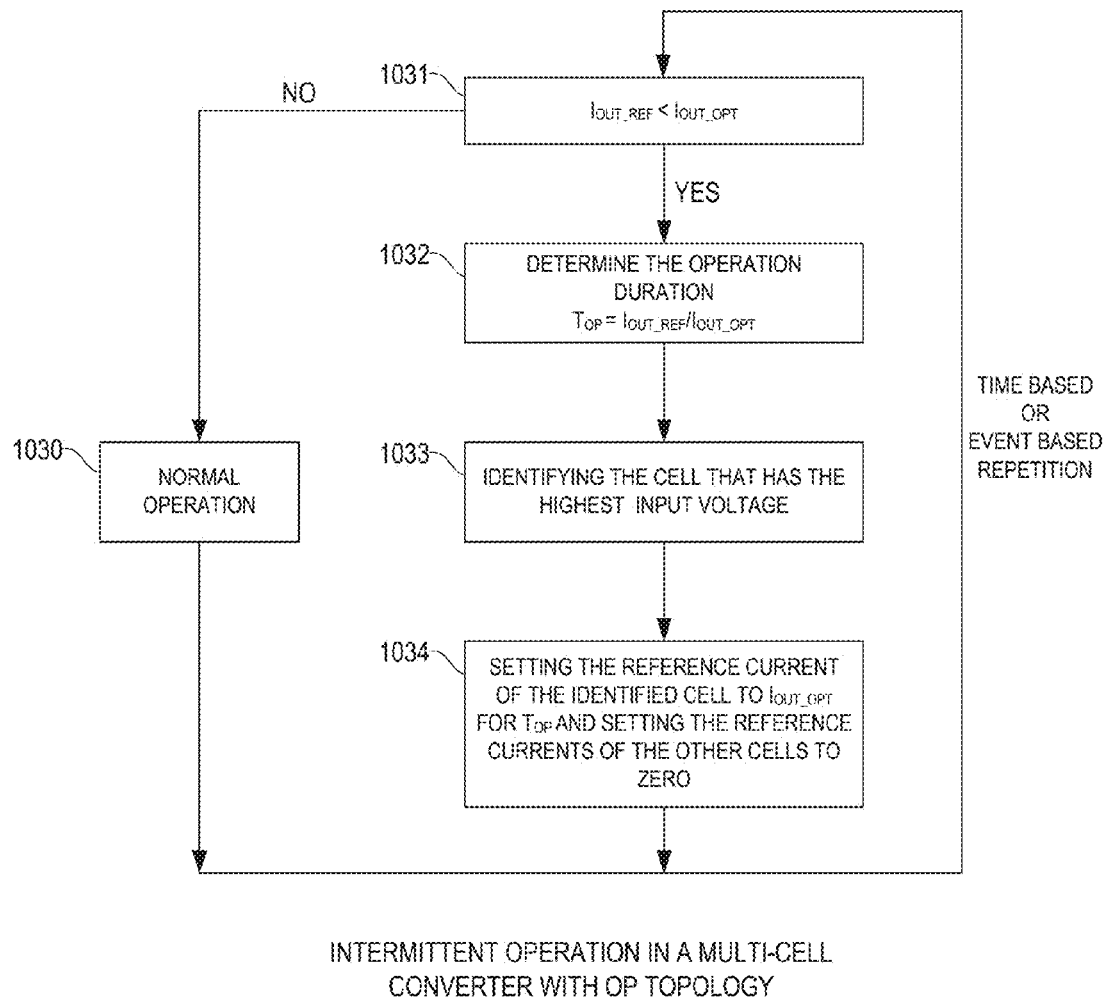
FIG. 56 illustrates one embodiment of operating a multi-cell converter with OP topology in an intermittent operation mode.

FIG. 56 shows one embodiment of a method for operating a multi-cell converter with OP topology in an intermittent mode. Referring to FIG. 56, the method includes evaluating the output current reference signal $I_{OUT\_REF}$ (1031). The output current reference signal is representative of the desired output power of the multi-cell converter. Instead of the output current reference signal, another signal representing the output power may be used as well. Evaluating the output current reference $I_{OUT\_REF}$ includes comparing the output current reference signal $I_{OUT\_REF}$ with an optimum output current signal $I_{OUT\_OPT}$ of one converter cell. This optimum output current signal represents an output power at which the converter cell either has its maximum efficiency or at which the efficiency of the converter cell is not below a predefined efficiency level. Instead of the optimum output current signal another signal representing the output power at which the converter cell either has its maximum efficiency may be used as well.

Referring to FIG. 56, if the output current reference signal $I_{OUT\_REF}$ is not below the optimum output current $I_{OUT\_OPT}$, the multi-cell converter is operated in a non-intermittent mode. This mode is referred to as normal mode (1030) in FIG. 56. This normal mode may include phase shedding, so that in the normal operation mode, some of the converter cells can be inactive, as explained with reference to FIGS. 40 to 49 hereinbefore. However, in the normal operation mode at least one converter cell is active at one time, so that there is no time period in which each of the converter cells is inactive (deactivated).

Referring to FIG. 56, if the level of output current reference signal $I_{OUT\_REF}$ is below the level of the optimum output current signal $I_{OUT\_OPT}$ of one converter cell, the multi-cell converter enters the intermittent mode in which the operation duration $T_{OUP}$ is calculated (1032) as shown in FIG. 56. Then, the converter cell that has the highest input voltage is identified and the reference current of the identified converter cell is set to $I_{OUT\_OPT}$ for the calculated time duration $T_{OP}$, and the reference currents of the other converter cells are set to zero. According to one embodiment, the power converter first enters the phase shedding mode when the level of the power reference signal (such as the output current reference signal decreases), and finally enters the intermittent mode when the power reference signal (such as the output current reference signal decreases) further decreases.

According to one embodiment, the individual converter cells are designed to have substantially the same optimum output current $I_{OUT\_OPT}$. According to another embodiment, the individual converter cells are designed to have different optimum output currents $I_{OUT\_OPT}$. In this embodiment, the intermittent operation mode may begin when the output reference signal $I_{OUT\_REF}$ falls below the level of the lowest optimum output current, then the converter cell having the highest input voltage is identified, and the operation duration is calculated based on the output current reference signal $I_{OUT\_REF}$ and the optimum output current $I_{OUT\_OPT}$ of the identified converter cell. The identified converter cell is then operated for the calculated duration at its optimum output current, while the other converter cells are operated at zero output current.

Figure 57:
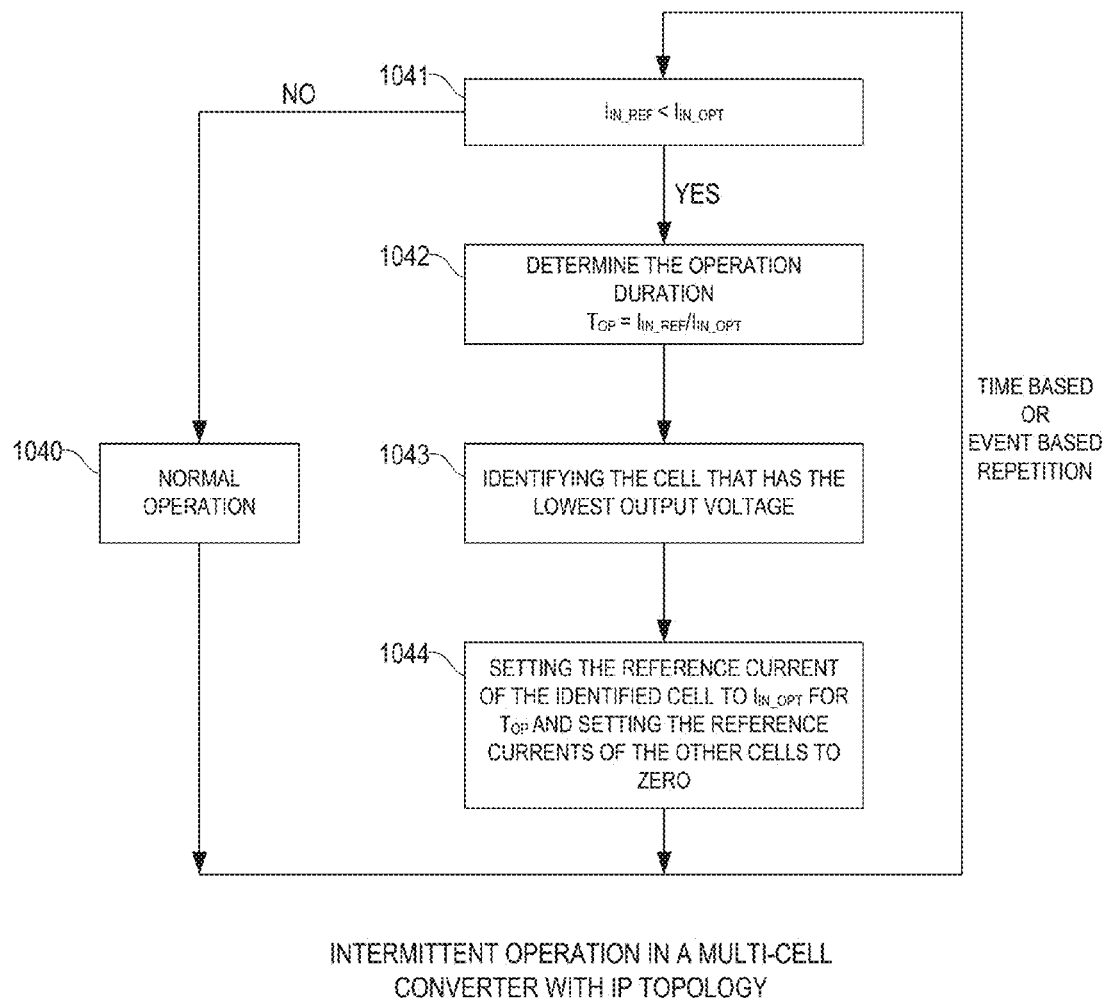
FIG. 57 illustrates one embodiment of operating a multi-cell converter with IP topology in an intermittent operation mode.

FIG. 57 shows one embodiment of a method for operating a multi-cell converter with an IP topology in the intermittent mode. The method shown in FIG. 57 is based on the method shown in FIG. 56 to which the reference is made. The difference between the method explained with reference to FIG. 56 and the method illustrated in FIG. 57 is that in the multi-cell converter with IP topology the input current reference signal $I_{IN\_REF}$ is compared with an optimum input current $I_{IN\_OPT}$ (see 1041 in FIG. 57) and that the operation duration $T_{OP}$ is calculated based on the input current reference signal $I_{IN\_REF}$ and the optimum input current $I_{IN\_OPT}$. Everything else which has been explained with reference to the method illustrated in FIG. 56 applies to the method illustrated in FIG. 57 equivalently.

Figure 58:
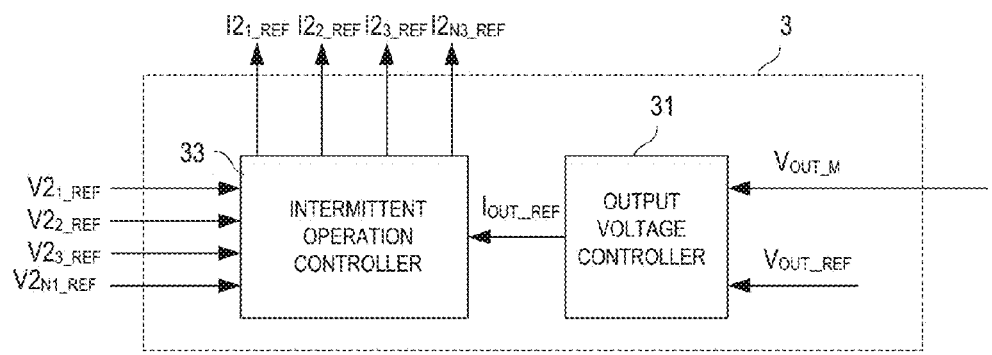
FIG. 58 shows one embodiment of a main controller in a multi-cell converter with OP topology.

FIG. 58 shows one embodiment of a main controller 3 in a multi-cell converter with OP topology. The main controller 3 is based on the main controller 3 shown in FIG. 33 and is different from this main controller shown in FIG. 33 in that an intermittent operation controller 33 receives the output current reference signal $I_{OUT\_REF}$ from the output voltage controller 31 (which may be omitted when the output current is to be controlled) and generates the output current reference signals $I2_{1\_REF}$-$I2_{N3\_REF}$ in accordance with the method explained with reference to FIG. 56. That is, the intermittent operation controller 33 sets the signal level of the identified converter cell to $I_{OUT\_OPT}$ for the calculated operation duration $T_{OP}$.

Figure 59:
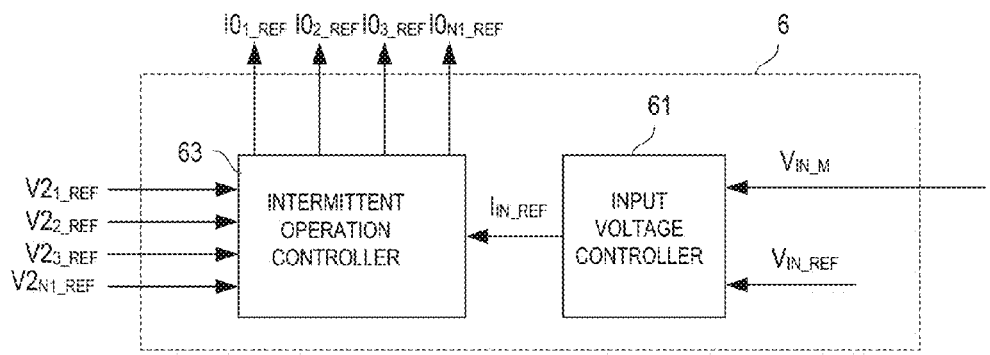
FIG. 59 shows one embodiment of a main controller in a multi-cell converter with IP topology.

FIG. 59 shows one embodiment of a main controller 6 in a multi-cell converter with an IP topology and having an intermittent operation functionality. This main converter 6 shown in FIG. 59 is based on the controller 6 shown in FIG. 39 and is different from this controller 6 shown in FIG. 39 in that it additionally includes an intermittent operation controller 62 which receives the input current reference signal $I_{IN\_REF}$ from the input voltage controller 61 (which may be omitted when the output current is to be controlled) and generates the input current reference signals $I0_{1\_REF}$-$I0_{N1\_REF}$. In accordance with the method explained with reference to FIG. 57. That is, the intermittent operation controller 63 sets the signal level of the identified converter cell to $I_{IN\_OPT}$ for calculated operation duration $T_{OP}$.

In each of the intermittent operation modes explained with reference to FIGS. 56 and 57, the output current reference signal $I_{OUT\_REF}$ and the input current reference signal $I_{IN\_REF}$, respectively, may be evaluated periodically. According to one embodiment, the multi-cell converter enters the intermittent mode when the power reference signal falls below a first threshold (referred to as $I_{OUT\_OPT}$ and $I_{IN\_OPT}$ in the embodiments shown in FIGS. 56 and 57) and leaves the intermittent mode when the power reference signal rises above a second threshold higher that the first threshold. Such hysteresis prevents the multi-cell converter from frequently switching between the intermittent and the non-intermittent mode when the power reference signal has a level which is close to the first threshold.

Figure 60:
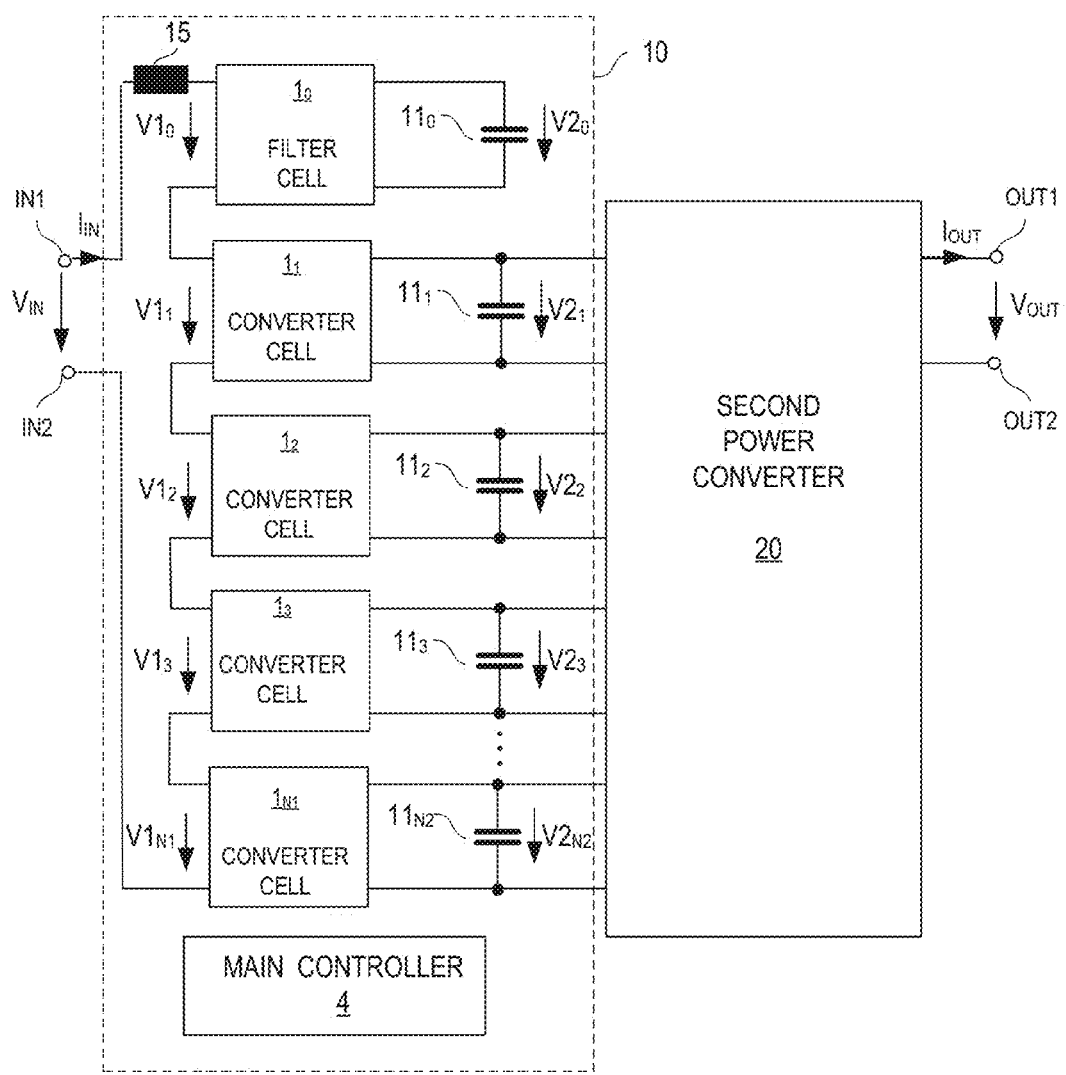
FIG. 60 shows one embodiment of a multi-cell converter which includes a filter cell.

FIG. 60 shows one embodiment of a power converter circuit in which the power converter 10 has an IS topology and, additionally to the converter cells $1_1$-$1_{N1}$, includes a filter cell $1_0$. As explained before, the converter cells $1_1$-$1_{N1}$ are each configured to receive a cell input power at a cell input, and to provide a cell output power at a cell output, to which the DC link capacitor $11_1$-$11_{N2}$ is connected thereto. The second power converter 20 is connected to the DC link capacitors $11_1$-$11_{N2}$ of the first power converter 10. The second power converter 20 may be implemented with one of the second power converter topologies explained hereinbefore.

The filter cell $1_0$ includes a capacitor $11_0$ (which is drawn outside the block representing the filter cell $1_0$ in FIG. 60). Unlike the DC link capacitors $11_1$-$11_{N2}$, the capacitor $11_0$ of the filter cell $1_0$ is not connected to the second power converter 20. The filter cell $1_0$ can be operated in an input power mode, in which the filter cell receives an input power at an terminal of the filter cell, and an output power mode, in which the filter cell provides an output power at the gate of the filter cell $1_0$. The terminal of the filter cell includes two nodes and is connected in series with the cell inputs of the converter cells $1_1$-$1_{N1}$. The series circuit with the cell inputs of the converter cells $1_1$-$1_{N1}$ and the terminal of the filter cell $1_0$ is connected to the input IN1, IN2 of the power converter circuit.

Figure 61:
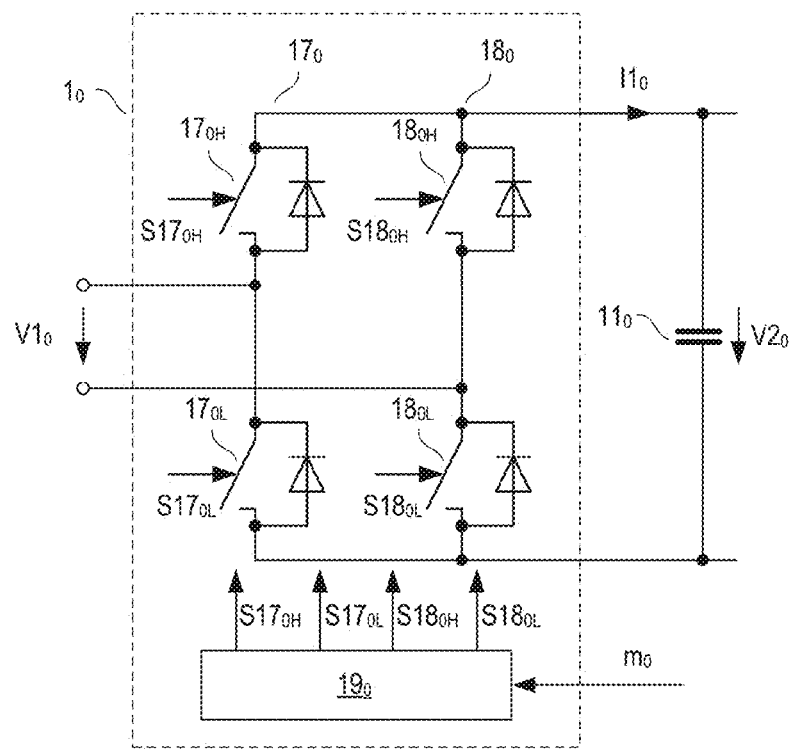
FIG. 61 shows one embodiment of the filter cell shown in FIG. 60.

The filter cell $1_0$ can be implemented with the same topology as the converter cells $1_1$-$1_{N1}$. One embodiment of the filter cell $1_0$ is shown in FIG. 61. In the embodiment shown in FIG. 61, the filter cell $1_0$ is implemented with a full-bridge topology, which is explained with reference to FIG. 24 above. In the filter cell $1_0$ shown in FIG. 61, the individual components have the same reference characters as the corresponding components in the converter cell $1_i$ shown in FIG. 24, where a subscript index "0" has been added to the reference characters in the filter cell $1_0$ shown in FIG. 61. The operation of the filter cell $1_0$ corresponds to the operation of the converter cell $1_i$. That is, a controller $19_0$ of the filter cell $1_0$ receives a modulation index $m_0$ and controls operation of the low-side switch $17_{0L}$ and the high-side switch $17_{0H}$ of the first half bridge $17_0$ and of the low-side switch $18_{0L}$ and the high-side switch $18_{0H}$ of the second half bridge $18_0$ based on the modulation index $m_0$ in accordance with one of the modulation schemes explained with reference to FIGS. 26A and 26B.

Implementing the filter cell $1_0$ with a full-bridge topology is only an example. The filter cell $1_0$ could also be implemented with only one half-bridge (as explained with reference to FIG. 12) when the input voltage $V_{IN}$ is a rectified sine voltage or a direct voltage.

Figure 62:
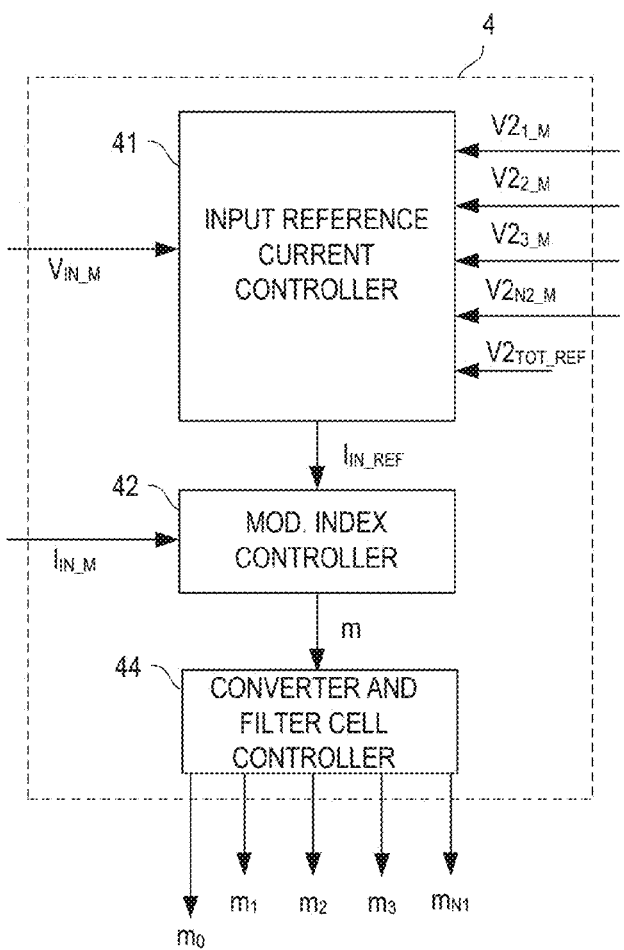
FIG. 62 shows one embodiment of a main controller in the multi-cell converter shown in FIG. 60.

The operation of a first power converter 10 shown in FIG. 60 is controlled by a main controller 4. One embodiment of this main controller is shown in FIG. 62. This main controller 4 is based on the main controller 4 shown in FIG. 13 (to the specification of which reference is made, and is different from the main controller 4 shown in FIG. 13 in that it additionally includes a converter and filter cell controller 44 which receives the modulation index from the modulation index controller 42. The converter and filter cell controller 44 provides a modulation index $m_0$ to the filter cell $1_0$ and modulation indices $m_1$-$m_{N1}$ to the converter cells $1_1$-$1_{N1}$.

Figure 63:
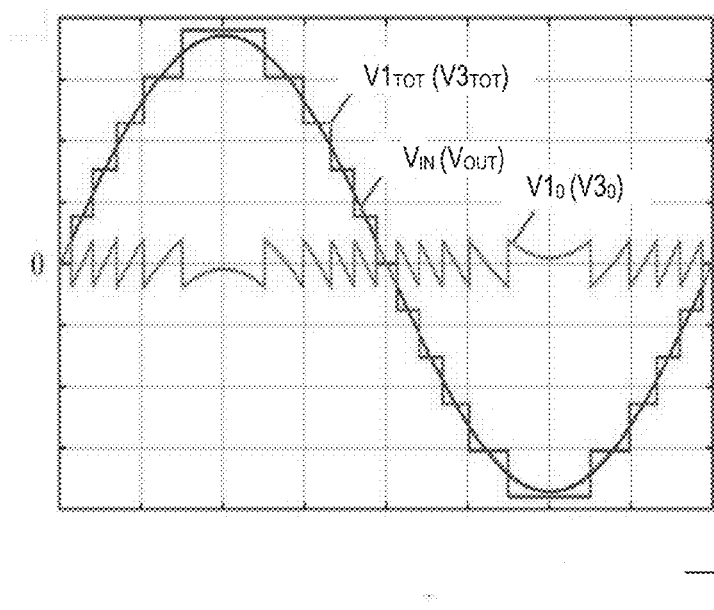
FIG. 63 shows timing diagrams which illustrate one way of operation of the multi-cell converter shown in FIG. 60.

FIG. 63 illustrates one way of operation of the first power converter 10 shown in FIG. 60 during one period of a sinusoidal input voltage $V_{IN}$. In FIG. 63 $V1_{TOT}$ denotes the total cell input voltage and V10 denotes the average cell input voltage of the filter cell, that is, the cell input voltage averaged over one or more drive cycles. In the first power converter 10 shown in FIG. 60, only the filter cell $1_0$ is operated in a switched-mode at the switching frequency such as, for example 20 kHz or higher. The converter cells may be operated in the block mode. That is, these converter cells may switch at a frequency which is twice the frequency of the input voltage $V_{IN}$, so that each converter cell is switched to the off-state and the on-state only once during one halfwave of the input voltage $V_{IN}$. That is, based in an instantaneous voltage level of the input voltage $V_{IN}$ the converter cells are operated in one of two operation modes, the on-mode or the off-mode. However, it is also possible to switch the converter cells at the switching frequency of the converter cell $1_0$.

Figure 64:
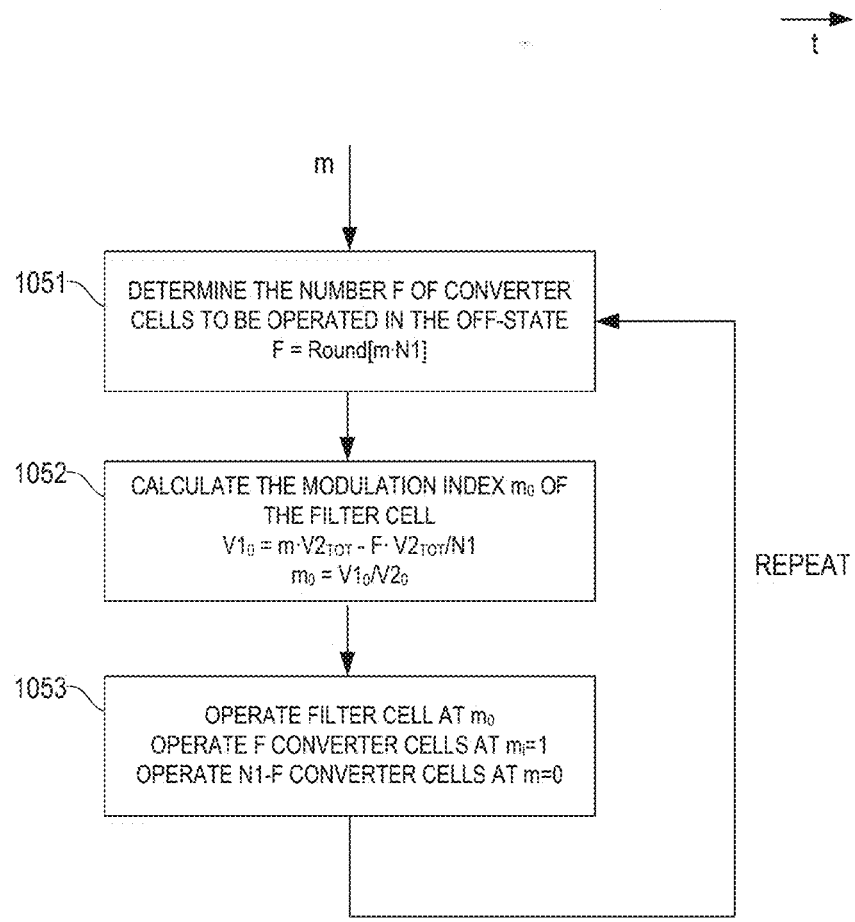
FIG. 64 shows one embodiment of operating the multi-cell converter shown in FIG. 60.

FIG. 64 shows one embodiment of a method for calculating the modulation index $m_0$ of the filter cell, and the modulation indices of the converter cells. For the purpose of explanation it is assumed that the DC link voltages of the converter cells are substantially equal, that is, equal to $V2_{TOT}/N1$. Referring to FIG. 64, the method includes calculating a number F of converter cells that are to be operated in the off-state (1051). The total cell input voltage $V1_{TOT}$ provided by those F converter cells is $F \cdot V2_{TOT}/N1$. Calculating this number F includes determining the number F of converter cells to be operated in the off-state by calculating $$F = \text{Round}[m \cdot N1] \quad (23),$$

that is, by the product of the modulation index m and the number N1 of converter cells, and by rounding the result. The modulation index $m_0$ of the filter cell $1_0$ is then calculated (1052) based on the voltage $V2_0$ across the capacitor $11_0$ and the desired average voltage $V1_0$ at the gate of the filter cell $1_0$ during one drive cycle by $m_0 = V1_0/V2_0$, where $V2_0$ is the voltage across the capacitor $11_0$ and $V1_0$ is the desired voltage at the gate of the filter cell. The desired voltage $V1_0$ at the terminal of the filter cell corresponds to the $$V1_0 = m \cdot V2_{TOT} - \frac{F \cdot V2_{TOT}}{N1}, \quad (24)$$

where m is the modulation index calculated by the modulation index controller, and $V2_{TOT}$ is the total DC link voltage.

The converter and filter cell controller 44 then operates (1053) the filter cell at the calculated modulation index $m_0$, operates F converter cells in the off-state (modulation index $m_i$=1), and operates N1−F converter cells in the on-state (modulation index $m_i$=0). This determining 1051, calculating 1052 and operating 1053 may be repeated cyclically. According to one embodiment these steps are repeated regularly. According to one embodiment, a frequency at which these steps are repeated is less than 0.1 times, or even less than 0.01 times the switching frequency in the filter cell $1_0$.

Referring to the explanation above, the converter may be operated in the block mode so that they are switched to the off-state and back to the on-state only once in each halfwave. In a multi-cell converter implemented with a filter cell in which the converter cells are operated in the block mode the filter cell may be optimized in terms of low switching losses, while the converter cells may be implemented in terms of low conduction losses.

The method illustrated in FIG. 64 applies to the positive halfwave of the input voltage. During the negative halfwave the method is different from the method shown in FIG. 64 in that F is calculated based on the absolute value of the modulation index (which is negative during the negative half-wave) and that the F converter cells are operated at a modulation index $m_i = -1$ During one halfwave of the input voltage $V_{IN}$ the converter cells are either operated at $m_i=1$ (or −1) or $m_i=0$. The sign of the modulation index $m_0$ of the filter cell $1_0$ may vary. That is, the modulation index $m_0$ can become positive and negative during one halfwave. During the positive halfwave, when the modulation index $m_0$ is positive, the filter cell $1_0$ receives power from the input IN1, IN2. When the modulation index $m_0$ is negative, the filter cell $1_0$ supplies power to the series circuit with the converter cells $1_1$-$1_{N1}$. During the negative halfwave a positive modulation index $m_0$ indicates that the filter cell $1_0$ supplies power, and a negative modulation index $m_0$ indicates that the filter cell $1_0$ receives power. Thus, the filter cell receives power (is in an input power mode) when the sign of the modulation index $m_0$ equals the sign of the overall modulation index m, and supplies power (is in the output power mode) when the signs are different. Basically, the average power, the filter cell $1_0$ receives in one half-period of the input voltage $V_{IN}$ is zero so that the voltage $V2_0$ across the capacitor $11_0$ swings around a certain voltage level, such as zero.

For example, during the positive halfwave, the modulation index is positive when the sum of the cell output voltages of the F converter cells that are in the off-state is lower than the level of the input voltage, and is negative when the sum of the cell output voltages of the F converter cells that are in the off-state is higher than the level of the input voltage $V_{IN}$. During the negative halfwave, the modulation index is negative when the sum of the cell output voltages of the F converter cells that are in the off-state is lower than the (absolute value of the) level of the input voltage, and is positive when the sum of the cell output voltages of the F converter cells that are in the off-state is higher than the (absolute value of the) level of the input voltage $V_{IN}$.

Figure 65:
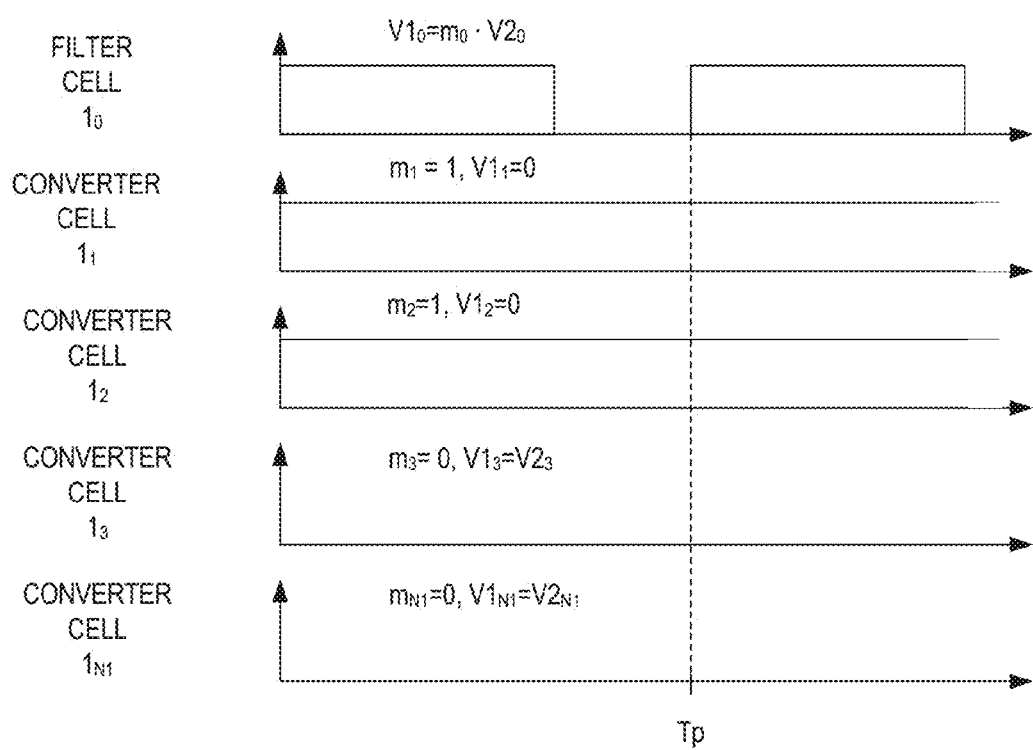
FIG. 65 shows timing diagrams which illustrate one way of operation of the multi-cell converter shown in FIG. 60.

FIG. 65 illustrates operation of the first power converter 10 shown in FIG. 60 during one drive cycle (having the duration Tp). In this embodiment, two of the converter cells are in the off-state during the complete duration Tp of the drive cycle, and two of the converter cells are in the on-state during the complete duration of the drive cycle Tp. The filter cell $1_0$ is operated in a switched mode based on the modulation index $m_0$ (where duty cycle do is given by $d_0=1-m_0$).

Referring to the above, the converter cells may be operated in the block mode. However, it is also possible to operate the multi-cell converter such that a group of converter cells that are in the off-state and, consequently, another group of converter cells that are in the on-state, may change from drive cycle to drive cycle. However, it is also possible, to operate the same converter cells in the off-state and the same converter cells in the on-state until the modulation index $m_0$ of the filter cell $1_0$ is calculated anew. In this way, the DC link capacitors are more equally charged.

Figure 66:
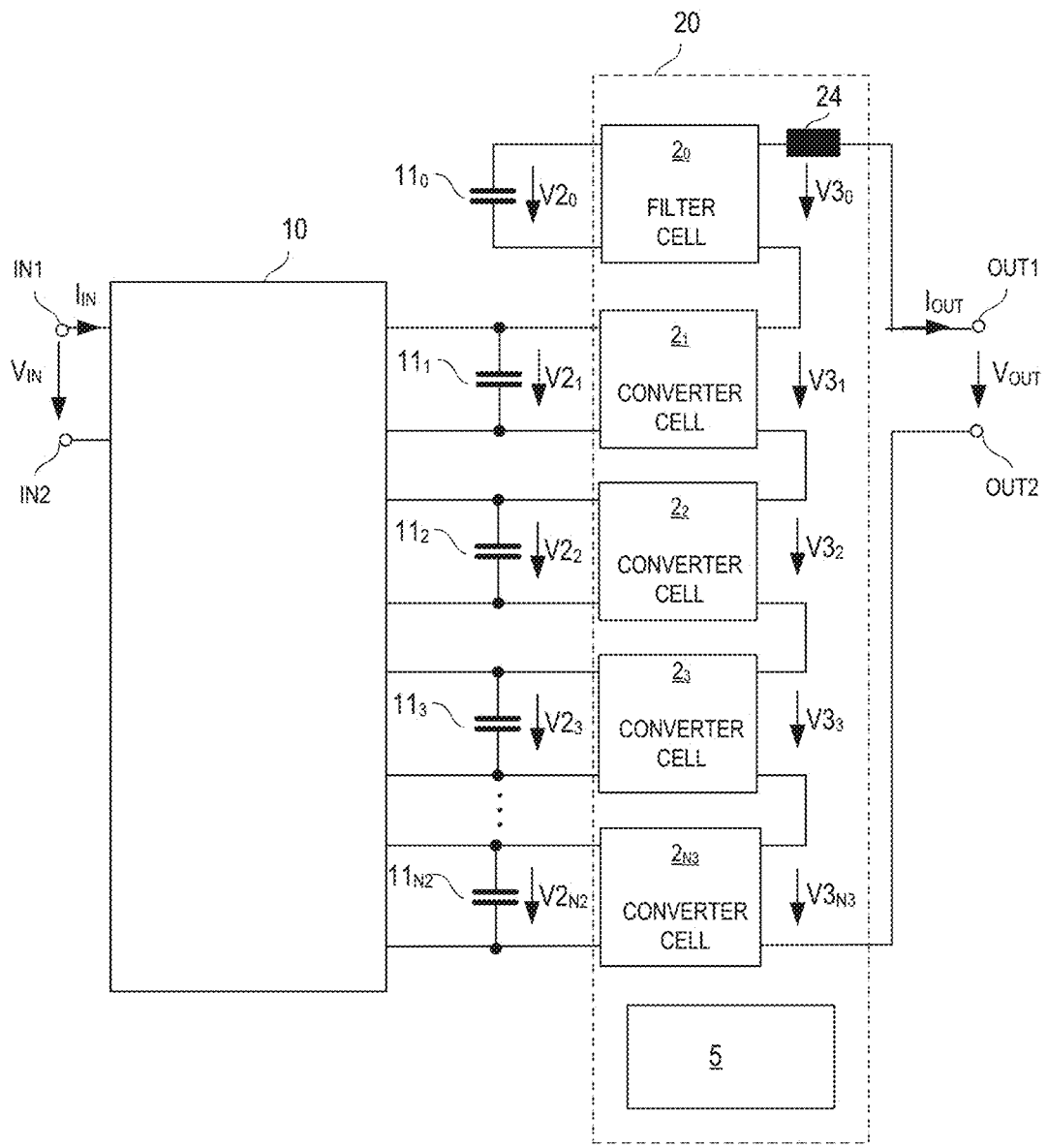
FIG. 66 shows one embodiment of a multi-cell converter which includes a filter cell.

FIG. 66 shows one embodiment of a second power converter 20 which includes a filter cell $2_0$. Like the filter cell $1_0$ shown in FIG. 60, the filter cell $1_0$ includes an terminal. The terminal of the filter cell $2_0$ is connected in series with cell outputs of the filter cells $2_1$-$2_{N3}$. The series circuit with the terminal of the filter cell $2_0$ and the cell outputs $2_1$-$2_{N3}$ of the converter cells is connected to the output OUT1, OUT2. In order for the illustration shown in FIG. 66 to be consistent with the illustration shown in FIG. 60, a capacitor of the filter cell $2_0$, like the capacitor shown in FIG. 60 is labeled with $11_0$. $V2_0$ is the voltage across the capacitor of the filter cell $2_0$. The operation of the filter cell $2_0$ shown in FIG. 66 corresponds to the operation of the filter cell shown in FIG. 60, with the difference that the filter cell $2_0$ shown in FIG. 66 provides a voltage $V3_0$, which is added to a total cell output voltage $V3_{TOT}$ of the converter cells.

Figure 67:
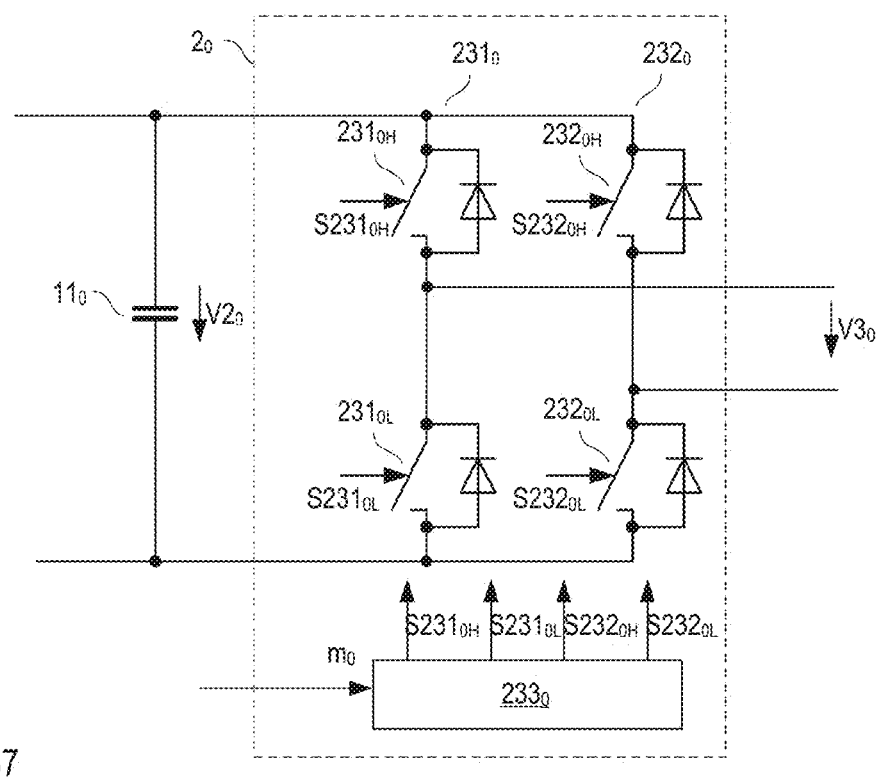
FIG. 67 shows one embodiment of the filter cell shown in FIG. 66.

FIG. 67 shows one embodiment of the filter cell $2_0$. The full-bridge topology of this filter cell $2_0$ corresponds to the topology of the converter cell $2_i$ shown in FIG. 34. However, a topology with only one half-bridge may be used as well.

Just to illustrate that the filter cell $2_0$ is different from the converter cell a subscript index "0" has been added to the reference characters of the individual components of the filter cell $2_0$. The operation of the filter cell $2_0$ corresponds to the operation of the converter cell $2_i$. That is, a controller $233_0$ of the filter cell $2_0$ receives a modulation index $m_0$ and drives a first half bridge $231_0$ and a second half bridge $232_0$ with a duty cycle calculated based on the modulation index $m_0$.

Figure 68:
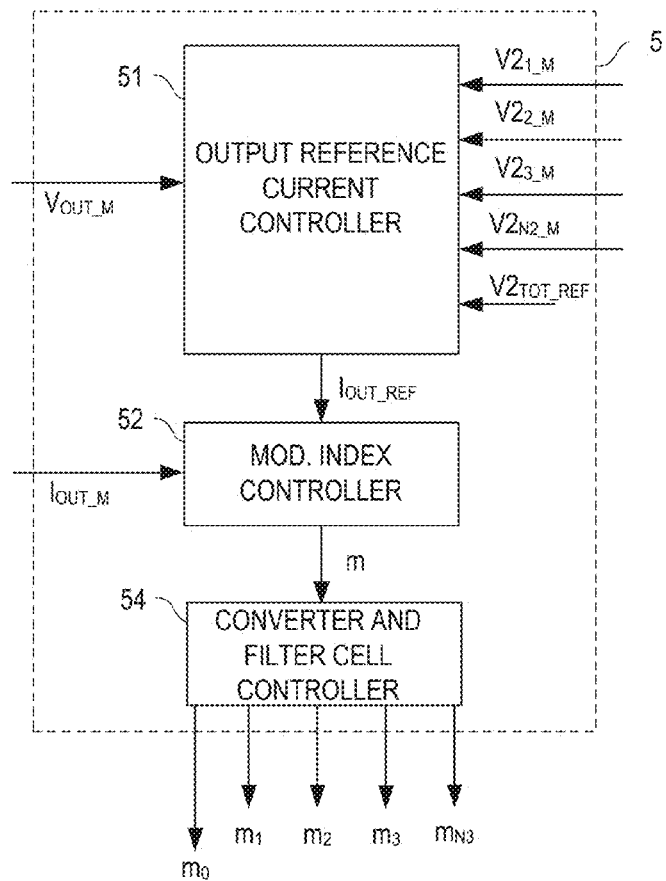
FIG. 68 shows one embodiment of a main controller in the multi-cell converter shown in FIG. 66.

FIG. 68 shows one embodiment of a main controller 5 in the second power converter 20 shown in FIG. 66. This main controller 5 is based on the main controller 5 shown in FIG. 35, and is different from the main controller 5 shown in FIG. 35 in that it additionally includes a converter and filter cell controller 54 which receives the modulation index m from the modulation index controller 52 and the provides the modulation index $m_0$ to the filter cell $2_0$, and modulation indices $m_1$-$m_{N3}$ to the individual converter cells $2_1$-$2_{N3}$. The converter and filter cell controller 54 shown in FIG. 68 operates like the converter and filter cell controller 44 shown in FIG. 62, to which reference is made. A difference between the converter and filter cell controller shown in FIG. 54 and the convergent filter cell controller shown in FIG. 62 is that the converter and filter cell controller shown in FIG. 55 generates the modulation indices $m_0$-$m_{N3}$ based on the total cell output voltage $V3_{TOT}$ instead of the total cell input voltage $V1_{TOT}$.

Figure 69:
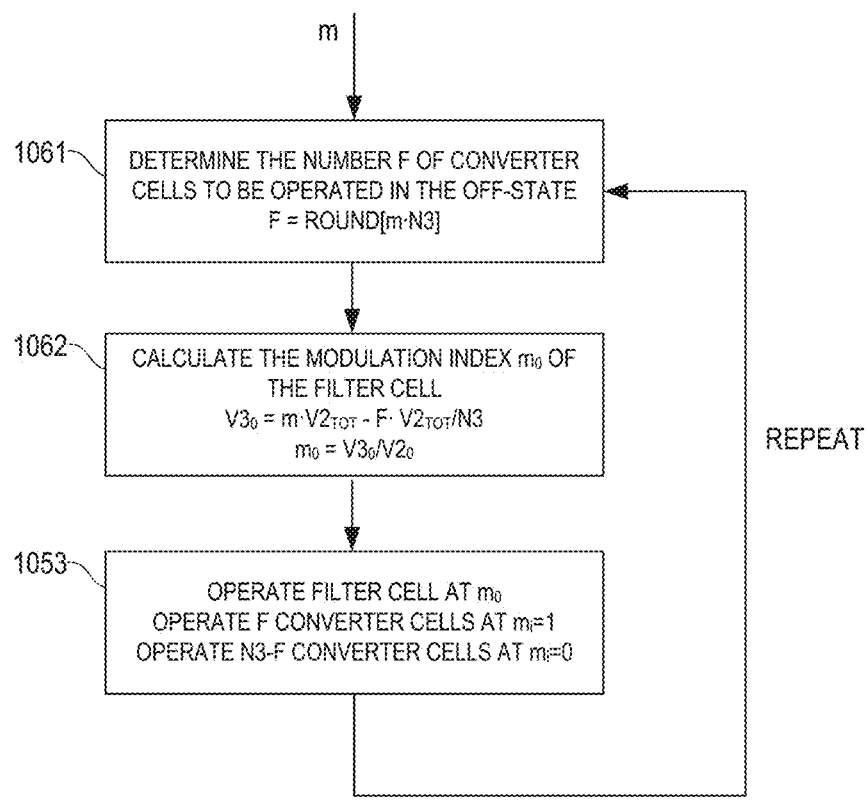
FIG. 69 shows one embodiment of operating the multi-cell converter shown in FIG. 66.

FIG. 69 shows one embodiment of a method that may implemented in the converter and filter cell controller 54 shown in FIG. 68. This method includes determining the number F of converter cells to be operated in the off-state by $$F = \text{Round}[m \cdot N3] \quad (25),$$

that is, by calculating the product of the modulation index m and the number N3 of converter cells, and by rounding the result (1061). Then the modulation index $m_0$ is calculated similar to calculating the modulation index $m_0$ in the method shown in FIG. 64, with the difference that the modulation index $m_0$ in the method shown in FIG. 69 is calculated based on the desired cell output voltage $V3_0$ of the filter cell $2_0$ (instead of the desired cell input voltage $V1_0$). The desired cell output voltage $V3_0$ of the filter cell $2_0$ is $$V3_0 = m \cdot V2_{TOT} - \frac{F1 \cdot V2_{TOT}}{N3}, \quad (26)$$

and the modulation index $m_0 = V3_0/V2_0$. The converter and filter cell controller 54 then operates the filter cell $1_0$ at the modulation index $m_0$, F converter cells at a modulation index $m_i=1$, and N3−F converter cells at a modulation index $m_i=0$. The timing diagrams shown in FIG. 63 apply to the second power converter 20 shown in FIG. 66 equivalently. The parameters of the second power converter 20 are indicated in brackets in FIG. 63. The filter cell $2_0$ supplies power (is in an output power mode) to the output OUT1, OUT2 when the modulation index $m_0$ has a sign which equals the sign of the overall modulation index m, and receives power (is in an input power mode) when the signs are different. The signs are equal, when the sum of the cell input voltages of those converter cells which are in the off-state is lower than the instantaneous level of the output voltage, and the signs are different, when the sum of these voltages is higher than the instantaneous level of the output voltage.

Another degree of freedom a multi-cell converter topology offers is the type of connection between the individual converter cells. In the embodiments explained hereinbefore, the converter cells of one multi-cell converter have their cell inputs connected in series (IS topology) or in parallel (IP topology), or have their outputs connected in series (OS topology) or in parallel (OP topology). According to one embodiment, the multi-cell converter includes at least two converter cells in which the type of connection between the two converter cells can change between a parallel connection and a series connection.

That is, these two converter cells are either series connected or parallel connected. This is explained for two converter cells of a multi-cell first power converter 10 with reference to FIGS. 70-73, and for two converter cells of a multi-cell second power converter 20 with reference to FIGS. 73-75.

Figure 70:
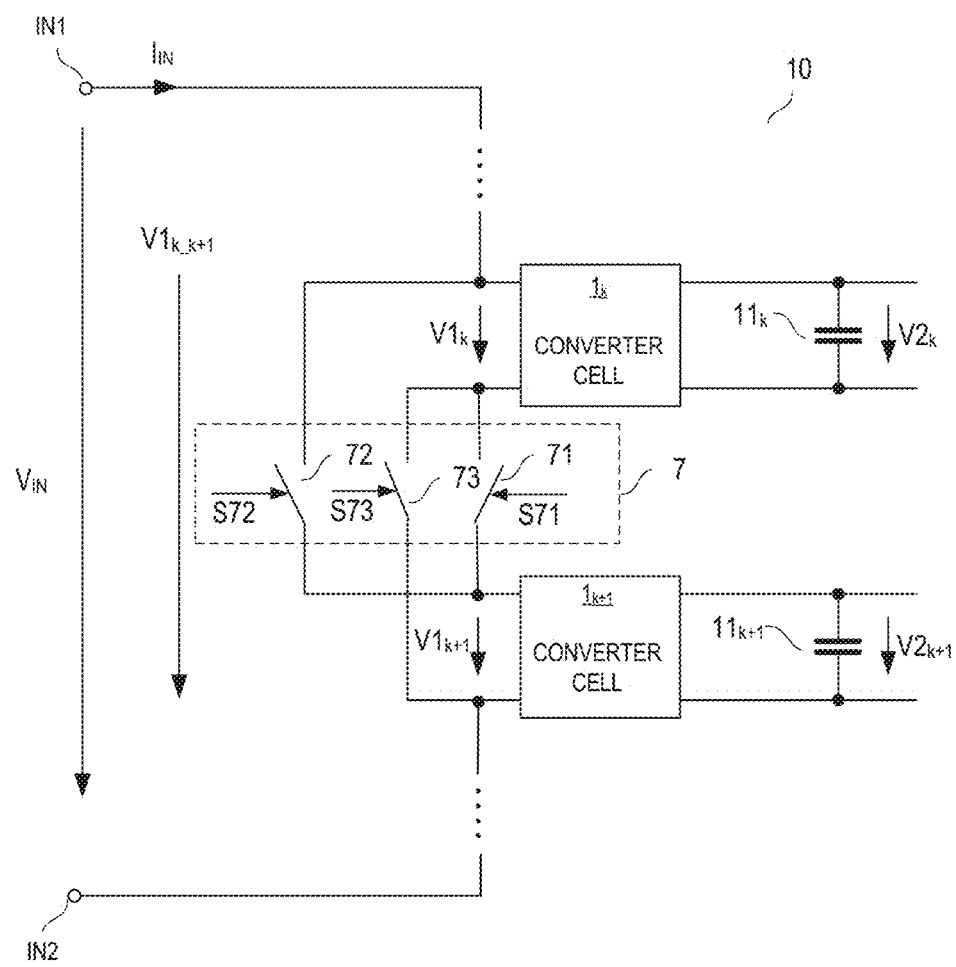
FIG. 70 shows two converter cells of a multi-cell converter and a switch circuit which connects the cell inputs either in series or in parallel.

In FIG. 70 reference character $1_k$ and $1_{k+1}$ denote two converter cells of the first power converter 10. $11_k$, $11_{k+1}$ denote the corresponding DC link capacitors, and $V2_k$, $V2_{k+1}$ denote the corresponding DC link voltages. Each of the converter cells $1_k$, $1_{k+1}$ includes a cell input with a first cell input node, and a second cell input node. A switch arrangement 7 is connected between the cell inputs of the converter cells $1_k$, $1_{k+1}$ and is configured to connect the cell inputs either in series or in parallel. The switch arrangement 7 includes a first switch 71 connected between a first cell input node of the converter cell $1_{k+1}$ and a second cell input node of the converter cell $1_k$. A second switch 72 is connected between a first cell input node of the converter cell $1_k$ and the first cell input node of the converter cell $1_{k+1}$. A third switch 73 is connected between a second cell input node of the converter cell $1_k$, and the second cell input node of the converter cell $1_{k+1}$. The converter cells $1_k$, $1_{k+1}$ have their cell inputs connected in series when the first switch 71 is switched on, and when the second and third switch are switched off. In this case, the second cell input of converter cell $1_k$ is connected to the first cell input of converter cell $1_{k+1}$. The two converter cells $1_k$, $1_{k+1}$ have their cell inputs connected in parallel when the first switch 71 is switched off, and when each of the second and third switch 72, 73 is switched on. In this case, the first cell input node of converter cell $1_k$ is connected to first cell input node of converter cell $1_{k+1}$, and the second cell input node of converter cell $1_k$ is connected to the second cell input node of converter cell $1_{k+1}$.

As indicated by the dotted lines shown in FIG. 70, the multi-cell power converter may include further converter cells, besides the converter cells $1_k$, $1_{k+1}$. The converter cells $1_k$, $1_{k+1}$ shown in FIG. 70 can be arranged in different ways in the multi-cell converter. According to one embodiment, the first cell input node of converter cell $1_k$ is connected to the first input node IN1 of the multi-cell converter 10, and at least one further converter cell is connected between the second cell input node of the converter cell $1_{k+1}$ and the second input node IN2 of the multi-cell converter 10. According to one embodiment, two or more converter cells are connected between the converter cell $1_{k+1}$ and the second input node IN2, wherein these two or more converter cells have their cell inputs connected in series between the second cell input node of converter cell $1_{k+1}$ and the second input node IN2. According to a further embodiment, the second cell input node of the converter cell $1_{k+1}$ is connected to the second input node IN2 of the multi-cell converter 10, and at least one further converter cell is connected between the first cell input node of converter cell $1_k$ and the first input IN1. According to one embodiment, two or more converter cells are connected between the first input node IN1 and the first cell input node of the converter cell $1_k$, wherein these two or more further converter cells have their cell inputs connected in series. According to another embodiment, two or more converter cells are connected between each input IN1, IN2 and the converters cells $1_k$, $1_{k+1}$, respectively.

Further, each of the two converter cells $1_k$, $1_{k+1}$ includes an inductor (not shown in FIG. 70, but as explained with reference to various converter cell topologies above).

According to one embodiment, the converter cells $1_k$, $1_{k+1}$ shown in FIG. 70 (and the other converter cells which are not shown in FIG. 70) have one of the converter topologies explained with reference to FIGS. 12 and 24 (boost topology or full-bridge topology).

Figure 71:
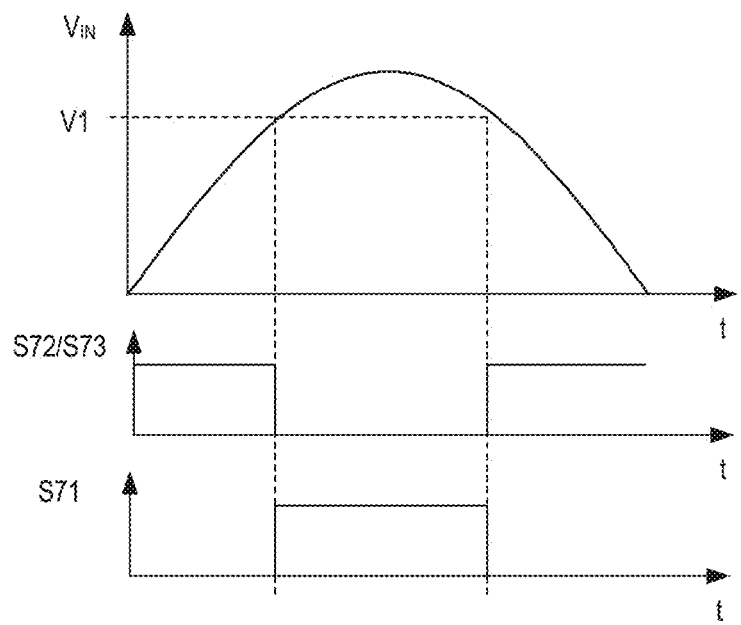
FIG. 71 shows timing diagrams which illustrate one way of operation of the converter cells shown in FIG. 70.

FIG. 71 shows one way of operating the multi-cell power converter 10 shown in FIG. 70. In this embodiment, the type of connection between converter cell $1_k$ and the converter cell $1_{k+1}$ is dependent on an instantaneous voltage level of the input voltage $V_{IN}$. For example, if the voltage level of the input voltage $V_{IN}$ is below a voltage threshold V1, the two converter cells $1_k$, $1_{k+1}$ are connected in parallel. In FIG. 71 this is indicated by an on-level (high level) of drive signals S72, S73 of the second and third switches 72, 73, and an off-level (low level) of a drive signal S71 of the first switch 71. An on-level of one of the drive signal S71-S73 indicates that the respective switch is in the on-state, and an off-level indicates that the respective switch is in the off-state. When the voltage level of the input voltage $V_{IN}$ is above the voltage threshold V1, the converter cells $1_k$, $1_{k+1}$ are connected in series. In FIG. 71 this is indicated by an off-level of the drive signals S72, S73 of the second and third switches 72, 73, and an on-level of the drive signal S71 of the first switch 71.

Each of the converter cells $1_k$, $1_{k+1}$ can be operated in one of an on-state and an off-state. In the on-state, the cell input voltage $V1_k$, $V1_{k+1}$ of each converter cell are substantially zero. When the converter cells $1_k$, $1_{k+1}$ are connected in series, a total cell input voltage $V1_{k\_k+1}$ of the converter cells $1_k$, $1_{k+1}$ is one of 0 (zero), $V2_k$, $V2_{k+1}$, and $V2_k+V2_{k+1}$, dependent on which of the two converter cells $1_k$, $1_{k+1}$ is in the on-state or in the off-state. If the two converter cells $1_k$, $1_{k+1}$ are connected in parallel, the total cell input voltage $V1_{k\_k+1}$ is zero when both converter cells $1_k$, $1_{k+1}$ are in the on-state. If both converter cells $1_k$, $1_{k+1}$ are in the off-state (and the converter cells are implemented with a full bridge topology), the total cell input voltage $V1_{k\_k+1}$ is dependent on the voltage $V2_k$, $V2_{k+1}$ across the DC link capacitors $11_k$, $11_{k+1}$. If these voltages are equal ($V2_k=V2_{k+1}$), the voltage level of the total cell input voltage $V1_{k\_k+1}$ corresponds to the voltage level of the DC link voltages $V2_k$, $V2_{k+1}$. If these voltages $V2_k$, $V2_{k+1}$ are not equal, there may be a charge balancing such that electrical charge from the DC link capacitor which has the higher voltages transferred to the DC link capacitor which has the lower voltage until these voltages are balanced such that the voltage levels of these two voltages $V2_k$, $V2_{k+1}$ are equal. The voltage level of the total cell input voltage $V1_{k\_k+1}$ then equals the voltage level of the balanced DC link voltages $V2_k$, $V2_{k+1}$.

Referring to the above, the maximum level of the total cell input voltage $V1_{k\_k+1}$ when the converter cells $1_k$, $1_{k+1}$ are connected in parallel is lower than the maximum level of the total cell input voltage $V1_{k\_k+1}$ when the converter cells $1_k$, $1_{k+1}$ are connected in series. When the input voltage $V_{IN}$ is below the threshold V1, the lower cell input voltage (in connection with the cell input voltages of the other converter cells) may be sufficient to track the voltage level of the input voltage $V_{IN}$, while a higher cell input voltage may be required when the voltage level of the input voltage $V_{IN}$ is above the voltage threshold V1.

Connecting the two converter cells $1_k$, $1_{k+1}$ in parallel when the input voltage $V_{IN}$ is below the voltage threshold V1, may be beneficial at a high level of the converted power. If, for example, the input current $I_{IN}$ is relatively high, even before the input voltage $V_{IN}$ reaches the voltage threshold V1, so that the input power of one converter cell is higher than the power at which the converter cell may have its maximum efficiency, the two parallel connected converter cells $1_k$, $1_{k+1}$ can share this input power so that each of these converter cells is operated at an efficiency which is higher than the efficiency of only one converter cell which converts the input power. For example, operating two parallel connected converter cell at a power which is only 50% of the maximum power may be more efficient than operating only one converter cell at the maximum power.

Figure 72:
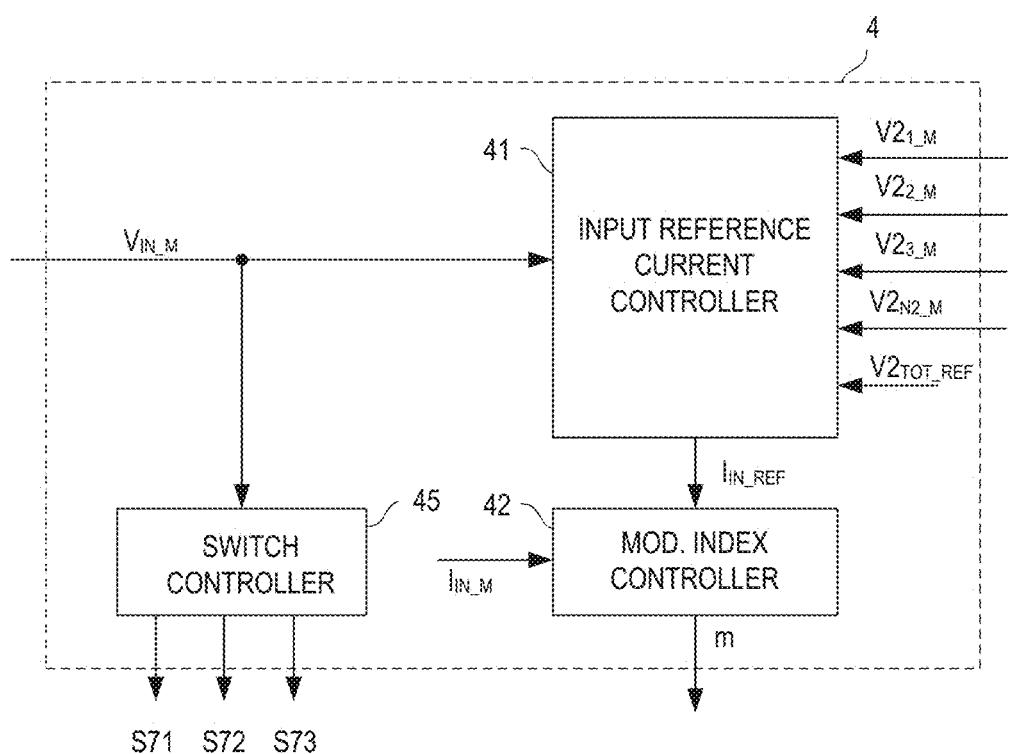
FIG. 72 shows one embodiment of a main controller in a multi-cell converter with two rearrangeable converter cells as shown in FIG. 70.

FIG. 72 shows one embodiment of a main controller 4 which is configured to control the converter cells in the multi-cell power converter 10 shown in FIG. 70. This main controller 4 is based on the main controller 4 shown in FIG. 13, and is different from the main controller shown in FIG. 13 in that it additionally includes a switch controller 45. The switch controller 45 receives the input voltage signal $V_{IN\_M}$ and is configured to operate the individual switches 71-73 of the switch circuit 7 dependent on a voltage level of the input voltage $V_{IN}$. The switch controller 45, which generates the drive signals S71-S73 of the switches 71-73, may operate the switches 71-73 as shown in FIG. 71. That is, the switch controller 54 may operate the switches 71-73 such that the cell inputs of the converter cells $1_k$, $1_{k+1}$ are connected in parallel when a voltage level of the input voltage $V_{IN}$ is below the threshold V1, and connected in series when the voltage level of the input voltage $V_{IN}$ is above the threshold V1. The main controller 4 shown in FIG. 72 is configured to operate the individual converter cells of the multi-cell converter 10 with the same modulation index m. However, it is also possible to operate the individual converter cells with different modulation indices.

According to one embodiment, the main controller 4 is configured to connect the two converter cells $1_k$, $1_{k+1}$ in series and to operate only one of the converter cells $1_k$, $1_{k+1}$ when the level of the input voltage $V_{IN}$ is below a second threshold lower than the first threshold V1, to connect both converter cells $1_k$, $1_{k+1}$ in parallel when the level of the input voltage $V_{IN}$ is below the second and the third threshold, and to connect the converter cells $1_k$, $1_{k+1}$ in series again when the level of the input voltage $V_{IN}$ is above the first threshold. "Operating only one converter cell" of the two parallel cells is equivalent to controlling the input current of one of the two cells to zero.

Although the multi-cell converter 10 shown in FIG. 70 is drawn to include only two converter cells which may be have their inputs connected either in parallel or in series, the multi-cell converter 10 is not restricted to having only two of those rearrangeable converter cells. "Rearrangeable" converter cells are converter cells that by a switch circuit 7 may either have their cell inputs connected in parallel, or connected in series. According to one embodiment, the multi-cell converter 10 includes further rearrangeable converter cells. This may be obtained by providing a switch circuit of the type shown in FIG. 70 between two converter cells other than the converter cells $1_k$, $1_{k+1}$ shown in FIG. 70. It is also possible, to provide a switch arrangement of the type shown in FIG. 70 between one of the converter cells $1_k$, $1_{k+1}$ and another converter cell (not shown). In this case, an arrangement of converter cells is obtained in which two or three converter cells can be connected in parallel. According to one embodiment, in a multi-cell converter 10 with N1 converter cells, there are N1−1 switch arrangements, so that there is a switch arrangement between each pair of two neighboring converter cells. In this embodiment, up to N1 converter cells can be connected in parallel.

In the embodiment shown in FIG. 70, there are two converter cells $1_k$, $1_{k+1}$ that can be connected in parallel. According to another embodiment, each of the two converter cells is replaced with a series circuit (a string) of two or more converter cells. In this embodiment, the two strings are connected in parallel or in series based on the signal level of the input voltage $V_{IN}$, wherein the criteria for switching the strings in series or in parallel can be the same as explained with reference to the two converter cells $1_k$, $1_{k+1}$ above.

Figure 73:
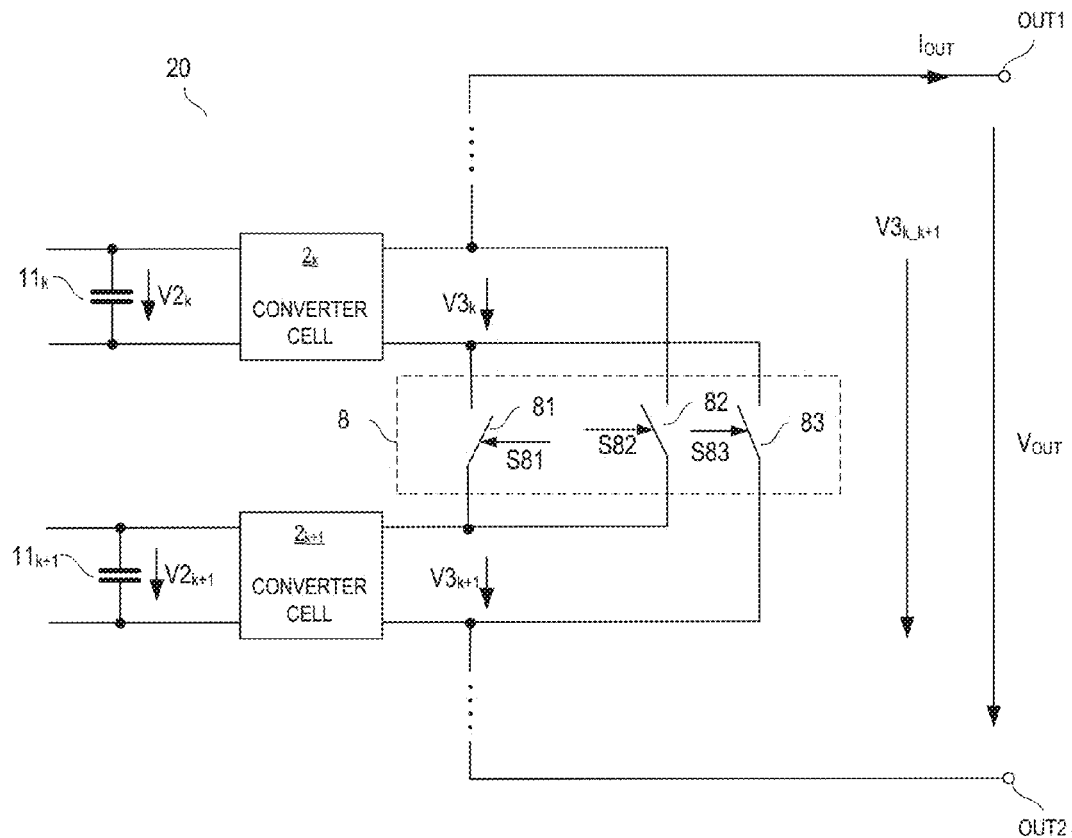
FIG. 73 shows two converter cells of a multi-cell converter and a switch circuit which connects the cell inputs either in series or in parallel.

FIG. 73 shows one embodiment of second power converter 20 which includes two rearrangeable converter cells $2_k$, $2_{k+1}$. Each of these converter cells $2_k$, $2_{k+1}$ includes a cell output with a first cell output node and a second cell output node. A switch arrangement 8 with a first switch 81, a second switch 82, and third switch 83 is connected between the cell outputs of the two converter cells $2_k$, $2_{k+1}$ such that a first switch 81 is connected between a second cell output node of converter cell $2_k$ and a first cell output node of converter cell $2_{k+1}$, a second switch 82 is connected between the first cell output node of the converter cell $2_k$ and the first cell output node of the converter cell $2_{k+1}$, and a third switch 83 is connected between the second cell output node of the converter cells $2_k$ and the second cell output node of the converter cell $2_{k+1}$. The cell outputs of the converter cells $2_k$, $2_{k+1}$ are connected in series when the first switch 81 is switched on and each of the second switch 82 and the third switch 83 is switched off, and the cell outputs are connected in parallel when the first switch 81 is switched off in each of the second 82 and the third 83 is switched on.

In FIG. 73, $11_k$, $11_{k+1}$ denote the DC link capacitors connected to the cell inputs of the converter cells $2_k$, $2_{k+1}$, and $V3_k$, $V3_{k+1}$ denote cell output voltages of the two converter cells $2_k$, $2_{k+1}$. A power converter (not shown in FIG. 73) which supplies power to the DC link capacitors $11_k$, $11_{k+1}$ may have any of the converter topologies explained with reference to the first power converter hereinbefore. That is, the first power converter supplying power to the DC link capacitors $11_k$, $11_{k+1}$ shown in FIG. 73 not necessarily is a first power converter with rearrangeable converter cells, although it may include rearrangeable converter cells.

According to one embodiment, the type of connection between the cell outputs of the two converter cells $1_k$, $1_{k+1}$ is dependent on a voltage level of the output voltage $V_{OUT}$. According to one embodiment, the output voltage $V_{OUT}$ is defined by an external voltage source such as, for example, a power grid. In this case, the multi-cell converter 20 supplies the output power "against" the output voltage $V_{OUT}$ defined by the external voltage source.

Figure 74:
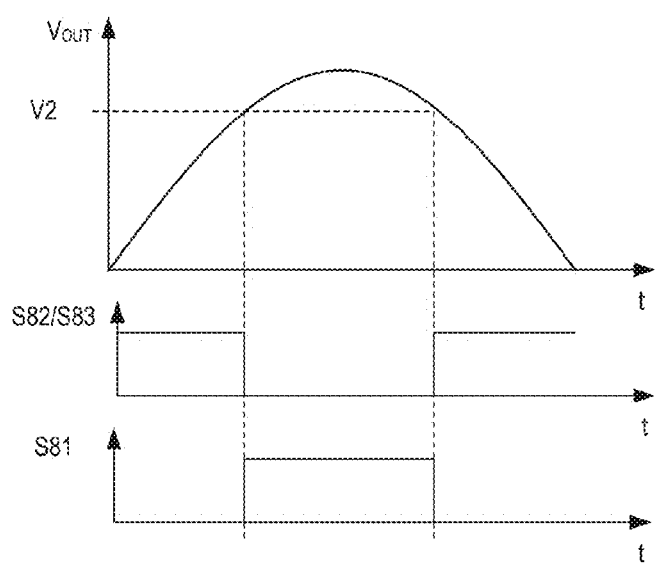
FIG. 74 shows timing diagrams which illustrate one way of operation of the converter cells shown in FIG. 73.

One way of operation of the multi-cell converter 20 shown in FIG. 73 is shown in FIG. 74. FIG. 74 shows the voltage level of the output voltage $V_{OUT}$ during one halfwave of a sinusoidal output voltage. Referring to FIG. 74, the cell outputs of the converter cell $2_k$, $2_{k+1}$ may be connected in parallel when the voltage level of the output voltage $V_{OUT}$ is below a voltage threshold V2, and may be connected in series, if the voltage level of the output voltage $V_{OUT}$ is above the voltage threshold V2. A parallel connection of the converter cells $2_k$, $2_{k+1}$ is indicated by on-levels (high levels) of drive signals S82, S83 of the second switch 82 and the third switch 83 and an off-level (low level) of a drive signal S81 of the first switch 81. A series connection of the cell outputs is represented by off-levels of the drive signals S82, S83 of the second switch 82 and the third switch 83 and an on-level of drive signal S81 of the first switch 81.

In FIG. 73, $V3_{k\_k+1}$ denotes a total cell output voltage of the two converter cells $2_k$, $2_{k+1}$. If the converter cells $2_k$, $2_{k+1}$ are connected in series this total cell output voltage $V3_{k\_k+1}$ is $V2_k$ (if $2_k$ is in the off-state, and $2_{k+1}$ in the on-state), $V2_{k+1}$ (if $2_k$ is in the on-state, and $2_{k+1}$ is in the off-state), and $V2_k+V2_{k+1}$ (if both, $2_k$ and $2_{k+1}$ are in the off-state). If the converter cells $2_k$, $2_{k+1}$ are connected in parallel, the total cell output voltage $V3_{k\_k+1}$ corresponds to a balanced voltage level. The balanced voltage level is the voltage level obtained by charge balancing between the two DC link capacitors $11_k$, $11_{k+1}$ when both converter cells $2_k$, $2_{k+1}$ are in the off-state.

Like in the power converter 10 shown in FIG. 70, there is an inductor (not shown in FIG. 73) in each of the converter cells $2_k$, $2_{k+1}$. Further, other converter cells of the multi-cell converter 20 are not shown in FIG. 73. These converter cells may be connected between the converter cell $2_k$ and the output node OUT1, between the converter cell $2_{k+1}$ and the second output node OUT2. Alternatively, one or more converter cells are connected between each of the converters $2_k$ and $2_{k+1}$ and each of the output nodes OUT1, OUT2.

Figure 75:
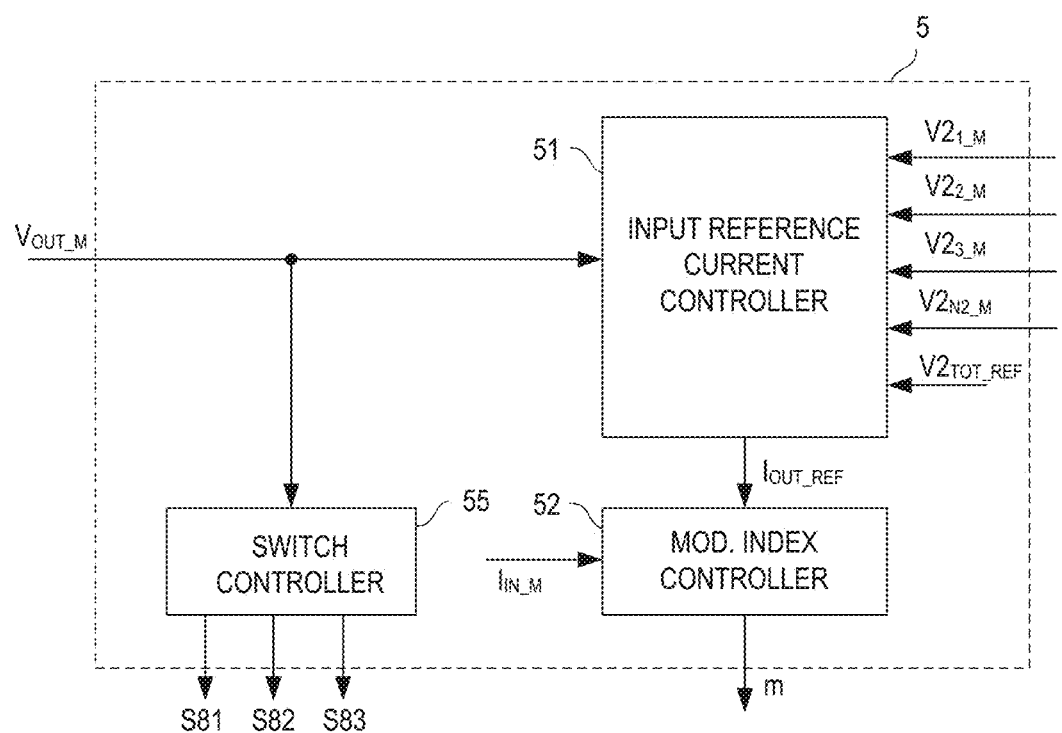
FIG. 75 shows one embodiment of a main controller in a multi-cell converter with two rearrangeable converter cells as shown in FIG. 73.

FIG. 75 shows one embodiment of a main controller 5 which is configured to control operation of the second power converter 20 shown in FIG. 73. This main controller 5 shown in FIG. 75 is based on the main controller 5 shown in FIG. 35 and is different from the main controller shown in FIG. 35 in that it additionally includes a switch controller 55 which generates the drive signals S81, S82, S83 of the individual switches in the switch arrangement 8 shown in FIG. 73. The switch controller 55 can be configured to drive these switches 81-83 in accordance with the embodiment shown in FIG. 74 such that the switch arrangement 8 connects the cell outputs of the converter cells $2_k$, $2_{k+1}$ in series when a voltage level of the output voltage $V_{OUT}$ is above the threshold V2, and to connect the cell outputs in parallel when the voltage level of the output voltage V2 is below the threshold.

Referring to FIGS. 71 and 74, the rearrangeable converter cells $1_k$, $1_{k+1}$ and $2_k$, $2_{k+1}$, respectively, in the multi-cell converters 10, 20, shown in FIGS. 70 and 73 are rearranged twice in each halfwave input voltage $V_{IN}$ and the output voltage $V_{OUT}$ respectively. In the embodiments shown in FIGS. 71 and 74, the type of connection changes from a parallel connection to a series connection when the respective voltage rises above a threshold (V1, V2 in FIGS. 71 and 74), and from the series connection back to a parallel connection when the respective voltage falls below the threshold.

Figure 76A:
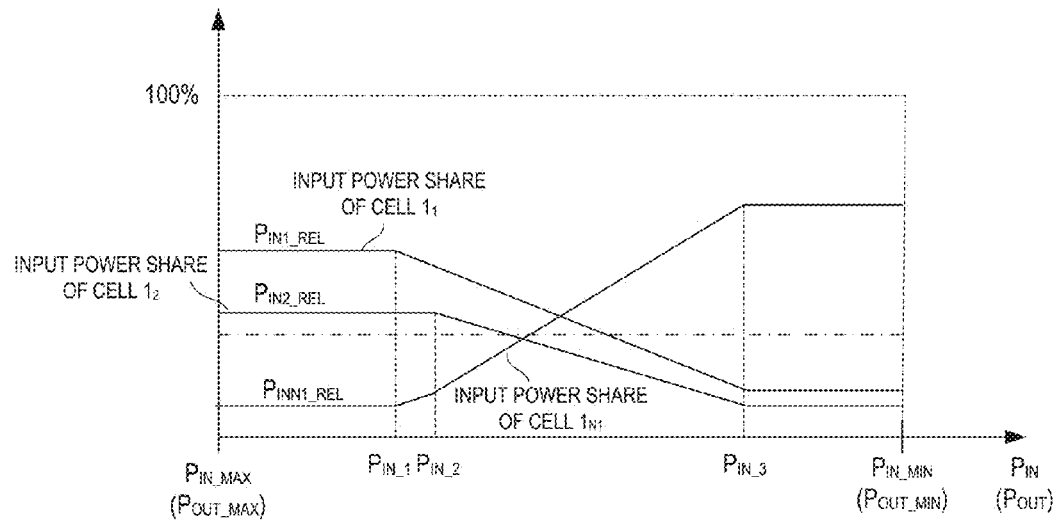
FIGS. 76A-76B illustrate an unequal distribution of power shares and current shares, respectively, in a multi-cell converter.
Figure 76B:
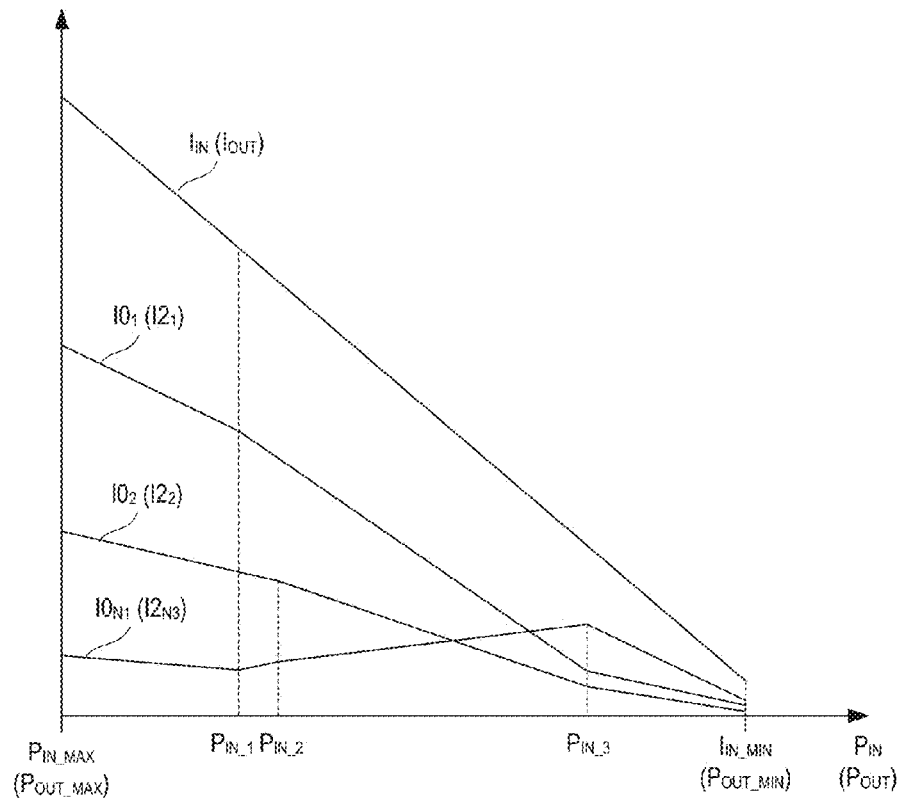

FIGS. 76A and 76B show one way of operation of a first power converter 10 with an IP topology. FIG. 76A illustrates a power level of the input power $P_{IN}$ (in case the input power is an AC power, $P_{IN}$ denotes the average input power in one period of the input voltage $V_{IN}$), and the shares of the input power $P_{IN}$ the individual converter cells $1_1$-$1_{N1}$ receive. Just for the purpose of explanation it is assumed that the power converter includes N1=3 converter cells, wherein $P_{IN1}$, $P_{IN2}$, $P_{INN1}$ denote the input powers of the individual converter cells, and $P_{IN1\_REL}=P_{IN1}/P_{IN}$, $P_{IN2\_REL}=P_{IN2}/P_{IN}$, $P_{INN1\_REL}=P_{IN3}/P_{IN}$ denote the shares of the individual converter cells, wherein $$P_{IN}=\Sigma_{i=1}^{N1}P_{INi\_REL}=100\% \qquad (27),$$

where $P_{INi\_REL}$ denote the input power shares of the individual converter cells, and N1=3 in this embodiment.

Referring to FIG. 76A, the input power shares $P_{IN1\_REL}$-$P_{INN1\_REL}$ of the individual converter cells $1_1$-$1_{N1}$ are dependent on the power level of the input power $P_{IN}$ which may vary between a maximum level $P_{IN\_MAX}$ and a minimum level $P_{IN\_MIN}$. In the embodiment shown in FIG. 76A, at the maximum level, $P_{IN\_MAX}$ converter cell $1_1$ has the highest share, converter cell $1_{N1}$ has the lowest share, and converter cell $1_2$ has a share lower than the one of converter cell $1_1$ but higher than the one of converter cell $1_{N1}$. At the lowest level $P_{IN\_MIN}$ (which is different from zero), converter cell $1_1$ has the lowest share, converter cell $1_{N1}$ has the highest share, and converter cell $1_2$ has a share lower than the one of converter cell $1_{N1}$ but higher than the one of converter cell $1_1$. In FIG. 76A, the dashed and dotted line illustrates the input power share of one converter cell in a power converter in which the individual converter cells receive equal shares of the input voltage independent of the level of the input power $P_{IN}$. These shares are dependent on the number of converter cells. In a power converter with N1=3 converter cells, each converter cell receives 33.33% (=1/N1) of the input power $P_{IN}$.

In the embodiment shown in FIG. 76A, the distribution of the input power shares is independent of the input power level if the input power level is between the maximum level $P_{IN\_MAX}$ and a first level $P_{IN\_1}$, wherein, for example, $P_{IN1\_REL}$=60%, $P_{IN2\_REL}$=30%, $P_{INN1\_REL}$=10%. If the input power level falls below the first level $P_{IN}$ the share of the converter $1_1$ decreases as the input power level decreases, while the share of the converter $1_{N1}$ increases. If the input power level falls below a second level $P_{IN\_2}$ lower than the first level $P_{IN\_1}$ the share of the converter $1_2$ decreases as the input power level decreases, while the share of the converter $1_{N1}$ further increases. If the power level is between a third level $P_{IN\_3}$ lower than the second level $P_{IN}$ and the minimum level $P_{IN\_MIN}$, the distribution of the input power shares is again independent of the input power level, wherein, for example, $P_{IN1\_REL}$=10%, $P_{IN2\_REL}$=15%, $P_{INN1\_REL}$=75%.

The distribution of the power shares at the individual input power levels shown in FIG. 76A is only an example. While in the embodiment shown in FIG. 76 each of the converter cells changes its input power share as the input power level decreases, it is also possible to have only two converter cells which change their input power shares and to leave the input power share of the other converter cell(s) substantially constant.

According to one embodiment, the individual converter cells $1_1$-$1_{N1}$ are configured to receive a direct voltage as the input voltage $V_{IN}$. In this case, the input powers of the individual converter cells can be adjusted by adjusting their respective input currents $I0_1$-$I0_{N1}$. FIG. 76B illustrates the distribution of the input currents $I0_1$-$I0_{N1}$ dependent on the power level of the input power. Referring to FIG. 76B, the input current $I_{IN}$ decreases linearly as the power level of the input power $P_{IN}$ decreases from the maximum level $P_{IN\_MAX}$ to the minimum level $P_{IN\_MIN}$. The individual input currents $I0_1$-$I0_{N1}$, however, do not decrease linearly over the complete input power range. There may even be ranges where the input current of one converter cell is substantially constant or increase as the power level decreases. For example, in the embodiment shown in FIG. 76B, the input current $I0_{N1}$ of converter cell $1_{N1}$ increases as the input power level decreases between the second level and the third level $P_{IN\_2}$ and $P_{IN\_3}$. In general, the capability of the power converter to unequally distribute the input power shares of the individual converter cells may be used to keep the input power level (input current level) of at least one converter cell within a predefined power range (current range) in which the respective converter cell has a high efficiency, that is, for example an efficiency higher than 60% or higher than 80% of the maximum efficiency.

In FIG. 76B, $I0_1$-$I0_{N1}$ denote the average input currents of the individual converter cells. That is, the power converter may be operated in a phase shedding mode or intermittent mode as the input power level decreases. In this case, there may be time periods in which the instantaneous current levels of one or more of the input currents $I0_1$-$I0_{N1}$ become zero.

Figure 77:
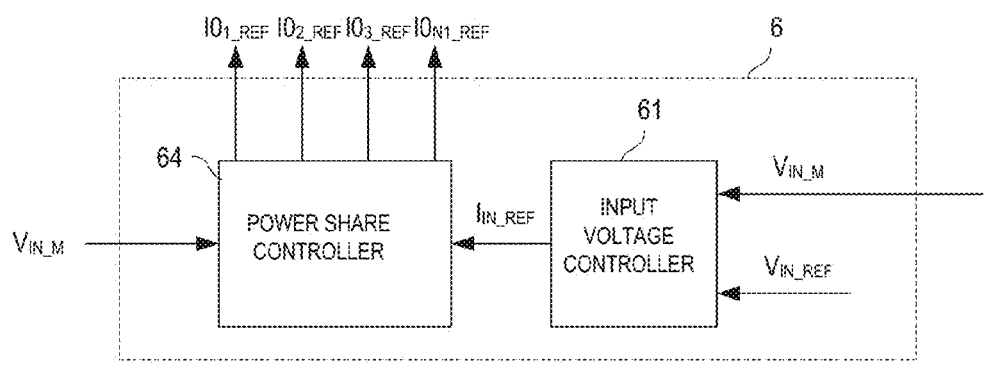
FIG. 77 shows one embodiment of a main controller configured to control a distribution of power and current shares, respectively, in a multi-cell converter with an IP topology.

FIG. 77 shows one embodiment of a main controller 6 which is configured to control the individual converter cells $1_1$-$1_{N1}$ in the way explained with reference to one of FIGS. 76A and 76B. The main controller 6 shown in FIG. 77 is based on the main controller 6 shown in FIG. 39 and is different in that it includes a power share controller 64 which is configured to generate the input current reference signals $I0_{1\_REF}$-$I0_{N1\_REF}$ of the individual converter cells based on desired input power level. The power share controller may calculate the desired input power level based on the input current reference signal $I_{IN\_REF}$ (which may be calculated by the input voltage controller 61, received by a central controller, or by an MPP tracker) and the input voltage signal $V_{IN\_M}$. According to another embodiment, the power share controller 64 generates the input current reference signals $I0_{1\_REF}$-$I0_{N1\_REF}$ only based on the input current reference signal $I_{IN\_REF}$.

The power share controller 64 is configured the generate the input current reference signals $I0_{1\_REF}$-$I0_{N1\_REF}$ such that the (average) input currents $I0_1$-$I0_{N1}$ of the individual converter cells are controlled as explained with reference to FIGS. 76A and 76B before. The power share controller 64 may additionally have a phase shedding capability. That is, the power share converter may alternately operate one or more of the converter cells in the active and the inactive mode in order to control the input current of the respective converter cell.

The method explained with reference to one of FIGS. 76A and 76B in which the input power is unequally shared by the individual converter cells, is not restricted to be employed in a power converter with an IP topology such as one of the first power converters with an IP topology explained before. Instead, this kind of operation may be used in a multi-cell converter with an OP topology, such as the multi-cell converter shown in FIG. 31, as well. That is, a multi-cell converter with an OP topology can be configured to vary the distribution of the output power shares of the individual converter cells $2_1$-$2_{N3}$ based on a power level of the output power $P_{OUT}$. In FIGS. 76A and 76B the output power shares and output currents occurring in an OP converter are indicated in brackets. Here, $P_{OUT1\_REL}$=$P_{OUT1}$/$P_{OUT}$, $P_{OUT2\_REL}$=$P_{OUT2}$/$P_{OUT}$, $P_{OUTN3\_REL}$=$P_{OUTN3}$/$P_{OUT}$, denote the shares of the individual converter cells, wherein $$P_{OUT}=\Sigma_{i=1}^{N3} P_{OUTi\_REL}=1.00\%, \quad (28).$$

Figure 78:
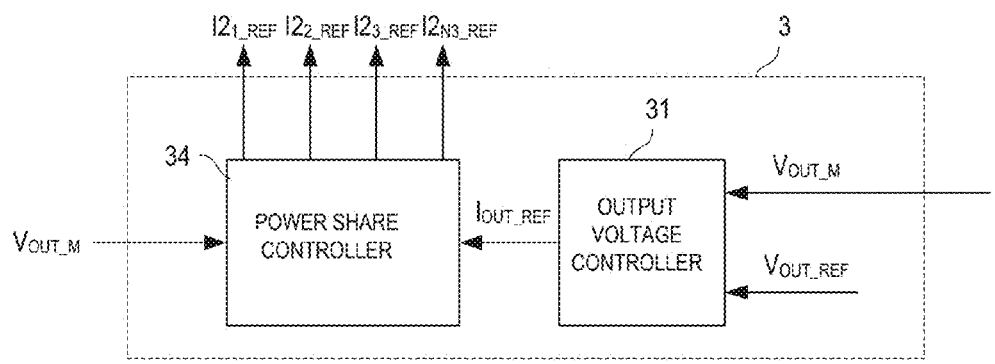
FIG. 78 shows one embodiment of a main controller configured to control a distribution of power and current shares, respectively, in a multi-cell converter with an OP topology.

FIG. 78 shows one embodiment of a main controller 3 which is configured to control the individual converter cells $2_1$-$2_{N3}$ in the way explained with reference to one of FIGS. 76A and 76B. The main controller 3 shown in FIG. 78 is based on the main controller 3 shown in FIG. 33 and is different in that it includes a power share controller 34 which is configured to generate the output current reference signals $I2_{1\_REF}$-$I2_{N3\_REF}$ of the individual converter cells based on desired input power level. The power share controller 34 may calculate the desired output power level based on the output current reference signal $I_{OUT\_REF}$ (which may be calculated by the output voltage controller 31, or received by a central controller) and the output voltage signal $V_{OUT\_M}$. According to another embodiment, the power share controller 34 generates the output current reference signals $I2_{1\_REF}$-$I2_{N3\_REF}$ only based on the output current reference signal $I_{OUT\_REF}$.

The power share controller 34 is configured the generate the output current reference signals $I2_{1\_REF}$-$I2_{N3\_REF}$ such that the (average) output currents $I2_1$-$I2_{N3}$ of the individual converter cells are controlled as explained with reference to FIGS. 76A and 76B before. The power share controller 34 may additionally have a phase shedding capability. That is, the power share converter may alternately operate one or more of the converter cells in the active and the inactive mode in order to control the input current of the respective converter cell.

In an IP or OP multi-cell converter that operates in accordance with the method illustrated in FIGS. 76A and 76B, the individual converter cells $1_1$-$1_{N1}$ ($2_1$-$2_{N3}$) may be implemented differently in terms of losses that may occur. Each type of converter cell explained above includes at least one electronic switch. According to one embodiment, the individual converter cells $1_1$-$1_{N1}$ ($2_1$-$2_{N3}$) are designed differently in terms of conduction losses. According to one embodiment, this is obtained by designing the at least one electronic switch in at least two of the converter cells $1_1$-$1_{N1}$ ($2_1$-$2_{N3}$) with different on-resistances ($R_{ON}$). The on-resistance of an electronic switch is the electrical resistance the electronic switch has in the on-state (switched on state). For example, the on-resistance of a MOSFET when used as an electronic switch is the electrical resistance between a drain node (D) and a source node (S) of the MOSFET in the on-state. A MOSFET can be designed to include a plurality of transistor cells that are connected in parallel. In this case, the on-resistance is substantially proportional to the number of transistor cells and, therefore, proportional to the area the MOSFET consumes on a semiconductor chip. In the design of a MOSFET the on-resistance can be adjusted by suitably selecting the number of parallel connected transistor cell. In a GaN-HEMT, as another example of an electronic switch, the on-resistance can be adjusted by suitably selecting a channel width in the design of the device.

Assume for example that in a multi-cell converter which operates in accordance with FIGS. 76A and 76B there are four converter cells, one converter cell optimized for "light load conditions" (corresponding to cell $1_{N1}$ ($2_{N3}$) in FIGS. 76A and 76B), one converter cell optimized for "medium load conditions" (corresponding to cell $1_2$ ($2_2$) in FIGS. 76A and 76B), and one converter cell optimized for "heavy load conditions" (corresponding to cell $1_1$ ($2_1$) in FIGS. 76A and 76B). In this case, the at least one electronic switch in the light load cell $1_{N1}$ ($2_{N3}$) is designed to have the highest on-resistance, which will be referred to as first on-resistance in the following $R_{ON1}$, the at least one electronic switch in the medium load cell $1_2$ ($2_2$) is designed to have a second on-resistance $R_{ON2}$ lower than the first on-resistance $R_{ON1}$, and the at least one electronic switch in the heavy load cell $1_1$ ($2_1$) is designed to have a third on-resistance $R_{ON3}$ lower than the second on-resistance $R_{ON2}$. That is, $$R_{ON1} > R_{ON2} > R_{ON2}.$$

A ratio $R_{ON1}$:$R_{ON2}$:$R_{ON3}$ is, for example, 1:0.5:0.1. That is, the first on-resistance $R_{ON1}$ is two times the second on-resistance $R_{ON2}$, and 10 times the third on-resistance $R_{ON3}$. Of course, this is only an example. The ratio between the individual on-resistance may vary in wide range. Further, not necessarily all the on-resistances of the converter cells are different. That is, the at least one electronic switch in two or more converter cells may be implemented with substantially the same on-resistance. However, there are at least two converter cells that are designed with different on-resistances. That is, the on-resistance of the at least one electronic switch in one converter cell is different from the on-resistance of the at least one electronic in the other converter cell. "Different" means that the on-resistance in the one converter cell is less than 80% of the on-resistance in the other converter cell.

In case the individual converter cells of the multi-cell converter are implemented with several electronic switches, such as two switches in a boost topology, four switches in a full-bridge topology, or eight switches in a DAB topology, there are at least two converter cells in which two corresponding electronic switches have different on-resistances. "Corresponding" means, the electronic switches have the same position and function in the respective topology. For example, in converter cells with a boost topology with one half-bridge (as shown in FIG. 12), the high-side switch in one converter cell may have an on resistance which is different from the on-resistance of the corresponding high-side switch in the other converter cell. If the multi-cell converter is implemented with converter cells that have several electronic switches, there may be other electronic switches that substantially have the same on-resistance in each converter cell.

Another degree of freedom a multi-cell converter topology offers is the ratio between the individual DC link voltages $V2_1$-$V2_{N2}$. In the embodiments explained before, the individual DC link voltages were assumed to have substantially the same voltage level. However, this is only an example. According to one embodiment, a multi-cell converter with an IP topology or IS topology is configured to control the DC link voltages at the cell outputs such that they have at least two different voltage levels. "Different" means that the voltage level of one group of DC link voltages is less than 80% of the voltage level of another group of DC link voltages, wherein each group includes at least one of the DC link voltages explained before. According to another embodiment, a multi-cell converter with an OP or OS topology is configured to control the DC link voltages at the cell inputs such that they have at least two different voltage levels. "Different" means that the voltage level of one group of DC link voltages is less than 80% of the voltage level of another group of DC link voltages, wherein each group includes at least one of the DC link voltages explained before.

As, referring to the explanation above, in a multi-cell converter with an IP or OP topology each converter cell may be configured to control its associated DC link voltage, different voltage levels of the DC link voltages may be obtained by setting the DC link voltage reference signals in the individual converter cells to different levels. For example, in the IP topology shown in FIG. 29, different DC link voltages $V2_1$-$V2_{N1}$ may be obtained by setting the DC link voltage reference signals in the controller $4_1$ of converter cell $1_1$ and in the controllers (not shown) of the other cells to different values. The DC link reference signal of controller $4_1$ is the signal $V2_{1\_REF}$ shown in FIG. 30. This signal and corresponding signals of the other controllers may be provided by a central controller (not shown in the drawings).

Figure 79A:
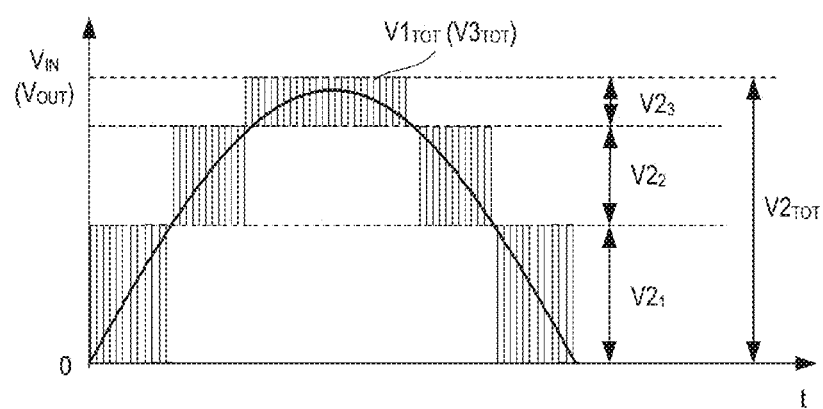
FIGS. 79A-79B show timing diagrams which illustrate operation of a multi-cell converter with an IS or OS topology such that DC link voltages have different voltage levels.
Figure 79B:
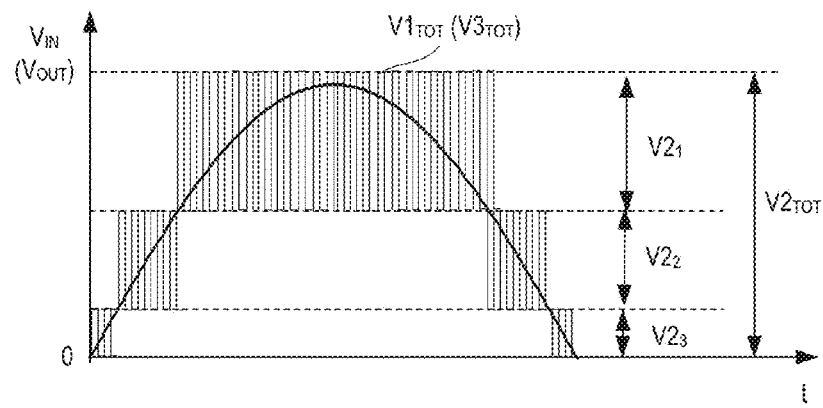

Generating DC link voltages with different voltage levels is not restricted to IP and OP topologies. According to one embodiment, a multi-cell converter with an IS topology is configured to generate DC link voltages $V2_1$-$V2_{N2}$ with different voltage levels at the cell outputs. One way of operation of such multi-cell converter with an IS topology is explained with reference to FIGS. 79A and 79B below. FIGS. 79A and 79B show timing diagrams of one halfwave of a sinusoidal input voltage or one full-wave of a rectified sinusoidal input voltage, and timing diagrams of the total cell input voltage $V1_{TOT}$. For the purpose of explanation it is assumed that the multi-cell converter includes three converter cells that generate different DC link voltages $V2_1$, $V2_2$, $V2_3$ at their respective cell output. In this embodiment, $V2_1 > V2_2 > V2_3$.

The multi-cell converter may be implemented with a topology as shown in FIG. 12 (when N1=3), the individual converter cells may have one of a boost topology (when the input voltage is a rectified sine voltage) and a full-bridge topology (when the input voltage is a sine voltage). in the following, the different DC link voltages $V2_1$, $V2_2$, $V2_{N1}$ will be referred to as first, second and third DC link voltage, respectively. The converter cells supplying these DC link voltages will be referred to as first, second and third converter cells.

In the embodiments shown in FIGS. 79A and 79B the first, second and third converter cells are operated in the block mode. That is, based on the instantaneous level of the voltage $V_{IN}$ only one of the converter cells is operated in a PWM fashion. The other converter cells are either in the on-state or the off-state. In the embodiment shown in FIG. 79A, the first converter cells operates in the PWM fashion when the level of the input voltage $V_{IN}$ is between 0 and the level of the first DC link voltage $V2_1$, the other two converter cells are in the on-state. When the level of the input voltage $V_{IN}$ rises above the level of the first DC link voltage $V2_1$ the second converter cell starts to operate in the PWM fashion, the first converter cell is in the off-state, and the second converter cell is in the on-state. When the level of the input voltage $V_{IN}$ rises above a level corresponding to the level of the first DC link voltage $V2_1$ plus the level of the second DC link voltage $V2_2$ the third converter cell starts to operate in the PWM fashion, the first converter cell is in the off-state, and the second converter cell is in the off-state. The modulation indices of the three converter cells based on the voltage level of the input voltage $V_{IN}$ are given in Table 1, below:

TABLE 1

| | $0 < |V_{IN}| \leq V2_1$ | $V2_1 < |V_{IN}| \leq V2_1 + V2_2$ | $V2_1 + V2_2 \leq |V_{IN}|$ |
|---|---|---|---|
| m 1 | $V_{IN}/V2_1$ | 1 | 1 |
| m 2 | 0 | $(V_{IN} - V2_1)/V2_2$ | 1 |
| m 3 | 0 | 0 | $(V_{IN} - V2_1 - V2_2)/V2_3$ |

In Table 1, $V_{IN}$ is the instantaneous level of the input voltage, $|V_{IN}|$ is the absolute value of the instantaneous voltage level of the input voltage, $V2_1$ is the level of the first DC link voltage, $V2_2$ is the level of the second DC link voltage, and $V2_3$ is the level of the third DC link voltage.

After the level of the input voltage $V_{IN}$ has reached the maximum level and decreases, first the third converter cell is switched to the on-state in which the cell input power is substantially zero, then the second converter cell is switched to the on-state in which the cell input power is substantially zero, and, finally when the input voltage decreases to zero, the first converter cell is switched to the on-state in which the cell input power is substantially zero.

Figure 80:
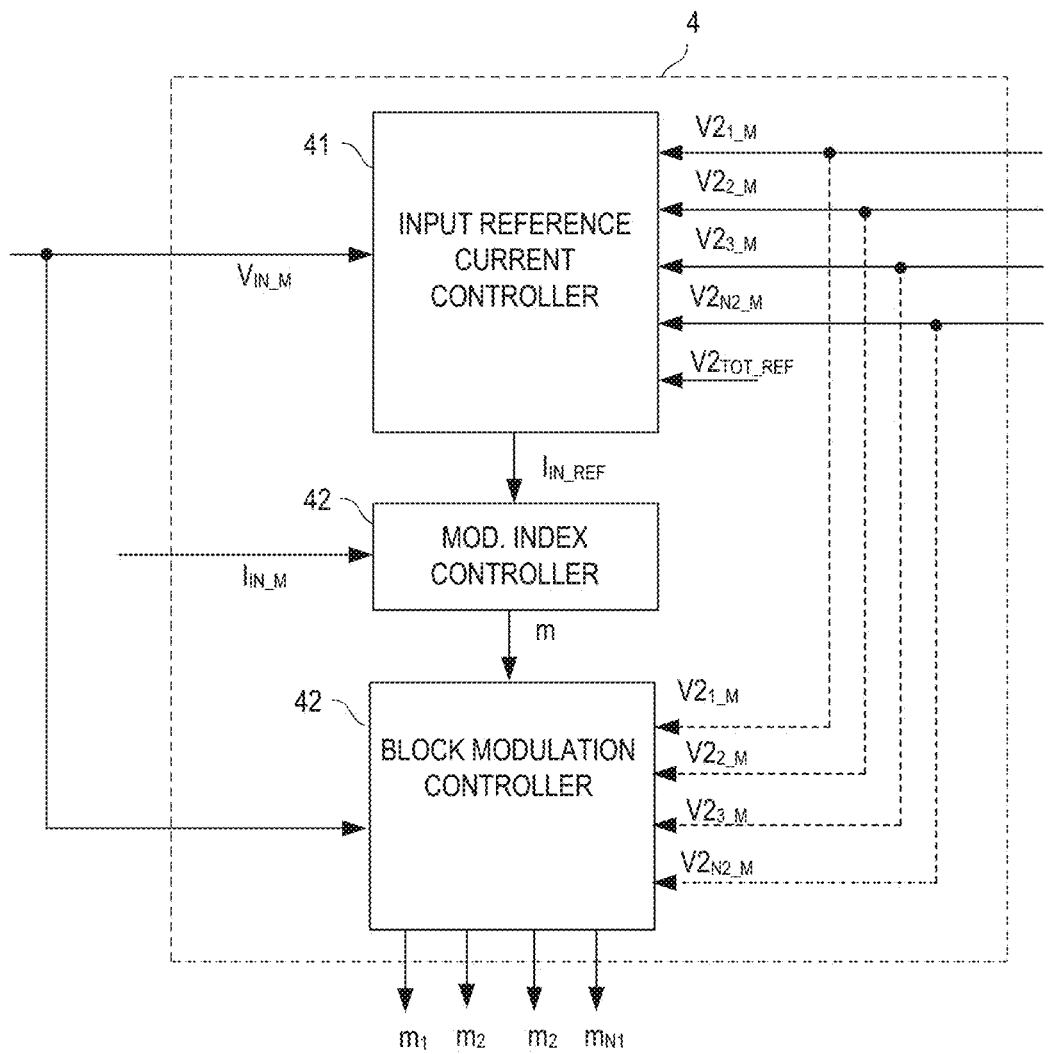
FIG. 80 shows one embodiment of a main controller configured to operate a multi-cell converter as shown in FIGS. 79A-79B.

The order in which the converter cells begin converting power when the level of the input voltage $V_{IN}$ increases is arbitrary. In the embodiment shown in FIG. 77A the first converter cell starts, followed by the second converter cell which is followed by the third converter cell. However, other orders are possible as well. In the embodiment shown in FIG. 79B the third converter cell starts and operates in a PWM fashion until the level of the input voltage $V_{IN}$ reaches the level of the third DC link voltage $V2_3$, then the second converter cell operates in a PWM fashion until the level of the input voltage $V_{IN}$ reaches the level of the third DC link voltage $V2_3$ plus the level of the second DC link voltage, and finally the first converter cell operates in the PWM fashion. According to one embodiment, the order in which the converter cells start converting power is different in different halfwaves (or fullwaves). According to one embodiment, the order in which the converter cells start converting power is dependent on a (desired) power level of the input power $P_{IN}$. In this case, the power level denotes an average power level averaged over one period of the input voltage. If, for example, the average power level is above a predefined threshold, the power converter may start in the order shown in FIG. 79A so that the first converter $1_1$ has the highest share of the input power $P_{IN}$. If, for example, the average power level is below the predefined threshold, the power converter may start in the order shown in FIG. 79B so that the third converter $1_3$ has the highest share of the input power $P_{IN}$. One embodiment of a main controller 4 configured to operate a multi-cell converter with an IS topology in the way explained with reference to FIGS. 79A and 79B is shown in FIG. 80. This controller is based on the main controller 4 shown in FIG. 13 and additionally includes a block modulation controller 47 which receives the modulation index m from the modulation index controller 42, and the input voltage signal $V_{IN\_M}$, and which is configured to generate the individual modulation indices (which are referred to as $m_1$-$m_{N1}$ in FIG. 80) of the individual converter cells in accordance with Table 1.

In the IS converter explained with reference to FIGS. 79A-81, the time durations in which the individual converter cells convert power are different. This may result in different cell input powers of the converter cells. For example, if the peak level of the input voltage $V_{IN}$ is 360V, the first DC link voltage $V2_1$ is 180V, the second DC link voltage $V2_2$ is 120V and the third DC link voltage $V2_{N1}$ is 60V (so that the total DC link voltage $V2_{TOT}$ is 360V), and if $P_{IN\_AVG}$ is the average input power in one halfwave (or full-wave, respectively) then the average cell input powers $P_{1\_AVG}$-$P_{3\_AVG}$ of the individual converters cells are as follows when the converter cells are operated as shown in FIG. 79A:

$P_{1\_AVG} = 0.61 \cdot P_{IN\_AVG}$ $P_{2\_AVG} = 0.31 \cdot P_{IN\_AVG}$ $P_{3\_AVG} = 0.08 \cdot P_{IN\_AVG}$.

If the converter cells are operated in the order explained with reference to FIG. 79B, the situation is as follows:

$P_{1\_AVG} = 0.39 \cdot P_{IN\_AVG}$ $P_{2\_AVG} = 0.40 \cdot P_{IN\_AVG}$ $P_{3\_AVG} = 0.21 \cdot P_{IN\_AVG}$.

In the present embodiment, the average cell input powers are substantially balanced, that is the average cell input power of each cell is substantially ⅓ (0.33) of the average input power $P_{IN\_AVG}$ when the converter cells are operated in the order shown in FIG. 79B and when the DC link voltages are controlled to have voltage levels as follows:

$V2_1 = 161V$ $V2_2 = 104V$ $V2_3 = 95V$.

In a multi-cell converter with IS topology which is configured to generate DC link voltages with different voltage levels, the individual converter cells $1_1$-$1_{N1}$ may be implemented with the same topology. However, the switches in the individual converter cells may be different in terms of their voltage blocking capability. The "voltage blocking capability" defines the maximum voltage an electronic switch can withstand in the off-state (switched off-state) without being damaged. For example, if the electronic switch is implemented as a MOSFET, the voltage blocking capability is dependent on the specific design of the MOSFET inside a semiconductor chip where active areas of the MOSFET are integrated. "Different" in this context means that the electronic switches were intentionally designed to have different voltage blocking capabilities.

Referring to the above, in an IS converter the voltage blocking capability of the individual switches implemented therein is higher than the level of the corresponding DC link voltage. For example, in the converter cell $1_1$ shown in FIG. 12, the high-side and the low-side switch $12_H$, $12_L$ are each designed to have a voltage blocking capability that is higher than the associated DC link voltage $V2_1$. Equivalently, in the converter cell $1_i$ shown in FIG. 24, the individual switches $17_H$-$18_L$ are each designed to have a voltage blocking capability that is lower than the associated DC link voltage $V2_1$. As the on-resistance of one electronic switches increases exponentially as the voltage blocking capability increases, it is desirable to design the individual electronic switches with a voltage blocking capability that is as low as required. Thus, in the embodiment explained before, the first converter cell is implemented with electronic switches that have a higher voltage blocking capability than electronic switches in the second converter cell, and the second converter cell is implemented with electronic switches that have a higher voltage blocking capability than electronic switches in the third converter cell.

In the example explained above where the DC link voltages $V2_1$-$V2_3$ are 180V, 120V and 60V, the first converter cell may be implemented with electronic switches having a voltage blocking capability of 250V, the second converter cell may be implemented with electronic switches having a voltage blocking capability of 150V, and the third converter cell may be implemented with electronic switches having a voltage blocking capability of 80V.

Operating individual converter cells with different DC link voltages is not restricted to a multi-cell converter with an IS topology. Instead, this kind of operation may be used in a multi-cell converter with an OS topology, such as the multi-cell converter shown in FIG. 34, as well. That is, a multi-cell converter with an OS topology can be designed to control the DC link voltages $V2_1$-$V2_2$ such that these DC link voltages $V2_1$-$V2_2$ have different voltage levels. Like in the IS converter explained before, the individual converter cells may be operated in the block mode. That is, based on the instantaneous voltage level of the output voltage only one of the converter cells is operated in a PWM fashion, while the other converter cells are in the on-state or the off-state.

In FIGS. 79A and 79B the voltages occurring in an OS converter that is configured to control DC link voltages $V2_1$-$V2_2$ with different voltage levels and in which the converter cells are operated in a block mode are indicated in brackets. Besides the waveform of the output voltage $V_{OUT}$, the waveform of the total cell output voltage $V3_{TOT}$ is shown. It is assumed that the output voltage has the same amplitude as the input voltage $V_{IN}$ in the embodiment disclosed above and that the DC link voltages $V2_1$-$V2_{N1}$ have the same voltage levels as in the embodiment explained above.

Like in the IS converter, the converter cells in the OS converter are operated in a predefined order within one halfwave (or fullwave). In the embodiment shown in FIG. 77A, the converter cell with the highest DC link voltage starts when the level of the output voltage $V_{OUT}$ increases, and in the embodiment shown in FIG. 77B, the converter cell with the lowest DC link voltage starts when the level of the output voltage $V_{OUT}$ increases.

In the embodiment explained with reference to FIGS. 79A and 79, the voltage levels of the individual DC link voltages $V2_1$-$V2_{N2}$ may be controlled by the IS converter and the OS converter, respectively. That is, the power converter not only controls the total DC link voltage $V2_{TOT}$ but also the different levels of the individual DC link voltages $V2_1$-$V2_{N2}$. According to another embodiment, a further power controls the levels of the individual DC link voltages. For example, in case of the IS converter explained above, a further power converter may be connected to the DC link capacitors and receive power from the IS converter. According to one embodiment, the further power converter has an OP topology with a plurality of converter cells, wherein each converter cell of the further power converter controls the DC link voltage across one respective DC link capacitor. For example, in case of the OS converter explained above, a further power converter may be connected to the DC link capacitors and provide power to the OS converter. According to one embodiment, the further power converter has an IP topology with a plurality of converter cells, wherein each converter cell of the further power converter controls the DC link voltage across one respective DC link capacitor.

In the explanation above, it has been assumed that $V_{IN} = m \cdot V2_{TOT}$ in an IS converter, and $V_{OUT} = m \cdot V2_{TOT}$ in an OS converter, respectively. However, there may be cases where $m \cdot V2_{TOT}$, which will be referred to as $V_{REF}$ in the following and which, more generally, can be expressed as $$V_{REF} = m \cdot V2_{TOT} = \Sigma_i^{N2} m_i \cdot V2_1 \quad (29),$$

is not exactly the input voltage $V_{IN}$ and the output voltage $V_{OUT}$, respectively. In general, there is a phase shift between the input/output voltage $V_{IN}/V_{OUT}$ and $m \cdot V2_{TOT}$, which may be several degrees and which is dependent on an inductance of the inductor 15 explained above. In those cases explained above, where the operation of the power converter has been explained to dependent on one of the input voltage and the output voltage, respectively, such as in the embodiments shown in FIGS. 71, 74, and 79A-79B, operation of the power converter can be dependent on $V_{REF}$ instead of $V_{IN}$ and $V_{OUT}$ as well, in particular in those cases where the inductor 15 has a relatively high inductance.

For example, in the embodiments shown in FIGS. 71 and 74 the two converter cells may be connected in parallel or in series dependent on $V_{REF}$ instead of dependent on one of $V_{IN}$ and $V_{OUT}$, respectively. In the embodiment shown in FIGS. 79A and 79B the voltage thresholds where the converter cells change their mode of operation may be compared with $V_{REF}$ instead of $V_{IN}$ and $V_{OUT}$, respectively. In this case, the block modulation controller 47 shown in FIG. 80 receives the DC link voltage signals (shown in dashed lines) in order to calculate $V_{REF}$.

However, using $V_{REF}$ instead of $V_{IN}$ and $V_{OUT}$ to take the decision if the operation of the power converter is to be changed does not change the general behavior so that in the description above $V_{IN}$ and $V_{OUT}$ were used instead of $V_{REF}$ to describe the operation of the power converter. However, the operation based on VIN and VOUT, respectively is to be understood to include an operation based on VREF as well. That is, for example, in FIGS. 71, 74, 79A-79B $V_{IN}$ and $V_{OUT}$ may be replaced by $V_{REF}$.

Figure 81:
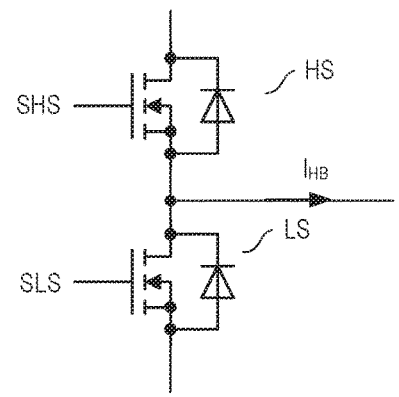
FIG. 81 shows one embodiment of a half-bridge in a converter cell of multi-cell converter.
Figure 82:
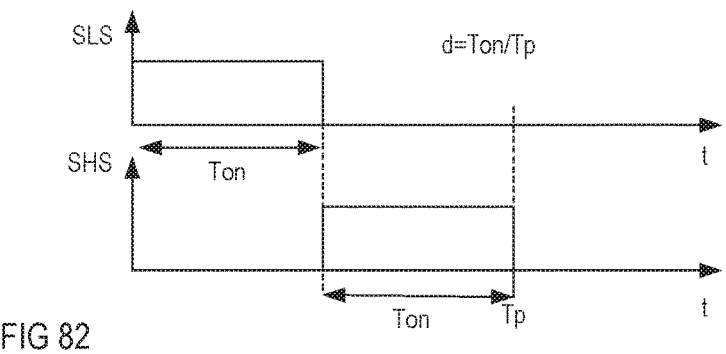
FIG. 82 shows timing diagrams which illustrate a PWM operation of the half-bridge shown in FIG. 81.

Another degree of freedom in a multi-cell converter is the specific design of the half-bridges in those types of converter cells which include a half-bridge. Those types of converter cells are, for example, the converter cells with a boost topology as shown in FIG. 12, with a full bridge topology as shown in FIG. 24, and with a buck topology as shown in FIG. 32B. FIG. 81 shows a half-bridge with a high-side switch HS and a low-side switch LS. This half-bridge represents any half-bridge in those converter cells with a boost topology or a totem pole topology explained before In the multi-cell converters with converter cells of this type, there are operation scenarios in which the half-bridge is operated in a PWM mode. This is explained in FIG. 82 which shows timing diagrams of a drive signal SLS of the low-side switch LS, and of a drive signal SHS of the high-side switch HS in one drive cycle having a duration Tp. Referring to FIG. 82, the low-side switch LS is switched on for an on-period Ton, while the high-side switch is off. After the low-side switch LS has been switched off, the high-side switch HS is switched on. An on-state of the low-side switch is represented by an on-level of the corresponding drive signal SLS, and an on-level of the high-side switch HS is represented by an on-level of the corresponding drive signal SHS in FIG. 82 (in which, just for the purpose of illustration) on-levels are represented by a high-level and off-levels are represented by a low-level. There may be a delay time (dead time) between the time when the low-side switch LS switches off and the high-side switch HS switches on. However, this delay time is not shown in FIG. 82.

In the embodiment shown in FIG. 81, the two switches HS, LS are drawn as MOSFETs, in particular as n-type MOSFETs. However, other type of transistors such as, for example, IGBTs, BJTs, JFETs, or the like, may be used as well. Independent of the specific type of electronic switch used to implement the high-side and the low-side switch, losses (conduction losses) occur when the respective switch HS, LS is in the on-state. The conduction losses of one switch are dependent on the electrical resistance of the switch in the on-state. This electrical resistance will be referred to as on-resistance $R_{ON}$ in the following. In the multi-cell converters explained hereinbefore, the individual converter cells may be operated in a continuous current mode (CCM). In this operation mode, a current through the converter cell does not decrease to zero in one drive cycle (except for the time in which the respective input voltage $V_{IN}$ or output voltage $V_{OUT}$ of the multi-cell converter is zero). For the purpose of explanation it may further be assumed that the current through the low-side switch LS during the on-time Ton is substantially equal the current through the high-side switch HS during the off-time Toff. The off-time Toff is the time between switching off the low-side switch LS and the end of the drive cycle. Losses that occur in one of the high-side switch HS and the low-side switch LS increases as the duration of the on-time of the respective switch increases. If the high-side switch HS and the low-side switch LS have substantially the same on-resistance $R_{ON}$, and when the duty cycle d=0.5 substantially the same losses occur in the high-side switch HS and the low-side switch LS because each of the switches is in the on-state for a duration that substantially equals 0.5·Tp at d=0.5

The on-resistance $R_{ON}$ of one switch is substantially reciprocal proportional to a chip area on a semiconductor chip in which the respective switch is implemented. If, for example, there is an overall chip area A available to implement the first switch HS and the second switch LS, and if each of the two switches HS, LS are implemented with substantially the same chip area, namely 0.5·A, then the two switches HS, LS have substantially the same on-resistance $R_{ON}$. If the two switches are designed to have substantially the same on-resistances $R_{ON}$, the overall conduction losses, which are the losses occurring in the high-side switch HS and the low-side switch LS are independent of the duty cycle d. If the duty cycle d is different from 0.5, the overall conduction losses can be reduced by designing the two switches to have different on-resistances. This is explained with reference to FIG. 79. In this context, "different" means that the electronic switches were intentionally designed to have different on-resistances. How the on-resistance of an electronic switch can be adjusted is explained herein before.

Figure 83:
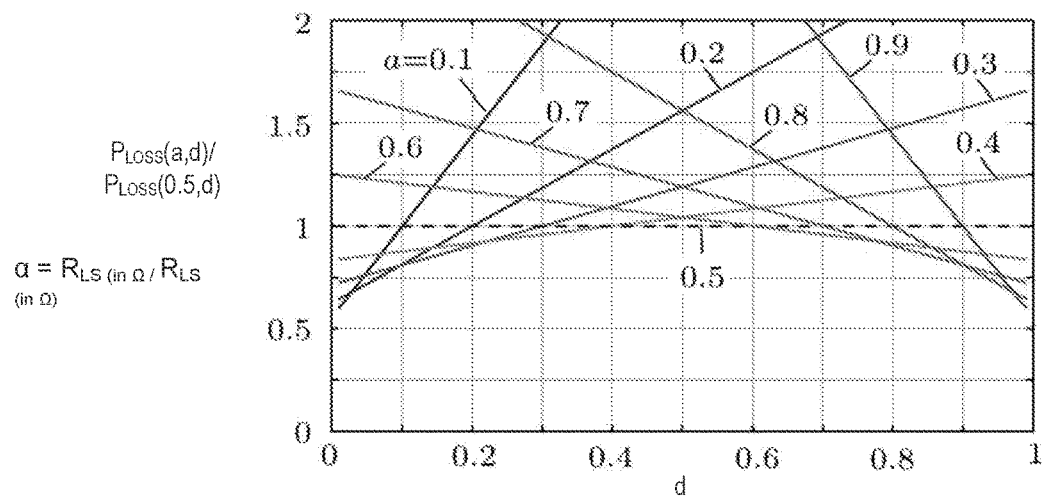
FIG. 83 illustrates losses that occur in the half-bridge shown in FIG. 81 at different duty cycles of a PWM operation for several different designs of the half-bridge.

FIG. 83 shows the overall conduction losses $P_{LOSS}(a,d)$ dependent on the duty cycle d relative to the overall conduction losses $P_{LOSS}(0.5,d)$ at equal switch area of the HS and LS switch for different designs of the high-side switch HS and the low-side switch LS. The overall conduction losses are the losses occurring in the high-side and the low-side switch HS, LS in one drive cycle. In FIG. 83, "a" denotes the switch area of the low-side switch LS relative to the overall chip area used for implementing the high-side switch HS and the low-side switch LS. If, for example, a=0.1 then the switch area of the low-side switch LS is only 0.1 times the overall switch area, while the switch area of the high-side switch is 0.9 times the overall switch area. Consequently, the on-resistance of the low-side switch is 9 times the on-resistance of the high-side switch. The dashed line in FIG. 83 represents the case in which the high-side switch and the low-side switch are designed with the same switch area, which is 0.5 times the overall switch area. A half-bridge in which the high-side switch HS and the low-side switch LS are designed with the same switch area will be referred to as a half-bridge with a symmetric design (symmetric half-bridge). Equivalently, a half-bridge designed with electronic switches HS, LS having different chip areas will be referred to as half-bridge with an asymmetric design (asymmetric half-bridge).

As can be seen from FIG. 83, a half-bridge with an asymmetric design can be superior to a half-bridge with a symmetric design (which is represented by the dashed line labeled with 0.5 in FIG. 83) if the duty cycle is in a certain range. For example, a half-bridge with an asymmetric design in which a=0.2 has lower losses than a half-bridge with a symmetric design if the duty cycle is below d=0.2. In general, for a<0.5, the asymmetric design offers lower losses if d<a. If a>0.5, the asymmetric design offers lower losses if d>a.

According to one embodiment, a multi-cell converter with an IS topology or an OS topology and including converter cells with at least one half-bridge, such as boost converter cells or totem pole converter cells, includes at least one converter cell with an asymmetric half-bridge. In those multi-cell converters, the modulation index and, therefore, the duty cycle of the individual converter cells may vary over a relatively large range during one halfwave of a sinusoidal input voltage (output voltage). The asymmetric design of at least one half-bridge in at least one converter cell and the varying duty cycle offers the possibility to operate the converter cell with the asymmetric half-bridge at a duty cycle in which the asymmetric design is superior to the symmetric design. This is explained with reference to FIG. 84 herein below.

Figure 84:
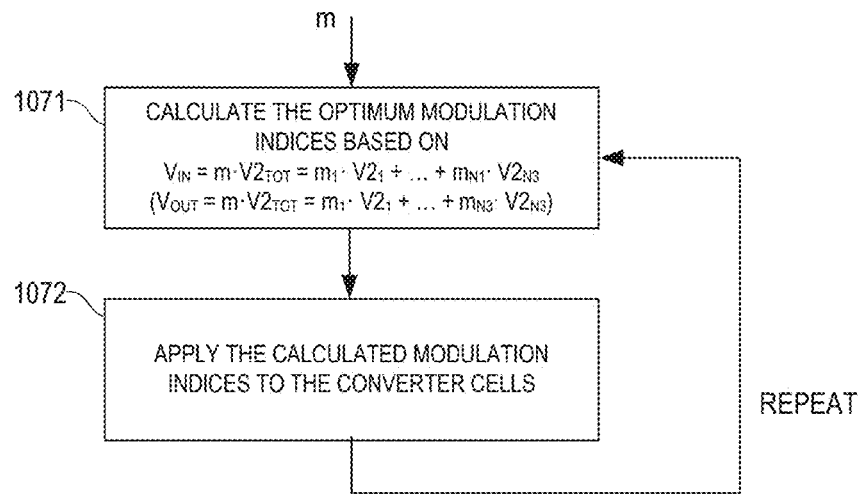
FIG. 84 shows one embodiment of a method for optimizing operation of a multi-cell power converter by differently operating the individual converter cells.

FIG. 84 illustrates one method of operating a multi-cell converter with an IS topology or with an OS topology. In particular, FIG. 84 illustrates a method for calculating modulation indices $m_1$-$m_{N1}$ of the individual converter cells which may have a boost topology or a totem pole topology. The method shown in FIG. 80 applies to a first power converter 10 with N1 converter cells. However, this method applies equivalently to a second power converter with N3 converter cells. Referring to the explanation above, a multi-cell converter with IS topology may be operated such that the instantaneous level of the input voltage $V_{IN}$ substantially corresponds to the product of the modulation index m and the total DC link voltage $V2_{TOT}$ (a multi-cell converter with OS topology may be operated such that the instantaneous level of the output voltage $V_{OUT}$ substantially corresponds to the product of the modulation index m and the total DC link voltage $V2_{TOT}$).

Referring to the above, the instantaneous voltage level of the input voltage $V_{IN}$ of an IS converter may be tracked by the total cell input voltage $V1_{TOT}$ by operating the individual converter cells with the same modulation index m at one time. However, it is also possible to operate the individual converter cells with different modulation indices. In this case, the individual converter cells are to be operated such that $V_{IN}=m_1 \cdot V2_1 + m_2 \cdot V2_2 + \ldots + m_{N1} \cdot V2_{N2}$. The plurality of modulation indices $m_1$-$m_{N1}$ in this equation can be regarded as a modulation index vector. It can be shown that the equation above is met by a plurality of different modulation index vectors. If, for example, the converter cell $\mathbf{1}_1$ receiving modulation index $m_1$ has a high efficiency at a high modulation index (which corresponds to a low duty cycle), then the modulation index vector may be calculated such that $m_1$ is high, where other modulation indices may be lower. The individual modulation indices $m_1$-$m_{N1}$ obtained through this method may be applied to the individual converter cells (1072).

Figure 85:
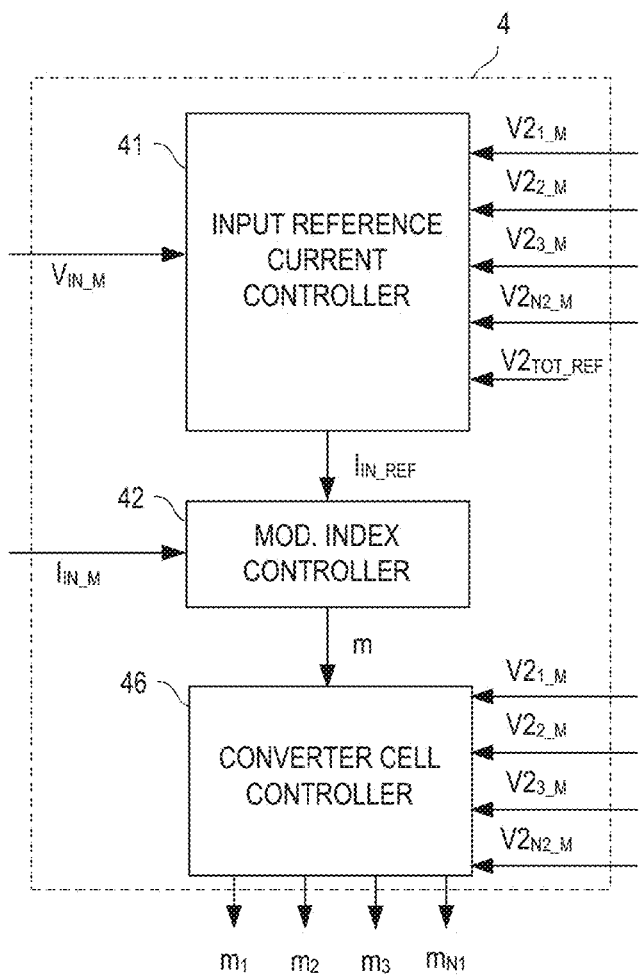
FIG. 85 shows one embodiment of a main controller in an IS multi-cell converter with an optimization functionality as illustrated in FIG. 84.

FIG. 85 shows one embodiment of a main controller 4 which is configured to control a first power converter 10 with an IS topology and with at least one converter cell having an asymmetric half-bridge. This main converter 4 shown in FIG. 81 is based on the main converter 4 shown in FIG. 13 and is different from this main converter 4 in that it additionally includes a converter cell controller 46 which is configured to generate the modulation indices $m_1$-$m_{N1}$ in accordance with the method explained with reference to FIG. 80.

Figure 86:
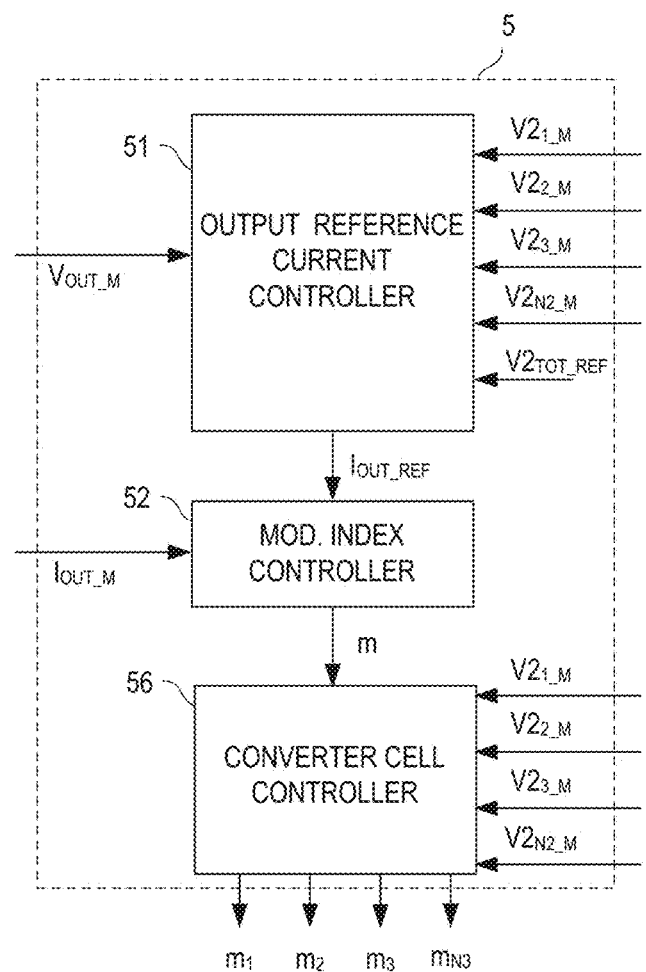
FIG. 86 shows one embodiment of a main controller in an OS multi-cell converter with an optimization functionality as illustrated in FIG. 84.

FIG. 86 shows a corresponding main controller 5 of a second power converter 20 with an OS topology. This main controller 5 is based on the main controller 5 shown in FIG. 35 and is different from this main controller shown in FIG. 35 in that it additionally includes a converter cell controller 56 a converter cell controller 56 which calculates the modulation indices $m_1$-$m_{N3}$ received by the individual converter cells $\mathbf{2}_1$-$\mathbf{2}_{N3}$ in accordance with the method explained with reference to FIG. 80 above.

Alternatively or additionally to operating individual converter cells of a multi-cell converter, in particular a multi-cell converter with an IS or OS topology, at different modulation indices in order to operate individual converter cells close to their optimum operation point, the switching frequency (which has been referred to as fp above) may be varied. That is, at least two converter cells of a multi-cell converter with an IS or OS topology may be operated with different switching frequencies in the PWM mode. The modulation index may be the same for the two converter cells, or may be different. The two converter cells may be operated in the PWM mode at the same time or at different times. Nevertheless, by operating the at least two converter cells in the PWM mode with different switching frequencies, the efficiency curves of the two converter cells are different, so that, for example, the converter cell with the higher switching frequency may have the maximum efficiency at a lower power level than the converter cells with the lower switching frequency. According to one embodiment, the switching frequency of the converter cell with the higher switching frequency is at least two times the switching frequency of the converter cell with the lower switching frequency.

Figure 87:
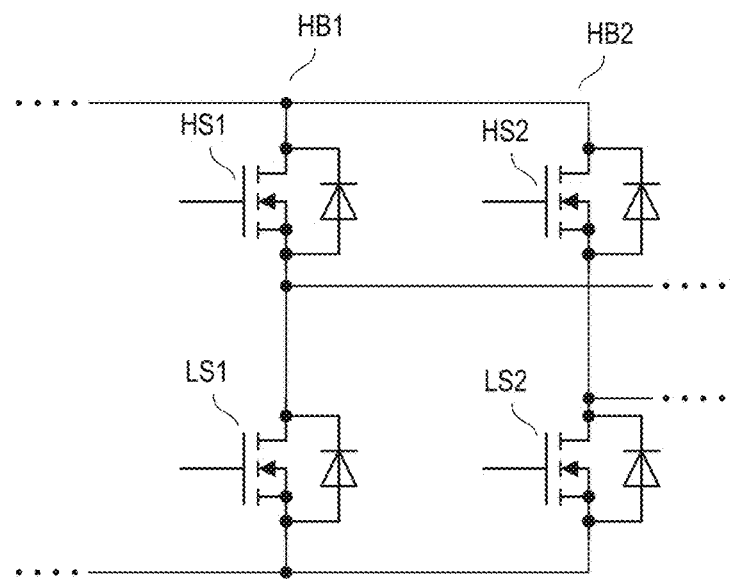
FIG. 87 shows one embodiment of a bridge circuit in a multi-cell converter.

FIG. 87 shows one embodiment of a full-bridge which includes two half-bridges HB1, HB2 wherein each half-bridge HB1, HB2 includes a high-side switch HS1. HS2 and a low-side switch LS1, LS2. Each of these high-side and low-side switches HS1, LS2 includes at least one silicon MOSFET. In the embodiment shown in FIG. 83, these MOSFETs are n-type MOSFETs, however, p-type MOSFETs may be used as well. Instead of only one MOSFET, each of these switches may include two or more MOSFETs which have their load paths connected in parallel and which are switched on and off simultaneously.

The full-bridge shown in FIG. 87 represents the full-bridge in any converter cell with a full-bridge (totem pole) topology in any of the IS or OS multi-cell converters explained hereinbefore. Referring to FIG. 25 and the corresponding description, one of these half-bridges is operated in a PWM mode, such as a PWM mode explained with reference to FIGS. 81 and 81 hereinbefore. Referring to FIG. 87, silicon MOSFETs include an internal diode which is explicitly drawn in FIG. 88. This diode is often referred to as body diode. If one of these half-bridges is operated in a PWM mode such that there is a delay time between switching off one of the two switches and switching on the other one of the two switches, the body diode of the other switch becomes conducting. This is explained with reference to the half-bridge 17 shown in FIG. 24.

If the low-side switch $\mathbf{17}_L$ is conducting, the input current $I0_i$ flows through the low-side switch $\mathbf{17}_L$. If the low-side switch $\mathbf{17}_L$ switches off the input current $I0_i$ (driven by the at least one inductor of the multi-cell power converter circuit) flows through the diode connected in parallel with high-side switch $\mathbf{17}_H$. This diode shown in FIG. 24 can be formed by the body diode of a MOSFET when the high-side switch $\mathbf{17}_H$ is implemented as a MOSFET. A current flows through the diode until the high-side switch $\mathbf{17}_H$ switches on. At the end of one drive cycle $\mathbf{17}_H$ switches on and the low-side switch $\mathbf{17}_L$ again switches on. There may be a delay time between switching off the high-side switch $\mathbf{17}_H$ and switching on the low-side switch $\mathbf{17}_L$, so that the input current $I0_i$ continuous to flow through the diode of the high-side switch $\mathbf{17}_H$ until the low-side switch $\mathbf{17}_L$ switches on.

When the diode of the high-side switch $\mathbf{17}_H$ conducts the input current $I0_i$ electrical charge is stored in the diode. This electrical charge has to be removed from the diode before the diode blocks. This effect of removing electrical charge from a bipolar diode is commonly known as reverse recovery.

The electrical charge stored in the body diode of a MOSFET, when the body diode is conducting, is, inter alia, dependent on a so-called output capacitance of the MOS- FET. This output capacitance and, the charge stored in the body diode, increases as the voltage blocking capability of the MOSFET increases, wherein the output capacitance increases exponentially. That is the output capacitance is a function of $V_B{}^c$, with b>1, where $V_B$ denotes the voltage blocking capability. By virtue of this relatively high output capacitance converters silicon MOSFETs were not considered suitable to implement the switches in a power converter with a totem pole topology. In this context reference is made Zhou et al.: "99% Efficiency True-Bridgeless Totem-Pole PFC Based on GaN HEMTs".

In a multi-cell converter with an IS or OS topology, however, the individual switches can be designed with a voltage blocking capability which is lower than the DC link voltage. If, for example, the total DC link voltage is 600V and a conventional power converter (with a PFC functionality) is employed, the converter is to be implemented with switches having a voltage blocking capability of 600V. In the IS or OS converters explained above, the switches of one converter cell may be implemented with a voltage blocking capability which only corresponds to the voltage level of the respective DC link voltage. For example, if there are N1=4 or N3=4 converter cells $1_1$-$1_{N1}$ and $2_1$-$2_{N3}$, respectively, it may be sufficient to design the individual switches with a voltage blocking capability of 150V (=600V/4). In case there are N1=10 or N3=10 only a voltage blocking capability of only 60V (=600V/10) may be sufficient.

In an IS or OS converter, the overall on-resistance is N1 (or N3) times the on-resistance of one switch, so that the on-resistance increase linearly as the number of converter cells increases. However, the overall reverse recovery charge stored in the switches of the individual converter cells decrease exponentially. This is shown by way of an example below. In a silicon MOSFET there is a figure of merit (FOM) which describes the relationship between the on resistance and the charge which has to be removed from the MOSFET when the body diode switches from the forward biased to the reverse biased state, namely $R_{ON} \cdot Q_{REV\_REC}$ ($Q_{REV\_REC}$ is often referred to as Qrr+Qoss, where Qoss is the charge stored in an output capacitance, and Qrr is the charge stored in the diode when switched from a forward current to a reverse current The on-resistance can be decreased by designing the MOSFET with a larger chip area, wherein the on-resistance $R_{ON}$ is substantially inversely proportional to the chip area. However, as $Q_{REV-REC}$ is substantially proportional to the chip area, the FOM defined above is substantially independent of the chip area and mainly dependent on the voltage blocking capability and the specific design.

A MOSFET with a voltage blocking capability of 600V of the CoolMOS™ CFD2 series of Infineon Technologies AG, Munich has an FOM of about 78000 (7.8E4). A MOSFET with a voltage blocking capability of 60V of the OptiMOS series of the same supplier has an FOM of only 346. The overall FOM of 10 series connected converter cells is 3460, which is 22 times better than the FOM of only one MOSFET with a voltage blocking capability of 600V.

Thus, a multi-cell converter with a series connection of several, such as 4, 6, 10 or more, converter cells has a reverse recovery behavior which is competitive.

Referring to the disclosure in context with FIG. 1, the power converter circuit includes at least one multi-cell converter. That is each type of first power converter 10 with a multi-cell topology explained before may be coupled to a second power converter which does not have a multi-cell topology, or may be used alone without a second power converter. Equivalently, each type of second power converter 20 with a multi-cell topology explained before may be coupled to a first power converter which does not have a multi-cell topology, or may be used alone without a first power converter. This is explained by way of two examples with reference to FIGS. 88 and 89 below.

Figure 88:
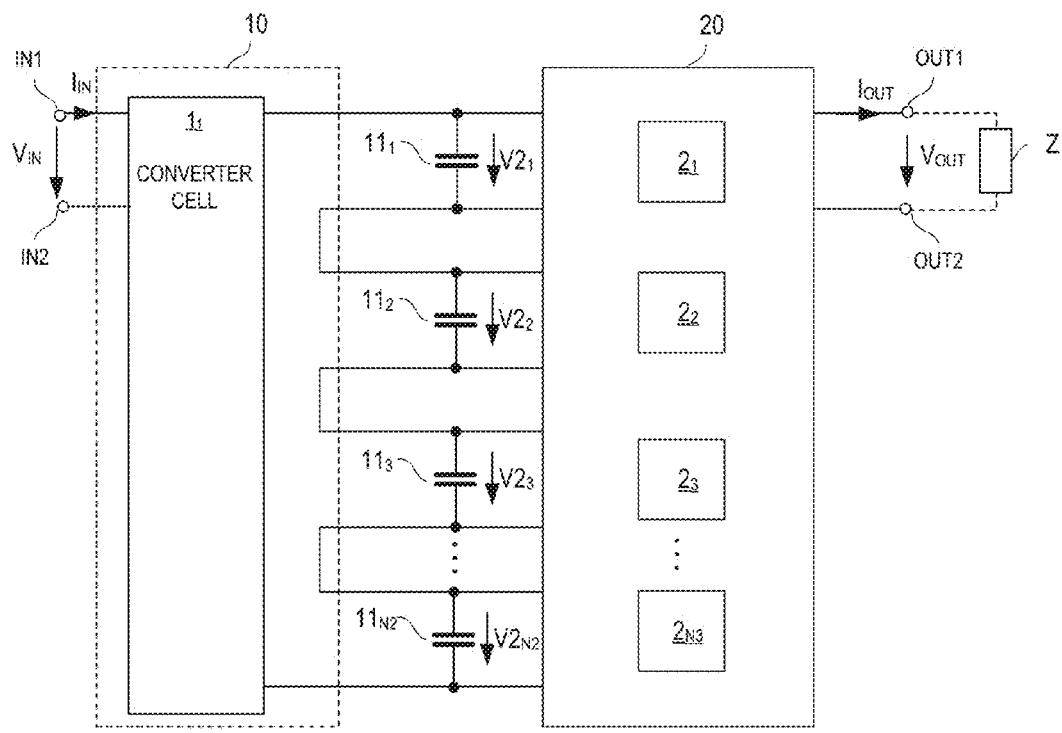
FIG. 88 shows one embodiment of a power converter circuit which includes a multi-cell converter and a single cell converter.

FIG. 88 shows one embodiment of a power converter circuit in which the second power converter 20 is a multi-cell converter of any of the types explained before. The first power converter is a single cell converter. That is, the first power converter includes only one converter cell $1_1$ which is configured to receive power from the input IN1, IN2 and to provide power to the plurality of DC link capacitors $11_1$-$11_{N1}$ which are connected in series at the cell output of the converter cell $1_1$. The converter cell $1_1$ may have one of a step-up and a step-down characteristic. That is the total DC link voltage may be higher or lower than a (peak) level of the input voltage.

Figure 89:
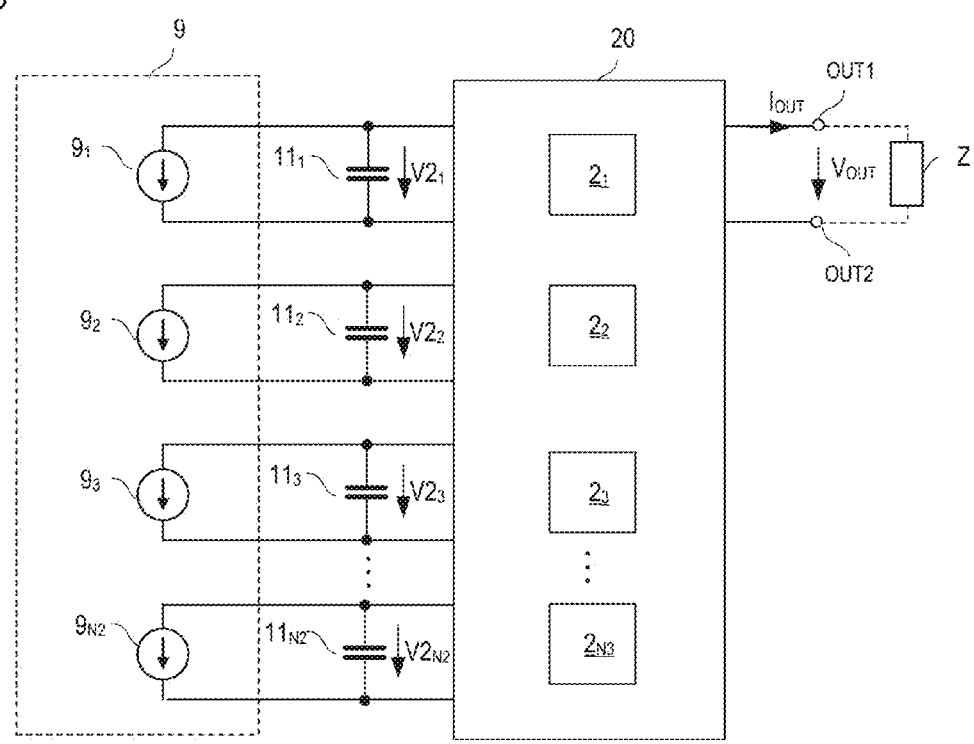
FIG. 89 shows one embodiment of a power converter circuit which includes a multi-cell converter which receives a plurality of DC voltages from different power sources.

FIG. 89 shows one embodiment of a power converter circuit which includes a second converter 20 of any of the types explained before. In this embodiment, there is no further power converter (no first converter). The individual DC link capacitors $2_1$-$2_{N2}$ couple the second power converter 20 to a DC power source 9 with a plurality of power source cells $9_1$-$9_{N2}$, wherein each power source cell is connected to one DC link capacitor $2_1$-$2_{N2}$. Examples of the power source cells include, but are not restricted to, batteries, photovoltaic (PV) panels, fuel cells, or the like. According to one embodiment, the second power converter 20 includes an OS topology and a PFC capability and is configured to supply power to an AC power grid.

Figure 90:
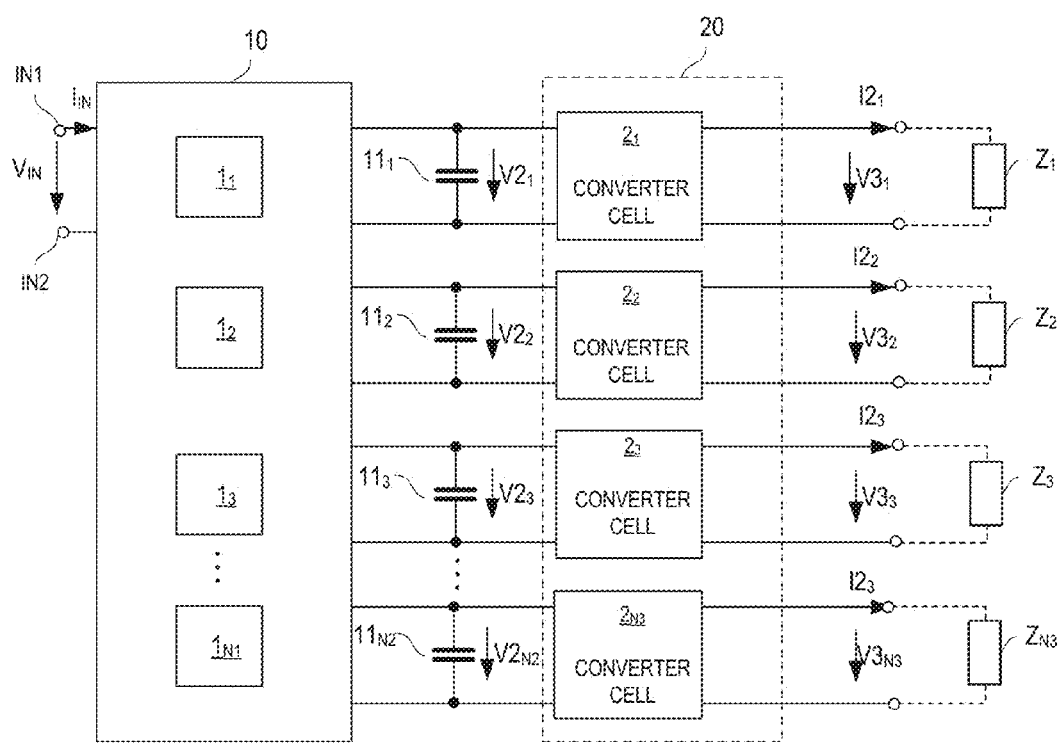
FIG. 90 shows one embodiment of a power converter circuit which includes a multi-cell converter and a plurality of single cell converters coupled to the multi-cell converter.

FIG. 90 shows one embodiment of a power converter circuit with a first power converter 10 and a second power converter 20. The second power converter includes a plurality of converter cells $2_1$-$2_{N3}$ each receiving power from the first converter 10 and the associated DC link capacitor $11_1$-$11_{N2}$. The topology of the second converter 20 is different from each of the second converter topologies explained above in that the cell output of each of the plurality of converter cells $2_1$-$2_{N3}$ is connected to one of a plurality of loads $Z_1$-$Z_{N3}$ which are supplied by the second converter 20. Thus, the cell outputs of the converter cells $2_1$-$2_{N3}$ are not connected (neither connected in series nor in parallel). According to one embodiment, the loads $Z_1$-$Z_{N3}$ are Dc loads so that the individual converter cells $2_1$-$2_{N3}$ are DC/DC converter cells. The first converter may have an IS topology and a PFC capability.

According to one embodiment, the first converter 10 is configured to receive the input power from a medium voltage grid. Using the power converter circuit shown in FIG. 89 DC loads, such as the loads $Z_1$-$Z_{N3}$ can directly be supplied from a medium voltage grid without having to transform the medium AC voltage to a low AC voltage. Dependent on the specific type of the medium voltage grid, the peak input voltage can be up to several 10 kV. However, by virtue of the IS topology in the first converter 10 semiconductor switches with a voltage blocking capability of much less than the peak input voltage can be used in the converter cells of the first converter 10. In this embodiment more than 10 and up to several 10 converter cells may be used in the first converter 10 and, consequently, the second converter 20. The "voltage blocking capability" defines the maximum voltage an electronic switch can withstand in the off-state (switched off-state) without being damaged.

The first and second power converters 10, 20 explained before may be combines in various different ways so as to obtain power converter circuits for many different applications in the field of AC/DC, DC/AC, or DC/DC power conversion. Some of these applications are explained below. In these applications, the specific design of the first power converter 10 and the second power converter 10, respectively, can be selected based on different parameters such as, for example, the (peak) level of the input voltage, and the (peak) level of the output voltage. An IS topology may be used when the level of the input voltage is relatively high, such as higher than 100V, an IP topology may be used when the voltage level is lower. Equivalently, an OS topology may be used when the level of the output voltage is relatively high, such as higher than 100V, an OP topology may be used when the voltage level is lower. In the design of the power converter circuit, the number of converter cells in the first power converter circuit 10 and the second power converter circuit, respectively can be dependent on the peak input voltage and may be higher the higher the peak input voltage is.

An AC/DC power converter circuit may be configured to receive a low voltage from a low voltage power grid, or a medium voltage from a medium voltage power grid. A low voltage power grid supplies a sine voltage with $110V_{RMS}$ or $220V_{RMS}$ (so that a peak voltage is about 155V or 310V, respectively). A medium voltage grid supplies a sine voltage with a peak voltage of several kilovolts (kV), up to 10 kV. The AC/DC power converter circuit may include a first power converter 10 with which controls the DC link voltages $V2_1$-$V2_{N2}$, and a second power converter 20 which controls the output voltage $V_{OUT}$.

A DC/AC power converter circuit may be configured to receive a DC power from a DC voltage source and to supply an AC power voltage to an AC power grid. According to one embodiment, the DC power source includes a solar panel. According to one embodiment, the DC power source includes a high-voltage, direct current (HVDC) power transmission grid. The power grid supplied by the DC/AC power converter circuit may be a low voltage or a medium voltage power grid. The DC/AC power converter circuit may include a first power converter which controls one of the input current $I_{IN}$ and the input voltage $V_{IN}$, and a second power converter 20 which controls the DC link voltages $V2_1$-$V2_{N2}$ output voltage $V_{OUT}$.

Basically, each of the multi-cell converters explained herein before may be implemented in a power converter circuit with together with another multi-cell converter, with a single cell converter, or alone, that is, without another power converter. In case there is another (multi-cell or single cell) converter, the other converter, dependent on the specific topology, either supplies power to the multi-cell converter and the DC link capacitors, respectively, or receives power from the multi-cell converter and the DC link capacitors, respectively.

Above, several types of multi-cell converters, power converter circuits with at least one multi-cell converters, and different ways of operation of such multi-cell converters and power converter circuits are disclosed. Of course, the aspects explained above may be combined with each other. Some of these aspects are summarized below.

Some of the aspects explained above relate to:

A1. A method including: converting power by a power converter including a plurality of converter cells; and selectively operating at least one converter cell of the plurality of converter cells in one of an active and an inactive mode based on a level of a power reference signal.

A2. The method of item A1, further including: operating at least one other converter cell of the plurality of converter cells in an active mode when the at least one converter cell is operated in the inactive mode.

A3. The method of item A2, wherein the at least one other converter cell of the plurality of converter cells includes the remainder of the plurality of converter cells.

A4. The method of one of items A1-A3, wherein operating the at least one converter cell in the inactive mode includes converting zero power by the at least one converter cell.

A5. The method of one of items A1-A4, wherein operating the at least one converter cell in one of the active mode and the inactive mode based on the level of the power reference signal includes: operating the at least one converter cell in the inactive mode when the level of the power reference signal is below a predefined threshold.

A6. The method of one of items A1-A5, wherein operating the at least one converter cell in the active mode includes operating at least one switch in the at least one converter cell in a PWM (Pulse-Width Modulated) fashion at a switching frequency, and wherein operating the at least one converter cell in the inactive mode includes operating the at least one converter cell in the inactive mode for a time duration which is at least ten times a reciprocal of the switching frequency.

A7. The method of one of items A1-A6, wherein operating the at least one converter cell in the inactive mode includes setting a number of converter cells which are operated in the inactive mode based on the level of the power reference signal, wherein the number increases as the level decreases.

A8. The method of one of items A1-A7, wherein each of the plurality of converter cells includes a cell input configured to receive a cell voltage and a cell output, and wherein the cell outputs of the plurality of converter cells are connected in parallel, wherein a parallel circuit which includes the cell outputs of the plurality of converter cells is coupled to an output of the power converter.

A9. The method of item A8, wherein the plurality of converter cells is configured to control one of an output voltage, and an output current at the output of the power converter based on the power reference signal, wherein the power reference signal includes an output current reference signal.

A10. The method of item A9, wherein operating the at least one of the plurality of converter cells in one of the active mode and the inactive mode includes operating the at least one of the plurality of converter cells in the inactive mode when a level of the output current reference signal is below a predefined current threshold.

A11. The method of item A8, wherein operating the at least converter cell in one of the active mode and the inactive mode includes: selecting a number K of converter cells to be operated in the inactive mode based on the level of the output current reference signal; identifying those K converter cells that receive the lowest cell input voltages; and operating the identified converter cells in the inactive mode.

A12. The method of item A10, further including: repeating the selecting, identifying, and operating.

A13. The method of item A12, wherein the repeating includes repeating regularly.

A14. The method of item A12, wherein the repeating includes repeating when a voltage level of the input voltage of one of the plurality of second converter cells falls below a predefined voltage threshold.

A15. The method of one of items A1-A14, wherein the plurality of converter cells is configured to control the output voltage to be substantially constant.

A16. The method of one of items A1-A14, further including: providing a cell input voltage at the cell input of each of the plurality of converter cells by another power converter.

A17. The method of item A16, wherein the other power converter includes at least one converter cell.

A18. The method of item A17, wherein the power converter and the other power converter are linked by a plurality of capacitors.

A19. The method of item A18, wherein each of the cell input voltages is a voltage across a respective one of the plurality of capacitors.

A20. The method of one of items A16-A19, wherein the other power converter is configured to control a sum of the cell input voltages.

A21. The method of item A1, wherein each of the plurality of converter cells includes a cell input and a cell output configured to provide a cell output voltage, and wherein the cell inputs of the plurality of converter cells are connected in parallel, wherein a parallel circuit which includes the cell inputs of the plurality of converter cells is coupled to an input of the power converter.

A22. The method of item A21, wherein the plurality of converter cells is configured to control one of an input voltage, and an input current at the input of the power converter based on the power reference signal, wherein the power reference signal includes an input current reference signal.

A23. The method of item A22, wherein operating the at least one of the plurality of converter cells in one of the active mode and the inactive mode includes operating the at least one of the plurality of converter cells in the inactive mode when a current level of the input current reference signal is below a predefined current threshold.

A24. The method of item A21, wherein operating the at least converter cell in one of the active mode and the inactive mode includes: selecting a number K of converter cells to be operated in the inactive mode based on the level of the input current reference signal; identifying those K converter cells that have the highest cell output voltages; and operating the identified converter cells in the inactive mode.

A25. The method of item A24, further including: repeating the selecting, identifying, and operating.

A26. The method of item A25, wherein the repeating includes repeating regularly.

A27. The method of item A25, wherein the repeating includes repeating when a voltage level of the input voltage of one of the plurality of second converter cells rises above a predefined voltage threshold.

A28. The method of one of items A22-A27 wherein the plurality of converter cells is configured to control the input voltage to be substantially constant.

A29. The method of one of items A21-A28, further including: receiving a cell output voltage at the cell output of each of the plurality of converter cells by another power converter.

A30. The method of item A29, wherein the other power converter includes only one converter cell.

A31. The method of one of items A29-A30, wherein the power converter and the further power converter are linked by a plurality of capacitors.

A32. The method of item A31, wherein each of the cell output voltages is a voltage across a respective one of the plurality of capacitors.

A33. A method including: receiving a periodic voltage by a power converter which includes a plurality of converter cells; and selectively operating at least one converter cell of the plurality of converter cells in one of an active and an inactive mode based on a change of a voltage level of the periodic voltage such that within one period of the periodic voltage, the number of active converter cells changes as the voltage level of the periodic voltage changes.

A34. The method of item A33, wherein selectively operating the at least one converter cell in one of the active and the inactive mode includes operating the at least one converter cell such that the number of active converter cells increases as the voltage level of the periodic voltage increases.

A35. The method of one of items A33-A34, wherein selectively operating the at least one converter cell in one of the active and the inactive mode includes operating the at least one converter cell such that the number of active converter cells decreases as the voltage level of the periodic voltage decreases.

A36. The method of one of items A33-A35, wherein each of the plurality of converter cells includes a cell input and a cell output, wherein the cell inputs of the plurality of converter cells are connected in parallel, wherein a parallel circuit which includes the cell inputs is coupled to an input of the power converter, and wherein the cell output of each converter cell is coupled to a respective capacitor.

A37. The method of one of items A33-A36, wherein each of the plurality of converter cells includes a cell input and a cell output, wherein the cell outputs of the plurality of converter cells are connected in parallel, wherein a parallel circuit which includes the cell inputs is coupled to an input of the power converter, and wherein the cell input of each converter cell is coupled to a respective capacitor.

A38. The method of one of items A34-A37, wherein in each of a plurality of successive periods or half-periods two or more converter cells are activated as the voltage level of the input voltage increases, and wherein an order in which the two or more converter cells are activated is different in at least two different periods or half-periods.

A39. The method of one of items A35-A38, wherein in each of a plurality of successive periods or half-periods two or more converter cells are deactivated as the voltage level of the input voltage decreases, and wherein an order in which the two or more converter cells are deactivated is different in at least two different periods or half-periods.

A40. The method of one of items A33-A39, wherein operating the at least one converter cell in the inactive mode includes converting zero power by the at least one converter cell.

A41. A power converter circuit including a power converter, wherein the power converter includes: a plurality of converter cells; and a controller configured to operate at least one converter cell of the plurality of converter cells in one of an active and an inactive mode based on a level of a power reference signal.

A42. The power converter circuit of item A41, wherein each of the plurality of converter cells includes a cell input configured to receive a cell input voltage and a cell output, and wherein the cell outputs of the plurality of converter cells are connected in parallel, wherein a parallel circuit which includes the cell outputs of the plurality of converter cells is coupled to an output of the power converter.

A43. The power converter circuit of item A42, wherein the controller is configured to control one of an output voltage, and an output current at the output of the power converter based on the level of the power reference signal, wherein the power reference signal includes an output current reference signal A44. The power converter circuit of item A43, wherein the controller is configured to operate the at least one of the plurality of converter cells in the inactive mode when a level of the output current reference signal is below a predefined current threshold.

A45. The method of one of items A42-A44, wherein the controller is configured: to select a number K of converter cells to be operated in the inactive mode based on the level of the output current reference signal; to identify those K converter cells that receive the lowest cell input voltages; and to operate the identified converter cells in the inactive mode.

A46. The power converter circuit of item A38, wherein each of the plurality of converter cells includes a cell input and a cell output configured to provide a cell output voltage, and wherein the cell inputs of the plurality of converter cells are connected in parallel, wherein a parallel circuit which includes the cell inputs of the plurality of converter cells is coupled to an input of the power converter.

A47. The power converter circuit of item A46, wherein the controller is configured to control one of an input voltage and an input current at the input of the power converter based on the power reference signal, wherein the power reference signal includes an input current reference signal.

A48. The power converter circuit of item A47, wherein the controller is configured to operate the at least one of the plurality of converter cells in the inactive mode when a level of the input current reference signal is below a predefined current threshold.

A49. The power converter circuit of one of items 46-A48, wherein the controller is configured: to select a number K of converter cells to be operated in the inactive mode based on the level of the input current reference signal; to identify those K converter cells that have the lowest cell output voltages; and to operate the identified converter cells in the inactive mode.

A50. A power converter circuit, including: a power converter which includes a plurality of converter cells and is configured to receive a periodic voltage; and a controller, wherein the controller is configured to selectively operate at least one converter cell of the plurality of converter cells in one of an active and an inactive mode based on a change of the periodic voltage such that within one period of the periodic voltage, the number of active converter cells changes as a voltage level of the periodic voltage changes.

A51. The power converter circuit of item A50, wherein the controller is configured to selectively operate the at least one converter cell in one of the active and inactive mode such that within one period of the periodic voltage, the number of active converter cells increases as the voltage level of the periodic voltage increases.

A52. The power converter circuit of one of items A50-A51, wherein the controller is configured to selectively operate the at least one converter cell in one of the active and inactive mode such that within one period of the periodic voltage, the number of active converter cells decreases as the voltage level of the periodic voltage decreases.

B1. A power converter circuit including: a plurality of converter cells, wherein at least a first converter cell of the plurality of converter cells has a first operational characteristic, and wherein at least a second converter cell of the plurality of converter cells has a second operational characteristic different than the first operational characteristic.

B2. The power converter circuit of item B1, further including: a plurality of capacitors, each associated with one of the plurality of converter cells, wherein the power converter is configured to control a voltage across each of the plurality of capacitors, and wherein the first operational parameter includes a first voltage level of a voltage across a first capacitor associated with the first converter cell, and the second operational parameter includes a second voltage level of a voltage across a second capacitor associated with the second converter cell.

B3. The power converter circuit of item B2, wherein the first voltage level is less than 80% of the second voltage level.

B4. The power converter circuit of one of items B1-B3, wherein the power converter is configured to control a voltage across each of the plurality of capacitors such that the voltages across the plurality of capacitors are mutually different.

B5. The power converter circuit of one of items B1-B4, wherein each of the plurality of converter cells includes a cell input and a cell output, wherein the cell inputs of the plurality of converter cells are connected in series, wherein a series circuit which includes the cell inputs of the plurality of converter cells is coupled to an input of the power converter, and wherein the cell output of each of the plurality of converter cells is connected to a respective one of the plurality of capacitors.

B6. The power converter circuit of one of items B1-B5, wherein the power converter is configured to receive a periodic voltage at the input of the power converter, and to operate each of the converter cells in one of three different operation modes based on a voltage level of the input voltage.

B7. The power converter of item B6, wherein the three different operation modes include: an on-mode; an off-mode; and a PWM (Pulse-Width Modulation) mode.

B8. The power converter of one of items B6-B7, wherein each of the converter cells includes at least one electronic switch, wherein operating each of the converter cell in one of the three different operation modes includes operating each of the converter cell in successive drive cycles, wherein in the on-mode the at least one electronic switch is in an on-state throughout each drive cycle, wherein in the off-mode the at least one electronic switch is in an off-state throughout each drive cycle, and wherein in the PWM mode, the at least one electronic switch is in the on-state for an on-period and in the off-state for an off-period in each drive cycle.

B9. The power converter circuit of one of items B1-B8, wherein each of the plurality of converter cells includes a cell input and a cell output, wherein the cell outputs of the plurality of converter cells are connected in series, wherein a series circuit which includes the cell outputs of the plurality of converter cells is coupled to an output of the power converter, and wherein the cell input of each converter cell is connected to a respective one of the plurality of capacitors.

B10. The power converter circuit of item B9, wherein the power converter is configured to receive a periodic voltage at the output of the power converter, and to operate each of the converter cells in one of three different operation modes based on a voltage level of the input voltage.

B11. The power converter of item B10, wherein the three different operation modes include: an on-mode; an off-mode; and a PWM mode.

B12. The power converter of item B11, wherein each of the converter cells includes at least one electronic switch, wherein operating each of the converter cell in one of the three different operation modes includes operating each of the converter cell in successive drive cycles, wherein in the on-mode the at least one electronic switch is in an on-state throughout each drive cycle, wherein in the off-mode the at least one electronic switch is in an off-state throughout each drive cycle, and wherein in the PWM mode, the at least one electronic switch is in the on-state for an on-period and in the off-state for an off-period in each drive cycle.

B13. The power converter circuit of item B1, wherein the first operational characteristic includes a first voltage blocking capability of at least one electronic switch in the first converter cell, and the second operational characteristic includes a second voltage blocking capability of at least one electronic switch in the second converter cell.

B14. The power converter circuit of item B13, wherein the first voltage blocking capability is less than 80% of the second voltage blocking capability.

B15. The power converter circuit of item B13, wherein the voltage blocking capability of the at least one electronic switch in each of the plurality of converter cells is different from the voltage blocking capability of the at least one electronic switch in each of the others of the plurality of converter cells.

B16. The power converter circuit of item B13, wherein each of the first converter cell and the second converter cell includes a half-bridge, and wherein the at least one electronic switch of the first converter cell is a high-side switch of the respective half-bridge, and the at least one electronic switch of the second converter cell is a high-side switch of the respective half-bridge.

B17. The power converter circuit of item B11, wherein each of the first converter cell and the second converter cell includes a half-bridge, and wherein the at least one electronic switch of the first converter cell is a low-side switch of the respective half-bridge, and the at least one electronic switch of the second converter cell is a low-side switch of the respective half-bridge.

B18. The power converter circuit of item B13, wherein each of the plurality of converter cells includes a cell input and a cell output, wherein the cell inputs of the plurality of converter cells are connected in series.

B19. The power converter circuit of item B13, wherein each of the plurality of converter cells includes a cell input and a cell output, wherein the cell outputs of the plurality of converter cells are connected in series.

B20. The power converter circuit of item B13, further including: a plurality of capacitors, wherein each of the plurality of capacitors is connected to one of the plurality of converter cells; and a further power converter coupled to the plurality of converter cells, wherein the further power converter includes at least one converter cell.

B21. The power converter circuit of item B1, wherein the first operational characteristic includes a first on-resistance of at least one electronic switch in the first converter cell, and the second operational characteristic includes a second on-resistance of at least one electronic switch in the second converter cell.

B22. The power converter circuit of item B21, wherein the first on-resistance is less than 80% of the second on-resistance.

B23. The power converter circuit of item B22, wherein the on-resistance of the at least one electronic switch in each of the plurality of converter cells is different from the on-resistance of the at least one electronic switch in each of the others of the plurality of converter cells.

B24. The power converter circuit of item B22, wherein each of the first converter cell and the second converter cell includes a half-bridge, and wherein the at least one electronic switch of the first converter cell is a high-side switch of the respective half-bridge, and the at least one electronic switch of the second converter cell is a high-side switch of the respective half-bridge.

B25. The power converter circuit of item B23, wherein each of the first converter cell and the second converter cell includes a half-bridge, and wherein the at least one electronic switch of the first converter cell is a low-side switch of the respective half-bridge, and the at least one electronic switch of the second converter cell is a low-side switch of the respective half-bridge.

B26. The power converter circuit of item B23, wherein each of the plurality of converter cells includes a cell input and a cell output, wherein the cell inputs of the plurality of converter cells are connected in parallel.

B27. The power converter circuit of item B23, wherein each of the plurality of converter cells includes a cell input and a cell output, wherein the cell outputs of the plurality of converter cells are connected in parallel.

B28. A method, including: receiving a periodic input voltage by a power converter including a plurality of converter cells each including a cell input, and a cell output; and based on a voltage level of the periodic input voltage, connecting the cell inputs of at least two converter cells of the plurality of converter cells either in parallel or in series.

B29. The method of item B28, including: connecting the cell inputs in parallel when the instantaneous voltage level is below a predefined voltage threshold.

B30. The method of item B28, further including: receiving a cell output power at the cell output of each converter cell by another power converter.

B31. The method of item B30, wherein the multi-cell power converter and the other power converter are linked by a plurality of capacitors.

B32. A method, including: receiving a periodic voltage by a power converter including a plurality of converter cells each including a cell output, and a cell input; and based on an instantaneous voltage level of the output voltage, connecting the cell outputs of at least two converter cells of the plurality of converter cells either in parallel or in series.

B33. The method of item B32, including: connecting the cell outputs in parallel when the voltage level is below a predefined voltage threshold.

B34. The method of item B32, further including receiving a cell input power at the cell input of each converter cell from another power converter.

B35. The method of item 33, wherein the other converter and the further power converter are linked by a plurality of capacitors.

C1. A method, including: receiving a periodic voltage by a power converter including a plurality of converter cells; in a series of time frames of equal duration, alternating an average power level of power converted by at least one converter cell of the plurality of converter cells, wherein each of the series of time frames corresponds to a time period between sequential zero crossings of the periodic voltage.

C2. The method of item C1, wherein the periodic voltage is one of a sine voltage, and a rectified sine voltage.

C3. The method of item C1, wherein the series of time frames includes a first number (P) of times frames, and a second number (Q) of time frames, and wherein alternating the average power level includes converting power for each of the first number of time frames and converting power for each of the second plurality of time frames such that an average power level in each of the second number of time frames is lower than an average power level in each of the first number of time frames.

C4. The method of item C3, wherein alternating the average power level in the series of time frames includes sequentially alternating the average power level.

C5. The method of item C3, wherein the average power level in the second number of time frames is less than 50% of the average power level in the first number of time frames.

C6. The method of one of items C3-05, wherein the average power level in the second number of time frames is zero.

C7. The method of one of items C3-C6, wherein a ratio between the second number of time frames and the first number of time frames is higher than 1.

C8. The method of one of items C3-C6, wherein alternating an average power level of power converted by at least one converter cell of the plurality of converter cells includes alternating an average power level of power converted by each of the plurality of converter cells.

C9. The method of one of items C3-C8, wherein the power converter includes an input and wherein the periodic voltage is received at the input.

C10. The method of item C9, wherein each of the plurality of converter cells includes a cell input and a cell output, and wherein the cell inputs of the converter cells are connected in series, wherein a series circuit which includes the cell inputs is coupled to the input of the power converter.

C11. The method of one of items C9-010, wherein each of the plurality of converter cells includes a cell input and a cell output, and wherein the cell inputs of the converter cells are connected in parallel, wherein a parallel circuit which includes the cell inputs is coupled to the input of the power converter.

C12. The method of one of items C10-C11, further including: receiving power from the power converter by another power converter, wherein the other power converter is coupled to the cell outputs of the plurality of converter cells.

C13. The method of item C12, each of the cell outputs of the plurality of converter cells is coupled to a respective capacitor of a plurality of capacitors.

C14. The method of item C1, wherein the power converter includes an output and wherein the periodic voltage is received at the output.

C15. The method of item C14, wherein each of the converter cells includes a cell input and a cell output, and wherein the cell outputs of the converter cells are connected in series, and wherein a series circuit which includes the cell outputs is coupled to the output of the power converter.

C16. The method of item C14, wherein each of the converter cells includes a cell input and a cell output, and wherein the cell outputs of the converter cells are connected in parallel, wherein a parallel circuit which includes the cell outputs is coupled to the output of the power converter.

C17. The method of one of items C14-C16, further including: receiving power by the power converter from another further power converter, wherein the other power converter is coupled to the cell inputs of the plurality of converter cells.

C18. The method of item C17, wherein each cell input of the plurality of converter cells is coupled to a respective one of a plurality of capacitors.

C19. A method, including: converting DC power by a power converter including a plurality of converter cells in a first mode or a second mode, wherein in the first mode a power level of the converted power is substantially constant, and wherein in the second mode the power level of the converted power alternates.

C20. The method of item C19, wherein converting the DC power in the second mode includes alternatingly operating at least one of the plurality of converter cells in one of an active mode and an inactive mode.

C21. The method of item C20, wherein operating the at least one of the plurality of converter cells in the inactive mode includes converting zero power by the at least one of the plurality of converter cells.

C22. The method of one of items C20-C21, wherein converting the DC power in the second mode includes operating only one converter cell in the active mode at one time.

C23. The method of item C22, wherein converting the DC power in the second mode includes operating each of the plurality of converter cells at different times.

C24. The method of one of items C19-C23, wherein converting DC power includes converting DC power in the first mode or the second mode based on a level of a power reference signal.

C25. The method of item C24, wherein in the first mode the power level of the converted power is dependent on a level of the power reference signal.

C26. The method of item C24, wherein converting the DC power includes converting the DC power in the second mode when the level of the power reference signal falls below a predefined threshold.

C27. The method of one of items C24-C26, wherein converting the DC power in the second mode includes converting the DC power such that an average power level in the second mode is dependent on the level of the power reference signal.

C28. The method of one of item C19-C27, wherein an average power level in the second mode is less than 50% of the power level in the first mode.

C29. The method of one of items C24-C28, wherein converting the DC power includes providing an output current at an output of the power converter, and wherein the power reference signal includes an output current reference signal.

C30. The method of item C29, further including: receiving power by the power converter from another power converter.

C31. The method of item C19, wherein each of the plurality of converter cells includes a cell input and a cell output, and wherein cell outputs of the plurality of converter cells are connected in parallel, wherein a parallel circuit which includes the cell outputs is coupled to the output of the power converter.

C32. The method of item C19, wherein each of the plurality of converter cells includes a cell input and a cell output, and wherein cell outputs of the plurality of converter cells are connected in series, wherein a series circuit which includes the cell outputs is coupled to the output of the power converter.

C33. The method of item C19, wherein converting the DC power includes receiving an input current at an input of the power converter, and wherein the power reference signal includes an input current reference signal.

C34. The method of item C33, further including: receiving power from the power converter by another power converter.

C35. The method of item C19, wherein each of the plurality of converter cells includes a cell input and a cell output, and wherein the cell inputs of the plurality of converter cells are connected in parallel, wherein a parallel circuit which includes the cell inputs is coupled to the output of the power converter.

C36. The method of item C19, wherein each of the plurality of converter cells includes a cell input and a cell output, and wherein the cell inputs of the plurality of converter cells are connected in series, wherein a series circuit which includes the cell inputs is coupled to the output of the power converter.

C37. A power converter circuit including: a power converter including a plurality of converter cells, wherein the power converter is configured to receive a periodic voltage; and a controller configured in a series of time frames to alternate an average power level of power converted by at least one converter cell of the plurality of converter cells, wherein each time frame corresponds to a time period between sequential zero crossings of the periodic signal.

C38. The power converter circuit of item C37, wherein the periodic voltage is one of a sine voltage, and a rectified sine voltage.

C39. The power converter circuit of item C37, wherein the power converter includes an input, wherein the power converter is configured to receive the periodic voltage at the input, and wherein the power converter circuit is configured to output power to another power converter.

C40. The power converter circuit of item C37, wherein the power converter includes an output, wherein the power converter is configured to receive the periodic voltage at the output, and wherein the power converter circuit includes another power converter configured to supply power to the power converter.

C41. A power converter circuit including: a power converter including a plurality of converter cells and a controller, wherein the controller is configured to operate the power converter in one of a first mode and a second mode, wherein in the first mode a power level of the converted power is substantially constant, and wherein in the second mode the power level of the converted power alternates.

C42. The power converter circuit of item C41, wherein the controller is configured to operate at least one of the plurality of converter cells alternatingly in one of an active mode and an inactive mode.

C43. The power converter circuit of item C42, wherein the controller is configured to operate the at least one of the plurality of converter cells in the inactive mode such that the at least one of the plurality of converter cells converts zero power.

C44. The power converter circuit of item C41, wherein the controller is configured to operate only one of the plurality of converter cells in the active mode at one time.

D1. A method, including: converting power by a power converter including a plurality of converter cells and at least one filter cell; receiving a cell input power at a cell input and providing a cell output power at a cell output of at least one of the plurality of converter cells; and operating the filter cell in one of an input power mode, in which the filter cell receives an input power, and an output power mode in, in which the filter cell provides an output power.

D2. The method of item D1, wherein operating the filter cell in the input power mode includes receiving the input power at a terminal of the filter cell, and wherein operating the filter cell in the output power mode includes providing the output power at the terminal of the filter cell.

D3. The method of item D1, wherein each of the plurality converter cells includes a cell input and a cell output, and wherein the cell inputs of the plurality of converter cells and the terminal of the at least one filter cell are connected in series, wherein a series circuit which includes the cell inputs and terminal is coupled to an input of the power converter.

D4. The method of item D3, further including: receiving an input voltage at the input of the power converter; providing a cell output voltage by each of the plurality of converter cells; and operating the filter cell in the one of the input power mode and the output power mode based on a voltage level of the input voltage and on voltage levels of the cell output voltages.

D5. The method of item D4, wherein operating the filter cell in the one of the input power mode and the output power mode includes: operating a first number of the plurality of converter cells in an off-state, and operating a second number of the converter cells in an on-state, operating the filter cell in the input power mode, when a sum of the cell output voltages of the first number of converter cells is lower than the level of the input voltage, and operating the filter cell in the output power mode, when a sum of the cell output voltages of the first number of converter cells is higher than the level of the input voltage.

D6. The method of item D5, wherein the first number is dependent on the level of the input voltage.

D7. The method of item D4, wherein the input voltage is a periodic voltage.

D8. The method of item D3, further including: receiving an input voltage and an input current at the input of the power converter, and controlling the input current to have a predefined phase difference relative to the input voltage.

D9. The method of item D8, further including: controlling a cell output voltage at the cell output of each of the plurality of converter cells.

D10. The method of one of items D2-D9, further including: receiving a cell output power provided by each of the plurality of converter cells by another power converter.

D11. The method of item D10, wherein the other power converter includes only one converter cell.

D12. The method of item D10, wherein the other power converter includes a plurality of converter cells, wherein each of the plurality of converter cells of the other power converter receives the cell output power provided by an associated converter cell of the plurality of converter cells of the power converter.

D13. The method of item D10, wherein the power converter and the other power converter are linked by a plurality of capacitors.

D14. The method of item D1, wherein each of the plurality converter cells includes a cell input and a cell output, and wherein the cell outputs of the plurality of converter cells and the terminal of the filter cell are connected in series, wherein a series circuit which includes the cell outputs and the terminal is coupled to an output of the power converter.

D15. The method of item D14, further including: receiving an output voltage at the output of the power converter; receiving a cell input voltage by each converter cell; and operating the filter cell in the one of the input power mode and the output power mode based on a voltage level of the output voltage and on voltage levels of the cell input voltages.

D16. The method of item D15, wherein operating the filter cell in the one of the input power mode and the output power mode includes: operating a first number of the plurality of converter cells in an off-state, and operating a second number of the converter cells in an on-state, operating the filter cell in the output power mode, when a sum of the cell input voltages of the first number of converter cells is lower than the level of the output voltage, and operating the filter cell in the input power mode, when a sum of the cell input voltages of the first number of converter cells is higher than the level of the output voltage.

D17. The method of item D16, wherein the first number is dependent on the level of the output voltage.

D18. The method of item D16, wherein the output voltage is a periodic voltage.

D19. The method of one of items D14, further including: receiving an output voltage and providing an output current at the output of the power converter, and controlling the output current to have a predefined phase difference relative to the output voltage.

D20. The method of one of items D14-D19, further including: providing a cell input power received by each of the plurality of converter cells by another power converter.

D21. The method of item D20, wherein the other power converter includes only one converter cell.

D22. The method of item D20, wherein the other power converter includes a plurality of converter cells; and wherein each of the plurality of converter cells of the power converter receives the cell input power from an associated converter cell of the plurality of converter cells of the other power converter.

D23. The method of one of items D20-D22 wherein the power converter and the further power converter are linked by a plurality of capacitors.

D24. A power converter circuit including power converter, which includes: a plurality of converter cells, wherein at least one of the plurality of converter cells is configured to receive a cell input power at a cell input and provide a cell output power at a cell output; and at least one filter cell configured to operate in one of an input power mode, in which the filter cell receives an input power, and an output power mode in, in which the filter cell provides an output power.

D25. The power converter circuit of item D24, wherein the filter cell is configured to receive the input power at a terminal of the filter cell in the input power mode, and to provide the output power at the terminal of the filter cell in the output power mode.

D26. The power converter circuit of item D24, wherein each of the plurality converter cells includes a cell input and a cell output, and wherein the cell inputs of the plurality of converter cells and the terminal of the filter cell are connected in series, wherein a series circuit which includes the cell inputs and the terminal is coupled to an input of the power converter.

D27. The power converter circuit of item D26, wherein the power converter is configured to receive an input voltage at the input of the power converter; wherein each converter cell is configured to provide a cell output voltage; and wherein the filter cell is configured to operate in the one of the input power mode and the output power mode based on a voltage level of the input voltage and on voltage levels of the cell output voltages.

D28. The power converter circuit of item D27, wherein a first number of the plurality of converter cells is configured to operate in an off-state, and a second number of the plurality of converter cells is configured to operate in an on-state, wherein the filter cell is configured to operate in the input power mode, when a sum of the cell output voltages of the first number of converter cells is lower than the level of the input voltage, and to operate in the output power mode, when a sum of the cell output voltages of the first number of converter cells is higher than the level of the input voltage.

D29. The power converter circuit of item D28, wherein the first number is dependent on the level of the input voltage.

D30. The method of one of items D16-D29, wherein the input voltage is a periodic voltage.

D31. The power converter circuit of item D26, wherein the power converter is configured to receive an input voltage and an input current at the input of the power converter, and to control the input current to have a predefined phase difference relative to the input voltage.

D32. The power converter circuit of item 31, wherein the power converter is further configured to control a cell output voltage at the cell output of each of the plurality of converter cells.

D33. The power converter circuit of one of items D20-D32, further including: another power converter configured to receive a cell output power provided by each of the plurality of converter cells.

D34. The power converter circuit of item D33, wherein the other power converter includes only one converter cell.

D35. The power converter circuit of item D33, wherein the further power converter includes a plurality of converter cells, and wherein each of the plurality of converter cells of the other power converter receives the cell output power provided by one of the plurality of converter cells of the power converter.

D36. The power converter circuit of one of items D33-D35, wherein the power converter and the other power converter are linked by a plurality of capacitors.

D37. The power converter circuit of one of items D24-D36, wherein each of the plurality converter cells includes a cell input and a cell output, and wherein the cell outputs of the plurality of converter cells and the terminal of the filter cell are connected in series, wherein a series circuit which includes the cell outputs and the terminal is coupled to an output of the power converter.

D38. The power converter circuit of item D37, wherein the power converter is configured to receive an output voltage at the output of the power converter; wherein each converter cell is configured to receive a cell input voltage; and wherein the filter cell is configured to operate in the one of the input power mode and the output power mode based on a voltage level of the output voltage and on voltage levels of the cell input voltages.

D39. The power converter circuit of item D38, wherein a first number of the plurality of converter cells is configured to operate in an off-state, and a second number of the plurality of converter cells is configured to operate in an on-state, wherein the filter cell is configured to operate in the input power mode, when a sum of the cell input voltages of the first number of converter cells is lower than the level of the output voltage, and to operate in the output power mode, when a sum of the cell input voltages of the first number of converter cells is higher than the level of the output voltage.

D40. The power converter circuit of item D39, wherein the first number is dependent on the level of the output voltage.

D41. The method of one of items D38-D40, wherein the output voltage is a periodic voltage.

D42. The power converter circuit of one of items D37-D41, wherein the power converter is configured to receive an output voltage and to provide an output current at the output of the power converter, and to control the output current to have a predefined phase difference relative to the output voltage.

D43. The power converter circuit of item D42, wherein the power converter is further configured to control a cell input voltage at the cell input of each of the plurality of converter cells.

D44. The power converter circuit of one of items D37-D43, further including: another power converter configured to provide a cell input power to each of the plurality of converter cells.

D45. The power converter circuit of item D44, wherein the other power converter includes at least one converter cell.

D46. The power converter circuit of one of items D44-D45, wherein the other power converter includes a plurality of converter cells, and wherein each of the plurality of converter cells of the other power converter provides the cell input to one of the plurality of converter cells of the power converter.

D47. The power converter circuit of one of items D44-D46, wherein the power converter and the other power converter are linked by a plurality of capacitors.

E1. A power converter circuit, including a power converter with a plurality of series connected converter cells, wherein each of the plurality of converter cells includes at least one first half-bridge circuit including a first silicon MOSFET (Metal Oxide Semiconductor Field-Effect Transistor) and a second silicon MOSFET, and wherein at least one of the plurality of converter cells is configured to operate in a continuous current mode.

E2. The power converter circuit of item E1, wherein in the continuous current mode, a current in the first half-bridge is different from zero.

E3. The power converter circuit of one of items E1-E2, wherein each of the plurality of converter cells is configured to operate in a continuous current mode.

E4. The power converter circuit of one of items E1-E3, wherein each of the plurality of converter cells further includes a second half-bridge including a third silicon MOSFET and a fourth silicon MOSFET.

E5. The power converter circuit of item E4, wherein at least one of the plurality of converter cells is configured to receive a periodic voltage and to operate in a totem pole modulation mode.

E6. The power converter circuit of item E5, wherein the at least one converter cell in the totem pole modulation mode is configured to operate one of the first and second half-bridges at a first frequency which is dependent on a frequency of the periodic voltage, and to operate the other one of the first and second half-bridges at a second frequency higher than the frequency of the periodic voltage.

E7. The power converter circuit of item E6, wherein the first frequency is twice the frequency of the periodic voltage.

E8. The power converter circuit of item E6, wherein the second frequency is at least 200 times the frequency of the periodic voltage.

E9. The power converter circuit of one of items E1-E8, wherein each of the plurality of converter cells includes a cell input and a cell output, and wherein the cell inputs of the plurality of converter cells are connected in series and wherein a series circuit which includes the cell inputs is coupled to an input of the power converter.

E10. The power converter circuit of item E9, wherein the power converter further includes at least one inductor connected in series with the cell inputs.

E11. The power converter circuit of item E9, further including a plurality of capacitors, wherein each of the cell outputs connected to a respective one of the plurality of capacitors.

E12. The power converter circuit of item E1, wherein each of the plurality of converter cells includes a cell input and a cell output, and wherein the cell outputs of the plurality of converter cells are connected in series, wherein a series circuit which includes the cell outputs of the plurality of converter cells is coupled to an output of the power converter.

E13. The power converter circuit of item E12, wherein the power converter further includes at least one inductor connected in series with the cell outputs.

E14. The power converter circuit of item E12, further including a plurality of capacitors, wherein the cell input of each of the plurality of converter cells is connected to a respective one of the plurality of capacitors.

E15. The power converter circuit of one of items E1-E14, further including: another power converter coupled to the power converter.

E16. The power converter circuit of one of items E1-E15, wherein each of the first and second silicon MOSFETs has a voltage blocking capability greater than 100V.

E17. The power converter circuit of one of items E1-E16, wherein the first silicon MOSFET includes a first on-resistance and a first voltage blocking capability, and the second silicon MOSFET includes a second on-resistance and a second voltage blocking capability, wherein the first voltage blocking capability and the second voltage blocking capability are substantially equal, and wherein the first on-resistance is different from the second on-resistance.

E18. The power converter circuit of item E17, wherein the first on-resistance is less than 90% of the second on-resistance.

E19. A method including: operating at least one converter cell of a power converter including a plurality of series connected converter cells in a continuous current mode, wherein each of the converter cells includes at least a first half-bridge including a first silicon MOSFET and a second silicon MOSFET.

E20. The method of item E19, wherein operating the at least one converter cell in the continuous current mode includes operating the first half-bridge such that, a current in the first half-bridge is different from zero.

E21. The method of item E20, wherein operating at least one converter cell in the continuous current mode includes operating each of the plurality of converter cells in the continuous current mode.

E22. The method of one of items E19-E21, wherein each of the plurality of converter cells further includes a second half-bridge including a third silicon MOSFET and a fourth silicon MOSFET.

E23. The method of item E22, wherein operating the at least one converter cell in the continuous current mode includes: receiving a periodic voltage by the least one converter cells, and operating the at least one converter cell in a totem pole modulation mode.

E24. The method of item E23, wherein operating the at least one converter cell in the totem pole modulation mode includes operating one of the first and second half-bridges at a first frequency which is dependent on a frequency of the periodic voltage, and operating the other one of the first and second half-bridges at a second frequency higher than the frequency of the periodic voltage.

E25. The method of item E24, wherein the first frequency is twice the frequency of the periodic voltage.

E26. The method of item E25, wherein the second frequency is at least 200 times the frequency of the periodic voltage.

E27. The method of one of items E19-E26, wherein a voltage blocking capability of each of the first and second silicon MOSFETs is higher than 100V.

E28. A power converter circuit, including: a power converter with a plurality of converter cells, wherein each converter cell includes at a half-bridge circuit including a first electronic switch and a second electronic switch, wherein the first electronic switch includes a first on-resistance and a first voltage blocking capability, and the second electronic switch includes a second on-resistance and a second voltage blocking capability, wherein in at least one converter cell the first voltage blocking capability and the second voltage blocking capability are substantially equal, and the first on-resistance and the second on-resistance are different.

E29 The power converter circuit of item E28, wherein in the at least one converter cell the first on-resistance is less than 90% of the second on-resistance.

E30. The power converter circuit of item E29, wherein the first on-resistance is less than 80% of the second on-resistance.

E31. The power converter circuit of item E28, wherein in the at least one converter cell, the first voltage blocking capability is between 90% and 110% of the second voltage blocking capability.

E32. The power converter circuit of item E28, wherein each of the plurality of converter cell includes a cell input and a cell output, and wherein the cell inputs of the plurality of converter cells are connected in series, and wherein a series circuit which includes the cell inputs of the plurality of converter cells is coupled to an input of the multi-cell power converter.

E33. The power converter circuit of item E32, further including an inductor connected in series with the cell inputs.

E34. The power converter circuit of item E32, further including a plurality of capacitors, wherein the cell output of each converter cell is connected to a respective one of the plurality of capacitors.

E35. The power converter circuit of item E28, wherein each of the plurality of converter cell includes a cell input and a cell output, and wherein the cell outputs of the plurality of converter cells are connected in series, wherein a series circuit which includes the cell outputs of the plurality of converter cells is coupled to an output of the power converter.

E36. The power converter circuit of item E35, further including an inductor connected in series with the cell outputs.

E37. The power converter circuit of item E35, further including a plurality of capacitors, wherein the cell input of each converter cell is connected to a respective one of the plurality capacitors.

E38. The power converter circuit of item E28, wherein each of the plurality of converter cells includes a cell input and a cell output, and wherein the cell outputs of the plurality of converter cells are connected in parallel, wherein a parallel circuit which includes the cell outputs of the plurality of converter cells is coupled to an output of the power converter.

E39. The power converter circuit of item E28, wherein each of the plurality of converter cells includes a cell input and a cell output, and wherein the cell inputs of the plurality of converter cells are connected in parallel, wherein a parallel circuit which includes the cell inputs of the plurality of converter cells is coupled to an input of the power converter.

E40. The power converter circuit of item E28, wherein each of the first and second electronic switches is selected from the group consisting of: a MOSFET (Metal Oxide Semiconductor Field Effect Transistor); a HEMT (High Electron Mobility Transistor); a JFET (Junction Field Effect Transistor); an IGBT (Insulated Gate Bipolar Transistor); and a BJT (Bipolar Junction Transistor).

E41. The power converter circuit of one of items E28-E40, further including: a plurality of capacitors wherein each of the plurality of capacitors is coupled to a respective one of the plurality of converter cells; and another power converter coupled to the plurality of capacitors.

F1. A power converter circuit including a power converter which includes a plurality of converter cells configured to operate in a PWM mode, wherein the plurality of converter cells includes a first converter cell configured to operate in the PWM mode at a first switching frequency, and a second converter cell configured to operate in the PWM mode at a second switching frequency different than the first frequency.

F2. The power converter circuit of item F1, wherein the second switching frequency is at least 1.2 times the first switching frequency.

F3. The power converter circuit of one of items F1-F2, wherein the power converter includes a topology selected from a group consisting of: IS, OS, IP, OP.

F4. The power converter circuit of one of items F1-F3, wherein the power converter includes one of an IS and OS topology, wherein the power converter is configured to receive a periodic voltage, and wherein the first converter cell and the second converter cell are configured to operate at substantially the same modulation index and duty cycle, respectively.

G1. A method, including: operating a first converter cell in a multi-cell in a PWM mode at a first frequency, and operating a second converter cell in the multi-cell in a PWM mode at a second frequency different than the first frequency.

H1. A method, including: receiving input power by a multi-cell converter and supplying output power to a plurality of separate loads, wherein the multi-cell power converter includes an IS topology.

H2. The method of item H1, wherein the multi-cell converter includes a plurality of converter cells, and wherein each converter cell supplies power to a respective load.

H3. The method of one of items H1-H2, wherein the input power is received from an AC power grid.

I1. A method including: receiving input power by a multi-cell converter from a plurality of separate power sources and supplying output power to a load.

I2. The method of item I1, wherein the load is an AC power grid.

I3. The method of one of items I1-I2, wherein the multi-cell converter includes an OS topology.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended items.

Spatially relative terms such as "under," "below," "lower," "over," "upper" and the like, are used for ease of description to explain the positioning of one element relative to a second element. These terms are intended to encompass different orientations of the device in addition to different orientations than those depicted in the figures. Further, terms such as "first," "second" and the like, are also used to describe various elements, regions, sections, etc. and are also not intended to be limiting. Like terms refer to like elements throughout the description.

As used herein, the terms "having," "containing," "including," "including" and the like are open ended terms that indicate the presence of stated elements or features, but do not preclude additional elements or features. The articles "a," "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following items and their legal equivalents.

The invention claimed is:

1. A power converter circuit, comprising:
   a power converter with a plurality of series connected converter cells,
   wherein each of the plurality of converter cells comprises at least one first half-bridge circuit comprising a first silicon MOSFET (Metal Oxide Semiconductor Field-Effect Transistor) and a second silicon MOSFET, and
   wherein at least one of the plurality of converter cells is configured to operate in a continuous current mode,
   wherein the first silicon MOSFET comprises a first on-resistance and a first voltage blocking capability, and the second silicon MOSFET comprises a second on-resistance and a second voltage blocking capability,
   wherein the first voltage blocking capability and the second voltage blocking capability are substantially equal, and
   wherein the first on-resistance is different from the second on-resistance.

2. The power converter circuit of claim 1, wherein in the continuous current mode, a current in the first half-bridge is different from zero.

3. The power converter circuit of claim 1, wherein each of the plurality of converter cells is configured to operate in a continuous current mode.

4. The power converter circuit of claim 1, wherein each of the plurality of converter cells further comprises a second half-bridge comprising a third silicon MOSFET and a fourth silicon MOSFET.

5. The power converter circuit of claim 4, wherein at least one of the plurality of converter cells is configured to receive a periodic voltage and to operate in a totem pole modulation mode.

6. The power converter circuit of claim 5, wherein the at least one converter cell in the totem pole modulation mode is configured
   to operate one of the first and second half-bridges at a first frequency which is dependent on a frequency of the periodic voltage, and
   to operate the other one of the first and second half-bridges at a second frequency higher than the frequency of the periodic voltage.

7. The power converter circuit of claim 6, wherein the first frequency is twice the frequency of the periodic voltage.

8. The power converter circuit of claim 6, wherein the second frequency is at least 200 times the frequency of the periodic voltage.

9. The power converter circuit of claim 1,
   wherein each of the plurality of converter cells comprises a cell input and a cell output, and
   wherein the cell inputs of the plurality of converter cells are connected in series and wherein a series circuit which includes the cell inputs is coupled to a input of the power converter.

10. The power converter circuit of claim 9, wherein the power converter further comprises at least one inductor connected in series with the cell inputs.

11. The power converter circuit of claim 9, further comprising a plurality of capacitors, wherein each of the cell outputs connected to a respective one of the plurality of capacitors.

12. The power converter circuit of claim 1,
    wherein each of the plurality of converter cells comprises a cell input and a cell output, and
    wherein the cell outputs of the plurality of converter cells are connected in series, wherein a series circuit which includes the cell outputs of the plurality of converter cells is coupled to an output of the power converter.

13. The power converter circuit of claim 12, wherein the power converter further comprises at least one inductor connected in series with the cell outputs.

14. The power converter circuit of claim 12, further comprising a plurality of capacitors, wherein the cell input of each of the plurality of converter cells is connected to a respective one of the plurality of capacitors.

15. The power converter circuit of claim 1, further comprising:
    another power converter coupled to the power converter.

16. The power converter circuit of claim 1,
    wherein each of the first and second silicon MOSFETs has a voltage blocking capability greater than 100V.

17. The power converter circuit of claim 1, wherein the first on-resistance is less than 90% of the second on-resistance.

18. A method comprising:
    operating at least one converter cell of a power converter comprising a plurality of series connected converter cells in a continuous current mode,
    wherein each of the converter cells includes at least a first half-bridge comprising a first silicon MOSFET and a second silicon MOSFET,
    wherein the first silicon MOSFET comprises a first on-resistance and a first voltage blocking capability, and the second silicon MOSFET comprises a second on-resistance and a second voltage blocking capability,
    wherein the first voltage blocking capability and the second voltage blocking capability are substantially equal, and
    wherein the first on-resistance is different from the second on resistance.

19. The method of claim 18,
    wherein operating the at least one converter cell in the continuous current mode comprises operating the first half-bridge such that, a current in the first half-bridge is different from zero.

20. The method of claim 19, wherein operating at least one converter cell in the continuous current mode comprises operating each of the plurality of converter cells in the continuous current rent mode.

21. The method of claim 18,
wherein each of the plurality of converter cells further comprises a second half-bridge comprising a third silicon MOSFET and a fourth silicon MOSFET.

22. The method of claim 21, wherein operating the at least one converter cell in the continuous current mode comprises:
receiving a periodic voltage by the least one converter cells, and
operating the at least one converter cell in a totem pole modulation mode.

23. The method of claim 22, wherein operating the at least one converter cell in the totem pole modulation mode comprises:
operating one of the first and second half-bridges at a first frequency which is dependent on a frequency of the periodic voltage, and
operating the other one of the first and second half-bridges at a second frequency higher than the frequency of the periodic voltage.

24. The method of claim 23, wherein the first frequency is twice the frequency of the periodic voltage.

25. The method of claim 24, the second frequency is at least 200 times the frequency of the periodic voltage.

26. The method of claim 18, wherein a voltage blocking capability of each of the first and second silicon MOSFETs is higher than 100V.

* * * * *

UNITED STATES PATENT AND TRADEMARK OFFICE
CERTIFICATE OF CORRECTION

PATENT NO. : 9,584,034 B2  
APPLICATION NO. : 14/480036  
DATED : February 28, 2017  
INVENTOR(S) : G. Deboy Page 1 of 1

It is certified that error appears in the above-identified patent and that said Letters Patent is hereby corrected as shown below:

On the Title Page

Page 2/other publications (Column 2, Line 34), please change ""Reseach" to -- "Research --

In the Claims

Column 92, Line 14 (Claim 9, Line 6), please change "a input" to -- an input --
Column 93, Line 4 (Claim 20, Line 4), please change "current rent" to -- current --
Column 93, Line 12 (Claim 22, Line 4), please change "the least" to -- the at least --
Column 93, Line 13 (Claim 22, Line 5), please change "cells," to -- cell, --
Column 93, Line 27 (Claim 25, Line 1), please change "the second" to -- wherein the second --

Signed and Sealed this  
Sixth Day of June, 2017

Michelle K. Lee  
*Director of the United States Patent and Trademark Office*